US010177954B2

(12) United States Patent
Schneider et al.

(10) Patent No.: US 10,177,954 B2
(45) Date of Patent: Jan. 8, 2019

(54) CODING AND MODULATION APPARATUS USING NON-UNIFORM CONSTELLATION

(71) Applicant: Sony Corporation, Tokyo (JP)

(72) Inventors: Daniel Schneider, Stuttgart (DE); Nabil Loghin, Freiburg (DE); Lothar Stadelmeier, Stuttgart (DE)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/556,540

(22) PCT Filed: Mar. 16, 2016

(86) PCT No.: PCT/EP2016/055647
§ 371 (c)(1),
(2) Date: Sep. 7, 2017

(87) PCT Pub. No.: WO2016/146664
PCT Pub. Date: Sep. 22, 2016

(65) Prior Publication Data
US 2018/0041371 A1  Feb. 8, 2018

(30) Foreign Application Priority Data
Mar. 16, 2015 (EP) .................................. 15159276

(51) Int. Cl.
*H04L 5/12* (2006.01)
*H04L 27/34* (2006.01)
(Continued)

(52) U.S. Cl.
CPC ........ *H04L 27/3405* (2013.01); *H04L 1/0003* (2013.01); *H04L 1/0058* (2013.01);
(Continued)

(58) Field of Classification Search
CPC ............... H04L 27/3405; H04L 1/0071; H04L 27/2628; H04L 1/0003; H04L 1/0059; H04L 1/0058; H04L 27/265
(Continued)

(56) References Cited

U.S. PATENT DOCUMENTS

| 2009/0129477 | A1* | 5/2009 | Yang | .................. | H04N 21/2383 |
| | | | | | 375/240.24 |
| 2011/0274211 | A1* | 11/2011 | Ko | ........................ | H04L 1/0057 |
| | | | | | 375/300 |
| 2015/0236884 | A1* | 8/2015 | Suh | ..................... | H04L 27/2627 |
| | | | | | 375/295 |

OTHER PUBLICATIONS

Catherine Douillard, et al., "The Bit Interleaved Coded Modulation Module for DVB-NGH: Enhanced features for mobile reception," 2012, 19$^{th}$ International Conference on Telecommunications, IEEE, XP032188384, Apr. 23, 2012, (6 pages).

(Continued)

*Primary Examiner* — Dhaval Patel
(74) *Attorney, Agent, or Firm* — Xsensus LLP

(57) ABSTRACT

A coding and modulation apparatus and method are presented, particularly for use in a system according to IEEE 802.11. The apparatus comprises an encoder configured to encode input data into cell words according to a binary convolutional code, BCC, or a low density parity check code, LDPC, and a modulator configured to modulate said cell words into constellation values of a non-uniform constellation and to assign bit combinations to constellation values of the used non-uniform constellation, wherein said modulator is configured to use, based on the code used by the encoder, the total number M of constellation points of the constellation and the code rate.

17 Claims, 4 Drawing Sheets

(51) Int. Cl.
*H04L 1/00* (2006.01)
*H04L 27/26* (2006.01)

(52) U.S. Cl.
CPC .......... *H04L 1/0059* (2013.01); *H04L 1/0071* (2013.01); *H04L 27/265* (2013.01); *H04L 27/2628* (2013.01); *H04L 1/0057* (2013.01)

(58) Field of Classification Search
USPC ........ 375/261, 260, 295, 298, 300; 370/203, 370/204, 208, 209
See application file for complete search history.

(56) References Cited

OTHER PUBLICATIONS

Daniel Schneider, "Non-Uniform Constellations for Higher Order QAMs; 11-15-0048-00-00ax-non-uniform-constellations-for-higher-order-qams," IEEE-SA Mentor, XP068082561, vol. 802.11ax, Jan. 12, 2015, (11 pages).
DVB Organization, "DVB_TM_C2_0111_Thomson_the evaluation for non uniform QAM design.pdf," Digital Video Broadcasting, XP017842622,—Apr. 9, 2014, (34 pages).
International Search Report dated Jul. 4, 2016 in PCT/EP2016/055647 filed Mar. 16, 2016.

\* cited by examiner

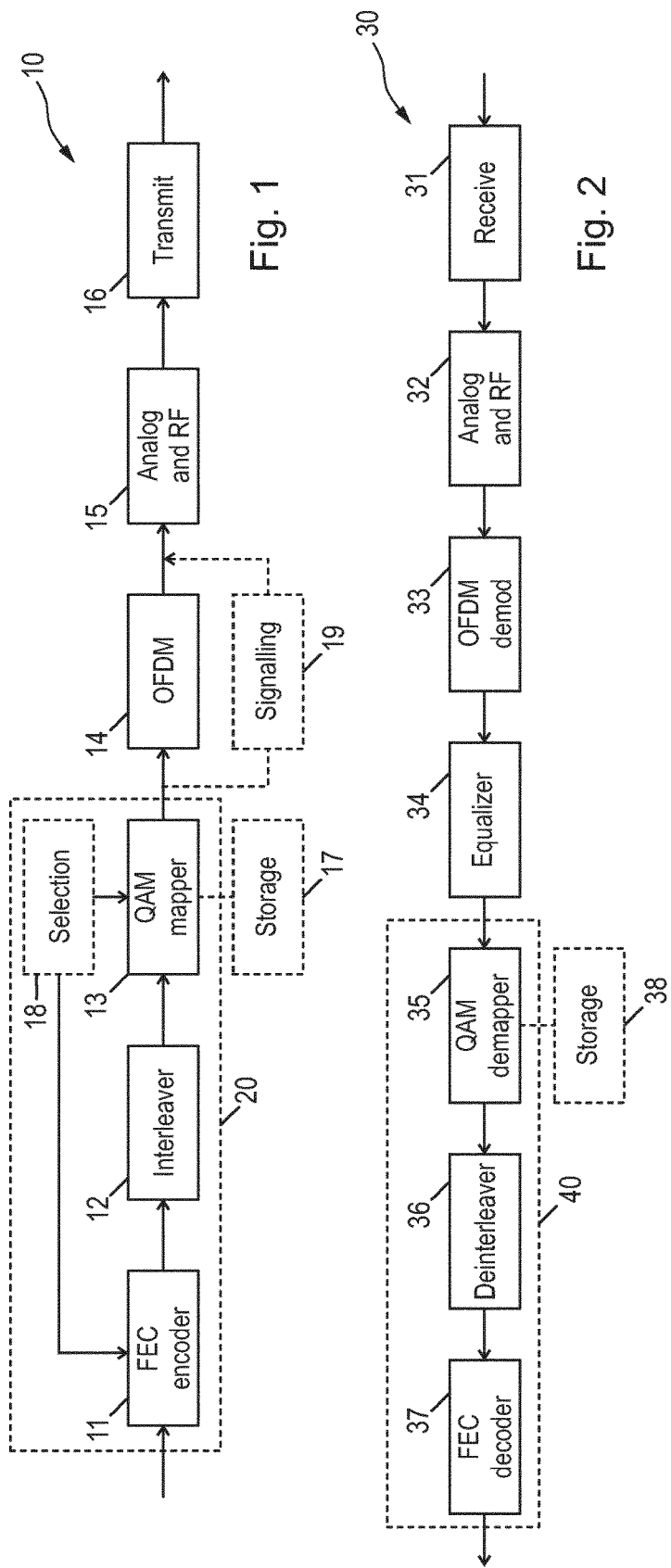
Fig. 1
Fig. 2
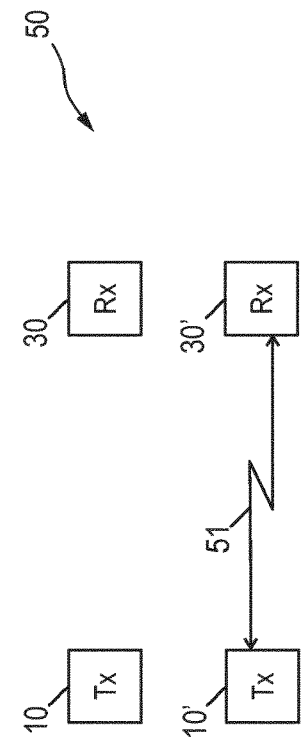
Fig. 3

CODING AND MODULATION APPARATUS USING NON-UNIFORM CONSTELLATION

CROSS-REFERENCE TO RELATED APPLICATIONS

This application is a National Stage of International Application No. PCT/EP2016/055647, filed Mar. 16, 2016, which claims priority to European Patent Application 15159276.3 filed by the European Patent Office on 16 Mar. 2015, the entire contents of which being incorporated herein by reference.

BACKGROUND

Field of the Disclosure

The present disclosure relates to a coding and modulation apparatus and method as well as a demodulation and decoding apparatus and method. Further, the present disclosure relates to a transmission apparatus and method as well as a receiving apparatus and method. Still further, the present disclosure relates to a computer program and a non-transitory computer-readable recording medium.

Description of Related Art

Modern communications systems typically employ, among other elements, a coding and modulation apparatus (as part of a transmission apparatus) and a decoding and demodulation apparatus (as part of a receiving apparatus). The coding and modulation apparatus is often part of a so called BICM (Bit Interleaved Coded Modulation) apparatus, which generally comprises (at the transmitter side) a serial concatenation of a FEC (Forward Error Correction) encoder, a bit interleaver, and a modulator, which uses spectral efficient modulation such as BPSK (Binary Phase Shift Keying), QPSK (Quaternary Phase Shift Keying), or QAM (Quadrature Amplitude Modulation).

BICM allows for good performance due to the use of the interleaver and/or the FEC encoder. It has a reasonable decoding complexity as opposed to multilevel coding (MLC) coding schemes and is thus used frequently in communications systems, such as in DVB systems or in powerline communications.

Generally, the coding and modulation capacity, such as the BICM capacity in systems using a BICM apparatus, is considered as a target function, and it is desired to find optimum constellation points such that this capacity is maximized, often subject to a power normalization, i.e., the average power of the constellation points should be normalized to e.g. 1.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide a coding and modulation apparatus and method providing an increased or even maximized coding and modulation capacity and a reduced bit error rate and reception with a reduced SNR (signal-to-noise ratio). It is a further object to provide a demodulation and decoding apparatus and method as well as a corresponding computer program for implementing said methods and a non-transitory computer-readable recording medium for implementing said methods.

According to an aspect there is provided a coding and modulation apparatus comprising an encoder configured to encode input data into cell words according to a binary convolutional code, BCC, or a low density parity check code, LDPC, and a modulator configured to modulate said cell words into constellation values of a non-uniform constellation and to assign bit combinations to constellation values of the used non-uniform constellation, wherein said modulator is configured to use, based on the code used by the encoder, the total number M of constellation points of the constellation and the code rate, one of the non-uniform constellations as defined in claim 1.

According to a further aspect there is provided a transmission apparatus comprising a coding and modulation apparatus as claimed in claim 1 configured to encode and modulate input data into constellation values, a converter configured to convert said constellation values into one or more transmission streams to be transmitted, and a transmitter configured to transmit said one or more transmission streams.

According to another aspect there is provided a demodulation and decoding apparatus comprising a demodulator configured to demodulate constellation values of a non-uniform constellation into cell words and to assign bit combinations to constellation values of the used non-uniform constellation, and a decoder configured to decode cell words into output data according to a binary convolutional code, BCC, or a low density parity check code, LDPC, wherein said demodulator is configured to use, based on the code used by the encoder, the total number M of constellation points of the constellation and the code rate, one of the non-uniform constellations as defined in claim 15.

According to a further aspect there is provided a receiving apparatus comprising receiving one or more transmission streams, deconverting one or more transmission streams into said constellation values, and demodulating and decoding said constellation values into output data according to a method as claimed in claim 16.

According to still further aspects corresponding methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Preferred embodiments are defined in the dependent claims. It shall be understood that the claimed methods, the claimed computer program and the claimed computer-readable recording medium have similar and/or identical preferred embodiments as the claimed apparatus and as defined in the dependent claims.

One of the aspects of the disclosure is that the constellation points of the used constellations, called non-uniform constellations, are not located on a regular grid with equidistant symbols, but rather on optimized locations, dependent on the channel conditions between the transmission apparatus and a receiving apparatus with which the transmission apparatus wants to communicate (e.g. in a WiFi network). Further, the used constellation is selected (preferably in advance, but generally on the fly in other embodiments) dependent on the code rate and the desired total number of constellation points of the used constellation. The code rate and total number of constellation points depends among other parameters on the channel quality, such as signal-to-noise ratio. A method how to find and optimize these non-uniform constellations (in the following called NUCs) will be explained below. Further, for the proposed non-uniform constellations an optimized bit labelling (i.e. an optimized assignment of bit combinations to constellation values of the used non-uniform constellation) is proposed.

The encoder is able to select between the use of a BCC code (binary convolutional code) or a LDPC (low density parity check code). The selected code is one criterion for selecting the constellation used by the modulator.

In the tables various constellations are provided for different values of M, for different code rates and for different codes used by the encoder. It should be noted that the code rate R indicated in the tables are not to be understood such that a particular constellation is only valid for exactly this code rate, but also for slightly different code rates. The code rate as indicated in the modulation and coding scheme (MCS) index might differ from the true code rate of the system, e.g. because tail bits are appended for a binary convolutional code (BCC) to terminate the BCC code.

It should also be noted that one or more of the following "invariant transformations" do not affect the properties of the constellations:
1. rotation of all symbols by an arbitrary angle $\varphi$,
2. inversion of m-th bit $y\_m=b\in\{0,1\}$ to $y\_m=\bar{b}$, where the bar indicates inversion,
3. interchanging of bit positions $y\_k1$ and $y\_k2$,
4. reflection on $Re\{x1\}$- and/or $Im\{x1\}$-axis,
5. predistortion,
6. mirroring on any line in the complex plane.

Thus, the modulator may also use a non-uniform constellation obtained from a constellation from anyone of groups A, B, C or D through rotation by an angle around the origin, an inversion of bit labels for all constellation points, an interchanging of bit positions for all constellation points and/or a reflection on the real part and/or imaginary part axis. For instance, if one constellation point has bit labels 0010 for 16-QAM, all first bit labels can be inverted such that this point becomes 1010. Further, constellation obtained through any other trivial manipulation, such as rounding of the constellation points' positions shall generally be covered by the claims. Through one or more of these operations an equivalent mapping to the mapping of the constellations defined in the above mentioned four groups is achieved.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 1 shows a schematic diagram of an embodiment of a transmission apparatus according to the present disclosure, FIG. 2 shows a schematic diagram of an embodiment of a receiving apparatus according to the present disclosure, FIG. 3 shows a schematic diagram of an embodiment of a communications system according to the present disclosure.

DESCRIPTION OF THE EMBODIMENTS

Figure 4:
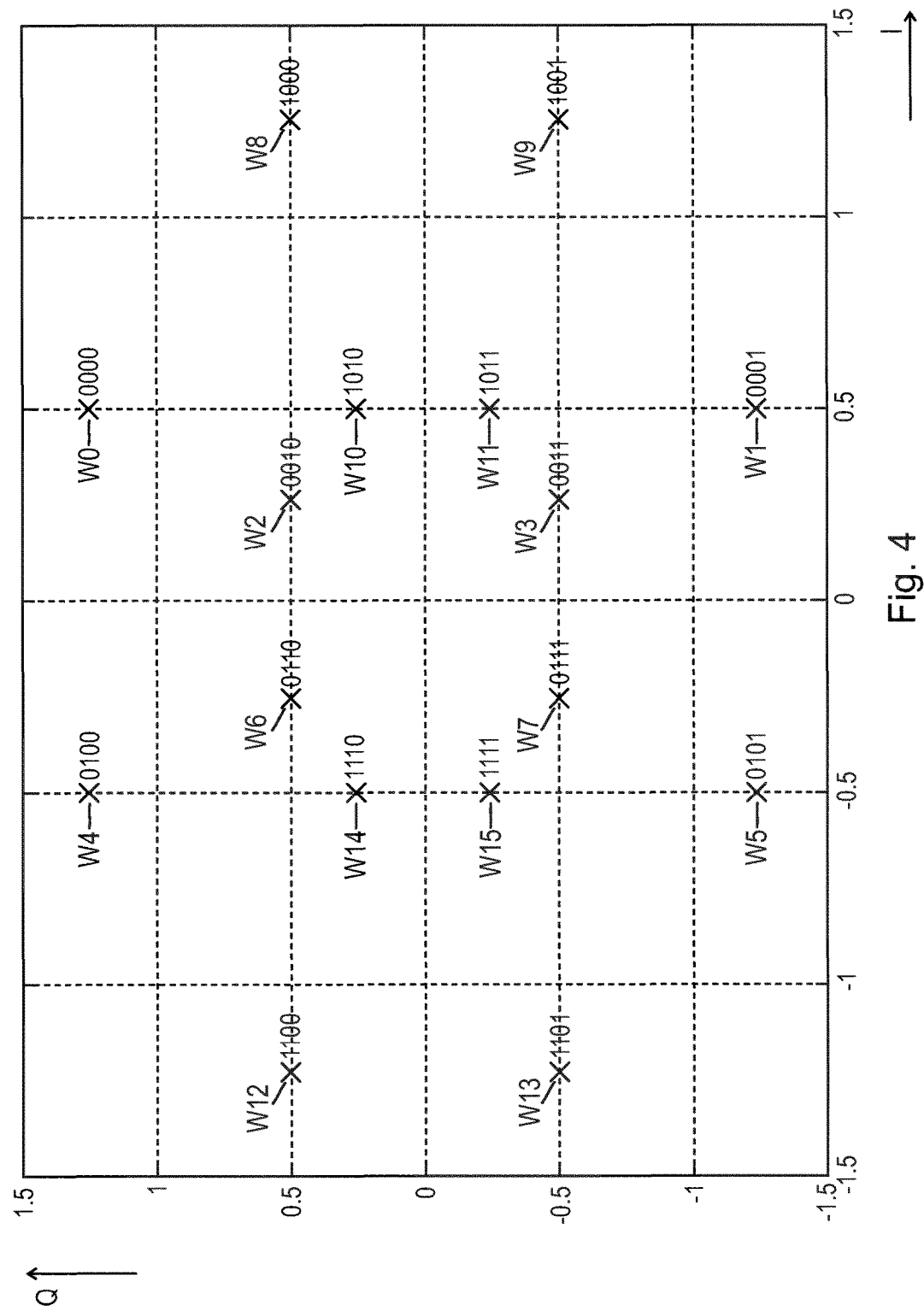
FIG. 4 shows a diagram of an exemplary two-dimensional non-uniform constellation for 16-QAM according to the present disclosure.

Referring now to the drawings, wherein like reference numerals designate identical or corresponding parts throughout the several views, FIG. 1 shows an embodiment of a transmission apparatus 10 according to the present disclosure including an embodiment of a coding and modulation apparatus 20 according to the present disclosure. In this embodiment the transmission apparatus 10 is configured for SISO (single input single output) transmission.

The transmission apparatus 10 comprises an FEC (forward error correction) encoder 11 for encoding the input data. There are two different schemes used: BCC (binary convolutional coding, which is a mandatory mode in systems according to IEEE 802.11) and LDPC (low density parity check code, which is an optional mode in systems according to IEEE 802.11n and 802.11ac). The code rate depends on the MCS (modulation and coding scheme) index, which is generally predetermined and shown in the following Table 1, preferably for 802.11ac for transmissions with one spatial stream.

TABLE 1

| MCS parameters | | | |
|---|---|---|---|
| MCS index | modulation | bit/symbol | code rate (R) |
| 0 | BPSK | 1 | 1/2 |
| 1 | QPSK | 2 | 1/2 |
| 2 | QPSK | 2 | 3/4 |
| 3 | 16-QAM | 4 | 1/2 |
| 4 | 16-QAM | 4 | 3/4 |
| 5 | 64-QAM | 6 | 2/3 |
| 6 | 64-QAM | 6 | 3/4 |
| 7 | 64-QAM | 6 | 5/6 |
| 8 | 256-QAM | 8 | 3/4 |
| 9 | 256-QAM | 8 | 5/6 |

The transmitter 10 further—optionally—comprises a bit interleaver 12, which is preferably only present in case of BCC encoding, whereas in case of LDPC encoding no interleaver is preferably used. The bit interleaver 12 performs bit interleaving of the encoded data.

A constellation mapper 13 (generally also called modulator), in particular a QAM (quadrature amplitude modulation) mapper, maps the encoded and interleaved bits of the input data to complex symbols (also called constellation points) in a constellation, in particular a QAM constellation. The modulation order depends on the MCS index (as reflected in Table 1).

The transmission apparatus 10 further comprises an OFDM (orthogonal frequency-division multiplexing) unit 14 for OFDM modulation, an RF processing unit 15 for RF processing like frequency up conversion, power amplifier, transmit filters, digital-to-analog conversion, etc., and a transmit unit 16 for transmitting the finally obtained signals over channel to a receiving apparatus. In other embodiments of the transmission apparatus 10 additional elements may be provided, such as an input processing unit and/or a frame building unit, or other elements as e.g. conventionally used in a transmission apparatus of a system in accordance with IEEE 802.11.

The FEC encoder 11, the (optional) interleaver 12 and the constellation mapper (modulator) 13 are often summarized as BICM (bit-interleaved coded modulation) modulation apparatus and represent the coding and modulation apparatus 20 according to the present disclosure. The FEC encoder 11 generally encodes input data into cell words according to a BCC code or an LDPC code. The modulator 13 generally modulates said cell words into constellation values of a non-uniform constellation and assign bit combinations to constellation values of the used non-uniform constellation. Based on the code used by the FEC encoder 11, the total number M of constellation points of the constellation and the code rate, one of a selection of non-uniform constellations of different groups is used. Details of those different groups of constellations will be explained in more detail below. The constellations and the constellations values are generally predetermined and e.g. stored in a constellations storage 17 or retrieved from an external source. The MCS parameters may also be stored in the constellations storage 17 or the external source.

FIG. 2 shows an embodiment of a receiving apparatus 30 according to the present disclosure including an embodiment of a decoding and demodulation apparatus 40 according to the present disclosure. Basically, the same blocks of the transmitter apparatus are reversed. After reception by a receiving unit 31, RF processing like frequency down conversion, receive filtering, analog-to-digital conversion, etc. is performed by an RF unit 32 and OFDM demodulation is performed by an OFDM demodulator 33. An equalizer 34 reverses the effect of channel distortions and forwards the equalized QAM symbols to the QAM demapper 35 (also called demodulator) for QAM demapping. After (optional) deinterleaving in an optional deinterleaver 36 FEC decoding is performed in a FEC decoder 37. In other embodiments of the receiving apparatus 30 additional elements may be provided, such as an output processing unit and/or a deframing unit, or other elements as e.g. conventionally used in a receiving apparatus of a system in accordance with IEEE 802.11.

The QAM demapper 35 (demodulator), the (optional) deinterleaver 36 and the FEC decoder 37 are often summarized as BICM demodulation apparatus and represent the decoding and demodulation apparatus 40 according to the present disclosure. The demodulator 35 generally demodulates received constellation values of a non-uniform constellation into cell words, whereby bit combinations are assigned to constellation values of the used non-uniform constellation. Based on a signalling information included in the received data the receiving apparatus knows which one of a selection of non-uniform constellations of different groups has been used by the transmitting apparatus 10 so that the receiving apparatus 30 can use the same non-uniform constellation for demodulation. The FEC decoder 37 generally decodes the cell words according to the used code (i.e. BCC code or LDPC code) into output words. Also in the receiving apparatus 30 the constellations and the constellations values may be stored in a constellations storage 38 or retrieved from an external source.

The preferred demodulation and decoding considers soft values as opposed to hard decided values (0 and 1). Soft values represent the continuously distributed received values (possibly after A/D conversion including quantization) by more than two states (as in the case of binary (hard) decision). The reason is that for hard decision, the non-uniform constellations are generally not optimal. Nowadays, BICM receivers typically are soft receivers anyway.

FIG. 3 shows an embodiment of a communications system 50 according to the present disclosure comprising one (or more) transmission apparatus 10, 10' (Tx) as shown in FIG. 1 and one or more receiving apparatus 30, 30' (Rx) as shown in FIG. 2. As an example, the transmission apparatus 10', which may be a WiFi access point or WiFi router, communicates with a receiving apparatus 30', which may be a user device like a smartphone, laptop or tablet, via a bi-directional communication channel 51, for instance to provide access to the internet to the receiving apparatus 30'. Both the transmission apparatus 10' and the receiving apparatus 30' may use the ideas of the present disclosure in said communication session.

Today's systems in accordance with IEEE 802.11 (WLAN, WiFi) generally use uniform constellations. Several Modulation and Coding Schemes (MCSs) are defined for use in such systems. According to the present disclosure, non-uniform constellations and their bit labelling are proposed, which are optimized with respect to coding and modulation capacity and which may be used in such system in accordance with IEEE 802.11, particularly in accordance with or upcoming versions.

The parameters of the basic MCSs for a SISO transmitting apparatus are given in Table 1 as shown above. The MCS index as described above defines the QAM modulation order (indicating the value of M), the number of bits/symbol and the used code rate R. The receiver needs to know which MCS index is used at transmitter side for correct decoding. The transmission apparatus therefore signals the used MCS index. This may be done at the beginning of each transmitted frame. For instance, this signalling information may be carried at the beginning of the frame in a special signal field. Examples of fields which may be used are the SIG, L-SIG, HT-SIG, VHT-SIG or HE-SIG field, depending on the mode. For inserting such signalling information a signalling unit 19 may be provided in the transmisssion apparatus 10.

It should be noted that for a MIMO (multiple input multiple output) transmitting apparatus different MCS indices may be used, referring to the same modulation order M and code rate R of the MCS indices as shown above in table 1 for a SISO transmitting apparatus. It is proposed according to the present disclosure to use the herein disclosed NUCs for MIMO as well (i.e. use the same NUCs as for SISO) even if the MCS indices are different. In other words, in the following tables and in the claims the NUCs are defined for a certain modulation order M and a code rate R, represented by MCS indices as used for SISO. The same NUCS may be used for MIMO when using the same modulation order M and a code rate R, even if these are represented by different MCS indices for MIMO.

The signalling information is typically carried within a small number (in particular 1 or 2) of OFDM symbols. This small number of signalling OFDM symbols follows short and long training symbols which form the beginning of each frame (the training symbols and signalling symbols are typically called preamble). The transmission apparatus may comprise a selection unit 18, shown with dashed lines in FIG. 1, which selects the MCS index depending on the channel conditions to the receiving apparatus. For bad channel conditions a small MCS index is selected (lower throughput but also smaller error probability), for good channel conditions a higher MCS index is selected (higher throughput but also more prone to bit errors).

According to the present disclosure a NUC is proposed for each MCS index for BCC and LDPC, respectively; in particular for MCS index 3-9 (there is no NUC for BPSK and QPSK). Additionally, NUCs are proposed for 1024-QAM, which may particularly be used in systems in accordance with IEEE 802.11ax.

According to the present disclosure the modulator 13 is configured to use, based on the code used by the encoder 11, the total number M of constellation points of the constellation and the code rate a predetermined non-uniform constellation and bit labeling. A selection unit 18 may be provided in the transmission apparatus 10 that is configured to select the total number M of constellation points of the constellation and the code rate based on channel conditions between a transmission apparatus including said coding and modulation apparatus and a receiving apparatus with which said transmission apparatus seeks to communicate. Preferably, the selection unit 18 selects a constellation with a higher number of M and/or a higher code rate the better the channel conditions are.

If the encoder uses a BCC code and if M=16, 64 or 256, a non-uniform constellation and bit labeling is used from a group A, the group A comprising constellations as defined in sub-group A1 for 16-QAM with M=16 and code rates of 1/2 or 3/4, sub-group A2 for 64-QAM with M=64 and code rates of 2/3, 3/4 or 5/6, and sub-group A3 for 256-QAM with M=256 and code rates of 3/4 or 5/6, wherein the constellation points are defined by a constellation position vector $w_0 \ldots w_{M-1}$, wherein the constellation position vectors of the different constellations are defined as follows:

A) M-QAM non-uniform constellations of group A for BCC encoding:

A1) 16-QAM NUC

| w | bitlabel | MCS = 3(or 4) | MCS = 4(or 3) |
|---|---|---|---|
| w0 | 0000 | +0.2918 + 0.2918i | +0.3063 − 0.3063i |
| w1 | 0001 | +0.9565 + 0.2918i | +0.3063 + 0.3063i |
| w2 | 0010 | −0.2918 + 0.2918i | +0.9519 − 0.3063i |
| w3 | 0011 | −0.9565 + 0.2918i | +0.9519 + 0.3063i |
| w4 | 0100 | +0.2918 + 0.9565i | −0.3063 − 0.3063i |
| w5 | 0101 | +0.9565 + 0.9565i | −0.3063 + 0.3063i |
| w6 | 0110 | −0.2918 + 0.9565i | −0.9519 − 0.3063i |
| w7 | 0111 | −0.9565 + 0.9565i | −0.9519 + 0.3063i |
| w8 | 1000 | +0.2918 − 0.2918i | +0.3063 − 0.9519i |
| w9 | 1001 | +0.9565 − 0.2918i | +0.3063 + 0.9519i |
| w10 | 1010 | −0.2918 − 0.2918i | +0.9519 − 0.9519i |
| w11 | 1011 | −0.9565 − 0.2918i | +0.9519 + 0.9519i |
| w12 | 1100 | +0.2918 − 0.9565i | −0.3063 − 0.9519i |
| w13 | 1101 | +0.9565 − 0.9565i | −0.3063 + 0.9519i |
| w14 | 1110 | −0.2918 − 0.9565i | −0.9519 − 0.9519i |
| w15 | 1111 | −0.9565 − 0.9565i | −0.9519 + 0.9519i |

A2) 64-QAM NUC

| w/ MCS index | bit label | MCS = 5 (or 6 or 7) | MCS = 6 (or 5 or 7) | MCS = 7 (or 5 or 6) |
|---|---|---|---|---|
| w0 | 000000 | +10474−0.1695i | +1.0432−0.1724i | +1.0297−0.1665i |
| w1 | 000001 | +0.7243−0.1504i | +0.7272−0.1538i | +0.1417−0.1412i |
| w2 | 000010 | −1.0474−0.1695i | +0.1428−0.1397i | −1.0297−0.1665i |
| w3 | 000011 | −0.7243−0.1504i | +0.4304−0.1474i | −0.1417−0.1412i |
| w4 | 000100 | +0.1407−0.1336i | −1.0432−0.1724i | +1.1116−0.5027i |
| w5 | 000101 | +0.4265−0.1388i | −0.7272−0.1538i | +0.1521−0.4258i |
| w6 | 000110 | −0.1407−0.1336i | −0.1428−0.1397i | −1.1116−0.5027i |
| w7 | 000111 | −0.4265−0.1388i | −0.4304−0.1474i | −0.1521−0.4258i |
| w8 | 001000 | +1.0474+0.1695i | +1.0432+0.1724i | +1.0297+0.1665i |
| w9 | 001001 | +0.7243+0.1504i | +0.7272+0.1538i | +0.1417+0.1412i |
| w10 | 001010 | −1.0474+0.1695i | +0.1428+0.1397i | −1.0297+0.1665i |
| w11 | 001011 | −0.7243+0.1504i | +0.4304+0.1474i | −0.1417+0.1412i |
| w12 | 001100 | +0.1407+0.1336i | −1.0432+0.1724i | +1.1116+0.5027i |
| w13 | 001101 | +0.4265+0.1388i | −0.7272+0.1538i | +0.1521+0.4258i |
| w14 | 001110 | −0.1407+0.1336i | −0.1428+0.1397i | −1.1116+0.5027i |
| w15 | 001111 | −0.4265+0.1388i | −0.4304+0.1474i | −0.1521+0.4258i |
| w16 | 010000 | +1.4261−0.2216i | +1.1145−0.5358i | +0.7218−0.1633i |
| w17 | 010001 | +0.6106−1.1783i | +0.7705=0.4700i | +0.4281−0.1504i |
| w18 | 010010 | −1.4261−0.2216i | +0.1500=0.4221i | −0.7218−0.1633i |
| w19 | 010011 | −0.6106−1.1783i | +0.4537−0.4461i | −0.4281−0.1504i |
| w20 | 010100 | +0.1682−1.0316i | −1.1145−0.5358i | +0.7726−0.4955i |
| w21 | 010101 | +0.2287−1.3914i | −0.7705−0.4700i | +0.4581−0.4553i |
| w22 | 010110 | −0.1682−1.0316i | −0.1500−0.4221i | −0.7726−0.4955i |
| w23 | 010111 | −0.2287−1.3914i | −0.4537−0.4461i | −0.4581−0.4553i |
| w24 | 011000 | +1.4261+0.2216i | +1.1145−0.5358i | +0.7218+0.1633i |
| w25 | 011001 | +0.6106+1.1783i | +0.7705+0.4700i | +0.4281+0.1504i |
| w26 | 011010 | −1.4261+0.2216i | +0.1500+0.4221i | −0.7213+0.1633i |
| w27 | 011011 | −0.6106+1.1783i | +0.4537+0.4451i | −0.4281+0.1504i |
| w28 | 011100 | +0.1682+1.0316i | −1.1145−0.5358i | +0.7726+0.4955i |
| w29 | 011101 | +0.2287+1.3914i | −0.7705+0.4700i | +0.4581+0.4553i |
| w30 | 011110 | −0.1682+1.0316i | −0.1500+0.4221i | −0.7726+0.4955i |
| w31 | 011111 | −0.2287+1.3914i | −0.4537+0.4451i | −0.4581+0.4553i |
| w32 | 100000 | +1.0854−0.5394i | +1.3903−0.2023i | +1.3715−0.1909i |
| w33 | 100001 | +0.7353−0.4523i | +0.5830−1.1356i | +0.1700−1.0281i |
| w34 | 100010 | −1.0854−0.5394i | +0.1708−1.0248i | −1.3715−0.1909i |
| w35 | 100011 | −0.7353−0.4523i | +0.2191−1.3613i | −0.1700−1.0281i |
| w36 | 100100 | +0.1392−0.4078i | −1.3903−0.2023i | +1.1152−0.8599i |
| w37 | 100101 | +0.4262−0.4205i | −0.5830−1.1356i | +0.1524−0.7179i |
| w38 | 100110 | −0.1392−0.4078i | −0.1708−1.0248i | −1.1152−0.3599i |
| w39 | 100111 | −0.4262−0.4205i | −0.2191−1.3613i | −0.1524−0.7179i |
| w40 | 101000 | +1.0854+0.5394i | +1.3903+0.2023i | +1.3715+0.1909i |
| w41 | 101001 | +0.7353+0.4523i | +0.5830+1.1356i | +0.1700+1.0281i |
| w42 | 101010 | −1.0854+0.5394i | +0.1708+1.0248i | −1.3715+0.1909i |
| w43 | 101011 | −0.7353+0.4523i | +0.2191+1.3613i | −0.1700+1.0281i |
| w44 | 101100 | +0.1392+0.4078i | −1.3903+0.2023i | +1.1152+0.8599i |
| w45 | 101101 | +0.4262+0.4205i | −0.5830+1.1356i | +0.1524+0.7179i |
| w46 | 101110 | −0.1392+0.4078i | −0.1708+1.0248i | −1.1152+0.8599i |
| w47 | 101111 | −0.4262+0.4205i | −0.2191+1.3618i | −0.1524+0.7179i |
| w48 | 110000 | +1.0693−0.9408i | +1.0788−0.9275i | +0.5530−1.1489i |
| w49 | 110001 | +0.7092−0.8073i | +0.7608−0.8009i | +0.2033−1.3620i |
| w50 | 110010 | −1.0693−0.9408i | +0.1480−0.7122i | −0.5530−1.1489i |
| w51 | 110011 | −0.7092−0.5073i | +0.4498−0.7565i | −0.2033−1.3620i |
| w52 | 110100 | +0.1388−0.7057i | −1.0788−0.9275i | +0.7724−0.8458i |
| w53 | 110101 | +0.4197−0.7206i | −0.7608−0.8009i | +0.4596−0.7717i |
| w54 | 110110 | −0.1388−0.7057i | −0.1480−0.7122i | −0.7724−0.3458i |
| w55 | 110111 | −0.4197−0.7206i | −0.4498−0.7565i | −0.4596−0.7717i |
| w56 | 111000 | +1.0693+0.9408i | +1.0788+0.9275i | +0.5530+1.1489i |
| w57 | 111001 | +0.7092+0.8073i | +0.7608+0.8009i | +0.2033+1.3620i |
| w58 | 111010 | −1.0693+0.9408i | +0.1480+0.7122i | −0.5530+1.1489i |
| w59 | 111011 | −0.7092+0.8073i | +0.4498+0.7565i | −0.2033+1.3620i |
| w60 | 111100 | +0.1388+0.7057i | −1.0788+0.9275i | +0.7724+0.8458i |
| w61 | 111101 | +0.4197+0.7206i | −0.7608+0.8009i | +0.4596+0.7717i |
| w62 | 111110 | −0.1388+0.7057i | −0.1480+0.7122i | −0.7724+0.8458i |
| w63 | 111111 | −0.4197+0.7206i | −0.4498+0.7565i | −0.4596+0.7717i |

A3) 256-QAM NUC for MCS=8 (or 9):

| w index | bit label | Constellation point |
|---|---|---|
| w0 | 0000000 | −0.4905+1.1842i |
| w1 | 0000000 | −0.6911+0.6930i |
| w2 | 0000001 | −0.5982+1.0262i |
| w3 | 0000001 | −0.6740+0.8584i |
| w4 | 0000010 | +0.4905+1.1842i |

| w index | bit label | Constellation point |
|---|---|---|
| w5 | 0000010 | +0.6911+0.6930i |
| w6 | 0000011 | +0.5982+1.0262i |
| w7 | 0000011 | +0.6740+0.8584i |
| w8 | 0000100 | −0.6622+0.0739i |
| w9 | 0000100 | −0.6739+0.5331i |
| w10 | 0000101 | −0.6337+0.2246i |
| w11 | 0000101 | −0.6474+0.3777i |
| w12 | 0000110 | +0.6622+0.0739i |
| w13 | 0000110 | +0.6739+0.5331i |
| w14 | 0000111 | +0.6337+0.2246i |
| w15 | 0000111 | +0.6474+0.3777i |
| w16 | 0001000 | −0.4905−1.1842i |
| w17 | 0001000 | −0.6911−0.6930i |
| w18 | 0001001 | −0.5982−1.0262i |
| w19 | 0001001 | −0.6740−0.8584i |
| w20 | 0001010 | +0.4905−1.1842i |
| w21 | 0001010 | +0.6911−0.6930i |
| w22 | 0001011 | +0.5982−1.0262i |
| w23 | 0001011 | +0.6740−0.8584i |
| w24 | 0001100 | −0.6622−0.0739i |
| w25 | 0001100 | −0.6739−0.5331i |
| w26 | 0001101 | −0.6337−0.2246i |
| w27 | 0001101 | −0.6474−0.3777i |
| w28 | 0001110 | +0.6622−0.0739i |
| w29 | 0001110 | +0.6739−0.5331i |
| w30 | 0001111 | +0.6337−0.2246i |
| w31 | 0001111 | +0.6474−0.3777i |
| w32 | 0010000 | −0.6854+1.2221i |
| w33 | 0010000 | −0.8561+0.6778i |
| w34 | 0010001 | −0.7829+1.0274i |
| w35 | 0010001 | −0.8451+0.8492i |
| w36 | 0010010 | +0.6854+1.2221i |
| w37 | 0010010 | +0.8561+0.6778i |
| w38 | 0010011 | +0.7829+1.0274i |
| w39 | 0010011 | +0.8451+0.8492i |
| w40 | 0010100 | −0.8231+0.0739i |
| w41 | 0010100 | −0.8353+0.5198i |
| w42 | 0010101 | −0.7818+0.2196i |
| w43 | 0010101 | −0.7994+0.3695i |
| w44 | 0010110 | +0.8231+0.0739i |
| w45 | 0010110 | +0.8353+0.5198i |
| w46 | 0010111 | +0.7818+0.2196i |
| w47 | 0010111 | +0.7994+0.3695i |
| w48 | 0011000 | −0.6854−1.2221i |
| w49 | 0011000 | −0.8561−0.6778i |
| w50 | 0011001 | −0.7829−1.0274i |
| w51 | 0011001 | −0.8451−0.8492i |
| w52 | 0011010 | +0.6854−1.2221i |
| w53 | 0011010 | +0.8561−0.6778i |
| w54 | 0011011 | +0.7829−1.0274i |
| w55 | 0011011 | +0.8451−0.8492i |
| w56 | 0011100 | −0.8231−0.0739i |
| w57 | 0011100 | −0.8353−0.5198i |
| w58 | 0011101 | −0.7818−0.2196i |
| w59 | 0011101 | −0.7994−0.3695i |
| w60 | 0011110 | +0.8231−0.0739i |
| w61 | 0011110 | +0.8353−0.5198i |
| w62 | 0011111 | +0.7818−0.2196i |
| w63 | 0011111 | +0.7994−0.3695i |
| w64 | 01000000 | −0.4711+1.3764i |
| w65 | 01000001 | −0.5308+0.6813i |
| w66 | 01000010 | −0.4242+0.9942i |
| w67 | 01000011 | −0.5155+0.8438i |
| w68 | 01000100 | +0.4711+1.3764i |
| w69 | 01000101 | +0.5308+0.6813i |
| w70 | 01000110 | +0.4242+0.9942i |
| w71 | 01000111 | +0.5155+0.8438i |
| w72 | 01001000 | −0.5101+0.0730i |
| w73 | 01001001 | −0.5175+0.5233i |
| w74 | 01001010 | −0.4897+0.2198i |
| w75 | 01001011 | −0.4992+0.3698i |
| w76 | 01001100 | +0.5101+0.0730i |
| w77 | 01001101 | +0.5175+0.5233i |
| w78 | 01001110 | +0.4897+0.2198i |
| w79 | 01001111 | +0.4992+0.3698i |
| w80 | 01010000 | −0.4711−1.3764i |
| w81 | 01010001 | −0.5308−0.6813i |
| w82 | 01010010 | −0.4242−0.9942i |
| w83 | 01010011 | −0.5155−0.8438i |
| w84 | 01010100 | +0.4711−1.3764i |
| w85 | 01010101 | +0.5308−0.6813i |
| w86 | 01010110 | +0.4242−0.9942i |
| w87 | 01010111 | +0.5155−0.8438i |
| w88 | 01011000 | −0.5101−0.0730i |
| w89 | 01011001 | −0.5175−0.5233i |
| w90 | 01011010 | −0.4897−0.2198i |
| w91 | 01011011 | −0.4992−0.3698i |
| w92 | 01011100 | +0.5101−0.0730i |
| w93 | 01011101 | +0.5175−0.5233i |
| w94 | 01011110 | +0.4897−0.2198i |
| w95 | 01011111 | +0.4992−0.3698i |
| w96 | 01100000 | −0.2836+1.2952i |
| w97 | 01100001 | −0.3755+0.6565i |
| w98 | 01100010 | −0.2860+1.1119i |
| w99 | 01100011 | −0.3664+0.8105i |
| w100 | 01100100 | +0.2836+1.2952i |
| w101 | 01100101 | +0.3755+0.6565i |
| w102 | 01100110 | +0.2860+1.1119i |
| w103 | 01100111 | +0.3664+0.8105i |
| w104 | 01101000 | −0.3616+0.0709i |
| w105 | 01101001 | −0.3655+0.5062i |
| w106 | 01101010 | −0.3479+0.2135i |
| w107 | 01101011 | −0.3537+0.3587i |
| w108 | 01101100 | +0.3616+0.0709i |
| w109 | 01101101 | +0.3655+0.5062i |
| w110 | 01101110 | +0.3479+0.2135i |
| w111 | 01101111 | +0.3537+0.3587i |
| w112 | 01110000 | −0.2836−1.2952i |
| w113 | 01110001 | −0.3755−0.6565i |
| w114 | 01110010 | −0.2860−1.1119i |
| w115 | 01110011 | −0.3664−0.8105i |
| w116 | 01110100 | +0.2836−1.2952i |
| w117 | 01110101 | +0.3755−0.6565i |
| w118 | 01110110 | +0.2860−1.1119i |
| w119 | 01110111 | +0.3664−0.8105i |
| w120 | 01111000 | −0.3616−0.0709i |
| w121 | 01111001 | −0.3655−0.5062i |
| w122 | 01111010 | −0.3479−0.2135i |
| w123 | 01111011 | −0.3537−0.3587i |
| w124 | 01111100 | +0.3616−0.0709i |
| w125 | 01111101 | +0.3655−0.5062i |
| w126 | 01111110 | +0.3479−0.2135i |
| w127 | 01111111 | +0.3537−0.3587i |
| w128 | 10000000 | −1.2103+0.9014i |
| w129 | 10000001 | −1.1677+0.4847i |
| w130 | 10000010 | −1.2323+0.6874i |
| w131 | 10000011 | −1.3547+0.4862i |
| w132 | 10000100 | +1.2103+0.9014i |
| w133 | 10000101 | +1.1677+0.4847i |
| w134 | 10000110 | +1.2323+0.6874i |
| w135 | 10000111 | +1.3547+0.4862i |
| w136 | 10001000 | −1.1595+0.0882i |
| w137 | 10001001 | −1.4613+0.2782i |
| w138 | 10001010 | −1.3430+0.0950i |
| w139 | 10001011 | −1.2637+0.2839i |
| w140 | 10001100 | +1.1595+0.0882i |
| w141 | 10001101 | +1.4613+0.2782i |
| w142 | 10001110 | +1.3430+0.0950i |
| w143 | 10001111 | +1.2637+0.2839i |
| w144 | 10010000 | −1.2103−0.9014i |
| w145 | 10010001 | −1.1677−0.4847i |
| w145 | 10010010 | −1.2323−0.6874i |
| w147 | 10010011 | −1.3547−0.4862i |
| w148 | 10010100 | +1.2103−0.9014i |
| w149 | 10010101 | +1.1677−0.4847i |
| w150 | 10010110 | +1.2323−0.6874i |
| w151 | 10010111 | +1.3547−0.4862i |
| w152 | 10011000 | −1.1595−0.0882i |
| w153 | 10011001 | −1.4613−0.2782i |
| w154 | 10011010 | −1.3430−0.0950i |
| w155 | 10011011 | −1.2637−0.2839i |
| w156 | 10011100 | +1.1595−0.0882i |
| w157 | 10011101 | +1.4613−0.2782i |
| w158 | 10011110 | +1.3430−0.0950i |

-continued

| w index | bit label | Constellation point |
|---|---|---|
| w159 | 10011111 | +1.2637−0.2839i |
| w160 | 10100000 | −0.9022+1.1987i |
| w161 | 10100001 | −1.0215−0.6013i |
| w162 | 10100010 | −0.9925+0.9967i |
| w163 | 10100011 | −1.0233+0.7878i |
| w164 | 10100100 | +0.9022+1.1987i |
| w165 | 10100101 | +1.0215+0.6013i |
| w166 | 10100110 | +0.9925+0.9967i |
| w167 | 10100111 | +1.0233+0.7878i |
| w168 | 10101000 | −0.9894+0.0820i |
| w169 | 10101001 | −0.9800+0.4265i |
| w170 | 10101010 | −0.9367+0.2358i |
| w171 | 10101011 | −1.0889+0.2858i |
| w172 | 10101100 | +0.9894+0.0820i |
| w173 | 10101101 | +0.9800+0.4265i |
| w174 | 10101110 | +0.9367+0.2358i |
| w175 | 10101111 | +1.0889+0.2858i |
| w176 | 10110000 | −0.9022−1.1987i |
| w177 | 10110001 | −1.0215−0.6013i |
| w178 | 10110010 | −0.9925−0.9967i |
| w179 | 10110011 | −1.0233−0.7878i |
| w180 | 10110100 | +0.9022−1.1987i |
| w181 | 10110101 | +1.0215−0.6013i |
| w182 | 10110110 | +0.9925−0.9967i |
| w183 | 10110111 | +1.0233−0.7878i |
| w184 | 10111000 | −0.9894−0.0820i |
| w185 | 10111001 | −0.9800−0.4265i |
| w186 | 10111010 | −0.9367−0.2358i |
| w187 | 10111011 | −1.0889−0.2858i |
| w188 | 10111100 | +0.9894−0.0820i |
| w189 | 10111101 | +0.9800−0.4265i |
| w190 | 10111110 | +0.9367−0.2358i |
| w191 | 10111111 | −1.2103+0.9014i |
| w192 | 11000000 | −0.0888+1.1903i |
| w193 | 11000001 | −0.0732+0.6770i |
| w194 | 11000010 | −0.0829+1.0145i |
| w195 | 11000011 | −0.0737+0.8430i |
| w196 | 11000100 | +0.0888+1.1903i |
| w197 | 11000101 | +0.0732+0.6770i |
| w198 | 11000110 | +0.0829+1.0145i |
| w199 | 11000111 | +0.0737+0.8430i |
| w200 | 11001000 | −0.0711+0.0728i |
| w201 | 11001001 | −0.0722+0.5215i |
| w202 | 11001010 | −0.0687+0.2202i |
| w203 | 11001011 | −0.0699+0.3698i |
| w204 | 11001100 | +0.0711+0.0728i |
| w205 | 11001101 | +0.0722+0.5215i |
| w206 | 11001110 | +0.0687+0.2202i |
| w207 | 11001111 | +0.0699+0.3698i |
| w208 | 11010000 | −0.0888−1.1903i |
| w209 | 11010001 | −0.0732−0.6770i |
| w210 | 11010010 | −0.0829−1.0145i |
| w211 | 11010011 | −0.0737−0.8430i |
| w212 | 11010100 | +0.0888−1.1903i |
| w213 | 11010101 | +0.0732−0.6770i |
| w214 | 11010110 | +0.0829−1.0145i |
| w215 | 11010111 | +0.0737−0.8430i |
| w216 | 11011000 | −0.0711−0.0728i |
| w217 | 11011001 | −0.0722−0.5215i |
| w218 | 11011010 | −0.0687−0.2202i |
| w219 | 11011011 | −0.0699−0.3698i |
| w220 | 11011100 | +0.0711−0.0728i |
| w221 | 11011101 | +0.0722−0.5215i |
| w222 | 11011110 | +0.0687−0.2202i |
| w223 | 11011111 | +0.0699−0.3698i |
| w224 | 11100000 | −0.1023+1.3833i |
| w225 | 11100001 | −0.2228+0.6437i |
| w226 | 11100010 | −0.2357+0.9536i |
| w227 | 11100011 | −0.2175+0.7949i |
| w228 | 11100100 | +0.1023+1.3833i |
| w229 | 11100101 | +0.2228+0.6437i |
| w230 | 11100110 | +0.2357+0.9536i |
| w231 | 11100111 | +0.2175+0.7949i |
| w232 | 11101000 | −0.2153+0.0697i |
| w233 | 11101001 | −0.2171+0.4970i |
| w234 | 11101010 | −0.2074+0.2103i |
| w235 | 11101011 | −0.2104+0.3528i |

-continued

| w index | bit label | Constellation point |
|---|---|---|
| w236 | 11101100 | +0.2153+0.0697i |
| w237 | 11101101 | +0.2171+0.4970i |
| w238 | 11101110 | +0.2074+0.2103i |
| w239 | 11101111 | +0.2104+0.3528i |
| w240 | 11110000 | −0.1023−1.3833i |
| w241 | 11110001 | −0.2228−0.6437i |
| w242 | 11110010 | −0.2357−0.9536i |
| w243 | 11110011 | −0.2175−0.7949i |
| w244 | 11110100 | +0.1023−1.3833i |
| w245 | 11110101 | +0.2228−0.6437i |
| w246 | 11110110 | +0.2357−0.9536i |
| w247 | 11110111 | +0.2175−0.7949i |
| w248 | 11111000 | −0.2153−0.0697i |
| w249 | 11111001 | −0.2171−0.4970i |
| w250 | 11111010 | −0.2074−0.2103i |
| w251 | 11111011 | −0.2104−0.3528i |
| w252 | 11111100 | +0.2153−0.0697i |
| w253 | 11111101 | +0.2171−0.4970i |
| w254 | 11111110 | +0.2074−0.2103i |
| w255 | 11111111 | +0.2104−0.3528i | or
for MCS=9 (or 8):

| w index | bit label | Constellation point |
|---|---|---|
| w0 | 0000000 | −0.4801+1.1746i |
| w1 | 0000000 | −0.6762+1.2058i |
| w2 | 0000001 | +0.4801+1.1746i |
| w3 | 0000001 | +0.6762+1.2058i |
| w4 | 0000010 | −0.4614+1.3554i |
| w5 | 0000010 | −0.2766+1.2869i |
| w6 | 0000011 | +0.4514+1.3554i |
| w7 | 0000011 | +0.2766+1.2869i |
| w8 | 0000100 | −1.1920+0.8876i |
| w9 | 0000100 | −0.8919+1.1799i |
| w10 | 0000101 | +1.1920+0.8876i |
| w11 | 0000101 | +0.8919+1.1799i |
| w12 | 0000110 | −0.0897+1.1870i |
| w13 | 0000110 | −0.0980+1.3675i |
| w14 | 0000111 | +0.0897+1.1870i |
| w15 | 0000111 | +0.0980+1.3675i |
| w16 | 0001000 | −0.7042+0.7037i |
| w17 | 0001000 | −0.8656+0.6806i |
| w18 | 0001001 | +0.7042+0.7037i |
| w19 | 0001001 | +0.8656+0.6806i |
| w20 | 0001010 | −0.5441+0.6946i |
| w21 | 0001010 | −0.3865+0.6677i |
| w22 | 0001011 | +0.5441+0.6946i |
| w23 | 0001011 | +0.3865+0.6677i |
| w24 | 0001100 | −1.1619+0.4714i |
| w25 | 0001100 | −1.0233+0.5938i |
| w26 | 0001101 | +1.1619+0.4714i |
| w27 | 0001101 | +1.0233+0.5938i |
| w28 | 0001110 | −0.0761+0.6911i |
| w29 | 0001110 | −0.2301+0.6395i |
| w30 | 0001111 | +0.0761+0.6911i |
| w31 | 0001111 | +0.2301+0.6395i |
| w32 | 0010000 | −0.4801−1.1746i |
| w33 | 0010000 | −0.6762−1.2058i |
| w34 | 0010001 | +0.4801−1.1746i |
| w35 | 0010001 | +0.6762−1.2058i |
| w36 | 0010010 | −0.4614−1.3554i |
| w37 | 0010010 | −0.2766−1.2869i |
| w38 | 0010011 | +0.4614−1.3554i |
| w39 | 0010011 | +0.2766−1.2869i |
| w40 | 0010100 | −1.1920−0.8876i |
| w41 | 0010100 | −0.8919−1.1799i |
| w42 | 0010101 | +1.1920−0.8876i |
| w43 | 0010101 | +0.8919−1.1799i |
| w44 | 0010110 | −0.0897−1.1870i |
| w45 | 0010110 | −0.0980−1.3675i |
| w46 | 0010111 | +0.0897−1.1870i |
| w47 | 0010111 | +0.0980−1.3675i |
| w48 | 0011000 | −0.7042−0.7037i |

-continued

| w index | bit label | Constellation point |
|---|---|---|
| w49 | 0011000 | −0.8656−0.6806i |
| w50 | 0011001 | +0.7042−0.7037i |
| w51 | 0011001 | +0.8656−0.6806i |
| w52 | 0011010 | −0.5441−0.6946i |
| w53 | 0011010 | −0.3865−0.6677i |
| w54 | 0011011 | +0.5441−0.6946i |
| w55 | 0011011 | +0.3865−0.6677i |
| w56 | 0011100 | −1.1619−0.4714i |
| w57 | 0011100 | −1.0233−0.5938i |
| w58 | 0011101 | +1.1619−0.4714i |
| w59 | 0011101 | +1.0233−0.5938i |
| w60 | 0011110 | −0.0761−0.6911i |
| w61 | 0011110 | −0.2301−0.6395i |
| w62 | 0011111 | +0.0761−0.6911i |
| w63 | 0011111 | +0.2301−0.6395i |
| w64 | 01000000 | −0.6844+0.0760i |
| w65 | 01000001 | −0.8440+0.0765i |
| w66 | 01000010 | +0.6844+0.0760i |
| w67 | 01000011 | +0.8440+0.0765i |
| w68 | 01000100 | −0.5319−0.0762i |
| w69 | 01000101 | −0.3811+0.0732i |
| w70 | 01000110 | +0.5319+0.0762i |
| w71 | 01000111 | +0.3811+0.0732i |
| w72 | 01001000 | −1.1751+0.0886i |
| w73 | 01001001 | −1.0070+0.0833i |
| w74 | 01001010 | +1.1751+0.0886i |
| w75 | 01001011 | +1.0070+0.0833i |
| w76 | 01001100 | −0.0749+0.0766i |
| w77 | 01001101 | −0.2291+0.0689i |
| w78 | 01001110 | +0.0749+0.0766i |
| w79 | 01001111 | +0.2291+0.0689i |
| w80 | 01010000 | −0.6891+0.5440i |
| w81 | 01010001 | −0.8493+0.5224i |
| w82 | 01010010 | +0.6891+0.5440i |
| w83 | 01010011 | +0.8493+0.5224i |
| w84 | 01010100 | −0.5302+0.5350i |
| w85 | 01010101 | −0.3753+0.5150i |
| w86 | 01010110 | +0.5302+0.5350i |
| w87 | 01010111 | +0.3753+0.5150i |
| w88 | 01011000 | −1.4427+0.2847i |
| w89 | 01011001 | −0.9868+0.4178i |
| w90 | 01011010 | +1.4427+0.2847i |
| w91 | 01011011 | +0.9868+0.4178i |
| w92 | 01011100 | −0.0759+0.5374i |
| w93 | 01011101 | −0.2229+0.4904i |
| w94 | 01011110 | +0.0759+0.5374i |
| w95 | 01011111 | +0.2229+0.4904i |
| w96 | 01100000 | −0.6844−0.0760i |
| w97 | 01100001 | −0.8440−0.0765i |
| w98 | 01100010 | +0.6844−0.0760i |
| w99 | 01100011 | +0.8440−0.0765i |
| w100 | 01100100 | −0.5319−0.0762i |
| w101 | 01100101 | −0.3811−0.0732i |
| w102 | 01100110 | +0.5319−0.0762i |
| w103 | 01100111 | +0.3811−0.0732i |
| w104 | 01101000 | −1.1751−0.0886i |
| w105 | 01101001 | −1.0070−0.0833i |
| w106 | 01101010 | +1.1751−0.0886i |
| w107 | 01101011 | +1.0070−0.0833i |
| w108 | 01101100 | −0.0749−0.0766i |
| w109 | 01101101 | −0.2291−0.0689i |
| w110 | 01101110 | +0.0749−0.0766i |
| w111 | 01101111 | +0.2291−0.0689i |
| w112 | 01110000 | −0.6891−0.5440i |
| w113 | 01110001 | −0.8493−0.5224i |
| w114 | 01110010 | +0.6891−0.5440i |
| w115 | 01110011 | +0.8493−0.5224i |
| w116 | 01110100 | −0.5302−0.5350i |
| w117 | 01110101 | −0.3753−0.5150i |
| w118 | 01110110 | +0.5302−0.5350i |
| w119 | 01110111 | +0.3753−0.5150i |
| w120 | 01111000 | −1.4427−0.2847i |
| w121 | 01111001 | −0.9868−0.4178i |
| w122 | 01111010 | +1.4427−0.2847i |
| w123 | 01111011 | +0.9868−0.4178i |
| w124 | 01111100 | −0.0759−0.5374i |
| w125 | 01111101 | −0.2229−0.4904i |
| w126 | 01111110 | +0.0759−0.5374i |
| w127 | 01111111 | +0.2229−0.4904i |
| w128 | 10000000 | −0.5937+1.0262i |
| w129 | 10000001 | −0.7777+1.0233i |
| w130 | 10000010 | +0.5937+1.0262i |
| w131 | 10000011 | +0.7777+1.0233i |
| w132 | 10000100 | −0.4184+0.9977i |
| w133 | 10000101 | −0.2792+1.1096i |
| w134 | 10000110 | +0.4184+0.9977i |
| w135 | 10000111 | +0.2792+1.1096i |
| w136 | 10001000 | −1.2121+0.6733i |
| w137 | 10001001 | −0.9865+0.9873i |
| w138 | 10001010 | +1.2121+0.6733i |
| w139 | 10001011 | +0.9865+0.9873i |
| w140 | 10001100 | −0.0824+1.0164i |
| w141 | 10001101 | −0.2359+0.9515i |
| w142 | 10001110 | +0.0824+1.0164i |
| w143 | 10001111 | +0.2359+0.9515i |
| w144 | 10010000 | −0.6785+0.8656i |
| w145 | 10010001 | −0.8479+0.8504i |
| w146 | 10010010 | +0.6785+0.8656i |
| w147 | 10010011 | +0.8479+0.8504i |
| w148 | 10010100 | −0.5200+0.8555i |
| w149 | 10010101 | −0.3697+0.8223i |
| w150 | 10010110 | +0.5200+0.8555i |
| w151 | 10010111 | +0.3697+0.8223i |
| w152 | 10011000 | −1.3397+0.4820i |
| w153 | 10011001 | −1.0229+0.7822i |
| w154 | 10011010 | +1.3397+0.4820i |
| w155 | 10011011 | +1.0229+0.7822i |
| w156 | 10011100 | −0.0752+0.8524i |
| w157 | 10011101 | −0.2205+0.7921i |
| w158 | 10011110 | +0.0752+0.8524i |
| w159 | 10011111 | +0.2205+0.7921i |
| w160 | 10100000 | −0.5937−1.0262i |
| w161 | 10100001 | −0.7777−1.0233i |
| w162 | 10100010 | +0.5937−1.0262i |
| w163 | 10100011 | +0.7777−1.0233i |
| w164 | 10100100 | −0.4184−0.9977i |
| w165 | 10100101 | −0.2792−1.1096i |
| w166 | 10100110 | +0.4184−0.9977i |
| w167 | 10100111 | +0.2792−1.1096i |
| w168 | 10101000 | −1.2121−0.6733i |
| w169 | 10101001 | −0.9865−0.9873i |
| w170 | 10101010 | +1.2121−0.6733i |
| w171 | 10101011 | +0.9865−0.9873i |
| w172 | 10101100 | −0.0824−1.0164i |
| w173 | 10101101 | −0.2359−0.9515i |
| w174 | 10101110 | +0.0824−1.0164i |
| w175 | 10101111 | +0.2359−0.9515i |
| w176 | 10110000 | −0.6785−0.8656i |
| w177 | 10110001 | −0.8479−0.8504i |
| w178 | 10110010 | +0.6785−0.8656i |
| w179 | 10110011 | +0.8479−0.8504i |
| w180 | 10110100 | −0.5200−0.8555i |
| w181 | 10110101 | −0.3697−0.8223i |
| w182 | 10110110 | +0.5200−0.8555i |
| w183 | 10110111 | +0.3697−0.8223i |
| w184 | 10111000 | −1.3397−0.4820i |
| w185 | 10111001 | −1.0229−0.7822i |
| w186 | 10111010 | +1.3397−0.4820i |
| w187 | 10111011 | +1.0229−0.7822i |
| w188 | 10111100 | −0.0752−0.8524i |
| w189 | 10111101 | −0.2205−0.7921i |
| w190 | 10111110 | +0.0752−0.8524i |
| w191 | 10111111 | +0.2205−0.7921i |
| w192 | 11000000 | −0.6336+0.2306i |
| w193 | 11000001 | −0.7836+0.2217i |
| w194 | 11000010 | +0.6336+0.2306i |
| w195 | 11000011 | +0.7836+0.2217i |
| w196 | 11000100 | −0.4864+0.2253i |
| w197 | 11000101 | −0.3429+0.2164i |
| w198 | 11000110 | +0.4864+0.2253i |
| w199 | 11000111 | +0.3429+0.2164i |
| w200 | 11001000 | −1.3520+0.0957i |
| w201 | 11001001 | −0.9402+0.2370i |
| w202 | 11001010 | +1.3520+0.0957i |

| w index | bit label | Constellation point |
| --- | --- | --- |
| w203 | 11001011 | +0.9402+0.2370i |
| w204 | 11001100 | −0.0684+0.2330i |
| w205 | 11001101 | −0.2017+0.2031i |
| w206 | 11001110 | +0.0684+0.2330i |
| w207 | 11001111 | +0.2017+0.2031i |
| w208 | 11010000 | −0.6601+0.3878i |
| w209 | 11010001 | −0.8131+0.3716i |
| w210 | 11010010 | +0.6601+0.3878i |
| w211 | 11010011 | +0.8131+0.3716i |
| w212 | 11010100 | −0.5092+0.3789i |
| w213 | 11010101 | −0.3608+0.3649i |
| w214 | 11010110 | +0.5092+0.3789i |
| w215 | 11010111 | +0.3608+0.3649i |
| w216 | 11011000 | −1.2604+0.2816i |
| w217 | 11011001 | −1.0927+0.2741i |
| w218 | 11011010 | +1.2604+0.2816i |
| w219 | 11011011 | +1.0927+0.2741i |
| w220 | 11011100 | −0.0724+0.3856i |
| w221 | 11011101 | −0.2134+0.3455i |
| w222 | 11011110 | +0.0724+0.3856i |
| w223 | 11011111 | +0.2134+0.3455i |
| w224 | 11100000 | −0.6336−0.2306i |
| w225 | 11100001 | −0.7836−0.2217i |
| w226 | 11100010 | +0.6336−0.2306i |
| w227 | 11100011 | +0.7836−0.2217i |
| w228 | 11100100 | −0.4864−0.2253i |
| w229 | 11100101 | −0.3429−0.2164i |
| w230 | 11100110 | +0.4864−0.2253i |
| w231 | 11100111 | +0.3429−0.2164i |
| w232 | 11101000 | −1.3520−0.0957i |
| w233 | 11101001 | −0.9402−0.2370i |
| w234 | 11101010 | +1.3520−0.0957i |
| w235 | 11101011 | +0.9402−0.2370i |
| w236 | 11101100 | −0.0684−0.2330i |
| w237 | 11101101 | −0.2017−0.2031i |
| w238 | 11101110 | +0.0684−0.2330i |
| w239 | 11101111 | +0.2017−0.2031i |
| w240 | 11110000 | −0.6601−0.3878i |
| w241 | 11110001 | −0.8131−0.3716i |
| w242 | 11110010 | +0.6601−0.3878i |
| w243 | 11110011 | +0.8131−0.3716i |
| w244 | 11110100 | −0.5092−0.3789i |
| w245 | 11110101 | −0.3608−0.3649i |
| w246 | 11110110 | +0.5092−0.3789i |
| w247 | 11110111 | +0.3608−0.3649i |
| w248 | 11111000 | −1.2604−0.2816i |
| w249 | 11111001 | −1.0927−0.2741i |
| w250 | 11111010 | +1.2604−0.2816i |
| w251 | 11111011 | +1.0927−0.2741i |
| w252 | 11111100 | −0.0724−0.3856i |
| w253 | 11111101 | −0.2134−0.3455i |
| w254 | 11111110 | +0.0724−0.3856i |
| w255 | 11111111 | +0.2134−0.3455i |

If the encoder uses an LDPC code and if M=16, 64 or 256, a non-uniform constellation and bit labeling is used from a group B, the group B comprising constellations as defined in sub-group B1 for 16-QAM with M=16 and code rates of 1/2 or 3/4, sub-group B2 for 64-QAM with M=64 and code rates of 2/3, 3/4 or 5/6, and sub-group B3 for 256-QAM with M=256 and code rates of 3/4 or 5/6, wherein the constellation points are defined by a constellation position vector $w_0 \ldots w_{M-1}$, wherein the constellation position vectors of the different constellations are defined as follows:

B) M-QAM non-uniform constellations of group B for LDPC encoding:

B1) 16-QAM NUC

| w | bit label | MCS = 3 (or 4) | MCS = 4 (or 3) |
| --- | --- | --- | --- |
| w0 | 0000 | +0.4925+1.2040i | +0.3018−0.3018i |
| w1 | 0001 | +0.4925−1.2040i | +0.9534−0.3018i |
| w2 | 0010 | +0.2530+0.4936i | +0.3018+0.3018i |
| w3 | 0011 | +0.2530−0.4936i | +0.9534+0.3018i |
| w4 | 0100 | −0.4925+1.2040i | −0.3018−0.3018i |
| w5 | 0101 | −0.4925−1.2040i | −0.9534−0.3018i |
| w6 | 0110 | −0.2530+0.4936i | −0.3018+0.3018i |
| w7 | 0111 | −0.2530−0.4936i | −0.9534+0.3018i |
| w8 | 1000 | +1.2040+0.4925i | +0.3018−0.9534i |
| w9 | 1001 | +1.2040−0.4925i | +0.9534−0.9534i |
| w10 | 1010 | +0.4936+0.2530i | +0.3018+0.9534i |
| w11 | 1011 | +0.4936−0.2530i | +0.9534+0.9534i |
| w12 | 1100 | −1.2040+0.4925i | −0.3018−0.9534i |
| w13 | 1101 | −1.2040−0.4925i | −0.9534−0.9534i |
| w14 | 1110 | −0.4936+0.2530i | −0.3018+0.9534i |
| w15 | 1111 | −0.4936−0.2530i | −0.9534+0.9534i |

B2) 64-QAM NUC

| w/MCS index | bit label | MCS = 5 (or 6 or 7) | MCS = 6 (or 5 or 7) | MCS = 7 (or 5 or 6) |
| --- | --- | --- | --- | --- |
| w0 | 000000 | +1.4656+0.2931i | +1.0441−0.1581i | +1.0474−0.1695i |
| w1 | 000001 | +0.2878+1.4388i | +0.1321−0.1317i | −1.0474−0.1695i |
| w2 | 000010 | +0.1678+0.1166i | +1.4516−0.2578i | +0.7243−0.1504i |
| w3 | 000011 | +0.1177+0.4119i | +0.1689−1.0567i | −0.7243−0.1504i |
| w4 | 000100 | +1.4656−0.2931i | +0.6995−0.1411i | +0.1407−0.1336i |
| w5 | 000101 | +0.2878−1.4388i | +0.4035−0.1354i | −0.1407−0.1336i |
| w6 | 000110 | +0.1678−0.1166i | +0.6750−1.2072i | +0.4265−0.1388i |
| w7 | 000111 | +0.1177−0.4119i | +0.2558−1.4247i | −0.4265−0.1388i |
| w8 | 001000 | +1.0649+0.2069i | +1.0161−0.4912i | +1.0474+0.1695i |
| w9 | 001001 | +0.2219+1.0386i | +0.1287−0.4061i | −1.0474+0.1695i |
| w10 | 001010 | +0.7408+0.1355i | +1.1306−0.8649i | +0.7243+0.1504i |
| w11 | 001011 | +0.1559+0.7442i | +0.1385−0.7199i | −0.7243+0.1504i |
| w12 | 001100 | +1.0649−0.2069i | +0.6966−0.4427i | +0.1407+0.1336i |
| w13 | 001101 | +0.2219−1.0386i | +0.4025−0.4142i | −0.1407+0.1336i |
| w14 | 001110 | +0.7408−0.1355i | +0.6874−0.8123i | +0.4265+0.1388i |
| w15 | 001111 | +0.1559−0.7442i | +0.4017−0.7107i | −0.4265+0.1388i |
| w16 | 010000 | +1.2278+0.8230i | +1.0441+0.1581i | +1.0854−0.5394i |
| w17 | 010001 | +0.8133+1.2150i | +0.1321+0.1317i | −1.0854−0.5394i |
| w18 | 010010 | +0.3325+0.1582i | +1.4516+0.2578i | +0.7353−0.4623i |
| w19 | 010011 | +0.2516+0.3998i | +0.1689+1.0567i | −0.7353−0.4623i |
| w20 | 010100 | +1.2278−0.8230i | +0.6995+0.1411i | +0.1392−0.4078i |
| w21 | 010101 | +0.8133−1.2150i | +0.4035+0.1354i | −0.1392−0.4078i |
| w22 | 010110 | +0.3325−0.1582i | +0.6750+1.2072i | +0.4262−0.4205i |
| w23 | 010111 | +0.2516−0.3998i | +0.2558+1.4247i | −0.4262−0.4205i |
| w24 | 011000 | +0.8971+0.5677i | +1.0161+0.4912i | +1.0854+0.5394i |
| w25 | 011001 | +0.6145+0.8494i | +0.1287+0.4061i | −1.0854+0.5394i |
| w26 | 011010 | +0.6200+0.3227i | +1.1306+0.8649i | +0.7353+0.4623i |
| w27 | 011011 | +0.4328+0.5954i | +0.1385+0.7199i | −0.7353+0.4623i |
| w28 | 011100 | +0.8971−0.5677i | +0.6966+0.4427i | +0.1392+0.4078i |
| w29 | 011101 | +0.6145−0.8494i | +0.4025+0.4142i | −0.1392+0.4078i |
| w30 | 011110 | +0.6200−0.3227i | +0.6874+0.8123i | +0.4262+0.4205i |
| w31 | 011111 | +0.4328−0.5954i | +0.4017+0.7107i | −0.4262+0.4205i |
| w32 | 100000 | −1.4656+0.2931i | −1.0441−0.1581i | +1.4261−0.2216i |
| w33 | 100001 | −0.2878+1.4388i | −0.1321−0.1317i | −1.4261−0.2216i |
| w34 | 100010 | −0.1678+0.1166i | −1.4516−0.2578i | +0.6106−1.1783i |
| w35 | 100011 | −0.1177+0.4119i | −0.1689−1.0567i | −0.6106−1.1783i |
| w36 | 100100 | −1.4656−0.2931i | −0.6995−0.1411i | +0.1682−1.0316i |
| w37 | 100101 | −0.2878−1.4388i | −0.4035−0.1354i | −0.1682−1.0316i |
| w38 | 100110 | −0.1678−0.1166i | −0.6750−1.2072i | +0.2287−1.3914i |
| w39 | 100111 | −0.1177−0.4119i | −0.2558−1.4247i | −0.2287−1.3914i |
| w40 | 101000 | −1.0649+0.2069i | −1.0161−0.4912i | +1.4261+0.2216i |
| w41 | 101001 | −0.2219+1.0386i | −0.1287−0.4061i | −1.4261+0.2216i |
| w42 | 101010 | −0.7408+0.1355i | −1.1306−0.8649i | +0.6106+1.1783i |
| w43 | 101011 | −0.1559+0.7442i | −0.1385−0.7199i | −0.6106+1.1783i |
| w44 | 101100 | −1.0649−0.2069i | −0.6966−0.4427i | +0.1682+1.0316i |
| w45 | 101101 | −0.2219−1.0386i | −0.4025−0.4142i | −0.1682+1.0316i |
| w46 | 101110 | −0.7408−0.1355i | −0.6874−0.8123i | +0.2287+1.3914i |
| w47 | 101111 | −0.1559−0.7442i | −0.4017−0.7107i | −0.2287+1.3914i |
| w48 | 110000 | −1.2278+0.8230i | −1.0441+0.1581i | +1.0693−0.9408i |
| w49 | 110001 | −0.8133+1.2150i | −0.1321+0.1317i | −1.0693−0.9408i |
| w50 | 110010 | −0.3325+0.1582i | −1.4516+0.2578i | +0.7092−0.8073i |
| w51 | 110011 | −0.2516+0.3998i | −0.1689+1.0567i | −0.7092−0.8073i |
| w52 | 110100 | −1.2278−0.8230i | −0.6995+0.1411i | +0.1388−0.7057i |

| w/ MCS index | bit label | MCS = 5 (or 6 or 7) | MCS = 6 (or 5 or 7) | MCS = 7 (or 5 or 6) |
|---|---|---|---|---|
| w53 | 110101 | −0.8133−1.2150i | −0.4035+0.1354i | −0.1388−0.7057i |
| w54 | 110110 | −0.3325−0.1582i | −0.6750+1.2072i | +0.4197−0.7206i |
| w55 | 110111 | −0.2516−0.3998i | −0.2558+1.4247i | −0.4197−0.7206i |
| w56 | 111000 | −0.8971+0.5677i | −1.0161+0.4912i | +1.0693+0.9408i |
| w57 | 111001 | −0.6145+0.8494i | −0.1287+0.4061i | −1.0693+0.9408i |
| w58 | 111010 | −0.6200+0.3227i | −1.1306+0.8649i | +0.7092+0.8073i |
| w59 | 111011 | −0.4328+0.5954i | −0.1385+0.7199i | −0.7092+0.8073i |
| w60 | 111100 | −0.8971−0.5677i | −0.6966+0.4427i | +0.1388+0.7057i |
| w61 | 111101 | −0.6145−0.8494i | −0.4025−0.4142i | −0.1388+0.7057i |
| w62 | 111110 | −0.6200−0.3227i | −0.6874+0.8123i | +0.4197+0.7206i |
| w63 | 111111 | −0.4328−0.5954i | −0.4017+0.7107i | −0.4197+0.7206i |

B3) 256-QAM NUC for MCS=8 (or 9):

| w index | bit label | Constellation point |
|---|---|---|
| w0 | 0000000 | −0.5039+1.2055i |
| w1 | 0000000 | −0.4884+1.0092i |
| w2 | 0000001 | −1.1657+1.0793i |
| w3 | 0000001 | −1.2385+0.8387i |
| w4 | 0000010 | −0.5781+1.4095i |
| w5 | 0000010 | −0.6891+1.0532i |
| w6 | 0000011 | −0.7876+1.2931i |
| w7 | 0000011 | −0.8990+1.0937i |
| w8 | 0000100 | −0.5039−1.2055i |
| w9 | 0000100 | −0.4884−1.0092i |
| w10 | 0000101 | −1.1657−1.0793i |
| w11 | 0000101 | −1.2385−0.8387i |
| w12 | 0000110 | −0.5781−1.4095i |
| w13 | 0000110 | −0.6891−1.0532i |
| w14 | 0000111 | −0.7876−1.2931i |
| w15 | 0000111 | −0.8990−1.0937i |
| w16 | 0001000 | −0.6348+0.6721i |
| w17 | 0001000 | −0.5902+0.8432i |
| w18 | 0001001 | −1.2060+0.5685i |
| w19 | 0001001 | −1.4112+0.6488i |
| w20 | 0001010 | −0.8075+0.6969i |
| w21 | 0001010 | −0.7660+0.8734i |
| w22 | 0001011 | −1.0100+0.6965i |
| w23 | 0001011 | −0.9651+0.8870i |
| w24 | 0001100 | −0.6346−0.6721i |
| w25 | 0001100 | −0.5902−0.8432i |
| w26 | 0001101 | −1.2060−0.5685i |
| w27 | 0001101 | −1.4112−0.6488i |
| w28 | 0001110 | −0.8075−0.6969i |
| w29 | 0001110 | −0.7660−0.8734i |
| w30 | 0001111 | −1.0100−0.6965i |
| w31 | 0001111 | −0.9651−0.8870i |
| w32 | 0010000 | −0.6629+0.0713i |
| w33 | 0010000 | −0.6641+0.2135i |
| w34 | 0010001 | −1.4228+0.1199i |
| w35 | 0010001 | −1.2036+0.1064i |
| w36 | 0010010 | −0.8160+0.0736i |
| w37 | 0010010 | −0.8280+0.2196i |
| w38 | 0010011 | −0.9811+0.0673i |
| w39 | 0010011 | −1.0114+0.2066i |
| w40 | 0010100 | −0.6629−0.0713i |
| w41 | 0010100 | −0.6641−0.2135i |
| w42 | 0010101 | −1.4228−0.1199i |
| w43 | 0010101 | −1.2036−0.1064i |
| w44 | 0010110 | −0.8160−0.0736i |
| w45 | 0010110 | −0.8280−0.2196i |
| w46 | 0010111 | −0.9811−0.0673i |
| w47 | 0010111 | −1.0114−0.2066i |
| w48 | 0011000 | −0.6511+0.5096i |
| w49 | 0011000 | −0.6617+0.3573i |
| w50 | 0011001 | −1.4186+0.3682i |
| w51 | 0011001 | −1.2116+0.3184i |
| w52 | 0011010 | −0.8111+0.5264i |
| w53 | 0011010 | −0.8276+0.3658i |
| w54 | 0011011 | −0.9802+0.5258i |
| w55 | 0011011 | −1.0181+0.3668i |
| w56 | 0011100 | −0.6511−0.5096i |
| w57 | 0011100 | −0.6617−0.3573i |
| w58 | 0011101 | −1.4186−0.3682i |
| w59 | 0011101 | −1.2116−0.3184i |
| w60 | 0011110 | −0.8111−0.5264i |
| w61 | 0011110 | −0.8276−0.3658i |
| w62 | 0011111 | −0.9802−0.5258i |
| w63 | 0011111 | −1.0181−0.3668i |
| w64 | 01000000 | +0.5039+1.2055i |
| w65 | 01000001 | +0.4884+1.0092i |
| w66 | 01000010 | +1.1657+1.0793i |
| w67 | 01000011 | +1.2385+0.8387i |
| w68 | 01000100 | +0.5781+1.4095i |
| w69 | 01000101 | +0.6891+1.0532i |
| w70 | 01000110 | +0.7876+1.2931i |
| w71 | 01000111 | +0.8990+1.0937i |
| w72 | 01001000 | +0.5039−1.2055i |
| w73 | 01001001 | +0.4884−1.0092i |
| w74 | 01001010 | +1.1657−1.0793i |
| w75 | 01001011 | +1.2385−0.8387i |
| w76 | 01001100 | +0.5781−1.4095i |
| w77 | 01001101 | +0.6891−1.0532i |
| w78 | 01001110 | +0.7876−1.2931i |
| w79 | 01001111 | +0.8990−1.0937i |
| w80 | 01010000 | +0.6346+0.6721i |
| w81 | 01010001 | +0.5902+0.8432i |
| w82 | 01010010 | +1.2060+0.5685i |
| w83 | 01010011 | +1.4112+0.6488i |
| w84 | 01010100 | +0.8075+0.6969i |
| w85 | 01010101 | +0.7660+0.8734i |
| w86 | 01010110 | +1.0100+0.6965i |
| w87 | 01010111 | +0.9651+0.8870i |
| w88 | 01011000 | +0.6346−0.6721i |
| w89 | 01011001 | +0.5902−0.8432i |
| w90 | 01011010 | +1.2060−0.5685i |
| w91 | 01011011 | +1.4112−0.6488i |
| w92 | 01011100 | +0.8075−0.6969i |
| w93 | 01011101 | +0.7660−0.8734i |
| w94 | 01011110 | +1.0100−0.6965i |
| w95 | 01011111 | +0.9651−0.8870i |
| w96 | 01100000 | +0.6629+0.0713i |
| w97 | 01100001 | +0.6641+0.2135i |
| w98 | 01100010 | +1.4228+0.1199i |
| w99 | 01100011 | +1.2036+0.1064i |
| w100 | 01100100 | +0.8160+0.0736i |
| w101 | 01100101 | +0.8280+0.2196i |
| w102 | 01100110 | +0.9811+0.0673i |
| w103 | 01100111 | +1.0114+0.2066i |
| w104 | 01101000 | +0.6629−0.0713i |
| w105 | 01101001 | +0.6641−0.2135i |
| w106 | 01101010 | +1.4228−0.1199i |
| w107 | 01101011 | +1.2036−0.1064i |
| w108 | 01101100 | +0.8160−0.0736i |
| w109 | 01101101 | +0.8280−0.2196i |
| w110 | 01101110 | +0.9811−0.0673i |
| w111 | 01101111 | +1.0114−0.2066i |
| w112 | 01110000 | +0.6511+0.5096i |
| w113 | 01110001 | +0.6617+0.3573i |
| w114 | 01110010 | +1.4186+0.3682i |
| w115 | 01110011 | +1.2116+0.3184i |
| w116 | 01110100 | +0.8111+0.5264i |
| w117 | 01110101 | +0.8276+0.3658i |
| w118 | 01110110 | +0.9802+0.5258i |
| w119 | 01110111 | +1.0181+0.3668i |
| w120 | 01111000 | +0.6511−0.5096i |
| w121 | 01111001 | +0.6617−0.3573i |
| w122 | 01111010 | +1.4186−0.3682i |
| w123 | 01111011 | +1.2116−0.3184i |
| w124 | 01111100 | +0.8111−0.5264i |
| w125 | 01111101 | +0.8276−0.3658i |
| w126 | 01111110 | +0.9802−0.5258i |
| w127 | 01111111 | +1.0181−0.3668i |
| w128 | 10000000 | −0.3004+1.2452i |
| w129 | 10000001 | −0.2967+1.0627i |
| w130 | 10000010 | −0.0994+1.2493i |
| w131 | 10000011 | −0.0947+1.0662i |
| w132 | 10000100 | −0.3452+1.4585i |

-continued

| w index | bit label | Constellation point |
| --- | --- | --- |
| w133 | 10000101 | −0.2650+0.9148i |
| w134 | 10000110 | −0.1137+1.4651i |
| w135 | 10000111 | −0.0895+0.8991i |
| w136 | 10001000 | −0.3004−1.2452i |
| w137 | 10001001 | −0.2967−1.0627i |
| w138 | 10001010 | −0.0994−1.2493i |
| w139 | 10001011 | −0.0947−1.0662i |
| w140 | 10001100 | −0.3452−1.4585i |
| w141 | 10001101 | −0.2650−0.9148i |
| w142 | 10001110 | −0.1137−1.4651i |
| w143 | 10001111 | −0.0895−0.8991i |
| w144 | 10010000 | −0.4787+0.6378i |
| w145 | 10010001 | −0.4439+0.7942i |
| w146 | 10010010 | −0.0688+0.5579i |
| w147 | 10010011 | −0.0550+0.6984i |
| w148 | 10010100 | −0.3328+0.6100i |
| w149 | 10010101 | −0.3014+0.7660i |
| w150 | 10010110 | −0.2008+0.5810i |
| w151 | 10010111 | −0.1623+0.7417i |
| w152 | 10011000 | −0.4787−0.6378i |
| w153 | 10011001 | −0.4439−0.7942i |
| w154 | 10011010 | −0.0688−0.5579i |
| w155 | 10011011 | −0.0550−0.6984i |
| w156 | 10011100 | −0.3328−0.6100i |
| w157 | 10011101 | −0.3014−0.7660i |
| w158 | 10011110 | −0.2008−0.5810i |
| w159 | 10011111 | −0.1623−0.7417i |
| w160 | 10100000 | −0.5146+0.0676i |
| w161 | 10100001 | −0.5128+0.2035i |
| w162 | 10100010 | −0.0738+0.0604i |
| w163 | 10100011 | −0.0736+0.1802i |
| w164 | 10100100 | −0.3680+0.0641i |
| w165 | 10100101 | −0.3662+0.1927i |
| w166 | 10100110 | −0.2211+0.0614i |
| w167 | 10100111 | −0.2203+0.1844i |
| w168 | 10101000 | −0.5146−0.0676i |
| w169 | 10101001 | −0.5128−0.2035i |
| w170 | 10101010 | −0.0738−0.0604i |
| w171 | 10101011 | −0.0736−0.1802i |
| w172 | 10101100 | −0.3680−0.0641i |
| w173 | 10101101 | −0.3662−0.1927i |
| w174 | 10101110 | −0.2211−0.0614i |
| w175 | 10101111 | −0.2203−0.1844i |
| w176 | 10110000 | −0.4984+0.4870i |
| w177 | 10110001 | −0.5089+0.3418i |
| w178 | 10110010 | −0.0716+0.4278i |
| w179 | 10110011 | −0.0731+0.3023i |
| w180 | 10110100 | −0.3534+0.4630i |
| w181 | 10110101 | −0.3625+0.3247i |
| w182 | 10110110 | −0.2134+0.4408i |
| w183 | 10110111 | −0.2183+0.3103i |
| w184 | 10111000 | −0.4984−0.4870i |
| w185 | 10111001 | −0.5089−0.3418i |
| w186 | 10111010 | −0.0716−0.4278i |
| w187 | 10111011 | −0.0731−0.3023i |
| w188 | 10111100 | −0.3534−0.4630i |
| w189 | 10111101 | −0.3625−0.3247i |
| w190 | 10111110 | −0.2134−0.4408i |
| w191 | 10111111 | −0.2183−0.3103i |
| w192 | 11000000 | +0.3004+1.2452i |
| w193 | 11000001 | +0.2967+1.0627i |
| w194 | 11000010 | +0.0994+1.2493i |
| w195 | 11000011 | +0.0947+1.0662i |
| w196 | 11000100 | +0.3452+1.4585i |
| w197 | 11000101 | +0.2650+0.9148i |
| w198 | 11000110 | +0.1137+1.4651i |
| w199 | 11000111 | +0.0895+0.8991i |
| w200 | 11001000 | +0.3004−1.2452i |
| w201 | 11001001 | +0.2967−1.0627i |
| w202 | 11001010 | +0.0994−1.2493i |
| w203 | 11001011 | +0.0947−1.0662i |
| w204 | 11001100 | +0.3452−1.4585i |
| w205 | 11001101 | +0.2650−0.9148i |
| w206 | 11001110 | +0.1137−1.4651i |
| w207 | 11001111 | +0.0895−0.8991i |
| w208 | 11010000 | +0.4787+0.6378i |
| w209 | 11010001 | +0.4439+0.7942i |

-continued

| w index | bit label | Constellation point |
| --- | --- | --- |
| w210 | 11010010 | +0.0688+0.5579i |
| w211 | 11010011 | +0.0550+0.6984i |
| w212 | 11010100 | +0.3328+0.6100i |
| w213 | 11010101 | +0.3014+0.7660i |
| w214 | 11010110 | +0.2008+0.5810i |
| w215 | 11010111 | +0.1623+0.7417i |
| w216 | 11011000 | +0.4787−0.6378i |
| w217 | 11011001 | +0.4439−0.7942i |
| w218 | 11011010 | +0.0688−0.5579i |
| w219 | 11011011 | +0.0550−0.6984i |
| w220 | 11011100 | +0.3328−0.6100i |
| w221 | 11011101 | +0.3014−0.7660i |
| w222 | 11011110 | +0.2008−0.5810i |
| w223 | 11011111 | +0.1623−0.7417i |
| w224 | 11100000 | +0.5146+0.0676i |
| w225 | 11100001 | +0.5128+0.2035i |
| w226 | 11100010 | +0.0738+0.0604i |
| w227 | 11100011 | +0.0736+0.1802i |
| w228 | 11100100 | +0.3680+0.0641i |
| w229 | 11100101 | +0.3662+0.1927i |
| w230 | 11100110 | +0.2211+0.0614i |
| w231 | 11100111 | +0.2203+0.1844i |
| w232 | 11101000 | +0.5146−0.0676i |
| w233 | 11101001 | +0.5128−0.2035i |
| w234 | 11101010 | +0.0738−0.0604i |
| w235 | 11101011 | +0.0736−0.1802i |
| w236 | 11101100 | +0.3680−0.0641i |
| w237 | 11101101 | +0.3662−0.1927i |
| w238 | 11101110 | +0.2211−0.0614i |
| w239 | 11101111 | +0.2203−0.1844i |
| w240 | 11110000 | +0.4984+0.4870i |
| w241 | 11110001 | +0.5089+0.3418i |
| w242 | 11110010 | +0.0716+0.4278i |
| w243 | 11110011 | +0.0731+0.3023i |
| w244 | 11110100 | +0.3534+0.4630i |
| w245 | 11110101 | +0.3625+0.3247i |
| w246 | 11110110 | +0.2134+0.4408i |
| w247 | 11110111 | +0.2183+0.3103i |
| w248 | 11111000 | +0.4984−0.4870i |
| w249 | 11111001 | +0.5089−0.3418i |
| w250 | 11111010 | +0.0716−0.4278i |
| w251 | 11111011 | +0.0731−0.3023i |
| w252 | 11111100 | +0.3534−0.4630i |
| w253 | 11111101 | +0.3625−0.3247i |
| w254 | 11111110 | +0.2134−0.4408i |
| w255 | 11111111 | +0.2183−0.3103i | or
for MCS=9 (or 8):

| w index | bit label | Constellation point |
| --- | --- | --- |
| w0 | 0000000 | −0.5039+1.2055i |
| w1 | 0000000 | +0.5039+1.2055i |
| w2 | 0000001 | −0.6629+0.0713i |
| w3 | 0000001 | +0.6629+0.0713i |
| w4 | 0000010 | −0.5781+1.4095i |
| w5 | 0000010 | +0.5781+1.4095i |
| w6 | 0000011 | −0.8160+0.0736i |
| w7 | 0000011 | +0.8160+0.0736i |
| w8 | 0000100 | −0.3004+1.2452i |
| w9 | 0000100 | +0.3004+1.2452i |
| w10 | 0000101 | −0.5146+0.0676i |
| w11 | 0000101 | +0.5146+0.0676i |
| w12 | 0000110 | −0.3452+1.4585i |
| w13 | 0000110 | +0.3452+1.4585i |
| w14 | 0000111 | −0.3680+0.0641i |
| w15 | 0000111 | +0.3680+0.0641i |
| w16 | 0001000 | −1.1657+1.0793i |
| w17 | 0001000 | +1.1657+1.0793i |
| w18 | 0001001 | −1.4228+0.1199i |
| w19 | 0001001 | +1.4228+0.1199i |
| w20 | 0001010 | −0.7876+1.2931i |
| w21 | 0001010 | +0.7876+1.2931i |
| w22 | 0001011 | −0.9811+0.0673i |

-continued

| w index | bit label | Constellation point |
|---|---|---|
| w23 | 0001011 | +0.9811+0.0673i |
| w24 | 0001100 | −0.0994+1.2493i |
| w25 | 0001100 | +0.0994+1.2493i |
| w26 | 0001101 | −0.0738+0.0604i |
| w27 | 0001101 | +0.0738+0.0604i |
| w28 | 0001110 | −0.1137+1.4651i |
| w29 | 0001110 | +0.1137+1.4651i |
| w30 | 0001111 | −0.2211+0.0614i |
| w31 | 0001111 | +0.2211+0.0614i |
| w32 | 0010000 | −0.5039−1.2055i |
| w33 | 0010000 | +0.5039−1.2055i |
| w34 | 0010001 | −0.6629−0.0713i |
| w35 | 0010001 | +0.6629−0.0713i |
| w36 | 0010010 | −0.5781−1.4095i |
| w37 | 0010010 | +0.5781−1.4095i |
| w38 | 0010011 | −0.8160−0.0736i |
| w39 | 0010011 | +0.8160−0.0736i |
| w40 | 0010100 | −0.3004−1.2452i |
| w41 | 0010100 | +0.3004−1.2452i |
| w42 | 0010101 | −0.5146−0.0676i |
| w43 | 0010101 | +0.5146−0.0676i |
| w44 | 0010110 | −0.3452−1.4585i |
| w45 | 0010110 | +0.3452−1.4585i |
| w46 | 0010111 | −0.3680−0.0641i |
| w47 | 0010111 | +0.3680−0.0641i |
| w48 | 0011000 | −1.1657−1.0793i |
| w49 | 0011000 | +1.1657−1.0793i |
| w50 | 0011001 | −1.4228−0.1199i |
| w51 | 0011001 | +1.4288−0.1199i |
| w52 | 0011010 | −0.7876−1.2931i |
| w53 | 0011010 | +0.7876−1.2931i |
| w54 | 0011011 | −0.9811−0.0673i |
| w55 | 0011011 | +0.9811−0.0673i |
| w56 | 0011100 | −0.0994−1.2493i |
| w57 | 0011100 | +0.0994−1.2493i |
| w58 | 0011101 | −0.0738−0.0604i |
| w59 | 0011101 | +0.0738−0.0604i |
| w60 | 0011110 | −0.1137−1.4651i |
| w61 | 0011110 | +0.1137−1.4651i |
| w62 | 0011111 | −0.2211−0.0614i |
| w63 | 0011111 | +0.2211−0.0614i |
| w64 | 01000000 | −0.6346+0.6721i |
| w65 | 01000001 | +0.6346+0.6721i |
| w66 | 01000010 | −0.6511+0.5096i |
| w67 | 01000011 | +0.6511+0.5096i |
| w68 | 01000100 | −0.8075+0.6969i |
| w69 | 01000101 | +0.8075+0.6969i |
| w70 | 01000110 | −0.8111+0.5264i |
| w71 | 01000111 | +0.8111+0.5264i |
| w72 | 01001000 | −0.4787+0.6378i |
| w73 | 01001001 | +0.4787+0.6378i |
| w74 | 01001010 | −0.4984+0.4870i |
| w75 | 01001011 | +0.4984+0.4870i |
| w76 | 01001100 | −0.3328+0.6100i |
| w77 | 01001101 | +0.3328+0.6100i |
| w78 | 01001110 | −0.3534+0.4630i |
| w79 | 01001111 | +0.3534+0.4630i |
| w80 | 01010000 | −1.2060+0.5685i |
| w81 | 01010001 | +1.2060+0.5685i |
| w82 | 01010010 | −1.4186+0.3682i |
| w83 | 01010011 | +1.4186+0.3682i |
| w84 | 01010100 | −1.0100+0.6965i |
| w85 | 01010101 | +1.0100+0.6965i |
| w86 | 01010110 | −0.9802+0.5258i |
| w87 | 01010111 | +0.9802+0.5258i |
| w88 | 01011000 | −0.0688+0.5579i |
| w89 | 01011001 | +0.0688+0.5579i |
| w90 | 01011010 | −0.0716+0.4278i |
| w91 | 01011011 | +0.0716+0.4278i |
| w92 | 01011100 | −0.2008+0.5810i |
| w93 | 01011101 | +0.2008+0.5810i |
| w94 | 01011110 | −0.2134+0.4408i |
| w95 | 01011111 | +0.2134+0.4408i |
| w96 | 01100000 | −0.6346−0.6721i |
| w97 | 01100001 | +0.6346−0.6721i |
| w98 | 01100010 | −0.6511−0.5096i |
| w99 | 01100011 | +0.6511−0.5096i |
| w100 | 01100100 | −0.8075−0.6969i |
| w101 | 01100101 | +0.8075−0.6969i |
| w102 | 01100110 | −0.8111−0.5264i |
| w103 | 01100111 | +0.8111−0.5264i |
| w104 | 01101000 | −0.4787−0.6378i |
| w105 | 01101001 | +0.4787−0.6378i |
| w106 | 01101010 | −0.4984−0.4870i |
| w107 | 01101011 | +0.4984−0.4870i |
| w108 | 01101100 | −0.3328−0.6100i |
| w109 | 01101101 | +0.3328−0.6100i |
| w110 | 01101110 | −0.3534−0.4630i |
| w111 | 01101111 | +0.3534−0.4630i |
| w112 | 01110000 | −1.2060−0.5685i |
| w113 | 01110001 | +1.2060−0.5685i |
| w114 | 01110010 | −1.4186−0.3682i |
| w115 | 01110011 | +1.4186−0.3682i |
| w116 | 01110100 | −1.0100−0.6965i |
| w117 | 01110101 | +1.0100−0.6965i |
| w118 | 01110110 | −0.9802−0.5258i |
| w119 | 01110111 | +0.9802−0.5258i |
| w120 | 01111000 | −0.0688−0.5579i |
| w121 | 01111001 | +0.0688−0.5579i |
| w122 | 01111010 | −0.0716−0.4278i |
| w123 | 01111011 | +0.0716−0.4278i |
| w124 | 01111100 | −0.2008−0.5810i |
| w125 | 01111101 | +0.2008−0.5810i |
| w126 | 01111110 | −0.2134−0.4408i |
| w127 | 01111111 | +0.2134−0.4408i |
| w128 | 10000000 | −0.4884+1.0092i |
| w129 | 10000001 | +0.4884+1.0092l |
| w130 | 10000010 | −0.6641+0.2135i |
| w131 | 10000011 | +0.6641+0.2135i |
| w132 | 10000100 | −0.6891+1.0532i |
| w133 | 10000101 | +0.6891+1.0532i |
| w134 | 10000110 | −0.8280+0.2196i |
| w135 | 10000111 | +0.8280+0.2196i |
| w136 | 10001000 | −0.2967+1.0627i |
| w137 | 10001001 | +0.2967+1.0627i |
| w138 | 10001010 | −0.5128+0.2035i |
| w139 | 10001011 | +0.5128+0.2035i |
| w140 | 10001100 | −0.2650+0.9148i |
| w141 | 10001101 | +0.2650+0.9148i |
| w142 | 10001110 | −0.3662+0.1927i |
| w143 | 10001111 | +0.3662+0.1927i |
| w144 | 10010000 | −1.2385+0.8387i |
| w145 | 10010001 | +1.2385+0.8387i |
| w146 | 10010010 | −1.2036+0.1064i |
| w147 | 10010011 | +1.2036+0.1064i |
| w148 | 10010100 | −0.8990+1.0937i |
| w149 | 10010101 | +0.8990+1.0937i |
| w150 | 10010110 | −1.0114+0.2066i |
| w151 | 10010111 | +1.0114+0.2066i |
| w152 | 10011000 | −0.0947+1.0662i |
| w153 | 10011001 | +0.0947+1.0662i |
| w154 | 10011010 | −0.0736+0.1802i |
| w155 | 10011011 | +0.0736+0.1802i |
| w156 | 10011100 | −0.0895+0.8991i |
| w157 | 10011101 | +0.0895+0.8991i |
| w158 | 10011110 | −0.2203+0.1844i |
| w159 | 10011111 | +0.2203+0.1844i |
| w160 | 10100000 | −0.4884−1.0092i |
| w161 | 10100001 | +0.4884−1.0092i |
| w162 | 10100010 | −0.6641−0.2135i |
| w163 | 10100011 | +0.6641−0.2135i |
| w164 | 10100100 | −0.6891−1.0532i |
| w165 | 10100101 | +0.6891−1.0532i |
| w166 | 10100110 | −0.8280−0.2196i |
| w167 | 10100111 | +0.8280−0.2196i |
| w168 | 10101000 | −0.2967−1.0627i |
| w169 | 10101001 | +0.2967−1.0627i |
| w170 | 10101010 | −0.5128−0.2035i |
| w171 | 10101011 | +0.5128−0.2035i |
| w172 | 10101100 | −0.2650−0.9148i |
| w173 | 10101101 | +0.2650−0.9148i |
| w174 | 10101110 | −0.3662−0.1927i |
| w175 | 10101111 | +0.3662−0.1927i |
| w176 | 10110000 | −1.2385−0.8387i |

| w index | bit label | Constellation point |
|---|---|---|
| w177 | 10110001 | +1.2385−0.8387i |
| w178 | 10110010 | −1.2036−0.1064i |
| w179 | 10110011 | +1.2036−0.1064i |
| w180 | 10110100 | −0.8990−1.0937i |
| w181 | 10110101 | +0.8990−1.0937i |
| w182 | 10110110 | −1.0114−0.2066i |
| w183 | 10110111 | +1.0114−0.2066i |
| w184 | 10111000 | −0.0947−1.0662i |
| w185 | 10111001 | +0.0947−1.0662i |
| w186 | 10111010 | −0.0736−0.1802i |
| w187 | 10111011 | +0.0736−0.1802i |
| w188 | 10111100 | −0.0895−0.8991i |
| w189 | 10111101 | +0.0895−0.8991i |
| w190 | 10111110 | −0.2203−0.1844i |
| w191 | 10111111 | +0.2203−0.1844i |
| w192 | 11000000 | −0.5902+0.8432i |
| w193 | 11000001 | +0.5902+0.8432i |
| w194 | 11000010 | −0.6617+0.3573i |
| w195 | 11000011 | +0.6617+0.3573i |
| w196 | 11000100 | −0.7660+0.8734i |
| w197 | 11000101 | +0.7660+0.8734i |
| w198 | 11000110 | −0.8276+0.3658i |
| w199 | 11000111 | +0.8276+0.3658i |
| w200 | 11001000 | −0.4439+0.7942i |
| w201 | 11001001 | +0.4439+0.7942i |
| w202 | 11001010 | −0.5089+0.3418i |
| w203 | 11001011 | +0.5089+0.3418i |
| w204 | 11001100 | −0.3014+0.7660i |
| w205 | 11001101 | +0.3014+0.7660i |
| w206 | 11001110 | −0.3625+0.3247i |
| w207 | 11001111 | +0.3625+0.3247i |
| w208 | 11010000 | −1.4112+0.6488i |
| w209 | 11010001 | +1.4112+0.6488i |
| w210 | 11010010 | −1.2116+0.3184i |
| w211 | 11010011 | +1.2116+0.3184i |
| w212 | 11010100 | −0.9651+0.8870i |
| w213 | 11010101 | +0.9651+0.8870i |
| w214 | 11010110 | −1.0181+0.3668i |
| w215 | 11010111 | +1.0181+0.3668i |
| w216 | 11011000 | −0.0550+0.6984i |
| w217 | 11011001 | +0.0550+0.6984i |
| w218 | 11011010 | −0.0731+0.3023i |
| w219 | 11011011 | +0.0731+0.3023i |
| w220 | 11011100 | −0.1623+0.7417i |
| w221 | 11011101 | +0.1623+0.7417i |
| w222 | 11011110 | −0.2183+0.3103i |
| w223 | 11011111 | +0.2183+0.3103i |
| w224 | 11100000 | −0.5902−0.8432i |
| w225 | 11100001 | +0.5902−0.8432i |
| w226 | 11100010 | −0.6617−0.3573i |
| w227 | 11100011 | +0.6617−0.3573i |
| w228 | 11100100 | −0.7660−0.8734i |
| w229 | 11100101 | +0.7660−0.8734i |
| w230 | 11100110 | −0.8276−0.3658i |
| w231 | 11100111 | +0.8276−0.3658i |
| w232 | 11101000 | −0.4439−0.7942i |
| w233 | 11101001 | +0.4439−0.7942i |
| w234 | 11101010 | −0.5089−0.3418i |
| w235 | 11101011 | +0.5089−0.3418i |
| w236 | 11101100 | −0.3014−0.7660i |
| w237 | 11101101 | +0.3014−0.7660i |
| w238 | 11101110 | −0.3625−0.3247i |
| w239 | 11101111 | +0.3625−0.3247i |
| w240 | 11110000 | −1.4112−0.6488i |
| w241 | 11110001 | +1.4112−0.6488i |
| w242 | 11110010 | −1.2116−0.3184i |
| w243 | 11110011 | +1.2116−0.3184i |
| w244 | 11110100 | −0.9651−0.8870i |
| w245 | 11110101 | +0.9651−0.8870i |
| w246 | 11110110 | −1.0181−0.3668i |
| w247 | 11110111 | +1.0181−0.3668i |
| w248 | 11111000 | −0.0550−0.6984i |
| w249 | 11111001 | +0.0550−0.6984i |
| w250 | 11111010 | −0.0731−0.3023i |
| w251 | 11111011 | +0.0731−0.3023i |
| w252 | 11111100 | −0.1623−0.7417i |
| w253 | 11111101 | +0.1623−0.7417i |
| w254 | 11111110 | −0.2183−0.3103i |
| w255 | 11111111 | +0.2183−0.3103i |

If the encoder uses a BCC code and if M=1024, a non-uniform constellation and bit labeling from a group C, if the encoder is configured to use a BCC code and if M=1024 and a code rate of 2/3, 3/4 or 7/8, the group C comprising constellations C1, C2 and C3, wherein the constellation points are defined by the constellation position vector u of length v=sqrt(M)/2−1, wherein the constellation position vectors of the different constellations are defined as follows:

C) 1024-QAM non-uniform constellations of group C for BCC encoding:

C1) for code rate 2/3 (or 3/4 or 7/8)

| | | | | | | | | real part | | | | | | | | | |
|---|---|---|---|---|---|---|---|---|---|---|---|---|---|---|---|---|---|
| $b_2$ | 0 | 0 | 0 | 0 | 0 | 0 | 0 | 0 | 0 | 0 | 0 | 0 | 0 | 0 | 0 | 0 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 0 | 0 | 0 | 0 | 0 | 0 | 0 | 1 | 1 | 1 | 1 | 1 | 1 | 1 | 1 | |
| Re($z_q$) | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_2$ | 1 | 1 | 1 | 1 | 1 | 1 | 1 | 1 | 1 | 1 | 1 | 1 | 1 | 1 | 1 | 1 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 1 | 1 | 1 | 1 | 1 | 1 | 1 | 0 | 0 | 0 | 0 | 0 | 0 | 0 | 0 | 0 | |
| Re($z_q$) | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| | | | | | | | | imaginary part | | | | | | | | | |
| $b_0$ | 0 | 0 | 0 | 0 | 0 | 0 | 0 | 0 | 1 | 1 | 1 | 1 | 1 | 1 | 1 | 1 | |
| $b_1$ | 0 | 0 | 1 | 1 | 1 | 1 | 0 | 0 | 0 | 0 | 1 | 1 | 1 | 1 | 0 | 0 | |
| $b_5$ | 0 | 0 | 0 | 0 | 0 | 0 | 0 | 0 | 0 | 0 | 0 | 0 | 0 | 0 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| Im($z_q$) | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 1 | 1 | 1 | 1 | 1 | 1 | 1 | 1 | 0 | 0 | 0 | 0 | 0 | 0 | 0 | 0 | |
| $b_1$ | 0 | 0 | 1 | 1 | 1 | 1 | 0 | 0 | 0 | 0 | 1 | 1 | 1 | 1 | 0 | 0 | |

-continued

| | | | | | | | | | | | | | | | | | |
|---|---|---|---|---|---|---|---|---|---|---|---|---|---|---|---|---|---|
| $b_5$ | 1 | 1 | 1 | 1 | 1 | 1 | 1 | 1 | 1 | 1 | 1 | 1 | 1 | 1 | 1 | 1 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041;

C2) for code rate 3/4 (or 2/3 or 7/8)

real part

| | | | | | | | | | | | | | | | | | |
|---|---|---|---|---|---|---|---|---|---|---|---|---|---|---|---|---|---|
| $b_0$ | 0 | 0 | 1 | 1 | 1 | 1 | 0 | 0 | 0 | 0 | 1 | 1 | 1 | 1 | 0 | 0 | |
| $b_1$ | 0 | 0 | 0 | 0 | 0 | 0 | 0 | 0 | 0 | 0 | 0 | 0 | 0 | 0 | 0 | 0 | |
| $b_3$ | 0 | 0 | 0 | 0 | 0 | 0 | 0 | 0 | 1 | 1 | 1 | 1 | 1 | 1 | 1 | 1 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 0 | 0 | 1 | 1 | 1 | 1 | 1 | 1 | 1 | 1 | 0 | 0 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 0 | 1 | 1 | 1 | 1 | 0 | 0 | 0 | 0 | 1 | 1 | 1 | 1 | 0 | 0 | |
| $b_1$ | 1 | 1 | 1 | 1 | 1 | 1 | 1 | 1 | 1 | 1 | 1 | 1 | 1 | 1 | 1 | 1 | |
| $b_3$ | 1 | 1 | 1 | 1 | 1 | 1 | 1 | 1 | 0 | 0 | 0 | 0 | 0 | 0 | 0 | 0 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | | |
|---|---|---|---|---|---|---|---|---|---|---|---|---|---|---|---|---|---|
| $b_2$ | 0 | 0 | 0 | 0 | 0 | 0 | 0 | 0 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_2$ | 1 | 1 | 1 | 1 | 1 | 1 | 1 | 1 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0001, 5.0203, 7.0622, 9.1446, 11.2738, 13.4672, 15.7360, 18.0975, 20.5669, 23.1643, 25.9119, 28.8399, 31.9932, 35.4479, 39.3783;

C3) for code rate 7/8 (or 2/3 or 3/4)

real part

| | | | | | | | | | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 0 | 0 | 0 | 0 | 1 | 1 | 1 | 1 | 1 | 1 | 1 | 1 | |
| $b_3$ | 0 | 0 | 0 | 0 | 0 | 0 | 0 | 0 | 0 | 0 | 0 | 0 | 0 | 0 | 0 | 0 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_1$ | 1 | 1 | 1 | 1 | 1 | 1 | 1 | 1 | 0 | 0 | 0 | 0 | 0 | 0 | 0 | 0 | |
| $b_3$ | 1 | 1 | 1 | 1 | 1 | 1 | 1 | 1 | 1 | 1 | 1 | 1 | 1 | 1 | 1 | 1 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | |
|---|---|---|---|---|---|---|---|---|---|---|---|---|---|---|---|---|
| $b_2$ | 0 | 1 | 1 | 0 | 0 | 1 | 1 | 0 | 0 | 1 | 1 | 0 | 0 | 1 | 1 | 0 |
| $b_5$ | 0 | 0 | 0 | 0 | 0 | 0 | 0 | 0 | 0 | 0 | 0 | 0 | 0 | 0 | 0 | 0 |
| $b_6$ | 0 | 0 | 0 | 0 | 1 | 1 | 1 | 1 | 1 | 1 | 1 | 1 | 0 | 0 | 0 | 0 |

-continued

| | | | | | | | | | | | | | | | | | |
|---|---|---|---|---|---|---|---|---|---|---|---|---|---|---|---|---|---|
| $b_8$ | 0 | 0 | 1 | 1 | 1 | 1 | 0 | 0 | 0 | 0 | 1 | 1 | 1 | 1 | 0 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_2$ | 0 | 1 | 1 | 0 | 0 | 1 | 1 | 0 | 0 | 1 | 1 | 0 | 0 | 1 | 1 | 0 | |
| $b_5$ | 1 | 1 | 1 | 1 | 1 | 1 | 1 | 1 | 1 | 1 | 1 | 1 | 1 | 1 | 1 | 1 | |
| $b_6$ | 0 | 0 | 0 | 0 | 1 | 1 | 1 | 1 | 1 | 1 | 1 | 1 | 0 | 0 | 0 | 0 | |
| $b_8$ | 0 | 0 | 1 | 1 | 1 | 1 | 0 | 0 | 0 | 0 | 1 | 1 | 1 | 1 | 0 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041.

If the encoder uses an LDPC code and if M=1024, a non-uniform constellation and bit labeling from a group D, if the encoder is configured to use a LDPC code and if M=1024 and a code rate of 2/3, 3/4 or 5/6, the group D comprising constellations D1, D2, D3, wherein the constellation points are defined by the constellation position vector u of length v=sqrt(M)/2−1, wherein the constellation position vectors of the different constellations are defined as follows:

D) 1024-QAM non-uniform constellations of group D for LDPC encoding:

D1) for code rate 2/3 (or 2/3 or 5/6)

real part

| | | | | | | | | | | | | | | | | | |
|---|---|---|---|---|---|---|---|---|---|---|---|---|---|---|---|---|---|
| $b_1$ | 0 | 1 | 1 | 0 | 0 | 1 | 1 | 0 | 0 | 1 | 1 | 0 | 0 | 1 | 1 | 0 | |
| $b_2$ | 0 | 0 | 0 | 0 | 0 | 0 | 0 | 0 | 1 | 1 | 1 | 1 | 1 | 1 | 1 | 1 | |
| $b_3$ | 0 | 0 | 1 | 1 | 1 | 1 | 0 | 0 | 0 | 0 | 1 | 1 | 1 | 1 | 0 | 0 | |
| $b_6$ | 0 | 0 | 0 | 0 | 0 | 0 | 0 | 0 | 0 | 0 | 0 | 0 | 0 | 0 | 0 | 0 | |
| $b_7$ | 0 | 0 | 0 | 0 | 1 | 1 | 1 | 1 | 1 | 1 | 1 | 1 | 0 | 0 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_1$ | 0 | 1 | 1 | 0 | 0 | 1 | 1 | 0 | 0 | 1 | 1 | 0 | 0 | 1 | 1 | 0 | |
| $b_2$ | 1 | 1 | 1 | 1 | 1 | 1 | 1 | 1 | 0 | 0 | 0 | 0 | 0 | 0 | 0 | 0 | |
| $b_3$ | 0 | 0 | 1 | 1 | 1 | 1 | 0 | 0 | 0 | 0 | 1 | 1 | 1 | 1 | 0 | 0 | |
| $b_6$ | 1 | 1 | 1 | 1 | 1 | 1 | 1 | 1 | 1 | 1 | 1 | 1 | 1 | 1 | 1 | 1 | |
| $b_7$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 1 | 1 | 1 | 1 | 0 | 0 | 1 | 1 | 1 | 1 | 0 | 0 | 0 | |
| $b_5$ | 0 | 0 | 0 | 0 | 0 | 0 | 0 | 0 | 0 | 0 | 0 | 0 | 0 | 0 | 0 | 0 | |
| $b_8$ | 0 | 0 | 0 | 0 | 1 | 1 | 1 | 1 | 1 | 1 | 1 | 1 | 0 | 0 | 0 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_4$ | 0 | 0 | 1 | 1 | 1 | 1 | 0 | 0 | 0 | 0 | 1 | 1 | 1 | 1 | 0 | 0 | |
| $b_5$ | 1 | 1 | 1 | 1 | 1 | 1 | 1 | 1 | 1 | 1 | 1 | 1 | 1 | 1 | 1 | 1 | |
| $b_8$ | 0 | 0 | 0 | 0 | 1 | 1 | 1 | 1 | 1 | 1 | 1 | 1 | 0 | 0 | 0 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.0047, 3.9822, 5.1633, 7.0998, 8.5600, 10.4887, 12.2428, 14.2618, 16.3225, 18.5947, 21.0696, 23.8248, 26.9139, 30.4303, 34.5872;

D2) for code rate 3/4 (or 2/3 or 5/6)

real part

| | | | | | | | | | | | | | | | | | |
|---|---|---|---|---|---|---|---|---|---|---|---|---|---|---|---|---|---|
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_8$ | 0 | 0 | 0 | 0 | 0 | 0 | 0 | 0 | 0 | 0 | 0 | 0 | 0 | 0 | 0 | 0 | |
| $b_9$ | 0 | 0 | 0 | 0 | 0 | 0 | 0 | 0 | 1 | 1 | 1 | 1 | 1 | 1 | 1 | 1 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |

-continued

| | | | | | | | | | | | | | | | | | |
|---|---|---|---|---|---|---|---|---|---|---|---|---|---|---|---|---|---|
| $b_5$ | 0 | 0 | 1 | 1 | 1 | 1 | 0 | 0 | 0 | 0 | 1 | 1 | 1 | 1 | 0 | 0 | |
| $b_8$ | 1 | 1 | 1 | 1 | 1 | 1 | 1 | 1 | 1 | 1 | 1 | 1 | 1 | 1 | 1 | 1 | |
| $b_9$ | 1 | 1 | 1 | 1 | 1 | 1 | 1 | 1 | 0 | 0 | 0 | 0 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 0 | 0 | 0 | 0 | 0 | 0 | 0 | 0 | 1 | 1 | 1 | 1 | 1 | 1 | 1 | 1 | |
| $b_7$ | 0 | 0 | 0 | 0 | 0 | 0 | 0 | 0 | 0 | 0 | 0 | 0 | 0 | 0 | 0 | 0 | |
| $Im(z_q)$ | −31 | −29 | −27 | −25 | −23 | −21 | −19 | −17 | −15 | −13 | −11 | −9 | −7 | −5 | −3 | −1 | Uniform |
| | −$u_{15}$ | −$u_{14}$ | −$u_{13}$ | −$u_{12}$ | −$u_{11}$ | −$u_{10}$ | −$u_9$ | −$u_8$ | −$u_7$ | −$u_6$ | −$u_5$ | −$u_4$ | −$u_3$ | −$u_2$ | −$u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 1 | 1 | 1 | 1 | 1 | 1 | 1 | 1 | 0 | 0 | 0 | 0 | 0 | 0 | 0 | 0 | |
| $b_7$ | 1 | 1 | 1 | 1 | 1 | 1 | 1 | 1 | 1 | 1 | 1 | 1 | 1 | 1 | 1 | 1 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9667, 4.9871, 7.0015, 9.0819, 11.3951, 15.6735, 18.0691, 20.5980, 23.2914, 26.1728, 29.2806, 32.6657, 36.4161, 40.7366;
D3) code rate 5/6 (or 2/3 or 3/4)

real part

| | | | | | | | | | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_3$ | 0 | 0 | 0 | 0 | 0 | 0 | 0 | 0 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 0 | 0 | 0 | 0 | 0 | 0 | 0 | 0 | 0 | 0 | 0 | 0 | |
| $b_8$ | 0 | 0 | 0 | 0 | 1 | 1 | 1 | 1 | 1 | 1 | 1 | 1 | 0 | 0 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | −$u_{15}$ | −$u_{14}$ | −$u_{13}$ | −$u_{12}$ | −$u_{11}$ | −$u_{10}$ | −$u_9$ | −$u_8$ | −$u_7$ | −$u_6$ | −$u_5$ | −$u_4$ | −$u_3$ | −$u_2$ | −$u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_3$ | 1 | 1 | 1 | 1 | 1 | 1 | 1 | 1 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 1 | 1 | 1 | 1 | 1 | 1 | 1 | 1 | 1 | 1 | 1 | 1 | 1 | 1 | 1 | 1 | |
| $b_8$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | | |
|---|---|---|---|---|---|---|---|---|---|---|---|---|---|---|---|---|---|
| $b_1$ | 0 | 0 | 0 | 0 | 0 | 0 | 0 | 0 | 1 | 1 | 1 | 1 | 1 | 1 | 1 | 1 | |
| $b_2$ | 0 | 0 | 0 | 0 | 1 | 1 | 1 | 1 | 1 | 1 | 1 | 1 | 0 | 0 | 0 | 0 | |
| $b_4$ | 0 | 0 | 0 | 0 | 0 | 0 | 0 | 0 | 0 | 0 | 0 | 0 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $Im(z_q)$ | −31 | −29 | −27 | −25 | −23 | −21 | −19 | −17 | −15 | −13 | −11 | −9 | −7 | −5 | −3 | −1 | Uniform |
| | −$u_{15}$ | −$u_{14}$ | −$u_{13}$ | −$u_{12}$ | −$u_{11}$ | −$u_{10}$ | −$u_9$ | −$u_8$ | −$u_7$ | −$u_6$ | −$u_5$ | −$u_4$ | −$u_3$ | −$u_2$ | −$u_1$ | −1 | NUC |
| $b_1$ | 1 | 1 | 1 | 1 | 1 | 1 | 1 | 1 | 0 | 0 | 0 | 0 | 0 | 0 | 0 | 0 | |
| $b_2$ | 0 | 0 | 0 | 0 | 1 | 1 | 1 | 1 | 1 | 1 | 1 | 1 | 0 | 0 | 0 | 0 | |
| $b_4$ | 1 | 1 | 1 | 1 | 1 | 1 | 1 | 1 | 1 | 1 | 1 | 1 | 1 | 1 | 1 | 1 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9902, 5.0100, 7.0116, 9.1283, 11.2570, 13.4588, 15.7417, 18.1292, 20.6379, 23.2916, 26.1151, 29.1412, 32.4176, 36.0267, 40.1583.

Still further, a non-uniform constellation obtained from a constellation from anyone of groups A, B, C or D through rotation by an angle around the origin, through inversion of bit labels for all constellation points, through interchanging of bit positions, through mirroring on any line in the complex plane and/or through predistortion for the constellation points may be used by the modulator. Further, the bit labeling indicated in groups A to D may alternatively be inverted for one or more bit labels.

As shown above, for 16-QAM, 64-QAM and 256-QAM two-dimensional NUCs are proposed including constellation points and bit labelling. The constellation points, i.e., coordinates in the complex plane, use the notation according to which a first column defines the w vector and the second column describes the bit labelling of the constellation points in the following columns (for different MCS indices). An exemplary diagram showing a constellation for a two-dimensional NUC for 16-QAM is depicted in FIG. 4 for modulation order M=16 and coderate R=1/2 (MCS=3) and LDPC encoding. The corresponding constellation point vector is w=(+0.4925+1.2040i, +0.4925−1.2040i, +0.2530+0.4936i, +0.2530−0.4936i, −0.4925+1.2040i, −0.4925−1.2040i, −0.2530+0.4936i, −0.2530−0.4936i, +1.2040+

0.4925i, +1.2040−0.4925i, +0.4936+0.2530i, +0.4936−0.2530i, −1.2040+0.4925i, −1.2040−0.4925i, −0.4936+0.2530i, −0.4936−0.2530i) for the bit labels from 0000 to 1111, wherein i=sqrt(−1) is the imaginary unit.

For 1024-QAM, one-dimensional (1D) NUCs are proposed including constellation points and bit labelling. The tables for 1024-QAM show how the input bit combinations map to the amplitudes of the real and imaginary part of the complex constellation points $z_q$, q describing the symbol time or the subcarrier index The power of the constellation points $z_q$ is normalized such that the power of the normalized constellation points $f_q$ equals 1, i.e. $E(|f_q|^2)=1$, where $E(x)$ denotes the expectation operator of x. These NUCs use the u-vector notation, describing the positive coordinates of the in-phase (real part) and quadrature phase (imaginary part). The tables describe the bit labelling for each NUC. An exemplary diagram showing a constellation for a two-dimensional NUC for 1024-QAM is depicted in FIG. 5.

In the following some more explanation is provided regarding the definition of the non-uniform 1024-QAM constellations as shown in an example in FIG. 5. Each input cell word $(b_{0,q} \ldots b_{m-1,q})$ (i.e. provided to the modulator) shall be modulated using a non-uniform QAM constellation to give a constellation point $z_q$ prior to normalization, where m corresponds to the number of bits per QAM symbol $m=\log_2(M)$. It should be noted that the parameter q is used here for discrete time or subcarrier index. The exact values of the real and imaginary components $Re(z_q)$ and $Im(z_q)$ for each combination of the relevant input bits $b_{0,q} \ldots b_{m-1,q}$ are given in the tables of groups C and D for the various constellation sizes depending on the NUC position vector $u_{1 \ldots v}$, which defines the constellation point position of the non-uniform constellation. The position of $u_0$ is set to 1, i.e., $u_0=1$. The length of the NUC position vector u is defined by $$v = \frac{\sqrt{M}}{2} - 1.$$

Figure 5:
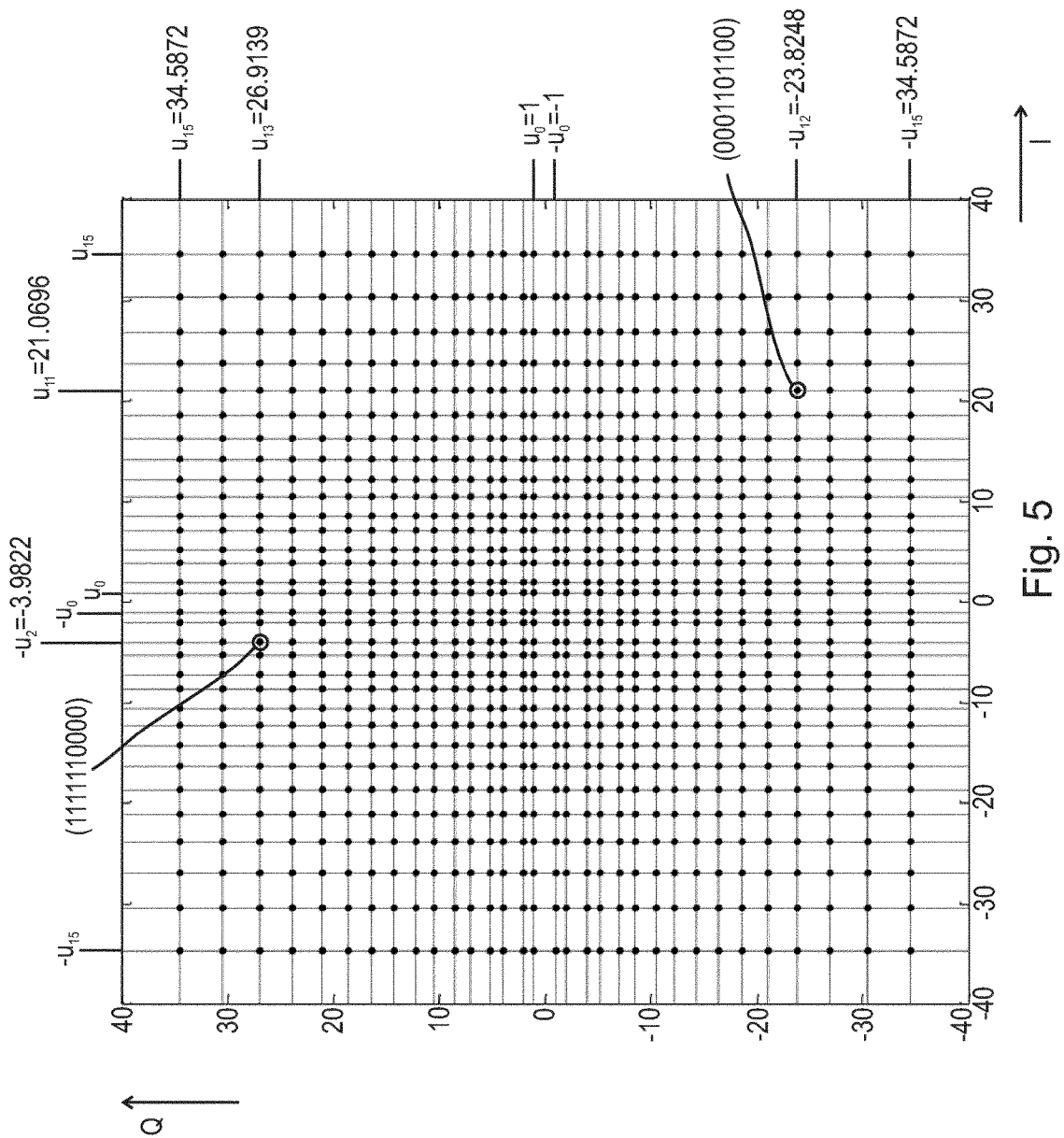
FIG. 5 shows a diagram of an exemplary one-dimensional non-uniform constellation for 1024-QAM according to the present disclosure.

In the example shown in FIG. 5, the corresponding constellation points $z_q$ for a 1024-QAM NUC for a code rate of 2/3 and LDPC encoding are defined by the NUC position vector $(u_{1 \ldots 15})$=(2.0047, 3.9822, 5.1633, 7.0998, 8.5600, 10.4887, 12.2428, 14.2618, 16.3225, 18.5947, 21.0696, 23.8248, 26.9139, 30.4303, 34.5872). As an example, as also indicated in FIG. 5, the input cell word $(b_{0,q} \ldots b_{m-1,q})$=(1111110000) is $Re(z_q)=-u_2=-3.9822$ and $Im(z_q)=u_{13}=26.9139$. This can be seen from the above recited table D1, since the real part is determined by bit labels $(b_{1,q}, b_{2,q}, b_{3,q}, b_{6,q}, b_{7,q})$=(11100), and the imaginary part is determined by $(b_{0,q}, b_{4,q}, b_{5,q}, b_{8,q}, b_{9,q})$=(11100). As a second example, the input cell word $(b_{0,q} \ldots b_{m-1,q})$=(0001101100) is $Re(z_q)=u_{11}=21.0696$ and $Im(z_q)=-u_{12}=-23.8248$ (the real part is determined by bit labels $(b_{1,q}, b_{2,q}, b_{3,q}, b_{6,q}, b_{7,q})$=(00111), and the imaginary part is determined by $(b_{0,q}, b_{4,q}, b_{5,q}, b_{8,q}, b_{9,q})$=(01000), respectively). The complete constellation for this NUC position vector is shown in FIG. 5 with exemplary input cell words marked at the corresponding constellation points.

It shall be noted that the same NUCs may be used for different MCS indices (e.g. the constellation points defined for MCS3 might be used for both MCS3 and MCS4 to reduce the overall number of NUCs). Hence, it is indicated in the tables for the NUCs for which MCS indices (representing a code rate R and a modulation order M) the respective constellations points and bit labels are used. If there are two or more MCS indices indicated, it may be predetermined for which MCS index the constellations points and bit labels shall be used by a particular communication system or by particular devices. Further, it shall be noted that bit positions might be inverted, i.e. the bits of any bit position of the bit labeling might be flipped, resulting in the same performance.

The bit labelling, (i.e. which bit combination is assigned to which constellation point) is preferably optimized to fit in a best possible way into the existing IEEE 802.11 architecture, yielding minimum error rates after FEC decoding. I.e. in an embodiment mainly the QAM mapper (modulator) 13 is changed compared to the known layout. In an embodiment the existing interleaving may be used as provided in known systems. Typically, in an optimization of the BICM, first the channel coding (FEC) is designed. In a next step the QAM (NUC) is optimized for the target SNR of the FEC. Afterwards, the bit interleaving is optimized to optimally match the FEC and NUC. Here, the bit labelling of the NUC was optimized to optimally match the existing FEC and newly proposed NUC without changing the interleaving between FEC and QAM. Also in cases, where LDPC is deployed as FEC, an optimized bit labelling in crucial, because the LDPC decoder can be interpreted as an iterative decoding scheme, having a so called edge interleaver between the components.

For the bit labelling optimization, for a given FEC code, the error protection of the bits might be unequal (e.g. for irregular LDPC codes or punctured convolutional codes as given here). The LLR values after demapping have different protection levels as well (given by the bit labelling). If the strongest code bits would be matched to the strongest LLR positions, the weak code bits are difficult to decode. A matching of the weakest code bits to the strongest LLR positions is also suboptimal. A optimum bit labelling balances the matching of different LLR robustness levels to code bits with different protection levels.

Figure 6:
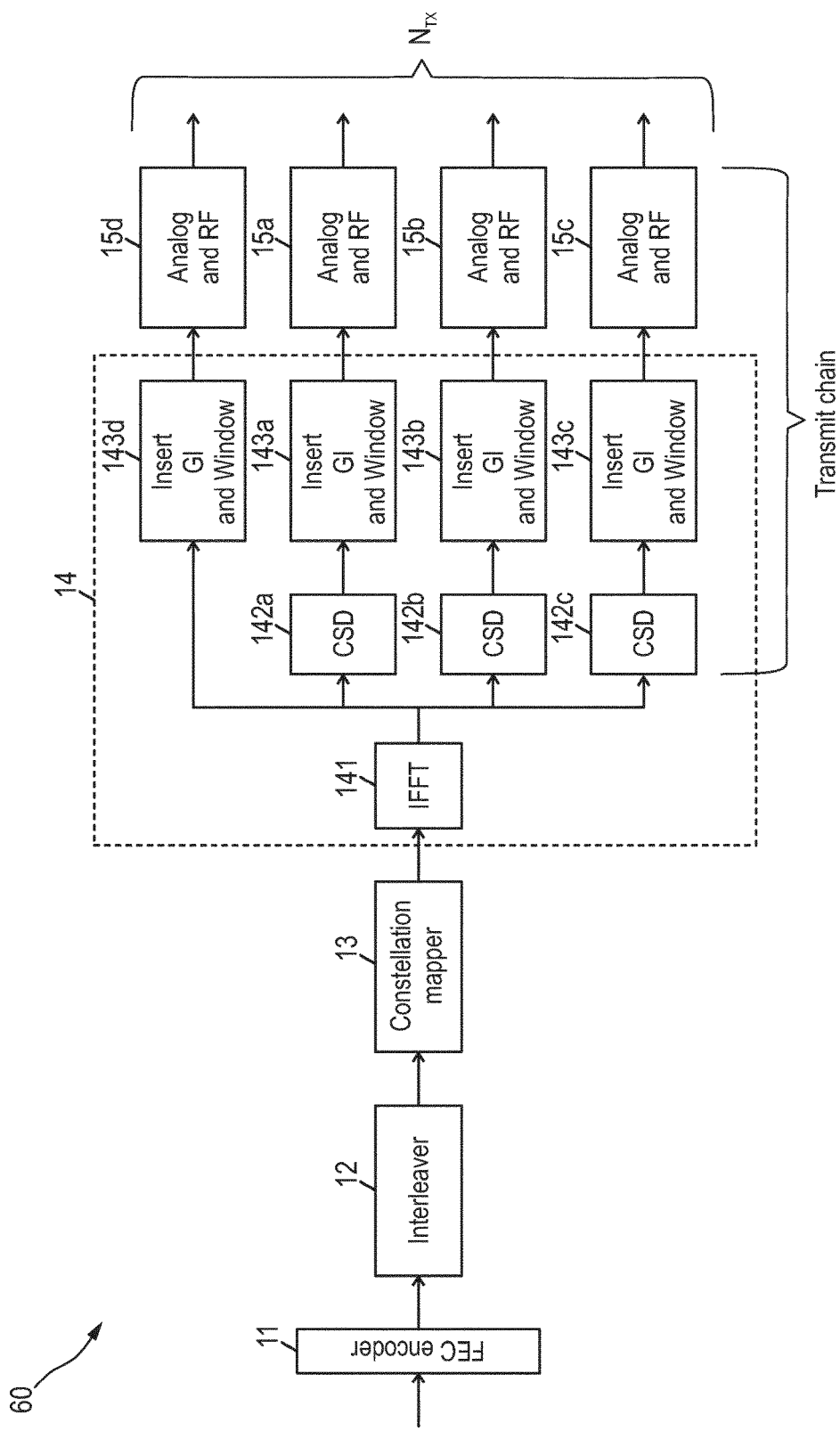
FIG. 6 shows a schematic diagram of another embodiment of a transmission apparatus according to the present disclosure.

FIG. 6 shows a schematic diagram of another embodiment of a transmission apparatus 60 according to the present disclosure, which is configured for MIMO transmission. In case of MIMO the transmit signal after the QAM mapper 13 is split and several transmit chains each consisting of elements of the OFDM and the RF processing unit, are deployed depending on the number of transmit antennas. In this examples there are four transmit. The OFDM unit 14 comprises an IFFT unit 141 and, per transmit chain, a cyclic shift delay (CSD) unit 142a-142c, and a guard interval (GI) insertion and windowing unit 143a-143d. Further, each transmit chain comprises its own RF processing unit 15a-15d.

Obviously, numerous modifications and variations of the present disclosure are possible in light of the above teachings. It is therefore to be understood that within the scope of the appended claims, the disclosure may be practiced otherwise than as specifically described herein (e.g., if the NUC position vectors are rounded to a smaller number of digits).

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A coding and modulation apparatus comprising
   an encoder configured to encode input data into cell words according to a binary convolutional code, BCC, or a low density parity check code, LDPC, and
   a modulator configured to modulate said cell words into constellation values of a non-uniform constellation and to assign bit combinations to constellation values of the used non-uniform constellation,
   wherein said modulator is configured to use, based on the code used by the encoder, the total number M of constellation points of the constellation and the code rate, a non-uniform constellation and bit labeling from one of the groups A, B, C or D as disclosed herein or a non-uniform constellation obtained from a constellation from anyone of groups A, B, C or D through rotation by an angle around the origin, through inversion of bit labels for all constellation points, through interchanging of bit positions, through mirroring on any line in the complex plane and/or through predistortion for the constellation points.

2. A coding and modulation apparatus as defined in embodiment 1,
   further comprising a selection unit configured to select the total number M of constellation points of the constellation and the code rate based on channel conditions between a transmission apparatus including said coding and modulation apparatus and a receiving apparatus with which said transmission apparatus seeks to communicate.

3. A coding and modulation apparatus as defined in embodiment 2,
   wherein said selection unit is configured to select a constellation with a higher number of M and/or a higher code rate the better the channel conditions are.

4. A coding and modulation apparatus as defined in one of embodiments 1 to 3,
   wherein said coding and modulation apparatus is configured for use in a transmission apparatus according to IEEE 802.11.

5. A coding and modulation method comprising
   encoding input data into cell words according to a binary convolutional code, BCC, or a low density parity check code, LDPC, and
   modulating said cell words into constellation values of a non-uniform constellation and to assign bit combinations to constellation values of the used non-uniform constellation,
   wherein said modulating is configured to use, based on the code used by the encoding, the total number M of constellation points of the constellation and the code rate, a non-uniform constellation and bit labeling from one of the groups A, B, C or D as disclosed herein or a non-uniform constellation obtained from a constellation from anyone of groups A, B, C or D through rotation by an angle around the origin, through inversion of bit labels for all constellation points, through interchanging of bit positions, through mirroring on any line in the complex plane and/or through predistortion for the constellation points.

6. A transmission apparatus comprising:
   a coding and modulation apparatus as defined in embodiment 1 configured to encode and modulate input data into constellation values,
   a converter configured to convert said constellation values into one or more transmission streams to be transmitted, and
   a transmitter configured to transmit said one or more transmission streams.

7. A transmission apparatus as defined in embodiment 6, further comprising a signalling unit configured to embed signalling information into the one or more transmission streams, said signalling information including information about the code used by the encoder, the total number M of constellation points of the constellation, the location of the constellation points and the code rate.

8. A transmission apparatus as defined in embodiment 6 or 7,
   wherein said signalling unit is configured to embed signalling information into the one or more transmission streams, said signalling information including a modulation and coding, MCS, index information including information about the total number M of constellation points of the constellation and the code rate.

9. A transmission apparatus as defined in one of embodiments 6 to 8,
   wherein said modulation unit is configured to select using a uniform constellation instead of one of said non-uniform constellations for modulating said cell words into constellation values, and
   wherein said signalling unit is configured to embed signalling information into the one or more transmission streams, said signalling information including constellation information indicating if a non-uniform constellation or a uniform constellation has been used for modulation.

10. A transmission apparatus as defined in one of embodiments 7 to 9,
    wherein said signalling unit is configured to embed said signalling information at the beginning of frames, in particular of each frame, of a plurality of frames used for transmission of the one or more transmission streams.

11. A transmission apparatus as defined in one of embodiments 7 to 9, wherein said signalling unit is configured to embed said signalling information into a SIG, L-SIG, HT-SIG, VHT-SIG or HE-SIG field.

12. A transmission method comprising:
a coding and modulation method as defined in embodiment 5 that encodes and modulates input data into constellation values,
converting said constellation values into one or more transmission streams to be transmitted, and
transmitting said one or more transmission streams.

15. A demodulation and decoding apparatus comprising:
a demodulator configured to demodulate constellation values of a non-uniform constellation into cell words and to assign bit combinations to constellation values of the used non-uniform constellation, and
a decoder configured to decode cell words into output data according to a binary convolutional code, BCC, or a low density parity check code, LDPC,
wherein said demodulator is configured to use, based on signalling information indicating the code used by an encoder, the total number M of constellation points of the constellation and the code rate, a non-uniform constellation and bit labeling from one of the groups A, B, C or D as disclosed herein or a non-uniform constellation obtained from a constellation from anyone of groups A, B, C or D through rotation by an angle around the origin, through inversion of bit labels for all constellation points, through interchanging of bit positions, through mirroring on any line in the complex plane and/or through predistortion for the constellation points.

16. A demodulation and decoding method comprising:
demodulating constellation values of a non-uniform constellation into cell words and assigning bit combinations to constellation values of the used non-uniform constellation, and
decoding cell words into output data according to a binary convolutional code, BCC, or a low density parity check code, LDPC,
wherein said demodulating is configured to use, based on signalling information indicating the code used by an encoder, the total number M of constellation points of the constellation and the code rate, a non-uniform constellation and bit labeling from one of the groups A, B, C or D as disclosed herein or a non-uniform constellation obtained from a constellation from anyone of groups A, B, C or D through rotation by an angle around the origin, through inversion of bit labels for all constellation points, through interchanging of bit positions, through mirroring on any line in the complex plane and/or through predistortion for the constellation points.

17. Receiving apparatus comprising:
a receiver configured to receive one or more transmission streams,
a deconverter configured to deconvert one or more transmission streams into said constellation values, and
a demodulation and decoding apparatus as defined in embodiment 15 configured to demodulate and decode said constellation values into output data.

18. Receiving method comprising:
receiving one or more transmission streams,
deconverting one or more transmission streams into said constellation values, and
demodulating and decoding said constellation values into output data according to a method as defined in embodiment 16.

19. A non-transitory computer-readable recording medium that stores therein a computer program product, which, when executed by a processor, causes the method according to embodiment 5 or 16 to be performed.

20. A communications system comprising one or more transmission apparatus as defined in embodiment 1 and one or more receiving apparatus as defined in embodiment 17.

21. A computer program comprising program code means for causing a computer to perform the steps of said method according to embodiment 5 or 16 when said computer program is carried out on a computer.

The invention claimed is:

1. A coding and modulation apparatus comprising:
an encoder configured to encode input data into cell words according to a BCC (binary convolutional code), or a LDPC (low density parity check code), and
a modulator configured to modulate said cell words into constellation values of a NUC (non-uniform constellation) and to assign bit combinations to constellation values of the used non-uniform constellation,
wherein said modulator is configured to use, based on the code used by the encoder, the total number M of constellation points of the constellation and the code rate,
i) a non-uniform constellation and bit labeling from a group A, if the encoder is configured to use a BCC code and if M=16, 64 or 256, the group A comprising constellations as defined in
sub-group A1 for 16-QAM with M=16 and code rates of 1/2 or 3/4,
sub-group A2 for 64-QAM with M=64 and code rates of 2/3, 3/4 or 5/6, and
sub-group A3 for 256-QAM with M=256 and code rates of 3/4 or 5/6,
wherein the constellation points are defined by a constellation position vector $w_0 \ldots w_{M-1}$,
or
ii) a non-uniform constellation and bit labeling from a group B, if the encoder is configured to use a LDPC code and if M=16, 64 or 256, the group B comprising constellations as defined in
sub-group B1 for 16-QAM with M=16 and code rates of 1/2 or 3/4,
sub-group B2 for 64-QAM with M=64 and code rates of 2/3, 3/4 or 5/6, and
sub-group B3 for 256-QAM with M=256 and code rates of 3/4 or 5/6,
wherein the constellation points are defined by a constellation position vector $w_0 \ldots w_{M-1}$,
or
iii) a non-uniform constellation and bit labeling from a group C, if the encoder is configured to use a BCC code and if M=1024 and a code rate of 2/3, 3/4 or 7/8, the group C comprising constellations C1, C2 and C3,
wherein the constellation points are defined by the constellation position vector u of length $v=\text{sqrt}(M)/2-1$,
or
iv) a non-uniform constellation and bit labeling from a group D, if the encoder is configured to use a LDPC code and if M=1024 and a code rate of 2/3, 3/4 or 5/6, the group D comprising constellations D1, D2, D3,
wherein the constellation points are defined by the constellation position vector u of length $v=\text{sqrt}(M)/2-1$,
wherein when said modulator is configured to use a selected non-uniform constellation obtained from a constellation from any one of groups A, B, C or D, the modulator may use the selected non-uniform constellation which has been modified through rotation by an angle around the origin, through inversion of bit labels for all constellation points, through interchanging of bit positions, through mirroring on any line in the complex plane and/or through pre-distortion for the constellation points, wherein the constellation position vectors of the different constellations of the groups A, B, C, D of constellations are defined as follows:

A) M-QAM non-uniform constellations of group A for BCC encoding:

A1) 16-QAM NUC, where MCS is a modulation and coding scheme

| w | bit label | MCS = 3 (or 4) | MCS = 4 (or 3) |
|---|---|---|---|
| w0 | 0000 | +0.2918+0.2918i | +0.3063−0.3063i |
| w1 | 0001 | +0.9565+0.2918i | +0.3063+0.3063i |
| w2 | 0010 | −0.2918+0.2918i | +0.9519−0.3063i |
| w3 | 0011 | −0.9565+0.2918i | +0.9519+0.3063i |
| w4 | 0100 | +0.2918+0.9565i | −0.3063−0.3063i |
| w5 | 0101 | +0.9565+0.9565i | −0.3063+0.3063i |
| w6 | 0110 | −0.2918+0.9565i | −0.9519−0.3063i |
| w7 | 0111 | −0.9565+0.9565i | −0.9519+0.3063i |
| w8 | 1000 | +0.2918−0.2918i | +0.3063−0.9519i |
| w9 | 1001 | +0.9565−0.2918i | +0.3063+0.9519i |
| w10 | 1010 | −0.2918−0.2918i | +0.9519−0.9519i |
| w11 | 1011 | −0.9565−0.2918i | +0.9519+0.9519i |
| w12 | 1100 | +0.2918−0.9565i | −0.3063−0.9519i |
| w13 | 1101 | +0.9565−0.9565i | −0.3063+0.9519i |
| w14 | 1110 | −0.2918−0.9565i | −0.9519−0.9519i |
| w15 | 1111 | −0.9565−0.9565i | −0.9519+0.9519i |

A2) 64-QAM NUC

| w/ MCS index | bit label | MCS = 5 (or 6 or 7) | MCS = 6 (or 5 or 7) | MCS = 7 (or 5 or 6) |
|---|---|---|---|---|
| w0 | 000000 | +1.0474−0.1695i | +1.0432−0.1724i | +1.0297−0.1665i |
| w1 | 000001 | +0.7243−0.1504i | +0.7272−0.1538i | +0.1417−0.1412i |
| w2 | 000010 | −1.0474−0.1695i | +0.1428−0.1397i | −1.0297−0.1665i |
| w3 | 000011 | −0.7243−0.1504i | +0.4304−0.1474i | −0.1417−0.1412i |
| w4 | 000100 | +0.1407−0.1336i | −1.0432−0.1724i | +1.1116−0.5027i |
| w5 | 000101 | +0.4265−0.1388i | −0.7272−0.1538i | +0.1521−0.4258i |
| w6 | 000110 | −0.1407−0.1336i | −0.1428−0.1397i | −1.1116−0.5027i |
| w7 | 000111 | −0.4265−0.1388i | −0.4304−0.1474i | −0.1521−0.4258i |
| w8 | 001000 | +1.0474+0.1695i | +1.0432+0.1724i | +1.0297+0.1665i |
| w9 | 001001 | +0.7243+0.1504i | +0.7272+0.1538i | +0.1417+0.1412i |
| w10 | 001010 | −1.0474+0.1695i | +0.1428+0.1397i | −1.0297+0.1665i |
| w11 | 001011 | −0.7243+0.1504i | +0.4304+0.1474i | −0.1417+0.1412i |
| w12 | 001100 | +0.1407+0.1336i | −1.0432+0.1724i | +1.1116+0.5027i |
| w13 | 001101 | +0.4265+0.1388i | −0.7272+0.1538i | +0.1521+0.4258i |
| w14 | 001110 | −0.1407+0.1336i | −0.1428+0.1397i | −1.1116+0.5027i |
| w15 | 001111 | −0.4265+0.1388i | −0.4304+0.1474i | −0.1521+0.4258i |
| w16 | 010000 | +1.4261−0.2216i | +1.1145−0.5358i | +0.7218−0.1633i |
| w17 | 010001 | +0.6106−1.1783i | +0.7705−0.4700i | +0.4281−0.1504i |
| w18 | 010010 | −1.4261−0.2216i | +0.1500−0.4221i | −0.7218−0.1633i |
| w19 | 010011 | −0.6106−1.1783i | +0.4537−0.4461i | −0.4281−0.1504i |
| w20 | 010100 | +0.1682−1.0316i | −1.1145−0.5358i | +0.7726−0.4955i |
| w21 | 010101 | +0.2287−1.3914i | −0.7705−0.4700i | +0.4581−0.4553i |
| w22 | 010110 | −0.1682−1.0316i | −0.1500−0.4221i | −0.7726−0.4955i |
| w23 | 010111 | −0.2287−1.3914i | −0.4537−0.4461i | −0.4581−0.4553i |
| w24 | 011000 | +1.4261+0.2216i | +1.1145+0.5358i | +0.7218+0.1633i |
| w25 | 011001 | +0.6106+1.1783i | +0.7705+0.4700i | +0.4281+0.1504i |
| w26 | 011010 | −1.4261+0.2216i | +0.1500+0.4221i | −0.7218+0.1633i |
| w27 | 011011 | −0.6106+1.1783i | +0.4537+0.4451i | −0.4281+0.1504i |
| w28 | 011100 | +0.1682+1.0316i | −1.1145+0.5358i | +0.7726+0.4955i |
| w29 | 011101 | +0.2287+13914i | −0.7705+0.4700i | +0.4581+0.4553i |
| w30 | 011110 | −0.1682+1.0316i | −0.1500+0.4221i | −0.7726+0.4955i |
| w31 | 011111 | −0.2287+1.3914i | −0.4537+0.4461i | −0.4581+0.4553i |
| w32 | 100000 | +1.0854−0.5394i | +1.3903−0.2023i | +1.3715−0.1909i |
| w33 | 100001 | +0.7353−0.4623i | +0.5830−1.1356i | +0.1700−1.0281i |
| w34 | 100010 | −1.0854−0.5394i | +0.1708−1.0248i | −1.3715−0.1909i |
| w35 | 100011 | −0.7353−0.4623i | +0.2191−1.3618i | −0.1700−1.0281i |
| w36 | 100100 | +0.1392−0.4078i | −1.3903−0.2023i | +1.1152−0.8599i |
| w37 | 100101 | +0.4262−0.4205i | −0.5830−1.1356i | +0.1524−0.7179i |
| w38 | 100110 | −0.1392−0.4078i | −0.1708−1.0248i | −1.1152−0.8599i |
| w39 | 100111 | −0.4262−0.4205i | −0.2191−1.3618i | −0.1524−0.7179i |
| w40 | 101000 | +1.0854+0.5394i | +1.3903+0.2023i | +1.3715+0.1909i |
| w41 | 101001 | +0.7353−0.4623i | +0.5830+1.1356i | +0.1700+1.0281i |
| w42 | 101010 | −1.0854+0.5394i | +0.1708+1.0248i | −1.3715+0.1909i |
| w43 | 101011 | −0.7353+0.4623i | +0.2191+1.3618i | −0.1700+1.0281i |
| w44 | 101100 | +0.1392+0.4078i | −1.3903+0.2023i | +1.1152+0.8599i |
| w45 | 101101 | +0.4262+0.4205i | −0.5830+1.1356i | +0.1524+0.7179i |
| w46 | 101110 | −0.1392+0.4078i | −0.1708+1.0248i | −1.1152+0.8599i |
| w47 | 101111 | −0.4262+0.4205i | −0.2191+1.3618i | −0.1524+0.7179i |
| w48 | 110000 | +1.0693−0.9408i | +1.0788−0.9275i | +0.5530−1.1489i |
| w49 | 110001 | +0.7092−0.8073i | +0.7608−0.8009i | +0.2033−1.3620i |
| w50 | 110010 | −1.0693−0.9408i | +0.1480−0.7122i | −0.5530−1.1489i |
| w51 | 110011 | −0.7092−0.8073i | +0.4498−0.7565i | −0.2033−1.3620i |
| w52 | 110100 | +0.1388−0.7057i | −1.0788−0.9275i | +0.7724−0.8458i |
| w53 | 110101 | +0.4197−0.7206i | −0.7608−0.8009i | +0.4596−0.7717i |
| w54 | 110110 | −0.1388−0.7057i | −0.1480−0.7122i | −0.7724−0.8458i |
| w55 | 110111 | −0.4197−0.7206i | −0.4498−0.7565i | −0.4596−0.7717i |
| w56 | 111000 | +1.0693+0.9408i | +1.0788+0.9275i | +0.5530+1.1489i |
| w57 | 111001 | +0.7092+0.8073i | +0.7608+0.8009i | +0.2033+1.3620i |
| w58 | 111010 | −1.0693+0.9408i | +0.1480+0.7122i | −0.5530+1.1489i |
| w59 | 111011 | −0.7092+0.8073i | +0.4498+0.7565i | −0.2033+1.3620i |
| w60 | 111100 | +0.1388+0.7057i | −1.0788+0.9275i | +0.7724+0.8458i |
| w61 | 111101 | +0.4197+0.7206i | −0.7608+0.8009i | +0.4596+0.7717i |
| w62 | 111110 | −0.1388+0.7057i | −0.1480+0.7122i | −0.7724+0.8458i |
| w63 | 111111 | −0.4197+0.7206i | −0.4498+0.7565i | −0.4596+0.7717i |

A3) 256-QAM NUC for MCS=8 (or 9):

| w index | bit label | Constellation point |
|---|---|---|
| w0 | 0000000 | −0.4905+1.1842i |
| w1 | 0000000 | −0.6911+0.6930i |
| w2 | 0000001 | −0.5982+1.0262i |
| w3 | 0000001 | −0.6740+0.8584i |
| w4 | 0000010 | +0.4905+1.1842i |
| w5 | 0000010 | +0.6911+0.6930i |
| w6 | 0000011 | +0.5982+1.0262i |
| w7 | 0000011 | +0.6740+0.8584i |
| w8 | 0000100 | −0.6622+0.0739i |
| w9 | 0000100 | −0.6739+0.5331i |
| w10 | 0000101 | −0.6337+0.2246i |
| w11 | 0000101 | −0.6474+0.3777i |
| w12 | 0000110 | +0.6622+0.0739i |
| w13 | 0000110 | +0.6739+0.5331i |
| w14 | 0000111 | +0.6337+0.2246i |
| w15 | 0000111 | +0.6474+0.3777i |
| w16 | 0001000 | −0.4905−1.1842i |
| w17 | 0001000 | −0.6911−0.6930i |
| w18 | 0001001 | −0.5982−1.0262i |
| w19 | 0001001 | −0.6740−0.8584i |
| w20 | 0001010 | +0.4905−1.1842i |
| w21 | 0001010 | +0.6911−0.6930i |
| w22 | 0001011 | +0.5982−1.0262i |
| w23 | 0001011 | +0.6740−0.8584i |
| w24 | 0001100 | −0.6622−0.0739i |
| w25 | 0001100 | −0.6739−0.5331i |
| w26 | 0001101 | −0.6337−0.2246i |
| w27 | 0001101 | −0.6474−0.3777i |
| w28 | 0001110 | +0.6622−0.0739i |
| w29 | 0001110 | +0.6739−0.5331i |
| w30 | 0001111 | +0.6337−0.2246i |
| w31 | 0001111 | +0.6474−0.3777i |
| w32 | 0010000 | −0.6854+1.2221i |
| w33 | 0010000 | −0.8561+0.6778i |
| w34 | 0010001 | −0.7829+1.0274i |
| w35 | 0010001 | −0.8451+0.8492i |
| w36 | 0010010 | +0.6854+1.2221i |
| w37 | 0010010 | +0.8561+0.6778i |
| w38 | 0010011 | +0.7829+1.0274i |

-continued

| w index | bit label | Constellation point |
|---|---|---|
| w39 | 0010011 | +0.8451+0.8492i |
| w40 | 0010100 | −0.8231+0.0739i |
| w41 | 0010100 | −0.8353+0.5198i |
| w42 | 0010101 | −0.7818+0.2196i |
| w43 | 0010101 | −0.7994+0.3695i |
| w44 | 0010110 | +0.8231+0.0739i |
| w45 | 0010110 | +0.8353+0.5198i |
| w46 | 0010111 | +0.7818+0.2196i |
| w47 | 0010111 | +0.7994+0.3695i |
| w48 | 0011000 | −0.6854−1.2221i |
| w49 | 0011000 | −0.8561−0.6778i |
| w50 | 0011001 | −0.7829−1.0274i |
| w51 | 0011001 | −0.8451−0.8492i |
| w52 | 0011010 | +0.6854−1.2221i |
| w53 | 0011010 | +0.8561−0.6778i |
| w54 | 0011011 | +0.7829−1.0274i |
| w55 | 0011011 | +0.8451−0.8492i |
| w56 | 0011100 | −0.8231−0.0739i |
| w57 | 0011100 | −0.8353−0.5198i |
| w58 | 0011101 | −0.7818−0.2196i |
| w59 | 0011101 | −0.7994−0.3695i |
| w60 | 0011110 | +0.8231−0.0739i |
| w61 | 0011110 | +0.8353−0.5198i |
| w62 | 0011111 | +0.7818−0.2196i |
| w63 | 0011111 | +0.7994−0.3695i |
| w64 | 01000000 | −0.4711+1.3764i |
| w65 | 01000001 | −0.5308+0.6813i |
| w66 | 01000010 | −0.4242+0.9942i |
| w67 | 01000011 | −0.5155+0.8438i |
| w68 | 01000100 | +0.4711+1.3764i |
| w69 | 01000101 | +0.5308+0.6813i |
| w70 | 01000110 | +0.4242+0.9942i |
| w71 | 01000111 | +0.5155+0.8438i |
| w72 | 01001000 | −0.5101+0.0730i |
| w73 | 01001001 | −0.5175+0.5233i |
| w74 | 01001010 | −0.4897+0.2198i |
| w75 | 01001011 | −0.4992+0.3698i |
| w76 | 01001100 | +0.5101+0.0730i |
| w77 | 01001101 | +0.5175+0.5233i |
| w78 | 01001110 | +0.4897+0.2198i |
| w79 | 01001111 | +0.4992+0.3698i |
| w80 | 01010000 | −0.4711−1.3764i |
| w81 | 01010001 | −0.5308−0.6813i |
| w82 | 01010010 | −0.4242−0.9942i |
| w83 | 01010011 | −0.5155−0.8438i |
| w84 | 01010100 | +0.4711−1.3764i |
| w85 | 01010101 | +0.5308−0.6813i |
| w86 | 01010110 | +0.4242−0.9942i |
| w87 | 01010111 | +0.5155−0.8438i |
| w88 | 01011000 | −0.5101−0.0730i |
| w89 | 01011001 | −0.5175−0.5233i |
| w90 | 01011010 | −0.4897−0.2198i |
| w91 | 01011011 | −0.4992−0.3698i |
| w92 | 01011100 | +0.5101−0.0730i |
| w93 | 01011101 | +0.5175−0.5233i |
| w94 | 01011110 | +0.4897−0.2198i |
| w95 | 01011111 | +0.4992−0.3698i |
| w96 | 01100000 | −0.2836+1.2952i |
| w97 | 01100001 | −0.3755+0.6565i |
| w98 | 01100010 | −0.2860+1.1119i |
| w99 | 01100011 | −0.3664+0.8105i |
| w100 | 01100100 | +0.2836+1.2952i |
| w101 | 01100101 | +0.3755+0.6565i |
| w102 | 01100110 | +0.2860+1.1119i |
| w103 | 01100111 | +0.3664+0.8105i |
| w104 | 01101000 | −0.3616+0.0709i |
| w105 | 01101001 | −0.3655+0.5062i |
| w106 | 01101010 | −0.3479+0.2135i |
| w107 | 01101011 | −0.3537+0.3587i |
| w108 | 01101100 | +0.3616+0.0709i |
| w109 | 01101101 | +0.3655+0.5062i |
| w110 | 01101110 | +0.3479+0.2135i |
| w111 | 01101111 | +0.3537+0.3587i |
| w112 | 01110000 | −0.2836−1.2952i |
| w113 | 01110001 | −0.3755−0.6565i |
| w114 | 01110010 | −0.2860−1.1119i |
| w115 | 01110011 | −0.3664−0.8105i |
| w116 | 01110100 | +0.2836−0.2952i |
| w117 | 01110101 | +0.3755−0.6565i |
| w118 | 01110110 | +0.2860−1.1119i |
| w119 | 01110111 | +0.3664−0.8105i |
| w120 | 01111000 | −0.3616−0.0709i |
| w121 | 01111001 | −0.3655−0.5062i |
| w122 | 01111010 | −0.3479−0.2135i |
| w123 | 01111011 | −0.3537−0.3587i |
| w124 | 01111100 | +0.3616−0.0709i |
| w125 | 01111101 | +0.3655−0.5062i |
| w126 | 01111110 | +0.3479−0.2135i |
| w127 | 01111111 | +0.3537−0.3587i |
| w128 | 10000000 | −1.2103+0.9014i |
| w129 | 10000001 | −1.1677+0.4847i |
| w130 | 10000010 | −1.2323+0.6874i |
| w131 | 10000011 | −1.3547+0.4862i |
| w132 | 10000100 | +1.2103+0.9014i |
| w133 | 10000101 | +1.1677+0.4847i |
| w134 | 10000110 | +1.2323+0.6874i |
| w135 | 10000111 | +1.3547+0.4862i |
| w136 | 10001000 | −1.1595+0.0882i |
| w137 | 10001001 | −1.4613+0.2782i |
| w138 | 10001010 | −1.3430+0.0950i |
| w139 | 10001011 | −1.2637+0.2839i |
| w140 | 10001100 | +1.1595+0.0882i |
| w141 | 10001101 | +1.4613+0.2782i |
| w142 | 10001110 | +1.3430+0.0950i |
| w143 | 10001111 | +1.2637+0.2839i |
| w144 | 10010000 | −1.2103−0.9014i |
| w145 | 10010001 | −1.1677−0.4847i |
| w146 | 10010010 | −1.2323−0.6874i |
| w147 | 10010011 | −1.3547−0.4862i |
| w148 | 10010100 | +1.2103−0.9014i |
| w149 | 10010101 | +1.1677−0.4847i |
| w150 | 10010110 | +1.2323−0.6874i |
| w151 | 10010111 | +1.3547−0.4862i |
| w152 | 10011000 | −1.1595−0.0882i |
| w153 | 10011001 | −1.4613−0.2782i |
| w154 | 10011010 | −1.3430−0.0950i |
| w155 | 10011011 | −1.2637−0.2839i |
| w156 | 10011100 | +1.1595−0.0882i |
| w157 | 10011101 | +1.4613−0.2782i |
| w158 | 10011110 | +1.3430−0.0950i |
| w159 | 10011111 | +1.2637−0.2839i |
| w160 | 10100000 | −0.9022+1.1987i |
| w161 | 10100001 | −1.0215+0.6013i |
| w162 | 10100010 | −0.9925+0.9967i |
| w163 | 10100011 | −1.0233+0.7878i |
| w164 | 10100100 | +0.9022+1.1987i |
| w165 | 10100101 | +1.0215+0.6013i |
| w166 | 10100110 | +0.9925+0.9967i |
| w167 | 10100111 | +1.0233+0.7878i |
| w168 | 10101000 | −0.9894+0.0820i |
| w169 | 10101001 | −0.9800+0.4265i |
| w170 | 10101010 | −0.9367+0.2358i |
| w171 | 10101011 | −1.0889+0.2858i |
| w172 | 10101100 | +0.9894+0.0820i |
| w173 | 10101101 | +0.9800+0.4265i |
| w174 | 10101110 | +0.9367+0.2358i |
| w175 | 10101111 | +1.0889+0.2858i |
| w176 | 10110000 | −0.9022−1.1987i |
| w177 | 10110001 | −1.0215−0.6013i |
| w178 | 10110010 | −0.9925−0.9967i |
| w179 | 10110011 | −1.0233−0.7878i |
| w180 | 10110100 | +0.9022−1.1987i |
| w181 | 10110101 | +1.0215−0.6013i |
| w182 | 10110110 | +0.9925−0.9967i |
| w183 | 10110111 | +1.0233−0.7878i |
| w184 | 10111000 | −0.9894−0.0820i |
| w185 | 10111001 | −0.9800−0.4265i |
| w186 | 10111010 | −0.9367−0.2358i |
| w187 | 10111011 | −1.0889−0.2858i |
| w188 | 10111100 | +0.9894−0.0820i |
| w189 | 10111101 | +0.9800−0.4265i |
| w190 | 10111110 | +0.9367−0.2358i |
| w191 | 10111111 | −1.2103+0.9014i |
| w192 | 11000000 | −0.0888+1.1903i |

| w index | bit label | Constellation point |
| --- | --- | --- |
| w193 | 11000001 | −0.0732+0.6770i |
| w194 | 11000010 | −0.0829+1.0145i |
| w195 | 11000011 | −0.0737+0.8430i |
| w196 | 11000100 | +0.0888+1.1903i |
| w197 | 11000101 | +0.0732+0.6770i |
| w198 | 11000110 | +0.0829+1.0145i |
| w199 | 11000111 | +0.0737+0.8430i |
| w200 | 11001000 | −0.0711+0.0728i |
| w201 | 11001001 | −0.0722+0.5215i |
| w202 | 11001010 | −0.0687+0.2202i |
| w203 | 11001011 | −0.0699+0.3698i |
| w204 | 11001100 | +0.0711+0.0728i |
| w205 | 11001101 | +0.0722+0.5215i |
| w206 | 11001110 | +0.0687+0.2202i |
| w207 | 11001111 | +0.0699+0.3698i |
| w208 | 11010000 | −0.0888−1.1903i |
| w209 | 11010001 | −0.0732−0.6770i |
| w210 | 11010010 | −0.0829−1.0145i |
| w211 | 11010011 | −0.0737−0.8430i |
| w212 | 11010100 | +0.0888−1.1903i |
| w213 | 11010101 | +0.0732−0.6770i |
| w214 | 11010110 | +0.0829−1.0145i |
| w215 | 11010111 | +0.0737−0.8430i |
| w216 | 11011000 | −0.0711−0.0728i |
| w217 | 11011001 | −0.0722−0.5215i |
| w218 | 11011010 | −0.0687−0.2202i |
| w219 | 11011011 | −0.0699−0.3698i |
| w220 | 11011100 | +0.0711−0.0728i |
| w221 | 11011101 | +0.0722−0.5215i |
| w222 | 11011110 | +0.0687−0.2202i |
| w223 | 11011111 | +0.0699−0.3698i |
| w224 | 11100000 | −0.1023+1.3833i |
| w225 | 11100001 | −0.2228+0.6437i |
| w226 | 11100010 | −0.2357+0.9536i |
| w227 | 11100011 | −0.2175+0.7949i |
| w228 | 11100100 | +0.1023+1.3833i |
| w229 | 11100101 | +0.2228+0.6437i |
| w230 | 11100110 | +0.2357+0.9536i |
| w231 | 11100111 | +0.2175+0.7949i |
| w232 | 11101000 | −0.2153+0.0697i |
| w233 | 11101001 | −0.2171+0.4970i |
| w234 | 11101010 | −0.2074+0.2103i |
| w235 | 11101011 | −0.2104+0.3528i |
| w236 | 11101100 | +0.2153+0.0697i |
| w237 | 11101101 | +0.2171+0.4970i |
| w238 | 11101110 | +0.2074+0.2103i |
| w239 | 11101111 | +0.2104+0.3528i |
| w240 | 11110000 | −0.1023−1.3833i |
| w241 | 11110001 | −0.2228−0.6437i |
| w242 | 11110010 | −0.2357−0.9536i |
| w243 | 11110011 | −0.2175−0.7949i |
| w244 | 11110100 | +0.1023−1.3833i |
| w245 | 11110101 | +0.2228−0.6437i |
| w246 | 11110110 | +0.2357−0.9536i |
| w247 | 11110111 | +0.2175−0.7949i |
| w248 | 11111000 | −0.2153−0.0697i |
| w249 | 11111001 | −0.2171−0.4970i |
| w250 | 11111010 | −0.2074−0.2103i |
| w251 | 11111011 | −0.2104−0.3528i |
| w252 | 11111100 | +0.2153−0.0697i |
| w253 | 11111101 | +0.2171−0.4970i |
| w254 | 11111110 | +0.2074−0.2103i |
| w255 | 11111111 | +0.2104−0.3528i | or
for MCS=9 (or 8):

| w index | bit label | Constellation point |
| --- | --- | --- |
| w0 | 0000000 | −0.4801+1.1746i |
| w1 | 0000000 | −0.6762+1.2058i |
| w2 | 0000001 | +0.4801+1.1746i |
| w3 | 0000001 | +0.6762+1.2058i |
| w4 | 0000010 | −0.4614+1.3554i |
| w5 | 0000010 | −0.2766+1.2869i |
| w6 | 0000011 | +0.4614+1.3554i |
| w7 | 0000011 | +0.2766+1.2869i |
| w8 | 0000100 | −1.1920+0.8876i |
| w9 | 0000100 | −0.8919+1.1799i |
| w10 | 0000101 | +1.1920+0.8876i |
| w11 | 0000101 | +0.8919+1.1799i |
| w12 | 0000110 | −0.0897+1.1870i |
| w13 | 0000110 | −0.0980+1.3675i |
| w14 | 0000111 | +0.0897+1.1870i |
| w15 | 0000111 | +0.0980+1.3675i |
| w16 | 0001000 | −0.7042+0.7037i |
| w17 | 0001000 | −0.8656+0.6806i |
| w18 | 0001001 | +0.7042+0.7037i |
| w19 | 0001001 | +0.8656+0.6806i |
| w20 | 0001010 | −0.5441+0.6946i |
| w21 | 0001010 | −0.3865+0.6677i |
| w22 | 0001011 | +0.5441+0.6946i |
| w23 | 0001011 | +0.3865+0.6677i |
| w24 | 0001100 | −1.1619+0.4714i |
| w25 | 0001100 | −1.0233+0.5938i |
| w26 | 0001101 | +1.1619+0.4714i |
| w27 | 0001101 | +1.0233+0.5938i |
| w28 | 0001110 | −0.0761+0.6911i |
| w29 | 0001110 | −0.2301+0.6395i |
| w30 | 0001111 | +0.0761+0.6911i |
| w31 | 0001111 | +0.2301+0.6395i |
| w32 | 0010000 | −0.4801−1.1746i |
| w33 | 0010000 | −0.6762−1.2058i |
| w34 | 0010001 | +0.4801−1.1746i |
| w35 | 0010001 | +0.6762−1.2058i |
| w36 | 0010010 | −0.4614−1.3554i |
| w37 | 0010010 | −0.2766−1.2869i |
| w38 | 0010011 | +0.4614−1.3554i |
| w39 | 0010011 | +0.2766−1.2869i |
| w40 | 0010100 | −1.1920−0.8876i |
| w41 | 0010100 | −0.8919−1.1799i |
| w42 | 0010101 | +1.1920−0.8876i |
| w43 | 0010101 | +0.8919−1.1799i |
| w44 | 0010110 | −0.0897−1.1870i |
| w45 | 0010110 | −0.0980−1.3675i |
| w46 | 0010111 | +0.0897−1.1870i |
| w47 | 0010111 | +0.0980−1.3675i |
| w48 | 0011000 | −0.7042−0.7037i |
| w49 | 0011000 | −0.8656−0.6806i |
| w50 | 0011001 | +0.7042−0.7037i |
| w51 | 0011001 | +0.8656−0.6806i |
| w52 | 0011010 | −0.5441−0.6946i |
| w53 | 0011010 | −0.3865−0.6677i |
| w54 | 0011011 | +0.5441−0.6946i |
| w55 | 0011011 | +0.3865−0.6677i |
| w56 | 0011100 | −1.1619−0.4714i |
| w57 | 0011100 | −1.0233−0.5938i |
| w58 | 0011101 | +1.1619−0.4714i |
| w59 | 0011101 | +1.0233−0.5938i |
| w60 | 0011110 | −0.0761−0.6911i |
| w61 | 0011110 | −0.2301−0.6395i |
| w62 | 0011111 | +0.0761−0.6911i |
| w63 | 0011111 | +0.2301−0.6395i |
| w64 | 01000000 | −0.6844+0.0760i |
| w65 | 01000001 | −0.8440+0.0765i |
| w66 | 01000010 | +0.6844+0.0760i |
| w67 | 01000011 | +0.8440+0.0765i |
| w68 | 01000100 | −0.5319+0.0762i |
| w69 | 01000101 | −0.3811+0.0732i |
| w70 | 01000110 | +0.5319+0.0762i |
| w71 | 01000111 | +0.3811+0.0732i |
| w72 | 01001000 | −1.1751+0.0886i |
| w73 | 01001001 | −1.0070+0.0833i |
| w74 | 01001010 | +1.1751+0.0886i |
| w75 | 01001011 | +1.0070+0.0833i |
| w76 | 01001100 | −0.0749+0.0766i |
| w77 | 01001101 | −0.2291+0.0689i |
| w78 | 01001110 | +0.0749+0.0766i |
| w79 | 01001111 | +0.2291+0.0689i |
| w80 | 01010000 | −0.6891+0.5440i |
| w81 | 01010001 | −0.8493+0.5224i |
| w82 | 01010010 | +0.6891+0.5440i |

| w index | bit label | Constellation point |
|---|---|---|
| w83 | 01010011 | +0.8493+0.5224i |
| w84 | 01010100 | −0.5302+0.5350i |
| w85 | 01010101 | −0.3753+0.5150i |
| w86 | 01010110 | +0.5302+0.5350i |
| w87 | 01010111 | +0.3753+0.5150i |
| w88 | 01011000 | −1.4427+0.2847i |
| w89 | 01011001 | −0.9868+0.4178i |
| w90 | 01011010 | +1.4427+0.2847i |
| w91 | 01011011 | +0.9868+0.4178i |
| w92 | 01011100 | −0.0759+0.5374i |
| w93 | 01011101 | −0.2229+0.4904i |
| w94 | 01011110 | +0.0759+0.5374i |
| w95 | 01011111 | +0.2229+0.4904i |
| w96 | 01100000 | −0.6844−0.0760i |
| w97 | 01100001 | −0.8440−0.0765i |
| w98 | 01100010 | +0.6844−0.0760i |
| w99 | 01100011 | +0.8440−0.0765i |
| w100 | 01100100 | −0.5319−0.0762i |
| w101 | 01100101 | −0.3811−0.0732i |
| w102 | 01100110 | +0.5319−0.0762i |
| w103 | 01100111 | +0.3811−0.0732i |
| w104 | 01101000 | −1.1751−0.0886i |
| w105 | 01101001 | −1.0070−0.0833i |
| w106 | 01101010 | +1.1751−0.0886i |
| w107 | 01101011 | +1.0070−0.0833i |
| w108 | 01101100 | −0.0749−0.0766i |
| w109 | 01101101 | −0.2291−0.0689i |
| w110 | 01101110 | +0.0749−0.0766i |
| w111 | 01101111 | +0.2291−0.0689i |
| w112 | 01110000 | −0.6891−0.5440i |
| w113 | 01110001 | −0.8493−0.5224i |
| w114 | 01110010 | +0.6891−0.5440i |
| w115 | 01110011 | +0.8493−0.5224i |
| w116 | 01110100 | −0.5302−0.5350i |
| w117 | 01110101 | −0.3753−0.5150i |
| w118 | 01110110 | +0.5302−0.5350i |
| w119 | 01110111 | +0.3753−0.5150i |
| w120 | 01111000 | −1.4427−0.2847i |
| w121 | 01111001 | −0.9868−0.4178i |
| w122 | 01111010 | +1.4427−0.2847i |
| w123 | 01111011 | +0.9868−0.4178i |
| w124 | 01111100 | −0.0759−0.5374i |
| w125 | 01111101 | −0.2229−0.4904i |
| w126 | 01111110 | +0.0759−0.5374i |
| w127 | 01111111 | +0.2229−0.4904i |
| w128 | 10000000 | −0.5937+1.0262i |
| w129 | 10000001 | −0.7777+1.0233i |
| w130 | 10000010 | +0.5937+1.0262i |
| w131 | 10000011 | +0.7777+1.0233i |
| w132 | 10000100 | −0.4184+0.9977i |
| w133 | 10000101 | −0.2792+1.1096i |
| w134 | 10000110 | +0.4184+0.9977i |
| w135 | 10000111 | +0.2792+1.1096i |
| w136 | 10001000 | −1.2121+0.6733i |
| w137 | 10001001 | −0.9865+0.9873i |
| w138 | 10001010 | +1.2121+0.6733i |
| w139 | 10001011 | +0.9865+0.9873i |
| w140 | 10001100 | −0.0824+1.0164i |
| w141 | 10001101 | −0.2359+0.9515i |
| w142 | 10001110 | +0.0824+1.0164i |
| w143 | 10001111 | +0.2359+0.9515i |
| w144 | 10010000 | −0.6785+0.8656i |
| w145 | 10010001 | −0.8479+0.8504i |
| w146 | 10010010 | +0.6785+0.8656i |
| w147 | 10010011 | +0.8479+0.8504i |
| w148 | 10010100 | −0.5200+0.8555i |
| w149 | 10010101 | −0.3697+0.8223i |
| w150 | 10010110 | +0.5200+0.8555i |
| w151 | 10010111 | +0.3697+0.8223i |
| w152 | 10011000 | −1.3397+0.4820i |
| w153 | 10011001 | −1.0229+0.7822i |
| w154 | 10011010 | +1.3397+0.4820i |
| w155 | 10011011 | +1.0229+0.7822i |
| w156 | 10011100 | −0.0752+0.8524i |
| w157 | 10011101 | −0.2205+0.7921i |
| w158 | 10011110 | +0.0752+0.8524i |
| w159 | 10011111 | +0.2205+0.7921i |
| w160 | 10100000 | −0.5937−1.0262i |
| w161 | 10100001 | −0.7777−1.0233i |
| w162 | 10100010 | +0.5937−1.0262i |
| w163 | 10100011 | +0.7777−1.0233i |
| w164 | 10100100 | −0.4184−0.9977i |
| w165 | 10100101 | −0.2792−1.1096i |
| w166 | 10100110 | +0.4184−0.9977i |
| w167 | 10100111 | +0.2792−1.1096i |
| w168 | 10101000 | −1.2121−0.6733i |
| w169 | 10101001 | −0.9865−0.9873i |
| w170 | 10101010 | +1.2121−0.6733i |
| w171 | 10101011 | +0.9865−0.9873i |
| w172 | 10101100 | −0.0824−1.0164i |
| w173 | 10101101 | −0.2359−0.9515i |
| w174 | 10101110 | +0.0824−1.0164i |
| w175 | 10101111 | +0.2359−0.9515i |
| w176 | 10110000 | −0.6785−0.8656i |
| w177 | 10110001 | −0.8479−0.8504i |
| w178 | 10110010 | +0.6785−0.8656i |
| w179 | 10110011 | +0.8479−0.8504i |
| w180 | 10110100 | −0.5200−0.8555i |
| w181 | 10110101 | −0.3697−0.8223i |
| w182 | 10110110 | +0.5200−0.8555i |
| w183 | 10110111 | +0.3697−0.8223i |
| w184 | 10111000 | −1.3397−0.4820i |
| w185 | 10111001 | −1.0229−0.7822i |
| w186 | 10111010 | +1.3397−0.4820i |
| w187 | 10111011 | +1.0229−0.7822i |
| w188 | 10111100 | −0.0752−0.8524i |
| w189 | 10111101 | −0.2205−0.7921i |
| w190 | 10111110 | +0.0752−0.8524i |
| w191 | 10111111 | +0.2205−0.7921i |
| w192 | 11000000 | −0.6336+0.2306i |
| w193 | 11000001 | −0.7836+0.2217i |
| w194 | 11000010 | +0.6336+0.2306i |
| w195 | 11000011 | +0.7836+0.2217i |
| w196 | 11000100 | −0.4864+0.2253i |
| w197 | 11000101 | −0.3429+0.2164i |
| w198 | 11000110 | +0.4864+0.2253i |
| w199 | 11000111 | +0.3429+0.2164i |
| w200 | 11001000 | −1.3520+0.0957i |
| w201 | 11001001 | −0.9402+0.2370i |
| w202 | 11001010 | +1.3520+0.0957i |
| w203 | 11001011 | +0.9402+0.2370i |
| w204 | 11001100 | −0.0684+0.2330i |
| w205 | 11001101 | −0.2017+0.2031i |
| w206 | 11001110 | +0.0684+0.2330i |
| w207 | 11001111 | +0.2017+0.2031i |
| w208 | 11010000 | −0.6601+0.3878i |
| w209 | 11010001 | −0.8131+0.3716i |
| w210 | 11010010 | +0.6601+0.3878i |
| w211 | 11010011 | +0.8131+0.3716i |
| w212 | 11010100 | −0.5092+0.3789i |
| w213 | 11010101 | −0.3608+0.3649i |
| w214 | 11010110 | +0.5092+0.3789i |
| w215 | 11010111 | +0.3608+0.3649i |
| w216 | 11011000 | −1.2604+0.2816i |
| w217 | 11011001 | −1.0927+0.2741i |
| w218 | 11011010 | +1.2604+0.2816i |
| w219 | 11011011 | +1.0927+0.2741i |
| w220 | 11011100 | −0.0724+0.3856i |
| w221 | 11011101 | −0.2134+0.3455i |
| w222 | 11011110 | +0.0724+0.3856i |
| w223 | 11011111 | +0.2134+0.3455i |
| w224 | 11100000 | −0.6336−0.2306i |
| w225 | 11100001 | −0.7836−0.2217i |
| w226 | 11100010 | +0.6336−0.2306i |
| w227 | 11100011 | +0.7836−0.2217i |
| w228 | 11100100 | −0.4864−0.2253i |
| w229 | 11100101 | −0.3429−0.2164i |
| w230 | 11100110 | +0.4864−0.2253i |
| w231 | 11100111 | +0.3429−0.2164i |
| w232 | 11101000 | −1.3520−0.0957i |
| w233 | 11101001 | −0.9402−0.2370i |
| w234 | 11101010 | +1.3520−0.0957i |
| w235 | 11101011 | +0.9402−0.2370i |
| w236 | 11101100 | −0.0684−0.2330i |

| w index | bit label | Constellation point |
|---|---|---|
| w237 | 11101101 | −0.2017−0.2031i |
| w238 | 11101110 | +0.0684−0.2330i |
| w239 | 11101111 | +0.2017−0.2031i |
| w240 | 11110000 | −0.6601−0.3878i |
| w241 | 11110001 | −0.8131−0.3716i |
| w242 | 11110010 | +0.6601−0.3878i |
| w243 | 11110011 | +0.8131−0.3716i |
| w244 | 11110100 | −0.5092−0.3789i |
| w245 | 11110101 | −0.3608−0.3649i |
| w246 | 11110110 | +0.5092−0.3789i |
| w247 | 11110111 | +0.3608−0.3649i |
| w248 | 11111000 | −1.2604−0.2816i |
| w249 | 11111001 | −1.0927−0.2741i |
| w250 | 11111010 | +1.2604−0.2816i |
| w251 | 11111011 | +1.0927−0.2741i |
| w252 | 11111100 | −0.0724−0.3856i |
| w253 | 11111101 | −0.2134−0.3455i |
| w254 | 11111110 | +0.0724−0.3856i |
| w255 | 11111111 | +0.2134−0.3455i |

B) M-QAM non-uniform constellations of group B for LDPC encoding:

B1) 16-QAM NUC, where MCS 3 corresponds to a 16-QAM with code rate 1/2, and MCS 4 corresponds to 16-QAM with code rate 3/4

| w | bit label | MCS = 3 (or 4) | MCS = 4 (or 3) |
|---|---|---|---|
| w0 | 0000 | +0.4925+1.2040i | +0.3018−0.3018i |
| w1 | 0001 | +0.4925−1.2040i | +0.9534−0.3018i |
| w2 | 0010 | +0.2530+0.4936i | +0.3018+0.3018i |
| w3 | 0011 | +0.2530−0.4936i | +0.9534+0.3018i |
| w4 | 0100 | −0.4925+1.2040i | −0.3018−0.3018i |
| w5 | 0101 | −0.4925−1.2040i | −0.9534−0.3018i |
| w6 | 0110 | −0.2530+0.4936i | −0.3018+0.3018i |
| w7 | 0111 | −0.2530−0.4936i | −0.9534+0.3018i |
| w8 | 1000 | +1.2040+0.4925i | +0.3018−0.9534i |
| w9 | 1001 | +1.2040−0.4925i | +0.9534−0.9534i |
| w10 | 1010 | +0.4936+0.2530i | +0.3018+0.9534i |
| w11 | 1011 | +0.4936−0.2530i | +0.9534+0.9534i |
| w12 | 1100 | −1.2040+0.4925i | −0.3018−0.9534i |
| w13 | 1101 | −1.2040−0.4925i | −0.9534−0.9534i |
| w14 | 1110 | −0.4936+0.2530i | −0.3018+0.9534i |
| w15 | 1111 | −0.4936−0.2530i | −0.9534+0.9534i |

B2) 64-QAM NUC

| w/ MCS index | bit label | MCS = 5 (or 6 or 7) | MCS = 6 (or 5 or 7) | MCS = 7 (or 5 or 6) |
|---|---|---|---|---|
| w0 | 000000 | +1.4656+0.2931i | +1.0441−0.1581i | +1.0474−0.1695i |
| w1 | 000001 | +0.2878+1.4388i | +0.1321−0.1317i | −1.0474−0.1695i |
| w2 | 000010 | +0.1678+0.1166i | +1.4516−0.2578i | +0.7243−0.1504i |
| w3 | 000011 | +0.1177+0.4119i | +0.1689−1.0567i | −0.7243−0.1504i |
| w4 | 000100 | +1.4656−0.2931i | +0.6995−0.1411i | +0.1407−0.1336i |
| w5 | 000101 | +0.2878−1.4388i | +0.4035−0.1354i | −0.1407−0.1336i |
| w6 | 000110 | +0.1678−0.1166i | +0.6750−1.2072i | +0.4265−0.1388i |
| w7 | 000111 | +0.1177−0.4119i | +0.2558−1.4247i | −0.4265−0.1388i |
| w8 | 001000 | +1.0649+0.2069i | +1.0161−0.4912i | +1.0474+0.1695i |
| w9 | 001001 | +0.2219+1.0386i | +0.1287−0.4061i | −1.0474+0.1695i |
| w10 | 001010 | +0.7408+0.1355i | +1.1306−0.8649i | +0.7243+0.1504i |
| w11 | 001011 | +0.1559+0.7442i | +0.1385−0.7199i | −0.7243+0.1504i |
| w12 | 001100 | +1.0649−0.2069i | +0.6966−0.4427i | +0.1407+0.1336i |
| w13 | 001101 | +0.2219−1.0386i | +0.4025−0.4142i | −0.1407+0.1336i |
| w14 | 001110 | +0.7408−0.1355i | +0.6874−0.8123i | +0.4265+0.1388i |
| w15 | 001111 | +0.1559−0.7442i | +0.4017−0.7107i | −0.4265+0.1388i |
| w16 | 010000 | +1.2278+0.8230i | +1.0441+0.1581i | +1.0854−0.5394i |
| w17 | 010001 | +0.8133+1.2150i | +0.1321+0.1317i | −1.0854−0.5394i |
| w18 | 010010 | +0.3325+0.1582i | +1.4516+0.2578i | +0.7353−0.4623i |
| w19 | 010011 | +0.2516+0.3998i | +0.1689+1.0567i | −0.7353−0.4623i |
| w20 | 010100 | +1.2278−0.8230i | +0.6995+0.1411i | +0.1392−0.4078i |
| w21 | 010101 | +0.8133−1.2150i | +0.4035+0.1354i | −0.1392−0.4078i |
| w22 | 010110 | +0.3325−0.1582i | +0.6750+1.2072i | +0.4262−0.4205i |
| w23 | 010111 | +0.2516−0.3998i | +0.2558+1.4247i | −0.4262−0.4205i |
| w24 | 011000 | +0.8971+0.5677i | +1.0161+0.4912i | +1.0854+0.5394i |
| w25 | 011001 | +0.6145+0.8494i | +0.1287+0.4061i | −1.0854+0.5394i |
| w26 | 011010 | +0.6200+0.3227i | +1.1306+0.8649i | +0.7353+0.4623i |
| w27 | 011011 | +0.4328+0.5954i | +0.1385+0.7199i | −0.7353+0.4623i |
| w28 | 011100 | +0.8971−0.5677i | +0.6966+0.4427i | +0.1392+0.4078i |
| w29 | 011101 | +0.6145−0.8494i | +0.4025+0.4142i | −0.1392+0.4078i |
| w30 | 011110 | +0.6200−0.3227i | +0.6874+0.8123i | +0.4262+0.4205i |
| w31 | 011111 | +0.4328−0.5954i | +0.4017+0.7107i | −0.4262+0.4205i |
| w32 | 100000 | −1.4656+0.2931i | −1.0441−0.1581i | +1.4261−0.2216i |
| w33 | 100001 | −0.2878+1.4388i | −0.1321−0.1317i | −1.4261−0.2216i |
| w34 | 100010 | −0.1678+0.1166i | −1.4516−0.2578i | +0.6106−1.1783i |
| w35 | 100011 | −0.1177+0.4119i | −0.1689−1.0567i | −0.6106−1.1783i |
| w36 | 100100 | −1.4656−0.2931i | −0.6995−0.1411i | +0.1682−1.0316i |
| w37 | 100101 | −0.2878−1.4388i | −0.4035−0.1354i | −0.1682−1.0316i |
| w38 | 100110 | −0.1678−0.1166i | −0.6750−1.2072i | +0.2287−1.3914i |
| w39 | 100111 | −0.1177−0.4119i | −0.2558−1.4247i | −0.2287−1.3914i |
| w40 | 101000 | −1.0649+0.2069i | −1.0161−0.4912i | +1.4261+0.2216i |
| w41 | 101001 | −0.2219+1.0386i | −0.1287−0.4061i | −1.4261+0.2216i |
| w42 | 101010 | −0.7408+0.1355i | −1.1306−0.8649i | +0.6106+1.1783i |
| w43 | 101011 | −0.1559+0.7442i | −0.1385−0.7199i | −0.6106+1.1783i |
| w44 | 101100 | −1.0649−0.2069i | −0.6966−0.4427i | +0.1682+1.0316i |
| w45 | 101101 | −0.2219−1.0386i | −0.4025−0.4142i | −0.1682+1.0316i |
| w46 | 101110 | −0.7408−0.1355i | −0.6874−0.8123i | +0.2287+1.3914i |
| w47 | 101111 | −0.1559−0.7442i | −0.4017−0.7107i | −0.2287+1.3914i |
| w48 | 110000 | −1.2278+0.8230i | −1.0441+0.1581i | +1.0693−0.9408i |
| w49 | 110001 | −0.8133+1.2150i | −0.1321+0.1317i | −1.0693−0.9408i |
| w50 | 110010 | −0.3325+0.1582i | −1.4516+0.2578i | +0.7092−0.8073i |
| w51 | 110011 | −0.2516+0.3998i | −0.1689+1.0567i | −0.7092−0.8073i |
| w52 | 110100 | −1.2278−0.8230i | −0.6995+0.1411i | +0.1388−0.7057i |
| w53 | 110101 | −0.8133−1.2150i | −0.4035+0.1354i | −0.1388−0.7057i |
| w54 | 110110 | −0.3325−0.1582i | −0.6750+1.2072i | +0.4197−0.7206i |
| w55 | 110111 | −0.2516−0.3998i | −0.2558+1.4247i | −0.4197−0.7206i |
| w56 | 111000 | −0.8971+0.5677i | −1.0161+0.4912i | +1.0693+0.9408i |
| w57 | 111001 | −0.6145+0.8494i | −0.1287+0.4061i | −1.0693+0.9408i |
| w58 | 111010 | −0.6200+0.3227i | −1.1306+0.8649i | +0.7092+0.8073i |
| w59 | 111011 | −0.4328+0.5954i | −0.1385+0.7199i | −0.7092+0.8073i |
| w60 | 111100 | −0.8971−0.5677i | −0.6966+0.4427i | +0.1388+0.7057i |
| w61 | 111101 | −0.6145−0.8494i | −0.4025+0.4142i | −0.1388+0.7057i |
| w62 | 111110 | −0.6200−0.3227i | −0.6874+0.8123i | +0.4197+0.7206i |
| w63 | 111111 | −0.4328−0.5954i | −0.4017+0.7107i | −0.4197+0.7206i |

B3) 256-QAM NUC for MCS=8 (or 9):

| w index | bit label | Constellation point |
|---|---|---|
| w0 | 0000000 | −0.5039+1.2055i |
| w1 | 0000000 | −0.4884+1.0092i |
| w2 | 0000000 | −1.1657+1.0793i |
| w3 | 0000001 | −1.2385+0.8387i |
| w4 | 0000010 | −0.5781+1.4095i |
| w5 | 0000010 | −0.6891+1.0532i |
| w6 | 0000011 | −0.7876+1.2931i |
| w7 | 0000011 | −0.8990+1.0937i |
| w8 | 0000100 | −0.5039−1.2055i |
| w9 | 0000100 | −0.4884−1.0092i |
| w10 | 0000101 | −1.1657−1.0793i |
| w11 | 0000101 | −1.2385−0.8387i |
| w12 | 0000110 | −0.5781−1.4095i |
| w13 | 0000110 | −0.6891−1.0532i |
| w14 | 0000111 | −0.7876−1.2931i |
| w15 | 0000111 | −0.8990−1.0937i |
| w16 | 0001000 | −0.6346−0.6721i |
| w17 | 0001000 | −0.5902+0.8432i |
| w18 | 0001001 | −1.2060+0.5685i |
| w19 | 0001001 | −1.4112+0.6488i |
| w20 | 0001010 | −0.8075+0.6969i |
| w21 | 0001010 | −0.7660+0.8734i |
| w22 | 0001011 | −1.0100+0.6965i |
| w23 | 0001011 | −0.9651+0.8870i |

| w index | bit label | Constellation point | w index | bit label | Constellation point |
|---|---|---|---|---|---|
| w24 | 0001100 | −0.6346−0.6721i | w101 | 01100101 | +0.8280+0.2196i |
| w25 | 0001100 | −0.5902−0.8432i | w102 | 01100110 | +0.9811+0.0673i |
| w26 | 0001101 | −1.2060−0.5685i | w103 | 01100111 | +1.0114+0.2066i |
| w27 | 0001101 | −1.4112−0.6488i | w104 | 01101000 | +0.6629−0.0713i |
| w28 | 0001110 | −0.8075−0.6969i | w105 | 01101001 | +0.6641−0.2135i |
| w29 | 0001110 | −0.7660−0.8734i | w106 | 01101010 | +1.4228−0.1199i |
| w30 | 0001111 | −1.0100−0.6965i | w107 | 01101011 | +1.2036−0.1064i |
| w31 | 0001111 | −0.9651−0.8870i | w108 | 01101100 | +0.8160−0.0736i |
| w32 | 0010000 | −0.6629+0.0713i | w109 | 01101101 | +0.8280−0.2196i |
| w33 | 0010000 | −0.6641+0.2135i | w110 | 01101110 | +0.9811−0.0673i |
| w34 | 0010001 | −1.4228+0.1199i | w111 | 01101111 | +1.0114−0.2066i |
| w35 | 0010001 | −1.2036+0.1064i | w112 | 01110000 | +0.6511+0.5096i |
| w36 | 0010010 | −0.8160+0.0736i | w113 | 01110001 | +0.6617+0.3573i |
| w37 | 0010010 | −0.8280+0.2196i | w114 | 01110010 | +1.4186+0.3682i |
| w38 | 0010011 | −0.9811+0.0673i | w115 | 01110011 | +1.2116+0.3184i |
| w39 | 0010011 | −1.0114+0.2066i | w116 | 01110100 | +0.8111+0.5264i |
| w40 | 0010100 | −0.6629−0.0713i | w117 | 01110101 | +0.8276+0.3658i |
| w41 | 0010100 | −0.6641−0.2135i | w118 | 01110110 | +0.9802+0.5258i |
| w42 | 0010101 | −1.4228−0.1199i | w119 | 01110111 | +1.0181+0.3668i |
| w43 | 0010101 | −1.2036−0.1064i | w120 | 01111000 | +0.6511−0.5096i |
| w44 | 0010110 | −0.8160−0.0736i | w121 | 01111001 | +0.6617−0.3573i |
| w45 | 0010110 | −0.8280−0.2196i | w122 | 01111010 | +1.4186−0.3682i |
| w46 | 0010111 | −0.9811−0.0673i | w123 | 01111011 | +1.2116−0.3184i |
| w47 | 0010111 | −1.0114−0.2066i | w124 | 01111100 | +0.8111−0.5264i |
| w48 | 0011000 | −0.6511+0.5096i | w125 | 01111101 | +0.8276−0.3658i |
| w49 | 0011000 | −0.6617+0.3573i | w126 | 01111110 | +0.9802−0.5258i |
| w50 | 0011001 | −1.4186+0.3682i | w127 | 01111111 | +1.0181−0.3668i |
| w51 | 0011001 | −1.2116+0.3184i | w128 | 10000000 | −0.3004+1.2452i |
| w52 | 0011010 | −0.8111+0.5264i | w129 | 10000001 | −0.2967+1.0627i |
| w53 | 0011010 | −0.8276+0.3658i | w130 | 10000010 | −0.0994+1.2493i |
| w54 | 0011011 | −0.9802+0.5258i | w131 | 10000011 | −0.0947+1.0662i |
| w55 | 0011011 | −1.0181+0.3668i | w132 | 10000100 | −0.3452+1.4585i |
| w56 | 0011100 | −0.6511−0.5096i | w133 | 10000101 | −0.2650+0.9148i |
| w57 | 0011100 | −0.6617−0.3573i | w134 | 10000110 | −0.1137+1.4651i |
| w58 | 0011101 | −1.4186−0.3682i | w135 | 10000111 | −0.0895+0.8991i |
| w59 | 0011101 | −1.2116−0.3184i | w136 | 10001000 | −0.3004−1.2452i |
| w60 | 0011110 | −0.8111−0.5264i | w137 | 10001001 | −0.2967−1.0627i |
| w61 | 0011110 | −0.8276−0.3658i | w138 | 10001010 | −0.0994−1.2493i |
| w62 | 0011111 | −0.9802−0.5258i | w139 | 10001011 | −0.0947−1.0662i |
| w63 | 0011111 | −1.0181−0.3668i | w140 | 10001100 | −0.3452−1.4585i |
| w64 | 01000000 | +0.5039+1.2055i | w141 | 10001101 | −0.2650−0.9148i |
| w65 | 01000001 | +0.4884+1.0092i | w142 | 10001110 | −0.1137−1.4651i |
| w66 | 01000010 | +1.1657+1.0793i | w143 | 10001111 | −0.0895−0.8991i |
| w67 | 01000011 | +1.2385+0.8387i | w144 | 10010000 | −0.4787+0.6378i |
| w68 | 01000100 | +0.5781+1.4095i | w145 | 10010001 | −0.4439+0.7942i |
| w69 | 01000101 | +0.6891+1.0532i | w146 | 10010010 | −0.0688+0.5579i |
| w70 | 01000110 | +0.7876+1.2931i | w147 | 10010011 | −0.0550+0.6984i |
| w71 | 01000111 | +0.8990+1.0937i | w148 | 10010100 | −0.3328+0.6100i |
| w72 | 01001000 | +0.5039−1.2055i | w149 | 10010101 | −0.3014+0.7660i |
| w73 | 01001001 | +0.4884−1.0092i | w150 | 10010110 | −0.2008+0.5810i |
| w74 | 01001010 | +1.1657−1.0793i | w151 | 10010111 | −0.1623+0.7417i |
| w75 | 01001011 | +1.2385−0.8387i | w152 | 10011000 | −0.4787−0.6378i |
| w76 | 01001100 | +0.5781−1.4095i | w153 | 10011001 | −0.4439−0.7942i |
| w77 | 01001101 | +0.6891−1.0532i | w154 | 10011010 | −0.0688−0.5579i |
| w78 | 01001110 | +0.7876−1.2931i | w155 | 10011011 | −0.0550−0.6984i |
| w79 | 01001111 | +0.8990−1.0937i | w156 | 10011100 | −0.3328−0.6100i |
| w80 | 01010000 | +0.6346+0.6721i | w157 | 10011101 | −0.3014−0.7660i |
| w81 | 01010001 | +0.5902+0.8432i | w158 | 10011110 | −0.2008−0.5810i |
| w82 | 01010010 | +1.2060+0.5685i | w159 | 10011111 | −0.1623−0.7417i |
| w83 | 01010011 | +1.4112+0.6488i | w160 | 10100000 | −0.5146+0.0676i |
| w84 | 01010100 | +0.8075+0.6969i | w161 | 10100001 | −0.5128+0.2035i |
| w85 | 01010101 | +0.7660+0.8734i | w162 | 10100010 | −0.0738+0.0604i |
| w86 | 01010110 | +1.0100+0.6965i | w163 | 10100011 | −0.0736+0.1802i |
| w87 | 01010111 | +0.9651+0.8870i | w164 | 10100100 | −0.3680+0.0641i |
| w88 | 01011000 | +0.6346−0.6721i | w165 | 10100101 | −0.3662+0.1927i |
| w89 | 01011001 | +0.5902−0.8432i | w166 | 10100110 | −0.2211+0.0614i |
| w90 | 01011010 | +1.2060−0.5685i | w167 | 10100111 | −0.2203+0.1844i |
| w91 | 01011011 | +1.4112−0.6488i | w168 | 10101000 | −0.5146−0.0676i |
| w92 | 01011100 | +0.8075−0.6969i | w169 | 10101001 | −0.5128−0.2035i |
| w93 | 01011101 | +0.7660−0.8734i | w170 | 10101010 | −0.0738−0.0604i |
| w94 | 01011110 | +1.0100−0.6965i | w171 | 10101011 | −0.0736−0.1802i |
| w95 | 01011111 | +0.9651−0.8870i | w172 | 10101100 | −0.3680−0.0641i |
| w96 | 01100000 | +0.6629+0.0713i | w173 | 10101101 | −0.3662−0.1927i |
| w97 | 01100001 | +0.6641+0.2135i | w174 | 10101110 | −0.2211−0.0614i |
| w98 | 01100010 | +1.4228+0.1199i | w175 | 10101111 | −0.2203−0.1844i |
| w99 | 01100011 | +1.2036+0.1064i | w176 | 10110000 | −0.4984+0.4870i |
| w100 | 01100100 | +0.8160+0.0736i | w177 | 10110001 | −0.5089+0.3418i |

-continued

| w index | bit label | Constellation point |
|---|---|---|
| w178 | 10110010 | −0.0716+0.4278i |
| w179 | 10110011 | −0.0731+0.3023i |
| w180 | 10110100 | −0.3534+0.4630i |
| w181 | 10110101 | −0.3625+0.3247i |
| w182 | 10110110 | −0.2134+0.4408i |
| w183 | 10110111 | −0.2183+0.3103i |
| w184 | 10111000 | −0.4984−0.4870i |
| w185 | 10111001 | −0.5089−0.3418i |
| w186 | 10111010 | −0.0716−0.4278i |
| w187 | 10111011 | −0.0731−0.3023i |
| w188 | 10111100 | −0.3534−0.4630i |
| w189 | 10111101 | −0.3625−0.3247i |
| w190 | 10111110 | −0.2134−0.4408i |
| w191 | 10111111 | −0.2183−0.3103i |
| w192 | 11000000 | +0.3004+1.2452i |
| w193 | 11000001 | +0.2967+1.0627i |
| w194 | 11000010 | +0.0994+1.2493i |
| w195 | 11000011 | +0.0947+1.0662i |
| w196 | 11000100 | +0.3452+1.4585i |
| w197 | 11000101 | +0.2650+0.9148i |
| w198 | 11000110 | +0.1137+1.4651i |
| w199 | 11000111 | +0.0895−0.8991i |
| w200 | 11001000 | +0.3004−1.2452i |
| w201 | 11001001 | +0.2967−1.0627i |
| w202 | 11001010 | +0.0994−1.2493i |
| w203 | 11001011 | +0.0947−1.0662i |
| w204 | 11001100 | +0.3452−1.4585i |
| w205 | 11001101 | +0.2650−0.9148i |
| w206 | 11001110 | +0.1137−1.4651i |
| w207 | 11001111 | +0.0895−0.8991i |
| w208 | 11010000 | +0.4787+0.6378i |
| w209 | 11010001 | +0.4439+0.7942i |
| w210 | 11010010 | +0.0688+0.5579i |
| w211 | 11010011 | +0.0550+0.6984i |
| w212 | 11010100 | +0.3328+0.6100i |
| w213 | 11010101 | +0.3014+0.7660i |
| w214 | 11010110 | +0.2008+0.5810i |
| w215 | 11010111 | +0.1623+0.7417i |
| w216 | 11011000 | +0.4787−0.6378i |
| w217 | 11011001 | +0.4439−0.7942i |
| w218 | 11011010 | +0.0688−0.5579i |
| w219 | 11011011 | +0.0550−0.6984i |
| w220 | 11011100 | +0.3328−0.6100i |
| w221 | 11011101 | +0.3014−0.7660i |
| w222 | 11011110 | +0.2008−0.5810i |
| w223 | 11011111 | +0.1623−0.7417i |
| w224 | 11100000 | +0.5146+0.0676i |
| w225 | 11100001 | +0.5128+0.2035i |
| w226 | 11100010 | +0.0738+0.0604i |
| w227 | 11100011 | +0.0736+0.1802i |
| w228 | 11100100 | +0.3680+0.0641i |
| w229 | 11100101 | +0.3662+0.1927i |
| w230 | 11100110 | +0.2211+0.0614i |
| w231 | 11100111 | +0.2203+0.1844i |
| w232 | 11101000 | +0.5146−0.0676i |
| w233 | 11101001 | +0.5128−0.2035i |
| w234 | 11101010 | +0.0738−0.0604i |
| w235 | 11101011 | +0.0736−0.1802i |
| w236 | 11101100 | +0.3680−0.0641i |
| w237 | 11101101 | +0.3662−0.1927i |
| w238 | 11101110 | +0.2211−0.0614i |
| w239 | 11101111 | +0.2203−0.1844i |
| w240 | 11110000 | +0.4984+0.4870i |
| w241 | 11110001 | +0.5089+0.3418i |
| w242 | 11110010 | +0.0716+0.4278i |
| w243 | 11110011 | +0.0731+0.3023i |
| w244 | 11110100 | +0.3534+0.4630i |
| w245 | 11110101 | +0.3625+0.3247i |
| w246 | 11110110 | +0.2134+0.4408i |
| w247 | 11110111 | +0.2183+0.3103i |
| w248 | 11111000 | +0.4984−0.4870i |
| w249 | 11111001 | +0.5089−0.3418i |
| w250 | 11111010 | +0.0716−0.4278i |
| w251 | 11111011 | +0.0731−0.3023i |
| w252 | 11111100 | +0.3534−0.4630i |
| w253 | 11111101 | +0.3625−0.3247i |
| w254 | 11111110 | +0.2134−0.4408i |
| w255 | 11111111 | +0.2183−0.3103i | or
for MCS=9 (or 8):

| w index | bit label | Constellation point |
|---|---|---|
| w0 | 0000000 | −0.5039+1.2055i |
| w1 | 0000000 | +0.5039+1.2055i |
| w2 | 0000001 | −0.6629+0.0713i |
| w3 | 0000001 | +0.6629+0.0713i |
| w4 | 0000010 | −0.5781+1.4095i |
| w5 | 0000010 | +0.5781+1.4095i |
| w6 | 0000011 | −0.8160+0.0736i |
| w7 | 0000011 | +0.8160+0.0736i |
| w8 | 0000100 | −0.3004+1.2452i |
| w9 | 0000100 | +0.3004+1.2452i |
| w10 | 0000101 | −0.5146+0.0676i |
| w11 | 0000101 | +0.5146+0.0676i |
| w12 | 0000110 | −0.3452+1.4585i |
| w13 | 0000110 | +0.3452+1.4585i |
| w14 | 0000111 | −0.3680+0.0641i |
| w15 | 0000111 | +0.3680+0.0641i |
| w16 | 0001000 | −1.1657+1.0793i |
| w17 | 0001000 | +1.1657+1.0793i |
| w18 | 0001001 | −1.4228+0.1199i |
| w19 | 0001001 | +1.4228+0.1199i |
| w20 | 0001010 | −0.7876+1.2931i |
| w21 | 0001010 | +0.7876+1.2931i |
| w22 | 0001011 | −0.9811+0.0673i |
| w23 | 0001011 | +0.9811+0.0673i |
| w24 | 0001100 | −0.0994+1.2493i |
| w25 | 0001100 | +0.0994+1.2493i |
| w26 | 0001101 | −0.0738+0.0604i |
| w27 | 0001101 | +0.0738+0.0604i |
| w28 | 0001110 | −0.1137+1.4651i |
| w29 | 0001110 | +0.1137+1.4651i |
| w30 | 0001111 | −0.2211+0.0614i |
| w31 | 0001111 | +0.2211+0.0614i |
| w32 | 0010000 | −0.5039−1.2055i |
| w33 | 0010000 | +0.5039−1.2055i |
| w34 | 0010001 | −0.6629−0.0713i |
| w35 | 0010001 | +0.6629−0.0713i |
| w36 | 0010010 | −0.5781−1.4095i |
| w37 | 0010010 | +0.5781−1.4095i |
| w38 | 0010011 | −0.8160−0.0736i |
| w39 | 0010011 | +0.8160−0.0736i |
| w40 | 0010100 | −0.3004−1.2452i |
| w41 | 0010100 | +0.3004−1.2452i |
| w42 | 0010101 | −0.5146−0.0676i |
| w43 | 0010101 | +0.5146−0.0676i |
| w44 | 0010110 | −0.3452−1.4585i |
| w45 | 0010110 | +0.3452−1.4585i |
| w46 | 0010111 | −0.3680−0.0641i |
| w47 | 0010111 | +0.3680−0.0641i |
| w48 | 0011000 | −1.1657−1.0793i |
| w49 | 0011000 | +1.1657−1.0793i |
| w50 | 0011001 | −1.4228−0.1199i |
| w51 | 0011001 | +1.4228−0.1199i |
| w52 | 0011010 | −0.7876−1.2931i |
| w53 | 0011010 | +0.7876−1.2931i |
| w54 | 0011011 | −0.9811−0.0673i |
| w55 | 0011011 | +0.9811−0.0673i |
| w56 | 0011100 | −0.0994−1.2493i |
| w57 | 0011100 | +0.0994−1.2493i |
| w58 | 0011101 | −0.0738−0.0604i |
| w59 | 0011101 | +0.0738−0.0604i |
| w60 | 0011110 | −0.1137−1.4651i |
| w61 | 0011110 | +0.1137−1.4651i |
| w62 | 0011111 | −0.2211−0.0614i |
| w63 | 0011111 | +0.2211−0.0614i |
| w64 | 01000000 | −0.6346+0.6721i |
| w65 | 01000001 | +0.6346+0.6721i |
| w66 | 01000010 | −0.6511+0.5096i |
| w67 | 01000011 | +0.6511+0.5096i |

| w index | bit label | Constellation point | w index | bit label | Constellation point |
|---|---|---|---|---|---|
| w68 | 01000100 | −0.8075+0.6969i | w145 | 10010001 | +1.2385+0.8387i |
| w69 | 01000101 | +0.8075+0.6969i | w146 | 10010010 | −1.2036+0.1064i |
| w70 | 01000110 | −0.8111+0.5264i | w147 | 10010011 | +1.2036+0.1064i |
| w71 | 01000111 | +0.8111+0.5264i | w148 | 10010100 | −0.8990+1.0937i |
| w72 | 01001000 | −0.4787+0.6378i | w149 | 10010101 | +0.8990+1.0937i |
| w73 | 01001001 | +0.4787+0.6378i | w150 | 10010110 | −1.0114+0.2066i |
| w74 | 01001010 | −0.4984+0.4870i | w151 | 10010111 | +1.0114+0.2066i |
| w75 | 01001011 | +0.4984+0.4870i | w152 | 10011000 | −0.0947+1.0662i |
| w76 | 01001100 | −0.3328+0.6100i | w153 | 10011001 | +0.0947+1.0662i |
| w77 | 01001101 | +0.3328+0.6100i | w154 | 10011010 | −0.0736+0.1802i |
| w78 | 01001110 | −0.3534+0.4630i | w155 | 10011011 | +0.0736+0.1802i |
| w79 | 01001111 | +0.3534+0.4630i | w156 | 10011100 | −0.0895+0.8991i |
| w80 | 01010000 | −1.2060+0.5685i | w157 | 10011101 | +0.0895+0.8991i |
| w81 | 01010001 | +1.2060+0.5685i | w158 | 10011110 | −0.2203+0.1844i |
| w82 | 01010010 | −1.4186+0.3682i | w159 | 10011111 | +0.2203+0.1844i |
| w83 | 01010011 | +1.4186+0.3682i | w160 | 10100000 | −0.4884−1.0092i |
| w84 | 01010100 | −1.0100+0.6965i | w161 | 10100001 | +0.4884−1.0092i |
| w85 | 01010101 | +1.0100+0.6965i | w162 | 10100010 | −0.6641−0.2135i |
| w86 | 01010110 | −0.9802+0.5258i | w163 | 10100011 | +0.6641−0.2135i |
| w87 | 01010111 | +0.9802+0.5258i | w164 | 10100100 | −0.6891−1.0532i |
| w88 | 01011000 | −0.0688+0.5579i | w165 | 10100101 | +0.6891−1.0532i |
| w89 | 01011001 | +0.0688+0.5579i | w166 | 10100110 | −0.8280−0.2196i |
| w90 | 01011010 | −0.0716+0.4278i | w167 | 10100111 | +0.8280−0.2196i |
| w91 | 01011011 | +0.0716+0.4278i | w168 | 10101000 | −0.2967−1.0627i |
| w92 | 01011100 | −0.2008+0.5810i | w169 | 10101001 | +0.2967−1.0627i |
| w93 | 01011101 | +0.2008+0.5810i | w170 | 10101010 | −0.5128−0.2035i |
| w94 | 01011110 | −0.2134+0.4408i | w171 | 10101011 | +0.5128−0.2035i |
| w95 | 01011111 | +0.2134+0.4408i | w172 | 10101100 | −0.2650−0.9148i |
| w96 | 01100000 | −0.6346−0.6721i | w173 | 10101101 | +0.2650−0.9148i |
| w97 | 01100001 | +0.6346−0.6721i | w174 | 10101110 | −0.3662−0.1927i |
| w98 | 01100010 | −0.6511−0.5096i | w175 | 10101111 | +0.3662−0.1927i |
| w99 | 01100011 | +0.6511−0.5096i | w176 | 10110000 | −1.2385−0.8387i |
| w100 | 01100100 | −0.8075−0.6969i | w177 | 10110001 | +1.2385−0.8387i |
| w101 | 01100101 | +0.8075−0.6969i | w178 | 10110010 | −1.2036−0.1064i |
| w102 | 01100110 | −0.8111−0.5264i | w179 | 10110011 | +1.2036−0.1064i |
| w103 | 01100111 | +0.8111−0.5264i | w180 | 10110100 | −0.8990−1.0937i |
| w104 | 01101000 | −0.4787−0.6378i | w181 | 10110101 | +0.8990−1.0937i |
| w105 | 01101001 | +0.4787−0.6378i | w182 | 10110110 | −1.0114−0.2066i |
| w106 | 01101010 | −0.4984−0.4870i | w183 | 10110111 | +1.0114−0.2066i |
| w107 | 01101011 | +0.4984−0.4870i | w184 | 10111000 | −0.0947−1.0662i |
| w108 | 01101100 | −0.3328−0.6100i | w185 | 10111001 | +0.0947−1.0662i |
| w109 | 01101101 | +0.3328−0.6100i | w186 | 10111010 | −0.0736−0.1802i |
| w110 | 01101110 | −0.3534−0.4630i | w187 | 10111011 | +0.0736−0.1802i |
| w111 | 01101111 | +0.3534−0.4630i | w188 | 10111100 | −0.0895−0.8991i |
| w112 | 01110000 | −1.2060−0.5685i | w189 | 10111101 | +0.0895−0.8991i |
| w113 | 01110001 | +1.2060−0.5685i | w190 | 10111110 | −0.2203−0.1844i |
| w114 | 01110010 | −1.4186−0.3682i | w191 | 10111111 | +0.2203−0.1844i |
| w115 | 01110011 | +1.4186−0.3682i | w192 | 11000000 | −0.5902+0.8432i |
| w116 | 01110100 | −1.0100−0.6965i | w193 | 11000001 | +0.5902+0.8432i |
| w117 | 01110101 | +1.0100−0.6965i | w194 | 11000010 | −0.6617+0.3573i |
| w118 | 01110110 | −0.9802−0.5258i | w195 | 11000011 | +0.6617+0.3573i |
| w119 | 01110111 | +0.9802−0.5258i | w196 | 11000100 | −0.7660+0.8734i |
| w120 | 01111000 | −0.0688−0.5579i | w197 | 11000101 | +0.7660+0.8734i |
| w121 | 01111001 | +0.0688−0.5579i | w198 | 11000110 | −0.8276+0.3658i |
| w122 | 01111010 | −0.0716−0.4278i | w199 | 11000111 | +0.8276+0.3658i |
| w123 | 01111011 | +0.0716−0.4278i | w200 | 11001000 | −0.4439+0.7942i |
| w124 | 01111100 | −0.2008−0.5810i | w201 | 11001001 | +0.4439+0.7942i |
| w125 | 01111101 | +0.2008−0.5810i | w202 | 11001010 | −0.5089+0.3418i |
| w126 | 01111110 | −0.2134−0.4408i | w203 | 11001011 | +0.5089+0.3418i |
| w127 | 01111111 | +0.2134−0.4408i | w204 | 11001100 | −0.3014+0.7660i |
| w128 | 10000000 | −0.4884+1.0092i | w205 | 11001101 | +0.3014+0.7660i |
| w129 | 10000001 | +0.4884+1.0092i | w206 | 11001110 | −0.3625+0.3247i |
| w130 | 10000010 | −0.6641+0.2135i | w207 | 11001111 | +0.3625+0.3247i |
| w131 | 10000011 | +0.6641+0.2135i | w208 | 11010000 | −1.4112+0.6488i |
| w132 | 10000100 | −0.6891+1.0532i | w209 | 11010001 | +1.4112+0.6488i |
| w133 | 10000101 | +0.6891+1.0532i | w210 | 11010010 | −1.2116+0.3184i |
| w134 | 10000110 | −0.8280+0.2196i | w211 | 11010011 | +1.2116+0.3184i |
| w135 | 10000111 | +0.8280+0.2196i | w212 | 11010100 | −0.9651+0.8870i |
| w136 | 10001000 | −0.2967+1.0627i | w213 | 11010101 | +0.9651+0.8870i |
| w137 | 10001001 | +0.2967+1.0627i | w214 | 11010110 | −1.0181+0.3668i |
| w138 | 10001010 | −0.5128+0.2035i | w215 | 11010111 | +1.0181+0.3668i |
| w139 | 10001011 | +0.5128+0.2035i | w216 | 11011000 | −0.0550+0.6984i |
| w140 | 10001100 | −0.2650+0.9148i | w217 | 11011001 | +0.0550+0.6984i |
| w141 | 10001101 | +0.2650+0.9148i | w218 | 11011010 | −0.0731+0.3023i |
| w142 | 10001110 | −0.3662+0.1927i | w219 | 11011011 | +0.0731+0.3023i |
| w143 | 10001111 | +0.3662+0.1927i | w220 | 11011100 | −0.1623+0.7417i |
| w144 | 10010000 | −1.2385+0.8387i | w221 | 11011101 | +0.1623+0.7417i |

-continued

| w index | bit label | Constellation point |
|---|---|---|
| w222 | 11011110 | −0.2183+0.3103i |
| w223 | 11011111 | +0.2183+0.3103i |
| w224 | 11100000 | −0.5902−0.8432i |
| w225 | 11100001 | +0.5902−0.8432i |
| w226 | 11100010 | −0.6617−0.3573i |
| w227 | 11100011 | +0.6617−0.3573i |
| w228 | 11100100 | −0.7660−0.8734i |
| w229 | 11100101 | +0.7660−0.8734i |
| w230 | 11100110 | −0.8276−0.3658i |
| w231 | 11100111 | +0.8276−0.3658i |
| w232 | 11101000 | −0.4439−0.7942i |
| w233 | 11101001 | +0.4439−0.7942i |
| w234 | 11101010 | −0.5089−0.3418i |
| w235 | 11101011 | +0.5089−0.3418i |
| w236 | 11101100 | −0.3014−0.7660i |
| w237 | 11101101 | +0.3014−0.7660i |
| w238 | 11101110 | −0.3625−0.3247i |
| w239 | 11101111 | +0.3625−0.3247i |
| w240 | 11110000 | −1.4112−0.6488i |
| w241 | 11110001 | +1.4112−0.6488i |
| w242 | 11110010 | −1.2116−0.3184i |

-continued

| w index | bit label | Constellation point |
|---|---|---|
| w243 | 11110011 | +1.2116−0.3184i |
| w244 | 11110100 | −0.9651−0.8870i |
| w245 | 11110101 | +0.9651−0.8870i |
| w246 | 11110110 | −1.0181−0.3668i |
| w247 | 11110111 | +1.0181−0.3668i |
| w248 | 11111000 | −0.0550−0.6984i |
| w249 | 11111001 | +0.0550−0.6984i |
| w250 | 11111010 | −0.0731−0.3023i |
| w251 | 11111011 | +0.0731−0.3023i |
| w252 | 11111100 | −0.1623−0.7417i |
| w253 | 11111101 | +0.1623−0.7417i |
| w254 | 11111110 | −0.2183−0.3103i |
| w255 | 11111111 | +0.2183−0.3103i |

C) 1024-QAM non-uniform constellations of group C for BCC encoding:

C1) for code rate 2/3 (or 3/4 or 7/8), where $z_q$ is a complex constellation point having a real part and an imaginary part

| real part | | | | | | | | | | | | | | | | | |
|---|---|---|---|---|---|---|---|---|---|---|---|---|---|---|---|---|---|
| $b_2$ | 0 | 0 | 0 | 0 | 0 | 0 | 0 | 0 | 0 | 0 | 0 | 0 | 0 | 0 | 0 | 0 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 0 | 0 | 0 | 0 | 0 | 0 | 0 | 1 | 1 | 1 | 1 | 1 | 1 | 1 | 1 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_2$ | 1 | 1 | 1 | 1 | 1 | 1 | 1 | 1 | 1 | 1 | 1 | 1 | 1 | 1 | 1 | 1 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 1 | 1 | 1 | 1 | 1 | 1 | 1 | 1 | 0 | 0 | 0 | 0 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| imaginary part | | | | | | | | | | | | | | | | | |
| $b_0$ | 0 | 0 | 0 | 0 | 0 | 0 | 0 | 0 | 1 | 1 | 1 | 1 | 1 | 1 | 1 | 1 | |
| $b_1$ | 0 | 0 | 1 | 1 | 1 | 1 | 0 | 0 | 0 | 0 | 1 | 1 | 1 | 1 | 0 | 0 | |
| $b_5$ | 0 | 0 | 0 | 0 | 0 | 0 | 0 | 0 | 0 | 0 | 0 | 0 | 0 | 0 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 1 | 1 | 1 | 1 | 1 | 1 | 1 | 1 | 0 | 0 | 0 | 0 | 0 | 0 | 0 | 0 | |
| $b_1$ | 0 | 0 | 1 | 1 | 1 | 1 | 0 | 0 | 0 | 0 | 1 | 1 | 1 | 1 | 0 | 0 | |
| $b_5$ | 1 | 1 | 1 | 1 | 1 | 1 | 1 | 1 | 1 | 1 | 1 | 1 | 1 | 1 | 1 | 1 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041;

C2) for code rate 3/4 (or 2/3 or 7/8)), where $z_q$ is a complex constellation point having a real part and an imaginary part

| real part | | | | | | | | | | | | | | | | | |
|---|---|---|---|---|---|---|---|---|---|---|---|---|---|---|---|---|---|
| $b_0$ | 0 | 0 | 1 | 1 | 1 | 1 | 0 | 0 | 0 | 0 | 1 | 1 | 1 | 1 | 0 | 0 | |
| $b_1$ | 0 | 0 | 0 | 0 | 0 | 0 | 0 | 0 | 0 | 0 | 0 | 0 | 0 | 0 | 0 | 0 | |
| $b_3$ | 0 | 0 | 0 | 0 | 0 | 0 | 0 | 1 | 1 | 1 | 1 | 1 | 1 | 1 | 1 | 1 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 0 | 0 | 1 | 1 | 1 | 1 | 1 | 1 | 1 | 1 | 0 | 0 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |

-continued

| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
|---|---|---|---|---|---|---|---|---|---|---|---|---|---|---|---|---|---|
| $b_0$ | 0 | 0 | 1 | 1 | 1 | 1 | 0 | 0 | 0 | 0 | 1 | 1 | 1 | 1 | 0 | 0 | |
| $b_1$ | 1 | 1 | 1 | 1 | 1 | 1 | 1 | 1 | 1 | 1 | 1 | 1 | 1 | 1 | 1 | 1 | |
| $b_3$ | 1 | 1 | 1 | 1 | 1 | 1 | 1 | 1 | 0 | 0 | 0 | 0 | 0 | 0 | 0 | 0 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| imaginary part | | | | | | | | | | | | | | | | | |
| $b_2$ | 0 | 0 | 0 | 0 | 0 | 0 | 0 | 0 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_2$ | 1 | 1 | 1 | 1 | 1 | 1 | 1 | 1 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0001, 5.0203, 7.0622, 9.1446, 11.2738, 13.4672, 15.7360, 18.0975, 20.5669, 23.1643, 25.9119, 28.8399, 31.9932, 35.4479, 39.3783;

C3) for code rate 7/8 (or 2/3 or 3/4)), where $z_q$ is a complex constellation point having a real part and an imaginary part

| real part | | | | | | | | | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 0 | 0 | 0 | 0 | 1 | 1 | 1 | 1 | 1 | 1 | 1 | 1 | |
| $b_3$ | 0 | 0 | 0 | 0 | 0 | 0 | 0 | 0 | 0 | 0 | 0 | 0 | 0 | 0 | 0 | 0 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_0$ | 0 | 1 | 1 | 0 | 0 | 1 | 1 | 0 | 0 | 1 | 1 | 0 | 0 | 1 | 1 | 0 | |
| $b_1$ | 1 | 1 | 1 | 1 | 1 | 1 | 1 | 1 | 0 | 0 | 0 | 0 | 0 | 0 | 0 | 0 | |
| $b_3$ | 1 | 1 | 1 | 1 | 1 | 1 | 1 | 1 | 1 | 1 | 1 | 1 | 1 | 1 | 1 | 1 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| imaginary part | | | | | | | | | | | | | | | | | |
| $b_2$ | 0 | 1 | 1 | 0 | 0 | 1 | 1 | 0 | 0 | 1 | 1 | 0 | 0 | 1 | 1 | 0 | |
| $b_5$ | 0 | 0 | 0 | 0 | 0 | 0 | 0 | 0 | 0 | 0 | 0 | 0 | 0 | 0 | 0 | 0 | |
| $b_6$ | 0 | 0 | 0 | 0 | 1 | 1 | 1 | 1 | 1 | 1 | 1 | 1 | 0 | 0 | 0 | 0 | |
| $b_8$ | 0 | 0 | 1 | 1 | 1 | 1 | 0 | 0 | 0 | 0 | 1 | 1 | 1 | 1 | 0 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_2$ | 0 | 1 | 1 | 0 | 0 | 1 | 1 | 0 | 0 | 1 | 1 | 0 | 0 | 1 | 1 | 0 | |
| $b_5$ | 1 | 1 | 1 | 1 | 1 | 1 | 1 | 1 | 1 | 1 | 1 | 1 | 1 | 1 | 1 | 1 | |
| $b_6$ | 0 | 0 | 0 | 0 | 1 | 1 | 1 | 1 | 1 | 1 | 1 | 1 | 0 | 0 | 0 | 0 | |
| $b_8$ | 0 | 0 | 1 | 1 | 1 | 1 | 0 | 0 | 0 | 0 | 1 | 1 | 1 | 1 | 0 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041;

D) 1024-QAM non-uniform constellations of group D for LDPC encoding:

D1) for code rate 2/3 (or 2/3 or 5/6)), where $z_q$ is a complex constellation point having a real part and an imaginary part

| | | | | | | | | | | | | | | | | | |
|---|---|---|---|---|---|---|---|---|---|---|---|---|---|---|---|---|---|
| | | | | | | | | real part | | | | | | | | | |
| $b_1$ | 0 | 1 | 1 | 0 | 0 | 1 | 1 | 0 | 0 | 1 | 1 | 0 | 0 | 1 | 1 | 0 | |
| $b_2$ | 0 | 0 | 0 | 0 | 0 | 0 | 0 | 0 | 1 | 1 | 1 | 1 | 1 | 1 | 1 | 1 | |
| $b_3$ | 0 | 0 | 1 | 1 | 1 | 1 | 0 | 0 | 0 | 0 | 1 | 1 | 1 | 1 | 0 | 0 | |
| $b_6$ | 0 | 0 | 0 | 0 | 0 | 0 | 0 | 0 | 0 | 0 | 0 | 0 | 0 | 0 | 0 | 0 | |
| $b_7$ | 0 | 0 | 0 | 0 | 1 | 1 | 1 | 1 | 1 | 1 | 1 | 1 | 0 | 0 | 0 | 0 | |
| $\mathrm{Re}(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_1$ | 0 | 1 | 1 | 0 | 0 | 1 | 1 | 0 | 0 | 1 | 1 | 0 | 0 | 1 | 1 | 0 | |
| $b_2$ | 1 | 1 | 1 | 1 | 1 | 1 | 1 | 1 | 0 | 0 | 0 | 0 | 0 | 0 | 0 | 0 | |
| $b_3$ | 0 | 0 | 1 | 1 | 1 | 1 | 0 | 0 | 0 | 0 | 1 | 1 | 1 | 1 | 0 | 0 | |
| $b_6$ | 1 | 1 | 1 | 1 | 1 | 1 | 1 | 1 | 1 | 1 | 1 | 1 | 1 | 1 | 1 | 1 | |
| $b_7$ | 0 | 0 | 0 | 0 | 1 | 1 | 1 | 1 | 1 | 1 | 1 | 1 | 0 | 0 | 0 | 0 | |
| $\mathrm{Re}(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| | | | | | | | | imaginary part | | | | | | | | | |
| $b_0$ | 0 | 1 | 1 | 0 | 0 | 1 | 1 | 0 | 0 | 1 | 1 | 0 | 0 | 1 | 1 | 0 | |
| $b_4$ | 0 | 0 | 1 | 1 | 1 | 1 | 0 | 0 | 0 | 0 | 1 | 1 | 1 | 1 | 0 | 0 | |
| $b_5$ | 0 | 0 | 0 | 0 | 0 | 0 | 0 | 0 | 0 | 0 | 0 | 0 | 0 | 0 | 0 | 0 | |
| $b_8$ | 0 | 0 | 0 | 0 | 1 | 1 | 1 | 1 | 1 | 1 | 1 | 1 | 0 | 0 | 0 | 0 | |
| $b_9$ | 0 | 0 | 0 | 0 | 0 | 0 | 0 | 0 | 1 | 1 | 1 | 1 | 1 | 1 | 1 | 1 | |
| $\mathrm{Im}(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_4$ | 0 | 0 | 1 | 1 | 1 | 1 | 0 | 0 | 0 | 0 | 1 | 1 | 1 | 1 | 0 | 0 | |
| $b_5$ | 1 | 1 | 1 | 1 | 1 | 1 | 1 | 1 | 1 | 1 | 1 | 1 | 1 | 1 | 1 | 1 | |
| $b_8$ | 0 | 0 | 0 | 0 | 1 | 1 | 1 | 1 | 1 | 1 | 1 | 1 | 0 | 0 | 0 | 0 | |
| $b_9$ | 1 | 1 | 1 | 1 | 1 | 1 | 1 | 1 | 0 | 0 | 0 | 0 | 0 | 0 | 0 | 0 | |
| $\mathrm{Im}(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.0047, 3.9822, 5.1633, 7.0998, 8.5600, 10.4887, 12.2428, 14.2618, 16.3225, 18.5947, 21.0696, 23.8248, 26.9139, 30.4303, 34.5872;

D2) for code rate 3/4 (or 2/3 or 5/6)), where $z_q$ is a complex constellation point having a real part and an imaginary part

| | | | | | | | | | | | | | | | | | |
|---|---|---|---|---|---|---|---|---|---|---|---|---|---|---|---|---|---|
| | | | | | | | | real part | | | | | | | | | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_8$ | 0 | 0 | 0 | 0 | 0 | 0 | 0 | 0 | 0 | 0 | 0 | 0 | 0 | 0 | 0 | 0 | |
| $b_9$ | 0 | 0 | 0 | 0 | 0 | 0 | 0 | 0 | 1 | 1 | 1 | 1 | 1 | 1 | 1 | 1 | |
| $\mathrm{Re}(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_8$ | 1 | 1 | 1 | 1 | 1 | 1 | 1 | 1 | 1 | 1 | 1 | 1 | 1 | 1 | 1 | 1 | |
| $b_9$ | 1 | 1 | 1 | 1 | 1 | 1 | 1 | 1 | 0 | 0 | 0 | 0 | 0 | 0 | 0 | 0 | |
| $\mathrm{Re}(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| | | | | | | | | imaginary part | | | | | | | | | |
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 0 | 0 | 0 | 0 | 0 | 0 | 0 | 0 | 1 | 1 | 1 | 1 | 1 | 1 | 1 | 1 | |
| $b_7$ | 0 | 0 | 0 | 0 | 0 | 0 | 0 | 0 | 0 | 0 | 0 | 0 | 0 | 0 | 0 | 0 | |
| $\mathrm{Im}(z_q)$ | −31 | −29 | −27 | −25 | −23 | −21 | −19 | −17 | −15 | −13 | −11 | −9 | −7 | −5 | −3 | −1 | Uniform |

-continued

|  | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 1 | 1 | 1 | 1 | 1 | 1 | 1 | 0 | 0 | 0 | 0 | 0 | 0 | 0 | 0 | 0 | |
| $b_7$ | 1 | 1 | 1 | 1 | 1 | 1 | 1 | 1 | 1 | 1 | 1 | 1 | 1 | 1 | 1 | 1 | |
| $\mathrm{Im}(z_q)$ | 1 | 3 | 5 | 7 | 9 | 11 | 13 | 15 | 17 | 19 | 21 | 23 | 25 | 27 | 29 | 31 | Uniform |
|  | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9667, 4.9871, 7.0015, 9.0819, 11.1960, 13.3951, 15.6735, 18.0691, 20.5980, 23.2914, 26.1728, 29.2806, 32.6657, 36.4161, 40.7366;

D3) code rate 5/6 (or 2/3 or 3/4)), where $z_q$ is a complex constellation point having a real part and an imaginary part real part

|  |  |  |  |  |  |  |  |  |  |  |  |  |  |  |  |  |  |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_3$ | 0 | 0 | 0 | 0 | 0 | 0 | 0 | 0 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 0 | 0 | 0 | 0 | 0 | 0 | 0 | 0 | 0 | 0 | 0 | 0 | |
| $b_8$ | 0 | 0 | 0 | 0 | 1 | 1 | 1 | 1 | 1 | 1 | 1 | 1 | 0 | 0 | 0 | 0 | |
| $\mathrm{Re}(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
|  | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_0$ | 0 | 1 | 1 | 0 | 0 | 1 | 1 | 0 | 0 | 1 | 1 | 0 | 0 | 1 | 1 | 0 | |
| $b_3$ | 1 | 1 | 1 | 1 | 1 | 1 | 1 | 1 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 1 | 1 | 1 | 1 | 1 | 1 | 1 | 1 | 1 | 1 | 1 | 1 | 1 | 1 | 1 | 1 | |
| $b_8$ | 0 | 0 | 0 | 0 | 1 | 1 | 1 | 1 | 1 | 1 | 1 | 1 | 0 | 0 | 0 | 0 | |
| $\mathrm{Re}(z_q)$ | 1 | 3 | 5 | 7 | 9 | 11 | 13 | 15 | 17 | 19 | 21 | 23 | 25 | 27 | 29 | 31 | Uniform |
|  | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

|  |  |  |  |  |  |  |  |  |  |  |  |  |  |  |  |  |  |
|---|---|---|---|---|---|---|---|---|---|---|---|---|---|---|---|---|---|
| $b_1$ | 0 | 0 | 0 | 0 | 0 | 0 | 0 | 0 | 1 | 1 | 1 | 1 | 1 | 1 | 1 | 1 | |
| $b_2$ | 0 | 0 | 0 | 0 | 1 | 1 | 1 | 1 | 1 | 1 | 1 | 1 | 0 | 0 | 0 | 0 | |
| $b_4$ | 0 | 0 | 0 | 0 | 0 | 0 | 0 | 0 | 0 | 0 | 0 | 0 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $\mathrm{Im}(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
|  | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_1$ | 1 | 1 | 1 | 1 | 1 | 1 | 1 | 1 | 0 | 0 | 0 | 0 | 0 | 0 | 0 | 0 | |
| $b_2$ | 0 | 0 | 0 | 0 | 1 | 1 | 1 | 1 | 1 | 1 | 1 | 1 | 0 | 0 | 0 | 0 | |
| $b_4$ | 1 | 1 | 1 | 1 | 1 | 1 | 1 | 1 | 1 | 1 | 1 | 1 | 1 | 1 | 1 | 1 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $\mathrm{Im}(z_q)$ | 1 | 3 | 5 | 7 | 9 | 11 | 13 | 15 | 17 | 19 | 21 | 23 | 25 | 27 | 29 | 31 | Uniform |
|  | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9902, 5.0100, 7.0446, 9.1283, 11.2570, 13.4588, 15.7417, 18.1292, 20.6379, 23.2916, 26.1151, 29.1412, 32.4176, 36.0267, 40.1583;

wherein the bit labeling indicated in groups A to D may alternatively be inverted for one or more bit labels.

2. A coding and modulation apparatus as claimed in claim 1, further comprising selection circuitry configured to select the total number M of constellation points of the constellation and the code rate based on channel conditions between a transmission apparatus including said coding and modulation apparatus and a receiving apparatus with which said transmission apparatus seeks to communicate.

3. A coding and modulation apparatus as claimed in claim 2, wherein said selection circuitry is configured to select a constellation with a higher number of M and/or a higher code rate the better the channel conditions are.

4. A coding and modulation apparatus as claimed in claim 1, wherein said coding and modulation apparatus is configured for use in a transmission apparatus according to IEEE 802.11.

5. A coding and modulation method comprising
encoding input data into cell words according to a BCC (binary convolutional code), or a LDPC (low density parity check code), and
modulating said cell words into constellation values of a NUC (non-uniform constellation) and to assign bit combinations to constellation values of the used non-uniform constellation,
wherein said modulating is configured to use, based on the code used by the encoding, the total number M of constellation points of the constellation and the code rate,
i) a non-uniform constellation and bit labeling from a group A, if the encoder is configured to use a BCC code and if M=16, 64 or 256, the group A comprising constellations as defined in
sub-group A1 for 16-QAM with M=16 and code rates of 1/2 or 3/4,
sub-group A2 for 64-QAM with M=64 and code rates of 2/3, 3/4 or 5/6, and sub-group A3 for 256-QAM with M=256 and code rates of 3/4 or 5/6,
wherein the constellation points are defined by a constellation position vector w0 . . . wM-1,
or
ii) a non-uniform constellation and bit labeling from a group B, if the encoder is configured to use a LDPC code and if M=16, 64 or 256, the group B comprising constellations as defined in
  sub-group B1 for 16-QAM with M=16 and code rates of 1/2 or 3/4,
  sub-group B2 for 64-QAM with M=64 and code rates of 2/3, 3/4 or 5/6, and
  sub-group B3 for 256-QAM with M=256 and code rates of 3/4 or 5/6,
wherein the constellation points are defined by a constellation position vector w0 . . . wM-1,
or
iii) a non-uniform constellation and bit labeling from a group C, if the encoder is configured to use a BCC code and if M=1024 and a code rate of 2/3, 3/4 or 7/8, the group C comprising constellations C1, C2 and C3,
wherein the constellation points are defined by the constellation position vector u of length v=sqrt(M)/2-1,
or
iv) a non-uniform constellation and bit labeling from a group D, if the encoder is configured to use a LDPC code and if M=1024 and a code rate of 2/3, 3/4 or 5/6, the group D comprising constellations D1, D2, D3,
wherein the constellation points are defined by the constellation position vector u of length v=sqrt(M)/2-1,
wherein when said modulating is configured to use a selected non-uniform constellation obtained from a constellation from anyone of groups A, B, C or D the modulating may use the selected non-uniform constellation which has been modified through rotation by an angle around the origin, through inversion of bit labels for all constellation points, through interchanging of bit positions, through mirroring on any line in the complex plane and/or through predistortion for the con-stellation points,
wherein the constellation position vectors of the different constellations of the groups A, B, C, D of constellations are defined as follows:
A) M-QAM non-uniform constellations of group A for BCC encoding:
A1) 16-QAM NUC, where MCS is a modulation and coding scheme

| w | bit label | MCS = 3 (or 4) | MCS = 4 (or 3) |
|---|---|---|---|
| w0 | 0000 | +0.2918+0.2918i | +0.3063-03063i |
| w1 | 0001 | +0.9565+0.2918i | +0.3063+03063i |
| w2 | 0010 | -0.2918+0.2918i | +0.9519-0.3063i |
| w3 | 0011 | -0.9565+0.2918i | +0.9519+0.3063i |
| w4 | 0100 | +0.2918+0.9565i | -0.3063-0.3063i |
| w5 | 0101 | +0.9565+0.9565i | -0.3063+0.3063i |
| w6 | 0110 | -0.2918+0.9565i | -0.9519-0.3063i |
| w7 | 0111 | -0.9565+0.9565i | -0.9519+0.3063i |
| w8 | 1000 | +0.2918-0.2918i | +0.3063-0.9519i |
| w9 | 1001 | +0.9565-0.2918i | +0.3063+0.9519i |
| w10 | 1010 | -0.2918-0.2918i | +0.9519-0.9519i |
| w11 | 1011 | -0.9565-0.2918i | +0.9519+0.9519i |
| w12 | 1100 | +0.2918-0.9565i | -0.3063-0.9519i |
| w13 | 1101 | +0.9565-0.9565i | -0.3063+0.9519i |
| w14 | 1110 | -0.2918-0.9565i | -0.9519-0.9519i |
| w15 | 1111 | -0.9565-0.9565i | -0.9519+0.9519i |

A2) 64-QAM NUC

| w/ MCS index | bit label | MCS = 5 (or 6 or 7) | MCS = 6 (or 5 or 7) | MCS = 7 (or 5 or 6) |
|---|---|---|---|---|
| w0 | 000000 | +1.0474-0.1695i | +1.0432-0.1724i | +1.0297-0.1665i |
| w1 | 000001 | +0.7243-0.1504i | +0.7272-0.1538i | +0.1417-0.1412i |
| w2 | 000010 | -1.0474-0.1695i | +0.1428-0.1397i | -1.0297-0.1665i |
| w3 | 000011 | -0.7243-0.1504i | +0.4304-0.1474i | -0.1417-0.1412i |
| w4 | 000100 | +1.0407-0.1336i | -1.0432-0.1724i | +1.1116-0.5027i |
| w5 | 000101 | +0.4265-0.1388i | -0.7272-0.1538i | +0.1521-0.4258i |
| w6 | 000110 | -0.1407-0.1336i | -0.1428-0.1397i | -1.1116-0.5027i |
| w7 | 000111 | -0.4265-0.1388i | -0.4304-0.1474i | -0.1521-0.4258i |
| w8 | 001000 | +1.0474+0.1695i | +1.0432+0.1724i | +1.0297+0.1665i |
| w9 | 001001 | +0.7243+0.1504i | +0.7272+0.1538i | +0.1417+0.1412i |
| w10 | 001010 | -1.0474+0.1695i | +0.1428+0.1397i | -1.0297+0.1665i |
| w11 | 001011 | -0.7243+0.1504i | +0.4304+0.1474i | -0.1417+0.1412i |
| w12 | 001100 | +0.1407+0.1336i | -1.0432+0.1724i | +1.1116+0.5027i |
| w13 | 001101 | +0.4265+0.1388i | -0.7272+0.1538i | +0.1521+0.4258i |
| w14 | 001110 | -0.1407+0.1336i | -0.1428+0.1397i | -1.1116+0.5027i |
| w15 | 001111 | -0.4265+0.1388i | -0.4304+0.1474i | -0.1521+0.4258i |
| w16 | 010000 | +1.4261-0.5358i | +1.1145-0.5358i | +0.7218-0.1633i |
| w17 | 010001 | +0.6106-1.1783i | +0.7705-0.4700i | +0.4281-0.1504i |
| w18 | 010010 | -1.4261-0.2216i | +0.1500-0.4221i | -0.7218-0.1633i |
| w19 | 010011 | -0.6106-1.1783i | +0.4537-0.4461i | -0.4281-0.1504i |
| w20 | 010100 | +0.1682-1.0316i | -1.1145-0.5358i | +0.7726-0.4955i |
| w21 | 010101 | +0.2287-1.3914i | -0.7705-0.4700i | +0.4581-0.4553i |
| w22 | 010110 | -0.1682-1.0316i | -0.1500-0.4221i | -0.7726-0.4955i |
| w23 | 010111 | -0.2287-1.3914i | -0.4537-0.4461i | -0.4581-0.4553i |
| w24 | 011000 | +1.4261+0.2216i | +1.1145+0.5358i | +0.7218+0.1633i |
| w25 | 011001 | +0.6106+1.1783i | +0.7705+0.4700i | +0.4281+0.1504i |
| w26 | 011010 | -1.4261+0.2216i | +0.1500+0.4221i | -0.7218+0.1633i |
| w27 | 011011 | -0.6106+1.1783i | +0.4537+0.4461i | -0.4281+0.1504i |
| w28 | 011100 | +0.1682+1.0316i | -1.1145+0.5358i | +0.7726+0.4955i |
| w29 | 011101 | +0.2287+1.3914i | -0.7705+0.4700i | +0.4581+0.4553i |
| w30 | 011110 | -0.1682+1.0316i | -0.1500+0.4221i | -0.7726+0.4955i |
| w31 | 011111 | -0.2287+1.3914i | -0.4537+0.4461i | -0.4581+0.4553i |
| w32 | 100000 | +1.0854-0.5394i | +1.3903-0.2023i | +1.3715-0.1909i |
| w33 | 100001 | +0.7353-0.4623i | +0.5830-1.1356i | +0.1700-1.0281i |
| w34 | 100010 | -1.0854-0.5394i | +0.1708-1.0248i | -1.3715-0.1909i |
| w35 | 100011 | -0.7353-0.4523i | +0.2191-1.3618i | -0.1700-1.0281i |
| w36 | 100100 | +0.1392-0.4078i | -1.3903-0.2023i | +1.1152-0.8599i |
| w37 | 100101 | +0.4262-0.4205i | -0.5830-1.1356i | +0.1524-0.7179i |
| w38 | 100110 | -0.1392-0.4078i | -0.1708-1.0248i | -1.1152-0.8599i |
| w39 | 100111 | -0.4262-0.4205i | -0.2191-1.3618i | -0.1524-0.7179i |
| w40 | 101000 | +1.0854+0.5394i | +1.3903+0.2023i | +1.3715+0.1909i |
| w41 | 101001 | +0.7353+0.4623i | +0.5830+1.1356i | +0.1700+1.0281i |
| w42 | 101010 | -1.0854+0.5394i | +0.1708+1.0248i | -1.3715+0.1909i |
| w43 | 101011 | -0.7353+0.4623i | +0.2191+1.3618i | -0.1700+1.0281i |
| w44 | 101100 | +0.1392+0.4078i | -1.3903+0.2023i | +1.1152+0.8599i |
| w45 | 101101 | +0.4262+0.4205i | -0.5830+1.1356i | +0.1524+0.7179i |
| w46 | 101110 | -0.1392+0.4078i | -0.1708+1.0248i | -1.1152+0.8599i |
| w47 | 101111 | -0.4262+0.4205i | -0.2191+1.3618i | -0.1524+0.7179i |
| w48 | 110000 | +1.0693-0.9408i | +1.0788-0.9275i | +0.5530-1.1489i |
| w49 | 110001 | +0.7092-0.8073i | +0.7608-0.8009i | +0.2033-1.3620i |
| w50 | 110010 | -1.0693-0.9408i | +0.1480-0.7122i | -0.5530-1.1489i |
| w51 | 110011 | -0.7092-0.8073i | +0.4498-0.7565i | -0.2033-1.3620i |
| w52 | 110100 | +0.1388-0.7057i | -1.0788-0.9275i | +0.7724-0.8458i |
| w53 | 110101 | +0.4197-0.7206i | -0.7608-0.8009i | +0.4596-0.7717i |
| w54 | 110110 | -0.1388-0.7057i | -0.1480-0.7122i | -0.7724-0.8458i |
| w55 | 110111 | -0.4197-0.7206i | -0.4498-0.7565i | -0.4596-0.7717i |
| w56 | 111000 | +1.0693+0.9408i | +1.0788+0.9275i | +0.5530+1.1489i |
| w57 | 111001 | +0.7092+0.8073i | +0.7608+0.8009i | +0.2033+1.3620i |
| w58 | 111010 | -1.0693+0.9408i | +0.1480+0.7122i | -0.5530+1.1489i |
| w59 | 111011 | -0.7092+0.8073i | +0.4498+0.7565i | -0.2033+1.3620i |
| w60 | 111100 | +0.1388+0.7057i | -1.0788+0.9275i | +0.7724+0.8458i |
| w61 | 111101 | +0.4197+0.7206i | -0.7608+0.8009i | +0.4596+0.7717i |
| w62 | 111110 | -0.1388+0.7057i | -0.1480+0.7122i | -0.7724+0.8458i |
| w63 | 111111 | -0.4197+0.7206i | -0.4498+0.7565i | -0.4596+0.7717i |

A3) 256-QAM NUC
for MCS=8 (or 9):

| w index | bit label | Constellation point |
|---|---|---|
| w0 | 0000000 | -0.4905+1.1842i |
| w1 | 0000000 | -0.6911+0.6930i |

| w index | bit label | Constellation point |
|---|---|---|
| w2 | 0000001 | −0.5982+1.0262i |
| w3 | 0000001 | −0.6740+0.8584i |
| w4 | 0000010 | +0.4905+1.1842i |
| w5 | 0000010 | +0.6911+0.6930i |
| w6 | 0000011 | +0.5982+1.0262i |
| w7 | 0000011 | +0.6740+0.8584i |
| w8 | 0000100 | −0.6622−0.0739i |
| w9 | 0000100 | −0.6739+0.5331i |
| w10 | 0000101 | −0.6337+0.2246i |
| w11 | 0000101 | −0.6474+0.3777i |
| w12 | 0000110 | +0.6622−0.0739i |
| w13 | 0000110 | +0.6739+0.5331i |
| w14 | 0000111 | +0.6337+0.2246i |
| w15 | 0000111 | +0.6474+0.3777i |
| w16 | 0001000 | −0.4905−1.1842i |
| w17 | 0001000 | −0.6911−0.6930i |
| w18 | 0001001 | −0.5982−1.0262i |
| w19 | 0001001 | −0.6740−0.8584i |
| w20 | 0001010 | +0.4905−1.1842i |
| w21 | 0001010 | +0.6911−0.6930i |
| w22 | 0001011 | +0.5982−1.0262i |
| w23 | 0001011 | +0.6740−0.8584i |
| w24 | 0001100 | −0.6622−0.0739i |
| w25 | 0001100 | −0.6739−0.5331i |
| w26 | 0001101 | −0.6337−0.2246i |
| w27 | 0001101 | −0.6474−0.3777i |
| w28 | 0001110 | +0.6622−0.0739i |
| w29 | 0001110 | +0.6739−0.5331i |
| w30 | 0001111 | +0.6337−0.2246i |
| w31 | 0001111 | +0.6474−0.3777i |
| w32 | 0010000 | −0.6854+1.2221i |
| w33 | 0010000 | −0.8561+0.6778i |
| w34 | 0010001 | −0.7829+1.0274i |
| w35 | 0010001 | −0.8451+0.8492i |
| w36 | 0010010 | +0.6854+1.2221i |
| w37 | 0010010 | +0.8561+0.6778i |
| w38 | 0010011 | +0.7829+1.0274i |
| w39 | 0010011 | +0.8451+0.8492i |
| w40 | 0010100 | −0.8231+0.0739i |
| w41 | 0010100 | −0.8353+0.5198i |
| w42 | 0010101 | −0.7818+0.2196i |
| w43 | 0010101 | −0.7994+0.3695i |
| w44 | 0010110 | +0.8231+0.0739i |
| w45 | 0010110 | +0.8353+0.5198i |
| w46 | 0010111 | +0.7818+0.2196i |
| w47 | 0010111 | +0.7994+0.3695i |
| w48 | 0011000 | −0.6854−1.2221i |
| w49 | 0011000 | −0.8561−0.6778i |
| w50 | 0011001 | −0.7829−1.0274i |
| w51 | 0011001 | −0.8451−0.8492i |
| w52 | 0011010 | +0.6854−1.2221i |
| w53 | 0011010 | +0.8561−0.6778i |
| w54 | 0011011 | +0.7829−1.0274i |
| w55 | 0011011 | +0.8451−0.8492i |
| w56 | 0011100 | −0.8231−0.0739i |
| w57 | 0011100 | −0.8353−0.5198i |
| w58 | 0011101 | −0.7818−0.2196i |
| w59 | 0011101 | −0.7994−0.3695i |
| w60 | 0011110 | +0.8231−0.0739i |
| w61 | 0011110 | +0.8353−0.5198i |
| w62 | 0011111 | +0.7818−0.2196i |
| w63 | 0011111 | +0.7994−0.3695i |
| w64 | 01000000 | −0.4711+1.3764i |
| w65 | 01000001 | −0.5308+0.6813i |
| w66 | 01000010 | −0.4242+0.9942i |
| w67 | 01000011 | −0.5155+0.8438i |
| w68 | 01000100 | +0.4711+1.3764i |
| w69 | 01000101 | +0.5308+0.6813i |
| w70 | 01000110 | +0.4242+0.9942i |
| w71 | 01000111 | +0.5155+0.8438i |
| w72 | 01001000 | −0.5101+0.0730i |
| w73 | 01001001 | −0.5175+0.5233i |
| w74 | 01001010 | −0.4897+0.2198i |
| w75 | 01001011 | −0.4992+0.3698i |
| w76 | 01001100 | +0.5101+0.0730i |
| w77 | 01001101 | +0.5175+0.5233i |
| w78 | 01001110 | +0.4897+0.2198i |
| w79 | 01001111 | +0.4992+0.3698i |
| w80 | 01010000 | −0.4711−1.3764i |
| w81 | 01010001 | −0.5308−0.6813i |
| w82 | 01010010 | −0.4242−0.9942i |
| w83 | 01010011 | −0.5155−0.8438i |
| w84 | 01010100 | +0.4711−1.3764i |
| w85 | 01010101 | +0.5308−0.6813i |
| w86 | 01010110 | +0.4242−0.9942i |
| w87 | 01010111 | +0.5155−0.8438i |
| w88 | 01011000 | −0.5101−0.0730i |
| w89 | 01011001 | −0.5175−0.5233i |
| w90 | 01011010 | −0.4897−0.2198i |
| w91 | 01011011 | −0.4992−0.3698i |
| w92 | 01011100 | +0.5101−0.0730i |
| w93 | 01011101 | +0.5175−0.5233i |
| w94 | 01011110 | +0.4897−0.2198i |
| w95 | 01011111 | +0.4992−0.3698i |
| w96 | 01100000 | −0.2836+1.2952i |
| w97 | 01100001 | −0.3755+0.6565i |
| w98 | 01100010 | −0.2860+1.1119i |
| w99 | 01100011 | −0.3664+0.8105i |
| w100 | 01100100 | +0.2836+1.2952i |
| w101 | 01100101 | +0.3755+0.6565i |
| w102 | 01100110 | +0.2860+1.1119i |
| w103 | 01100111 | +0.3664+0.8105i |
| w104 | 01101000 | −0.3616+0.0709i |
| w105 | 01101001 | −0.3655+0.5062i |
| w106 | 01101010 | −0.3479+0.2135i |
| w107 | 01101011 | −0.3537+0.3587i |
| w108 | 01101100 | +0.3616+0.0709i |
| w109 | 01101101 | +0.3655+0.5062i |
| w110 | 01101110 | +0.3479+0.2135i |
| w111 | 01101111 | +0.3537+0.3587i |
| w112 | 01110000 | −0.2836−1.2952i |
| w113 | 01110001 | −0.3755−0.6565i |
| w114 | 01110010 | −0.2860−1.1119i |
| w115 | 01110011 | −0.3664−0.8105i |
| w116 | 01110100 | +0.2836−1.2952i |
| w117 | 01110101 | +0.3755−0.6565i |
| w118 | 01110110 | +0.2860−1.1119i |
| w119 | 01110111 | +0.3664−0.8105i |
| w120 | 01111000 | −0.3616−0.0709i |
| w121 | 01111001 | −0.3655−0.5062i |
| w122 | 01111010 | −0.3479−0.2135i |
| w123 | 01111011 | −0.3537−0.3587i |
| w124 | 01111100 | +0.3616−0.0709i |
| w125 | 01111101 | +0.3655−0.5062i |
| w126 | 01111110 | +0.3479−0.2135i |
| w127 | 01111111 | +0.3537−0.3587i |
| w128 | 10000000 | −1.2103+0.9014i |
| w129 | 10000001 | −1.1677+0.4847i |
| w130 | 10000010 | −1.2323+0.6874i |
| w131 | 10000011 | −1.3547+0.4862i |
| w132 | 10000100 | +1.2103+0.9014i |
| w133 | 10000101 | +1.1677+0.4847i |
| w134 | 10000110 | +1.2323+0.6874i |
| w135 | 10000111 | +1.3547+0.4862i |
| w136 | 10001000 | −1.1595+0.0882i |
| w137 | 10001001 | −1.4613+0.2782i |
| w138 | 10001010 | −1.3430+0.0950i |
| w139 | 10001011 | −1.2637+0.2839i |
| w140 | 10001100 | +1.1595+0.0882i |
| w141 | 10001101 | +1.4613+0.2782i |
| w142 | 10001110 | +1.3430+0.0950i |
| w143 | 10001111 | +1.2637+0.2839i |
| w144 | 10010000 | −1.2103−0.9014i |
| w145 | 10010001 | −1.1677−0.4847i |
| w146 | 10010010 | −1.2323−0.6874i |
| w147 | 10010011 | −1.3547−0.4862i |
| w148 | 10010100 | +1.2103−0.9014i |
| w149 | 10010101 | +1.1677−0.4847i |
| w150 | 10010110 | +1.2323−0.6874i |
| w151 | 10010111 | +1.3547−0.4862i |
| w152 | 10011000 | −1.1595−0.0882i |
| w153 | 10011001 | −1.4613−0.2782i |
| w154 | 10011010 | −1.3430−0.0950i |
| w155 | 10011011 | −1.2637−0.2839i |

-continued

| w index | bit label | Constellation point |
|---|---|---|
| w156 | 10011100 | +1.1595−0.0882i |
| w157 | 10011101 | +1.4613−0.2782i |
| w158 | 10011110 | +1.3430−0.0950i |
| w159 | 10011111 | +1.2637−0.2839i |
| w160 | 10100000 | −0.9022+1.1987i |
| w161 | 10100001 | −1.0215+0.6013i |
| w162 | 10100010 | −0.9925+0.9967i |
| w163 | 10100011 | −1.0233+0.7878i |
| w164 | 10100100 | +0.9022+1.1987i |
| w165 | 10100101 | +1.0215+0.6013i |
| w166 | 10100110 | +0.9925+0.9967i |
| w167 | 10100111 | +1.0233+0.7878i |
| w168 | 10101000 | −0.9894+0.0820i |
| w169 | 10101001 | −0.9800+0.4265i |
| w170 | 10101010 | −0.9367+0.2358i |
| w171 | 10101011 | −1.0889+0.2858i |
| w172 | 10101100 | +0.9894+0.0820i |
| w173 | 10101101 | +0.9800+0.4265i |
| w174 | 10101110 | +0.9367+0.2358i |
| w175 | 10101111 | +1.0889+0.2858i |
| w176 | 10110000 | −0.9022−1.1987i |
| w177 | 10110001 | −1.0215−0.6013i |
| w178 | 10110010 | −0.9925−0.9967i |
| w179 | 10110011 | −1.0233−0.7878i |
| w180 | 10110100 | +0.9022−1.1987i |
| w181 | 10110101 | +1.0215−0.6013i |
| w182 | 10110110 | +0.9925−0.9967i |
| w183 | 10110111 | +1.0233−0.7878i |
| w184 | 10111000 | −0.9894−0.0820i |
| w185 | 10111001 | −0.9800−0.4265i |
| w186 | 10111010 | −0.9367−0.2358i |
| w187 | 10111011 | −1.0889−0.2858i |
| w188 | 10111100 | +0.9894−0.0820i |
| w189 | 10111101 | +0.9800−0.4265i |
| w190 | 10111110 | +0.9367−0.2358i |
| w191 | 10111111 | −1.2103+0.9014i |
| w192 | 11000000 | −0.0888+1.1903i |
| w193 | 11000001 | −0.0732+0.6770i |
| w194 | 11000010 | −0.0829+1.0145i |
| w195 | 11000011 | −0.0737+0.8430i |
| w196 | 11000100 | +0.0888+1.1903i |
| w197 | 11000101 | +0.0732+0.6770i |
| w198 | 11000110 | +0.0829+1.0145i |
| w199 | 11000111 | +0.0737+0.8430i |
| w200 | 11001000 | −0.0711+0.0728i |
| w201 | 11001001 | −0.0722+0.5215i |
| w202 | 11001010 | −0.0687−0.2202i |
| w203 | 11001011 | −0.0699+0.3698i |
| w204 | 11001100 | +0.0711+0.0728i |
| w205 | 11001101 | +0.0722+0.5215i |
| w206 | 11001110 | +0.0687+0.2202i |
| w207 | 11001111 | +0.0699+0.3698i |
| w208 | 11010000 | −0.0888−1.1903i |
| w209 | 11010001 | −0.0732−0.6770i |
| w210 | 11010010 | −0.0829−1.0145i |
| w211 | 11010011 | −0.0737−0.8430i |
| w212 | 11010100 | +0.0888−1.1903i |
| w213 | 11010101 | +0.0732−0.6770i |
| w214 | 11010110 | +0.0829−1.0145i |
| w215 | 11010111 | +0.0737−0.8430i |
| w216 | 11011000 | −0.0711−0.0728i |
| w217 | 11011001 | −0.0722−0.5215i |
| w218 | 11011010 | −0.0687−0.2202i |
| w219 | 11011011 | −0.0699−0.3698i |
| w220 | 11011100 | +0.0711−0.0728i |
| w221 | 11011101 | +0.0722−0.5215i |
| w222 | 11011110 | +0.0687−0.2202i |
| w223 | 11011111 | +0.0699−0.3698i |
| w224 | 11100000 | −0.1023+1.3833i |
| w225 | 11100001 | −0.2228+0.6437i |
| w226 | 11100010 | −0.2357+0.9536i |
| w227 | 11100011 | −0.2175+0.7949i |
| w228 | 11100100 | +0.1023+1.3833i |
| w229 | 11100101 | +0.2228+0.6437i |
| w230 | 11100110 | +0.2357+0.9536i |
| w231 | 11100111 | +0.2175+0.7949i |
| w232 | 11101000 | −0.2153+0.0697i |
| w233 | 11101001 | −0.2171+0.4970i |
| w234 | 11101010 | −0.2074+0.2103i |
| w235 | 11101011 | −0.2104+0.3528i |
| w236 | 11101100 | +0.2153+0.0697i |
| w237 | 11101101 | +0.2171+0.4970i |
| w238 | 11101110 | +0.2074+0.2103i |
| w239 | 11101111 | +0.2104+0.3528i |
| w240 | 11110000 | −0.1023−1.3833i |
| w241 | 11110001 | −0.2228−0.6437i |
| w242 | 11110010 | −0.2357−0.9536i |
| w243 | 11110011 | −0.2175−0.7949i |
| w244 | 11110100 | +0.1023−1.3833i |
| w245 | 11110101 | +0.2228−0.6437i |
| w246 | 11110110 | +0.2357−0.9536i |
| w247 | 11110111 | +0.2175−0.7949i |
| w248 | 11111000 | −0.2153−0.0697i |
| w249 | 11111001 | −0.2171−0.4970i |
| w250 | 11111010 | −0.2074−0.2103i |
| w251 | 11111011 | −0.2104−0.3528i |
| w252 | 11111100 | +0.2153−0.0697i |
| w253 | 11111101 | +0.2171−0.4970i |
| w254 | 11111110 | +0.2074−0.2103i |
| w255 | 11111111 | +0.2104−0.3528i | or
for MCS=9 (or 8):

| w index | bit label | Constellation point |
|---|---|---|
| w0 | 0000000 | −0.4801+1.1746i |
| w1 | 0000000 | −0.6762+1.2058i |
| w2 | 0000001 | +0.4801+1.1746i |
| w3 | 0000001 | +0.6762+1.2058i |
| w4 | 0000010 | −0.4614+1.3554i |
| w5 | 0000010 | −0.2766+1.2869i |
| w6 | 0000011 | +0.4614+1.3554i |
| w7 | 0000011 | +0.2766+1.2869i |
| w8 | 0000100 | −1.1920+0.8876i |
| w9 | 0000100 | −0.8919+1.1799i |
| w10 | 0000101 | +1.1920+0.8876i |
| w11 | 0000101 | +0.8919+1.1799i |
| w12 | 0000110 | −0.0897+1.1870i |
| w13 | 0000110 | −0.0980+1.3675i |
| w14 | 0000111 | +0.0897+1.1870i |
| w15 | 0000111 | +0.0980+1.3675i |
| w16 | 0001000 | −0.7042+0.7037i |
| w17 | 0001000 | −0.8656+0.6806i |
| w18 | 0001001 | +0.7042+0.7037i |
| w19 | 0001001 | +0.8656+0.6806i |
| w20 | 0001010 | −0.5441+0.6946i |
| w21 | 0001010 | −0.3865+0.6677i |
| w22 | 0001011 | +0.5441+0.6946i |
| w23 | 0001011 | +0.3865+0.6677i |
| w24 | 0001100 | −1.1619+0.4714i |
| w25 | 0001100 | −1.0233+0.5938i |
| w26 | 0001101 | +1.1619+0.4714i |
| w27 | 0001101 | +1.0233+0.5938i |
| w28 | 0001110 | −0.0761+0.6911i |
| w29 | 0001110 | −0.2301+0.6395i |
| w30 | 0001111 | +0.0761+0.6911i |
| w31 | 0001111 | +0.2301+0.6395i |
| w32 | 0010000 | −0.4801−1.1746i |
| w33 | 0010000 | −0.6762−1.2058i |
| w34 | 0010001 | +0.4801−1.1746i |
| w35 | 0010001 | +0.6762−1.2058i |
| w36 | 0010010 | −0.4614−1.3554i |
| w37 | 0010010 | −0.2766−1.2869i |
| w38 | 0010011 | +0.4614−1.3554i |
| w39 | 0010011 | +0.2766−1.2869i |
| w40 | 0010100 | −1.1920−0.8876i |
| w41 | 0010100 | −0.8919−1.1799i |
| w42 | 0010101 | +1.1920−0.8876i |
| w43 | 0010101 | +0.8919−1.1799i |
| w44 | 0010110 | −0.0897−1.1870i |
| w45 | 0010110 | −0.0980−1.3675i |

| w index | bit label | Constellation point |
|---|---|---|
| w46 | 0010111 | +0.0897−1.1870i |
| w47 | 0010111 | +0.0980−1.3675i |
| w48 | 0011000 | −0.7042−0.7037i |
| w49 | 0011000 | −0.8656−0.6806i |
| w50 | 0011001 | +0.7042−0.7037i |
| w51 | 0011001 | +0.8656−0.6806i |
| w52 | 0011010 | −0.5441−0.6946i |
| w53 | 0011010 | −0.3865−0.6677i |
| w54 | 0011011 | +0.5441−0.6946i |
| w55 | 0011011 | +0.3865−0.6677i |
| w56 | 0011100 | −1.1619−0.4714i |
| w57 | 0011100 | −1.0233−0.5938i |
| w58 | 0011101 | +1.1619−0.4714i |
| w59 | 0011101 | +1.0233−0.5938i |
| w60 | 0011110 | −0.0761−0.6911i |
| w61 | 0011110 | −0.2301−0.6395i |
| w62 | 0011111 | +0.0761−0.6911i |
| w63 | 0011111 | +0.2301−0.6395i |
| w64 | 01000000 | −0.6844+0.0760i |
| w65 | 01000001 | −0.8440+0.0765i |
| w66 | 01000010 | +0.6844+0.0760i |
| w67 | 01000011 | +0.8440+0.0765i |
| w68 | 01000100 | −0.5319+0.0762i |
| w69 | 01000101 | −0.3811+0.0732i |
| w70 | 01000110 | +0.5319+0.0762i |
| w71 | 01000111 | +0.3811+0.0732i |
| w72 | 01001000 | −1.1751+0.0886i |
| w73 | 01001001 | −1.0070+0.0833i |
| w74 | 01001010 | +1.1751+0.0886i |
| w75 | 01001011 | +1.0070+0.0833i |
| w76 | 01001100 | −0.0749+0.0766i |
| w77 | 01001101 | −0.2291+0.0689i |
| w78 | 01001110 | +0.0749+0.0766i |
| w79 | 01001111 | +0.2291+0.0689i |
| w80 | 01010000 | −0.6891+0.5440i |
| w81 | 01010001 | −0.8493+0.5224i |
| w82 | 01010010 | +0.6891+0.5440i |
| w83 | 01010011 | +0.8493+0.5224i |
| w84 | 01010100 | −0.5302+0.5350i |
| w85 | 01010101 | −0.3753+0.5150i |
| w86 | 01010110 | +0.5302+0.5350i |
| w87 | 01010111 | +0.3753+0.5150i |
| w88 | 01011000 | −1.4427+0.2847i |
| w89 | 01011001 | −0.9868+0.4178i |
| w90 | 01011010 | +1.4427+0.2847i |
| w91 | 01011011 | +0.9868+0.4178i |
| w92 | 01011100 | −0.0759+0.5374i |
| w93 | 01011101 | −0.2229+0.4904i |
| w94 | 01011110 | +0.0759+0.5374i |
| w95 | 01011111 | +0.2229+0.4904i |
| w96 | 01100000 | −0.6844−0.0760i |
| w97 | 01100001 | −0.8440−0.0765i |
| w98 | 01100010 | +0.6844−0.0760i |
| w99 | 01100011 | +0.8440−0.0765i |
| w100 | 01100100 | −0.5319−0.0762i |
| w101 | 01100101 | −0.3811−0.0732i |
| w102 | 01100110 | +0.5319−0.0762i |
| w103 | 01100111 | +0.3811−0.0732i |
| w104 | 01101000 | −1.1751−0.0886i |
| w105 | 01101001 | −1.0070−0.0833i |
| w106 | 01101010 | +1.1751−0.0886i |
| w107 | 01101011 | +1.0070−0.0833i |
| w108 | 01101100 | −0.0749−0.0766i |
| w109 | 01101101 | −0.2291−0.0689i |
| w110 | 01101110 | +0.0749−0.0766i |
| w111 | 01101111 | +0.2291−0.0689i |
| w112 | 01110000 | −0.6891−0.5440i |
| w113 | 01110001 | −0.8493−0.5224i |
| w114 | 01110010 | +0.6891−0.5440i |
| w115 | 01110011 | +0.8493−0.5224i |
| w116 | 01110100 | −0.5302−0.5350i |
| w117 | 01110101 | −0.3753−0.5150i |
| w118 | 01110110 | +0.5302−0.5350i |
| w119 | 01110111 | +0.3753−0.5150i |
| w120 | 01111000 | −1.4427−0.2847i |
| w121 | 01111001 | −0.9868−0.4178i |
| w122 | 01111010 | +1.4427−0.2847i |
| w123 | 01111011 | +0.9868−0.4178i |
| w124 | 01111100 | −0.0759−0.5374i |
| w125 | 01111101 | −0.2229−0.4904i |
| w126 | 01111110 | +0.0759−0.5374i |
| w127 | 01111111 | +0.2229−0.4904i |
| w128 | 10000000 | −0.5937+1.0262i |
| w129 | 10000001 | −0.7777+1.0233i |
| w130 | 10000010 | +0.5937+1.0262i |
| w131 | 10000011 | +0.7777+1.0233i |
| w132 | 10000100 | −0.4184+0.9977i |
| w133 | 10000101 | −0.2792+1.1096i |
| w134 | 10000110 | +0.4184+0.9977i |
| w135 | 10000111 | +0.2792+1.1096i |
| w136 | 10001000 | −1.2121+0.6733i |
| w137 | 10001001 | −0.9865+0.9873i |
| w138 | 10001010 | +1.2121+0.6733i |
| w139 | 10001011 | +0.9865+0.9873i |
| w140 | 10001100 | −0.0824+1.0164i |
| w141 | 10001101 | −0.2359+0.9515i |
| w142 | 10001110 | +0.0824+1.0164i |
| w143 | 10001111 | +0.2359+0.9515i |
| w144 | 10010000 | −0.6785+0.8656i |
| w145 | 10010001 | −0.8479+0.8504i |
| w146 | 10010010 | +0.6785+0.8656i |
| w147 | 10010011 | +0.8479+0.8504i |
| w148 | 10010100 | −0.5200+0.8555i |
| w149 | 10010101 | −0.3697+0.8223i |
| w150 | 10010110 | +0.5200+0.8555i |
| w151 | 10010111 | +0.3697+0.8223i |
| w152 | 10011000 | −1.3397+0.4820i |
| w153 | 10011001 | −1.0229+0.7822i |
| w154 | 10011010 | +1.3397+0.4820i |
| w155 | 10011011 | +1.0229+0.7822i |
| w156 | 10011100 | −0.0752+0.8524i |
| w157 | 10011101 | −0.2205+0.7921i |
| w158 | 10011110 | +0.0752+0.8524i |
| w159 | 10011111 | +0.2205+0.7921i |
| w160 | 10100000 | −0.5937−1.0262i |
| w161 | 10100001 | −0.7777−1.0233i |
| w162 | 10100010 | +0.5937−1.0262i |
| w163 | 10100011 | +0.7777−1.0233i |
| w164 | 10100100 | −0.4184−0.9977i |
| w165 | 10100101 | −0.2792−1.1096i |
| w166 | 10100110 | +0.4184−0.9977i |
| w167 | 10100111 | +0.2792−1.1096i |
| w168 | 10101000 | −1.2121−0.6733i |
| w169 | 10101001 | −0.9865−0.9873i |
| w170 | 10101010 | +1.2121−0.6733i |
| w171 | 10101011 | +0.9865−0.9873i |
| w172 | 10101100 | −0.0824−1.0164i |
| w173 | 10101101 | −0.2359−0.9515i |
| w174 | 10101110 | +0.0824−1.0164i |
| w175 | 10101111 | +0.2359−0.9515i |
| w176 | 10110000 | −0.6785−0.8656i |
| w177 | 10110001 | −0.8479−0.8504i |
| w178 | 10110010 | +0.6785−0.8656i |
| w179 | 10110011 | +0.8479−0.8504i |
| w180 | 10110100 | −0.5200−0.8555i |
| w181 | 10110101 | −0.3697−0.8223i |
| w182 | 10110110 | +0.5200−0.8555i |
| w183 | 10110111 | +0.3697−0.8223i |
| w184 | 10111000 | −1.3397−0.4820i |
| w185 | 10111001 | −1.0229−0.7822i |
| w186 | 10111010 | +1.3397−0.4820i |
| w187 | 10111011 | +1.0229−0.7822i |
| w188 | 10111100 | −0.0752−0.8524i |
| w189 | 10111101 | −0.2205−0.7921i |
| w190 | 10111110 | +0.0752−0.8524i |
| w191 | 10111111 | +0.2205−0.7921i |
| w192 | 11000000 | −0.6336+0.2306i |
| w193 | 11000001 | −0.7836+0.2217i |
| w194 | 11000010 | +0.6336+0.2306i |
| w195 | 11000011 | +0.7836+0.2217i |
| w196 | 11000100 | −0.4864+0.2253i |
| w197 | 11000101 | −0.3429+0.2164i |
| w198 | 11000110 | +0.4864+0.2253i |
| w199 | 11000111 | +0.3429+0.2164i |

-continued

| w index | bit label | Constellation point |
|---|---|---|
| w200 | 11001000 | −1.3520+0.0957i |
| w201 | 11001001 | −0.9402+0.2370i |
| w202 | 11001010 | +1.3520+0.0957i |
| w203 | 11001011 | +0.9402+0.2370i |
| w204 | 11001100 | −0.0684+0.2330i |
| w205 | 11001101 | −0.2017+0.2031i |
| w206 | 11001110 | +0.0684+0.2330i |
| w207 | 11001111 | +0.2017+0.2031i |
| w208 | 11010000 | −0.6601+0.3878i |
| w209 | 11010001 | −0.8131+0.3716i |
| w210 | 11010010 | +0.6601+0.3878i |
| w211 | 11010011 | +0.8131+0.3716i |
| w212 | 11010100 | −0.5092+0.3789i |
| w213 | 11010101 | −0.3608+0.3649i |
| w214 | 11010110 | +0.5092+0.3789i |
| w215 | 11010111 | +0.3608+0.3649i |
| w216 | 11011000 | −1.2604+0.2816i |
| w217 | 11011001 | −1.0927+0.2741i |
| w218 | 11011010 | +1.2604+0.2816i |
| w219 | 11011011 | +1.0927+0.2741i |
| w220 | 11011100 | −0.0724+0.3856i |
| w221 | 11011101 | −0.2134+0.3455i |
| w222 | 11011110 | +0.0724+0.3856i |
| w223 | 11011111 | +0.2134+0.3455i |
| w224 | 11100000 | −0.6336−0.2306i |
| w225 | 11100001 | −0.7836−0.2217i |
| w226 | 11100010 | +0.6336−0.2306i |
| w227 | 11100011 | +0.7836−0.2217i |
| w228 | 11100100 | −0.4864−0.2253i |
| w229 | 11100101 | −0.3429−0.2164i |
| w230 | 11100110 | +0.4864−0.2253i |
| w231 | 11100111 | +0.3429−0.2164i |
| w232 | 11101000 | −1.3520−0.0957i |
| w233 | 11101001 | −0.9402−0.2370i |
| w234 | 11101010 | +1.3520−0.0957i |
| w235 | 11101011 | +0.9402−0.2370i |
| w236 | 11101100 | −0.0684−0.2330i |
| w237 | 11101101 | −0.2017−0.2031i |
| w238 | 11101110 | +0.0684−0.2330i |
| w239 | 11101111 | +0.2017−0.2031i |
| w240 | 11110000 | −0.6601−0.3878i |
| w241 | 11110001 | −0.8131−0.3716i |
| w242 | 11110010 | +0.6601−0.3878i |
| w243 | 11110011 | +0.8131−0.3716i |
| w244 | 11110100 | −0.5092−0.3789i |
| w245 | 11110101 | −0.3608−0.3649i |
| w246 | 11110110 | +0.5092−0.3789i |
| w247 | 11110111 | +0.3608−0.3649i |
| w248 | 11111000 | −1.2604−0.2816i |
| w249 | 11111001 | −1.0927−0.2741i |
| w250 | 11111010 | +1.2604−0.2816i |
| w251 | 11111011 | +1.0927−0.2741i |
| w252 | 11111100 | −0.0724−0.3856i |
| w253 | 11111101 | −0.2134−0.3455i |
| w254 | 11111110 | +0.0724−0.3856i |
| w255 | 11111111 | +0.2134−0.3455i |

B) M-QAM non-uniform constellations of group B for LDPC encoding:

B1) 16-QAM NUC, where MCS 3 corresponds to a 16-QAM with code rate 1/2, and MCS 4 corresponds to 16-QAM with code rate 3/4

| w | bit label | MCS = 3 (or 4) | MCS = 4 (or 3) |
|---|---|---|---|
| w0 | 0000 | +0.4925+1.2040i | +0.3018−0.3018i |
| w1 | 0001 | +0.4925−1.2040i | +0.9534−0.3018i |
| w2 | 0010 | +0.2530+0.4936i | +0.3018+0.3018i |
| w3 | 0011 | +0.2530−0.4936i | +0.9534+0.3018i |
| w4 | 0100 | −0.4925+1.2040i | −0.3018−0.3018i |
| w5 | 0101 | −0.4925−1.2040i | −0.9534−0.3018i |
| w6 | 0110 | −0.2530+0.4936i | −0.3018+0.3018i |
| w7 | 0111 | −0.2530−0.4936i | −0.9534+0.3018i |
| w8 | 1000 | +1.2040+0.4925i | +0.3018−0.9534i |
| w9 | 1001 | +1.2040−0.4925i | +0.9534−0.9534i |
| w10 | 1010 | +0.4936+0.2530i | +0.3018+0.9534i |
| w11 | 1011 | +0.4936−0.2530i | +0.9534+0.9534i |
| w12 | 1100 | −1.2040+0.4925i | −0.3018−0.9534i |
| w13 | 1101 | −1.2040−0.4925i | −0.9534−0.9534i |
| w14 | 1110 | −0.4936+0.2530i | −0.3018+0.9534i |
| w15 | 1111 | −0.4936−0.2530i | −0.9534+0.9534i |

B2) 64-QAM NUC

| w/ MCS index | bit label | MCS = 5 (or 6 or 7) | MCS = 6 (or 5 or 7) | MCS = 7 (or 5 or 6) |
|---|---|---|---|---|
| w0 | 000000 | +1.4656+0.2931i | +1.0441−0.1581i | +1.0474−0.1695i |
| w1 | 000001 | +0.2878+1.4388i | +0.1321−0.1317i | −1.0474−0.1695i |
| w2 | 000010 | +0.1678+0.1166i | +1.4516−0.2578i | +0.7243−0.1504i |
| w3 | 000011 | +0.1177+0.4119i | +0.1689−1.0567i | −0.7243−0.1504i |
| w4 | 000100 | +1.4656−0.2931i | +0.6995−0.1411i | +0.1407−0.1336i |
| w5 | 000101 | +0.2878−1.4388i | +0.4035−0.1354i | −0.1407−0.1336i |
| w6 | 000110 | +0.1678−0.1166i | +0.6750−1.2072i | +0.4265−0.1388i |
| w7 | 000111 | +0.1177−0.4119i | +0.2558−1.4247i | −0.4265−0.1388i |
| w8 | 001000 | +1.0649+0.2069i | +1.0161−0.4912i | +1.0474+0.1695i |
| w9 | 001001 | +0.2219+1.0386i | +0.1287−0.4061i | −1.0474+0.1695i |
| w10 | 001010 | +0.7408+0.1355i | +1.1306−0.8649i | +0.7243+0.1504i |
| w11 | 001011 | +0.1559+0.7442i | +0.1385−0.7199i | −0.7243+0.1504i |
| w12 | 001100 | +1.0649−0.2069i | +0.6966−0.4427i | +0.1407+0.1336i |
| w13 | 001101 | +0.2219−1.0386i | +0.4025−0.4142i | −0.1407+0.1336i |
| w14 | 001110 | +0.7408−0.1355i | +0.6874−0.8123i | +0.4265+0.1388i |
| w15 | 001111 | +0.1559−0.7442i | +0.4017−0.7107i | −0.4265+0.1388i |
| w16 | 010000 | +1.2278+0.8230i | +1.0441+0.1581i | +1.0854−0.5394i |
| w17 | 010001 | +0.8133+1.2150i | +0.1321+0.1317i | −1.0854−0.5394i |
| w18 | 010010 | +0.3325+0.1582i | +1.4516+0.2578i | +0.7353−0.4623i |
| w19 | 010011 | +0.2516+0.3998i | +0.1689+1.0567i | −0.7353−0.4623i |
| w20 | 010100 | +1.2278−0.8230i | +0.6995+0.1411i | +0.1392−0.4078i |
| w21 | 010101 | +0.8133−1.2150i | +0.4035+0.1354i | −0.1392−0.4078i |
| w22 | 010110 | +0.3325−0.1582i | +0.6750+1.2072i | +0.4262−0.4205i |
| w23 | 010111 | +0.2516−0.3998i | +0.2558+1.4247i | −0.4262−0.4205i |
| w24 | 011000 | +0.8971+0.5677i | +1.0161+0.4912i | +1.0854+0.5394i |
| w25 | 011001 | +0.6145+0.8494i | +0.1287+0.4061i | −1.0854+0.5394i |
| w26 | 011010 | +0.6200+0.3227i | +1.1306+0.8649i | +0.7353+0.4623i |
| w27 | 011011 | +0.4328+0.5954i | +0.1385+0.7199i | −0.7353+0.4623i |
| w28 | 011100 | +0.8971−0.5677i | +0.6966+0.4427i | +0.1392+0.4078i |
| w29 | 011101 | +0.6145−0.8494i | +0.4025+0.4142i | −0.1392+0.4078i |
| w30 | 011110 | +0.6200−0.3227i | +0.6874+0.8123i | +0.4262+0.4205i |
| w31 | 011111 | +0.4328−0.5954i | +0.4017+0.7107i | −0.4262+0.4205i |
| w32 | 100000 | −1.4656+0.2931i | −1.0441−0.1581i | +1.4261−0.2216i |
| w33 | 100001 | −0.2878+1.4388i | −0.1321−0.1317i | −1.4261−0.2216i |
| w34 | 100010 | −0.1678+0.1166i | −1.4516−0.2578i | +0.6106−1.1783i |
| w35 | 100011 | −0.1177+0.4119i | −0.1689−1.0567i | −0.6106−1.1783i |
| w36 | 100100 | −1.4656−0.2931i | −0.6995−0.1411i | +0.1682−1.0316i |
| w37 | 100101 | −0.2878−1.4388i | −0.4035−0.1354i | −0.1682−1.0316i |
| w38 | 100110 | −0.1678−0.1166i | −0.6750−1.2072i | +0.2287−1.3914i |
| w39 | 100111 | −0.1177−0.4119i | −0.2558−1.4247i | −0.2287−1.3914i |
| w40 | 101000 | −1.0649+0.2069i | −1.0161−0.4912i | +1.4261+0.2216i |
| w41 | 101001 | −0.2219+1.0386i | −0.1287−0.4061i | −1.4261+0.2216i |
| w42 | 101010 | −0.7408+0.1355i | −1.1306−0.8649i | +0.6106+1.1783i |
| w43 | 101011 | −0.1559+0.7442i | −0.1385−0.7199i | −0.6106+1.1783i |
| w44 | 101100 | −1.0649−0.2069i | −0.6966−0.4427i | +0.1682+1.0316i |
| w45 | 101101 | −0.2219−1.0386i | −0.4025−0.4142i | −0.1682+1.0316i |
| w46 | 101110 | −0.7408−0.1355i | −0.6874−0.8123i | +0.2287+1.3914i |
| w47 | 101111 | −0.1559−0.7442i | −0.4017−0.7107i | −0.2287+1.3914i |
| w48 | 110000 | −1.2278+0.8230i | −1.0441+0.1581i | +1.0693−0.9408i |
| w49 | 110001 | −0.8133+1.2150i | −0.1321+0.1317i | −1.0693−0.9408i |
| w50 | 110010 | −0.3325+0.1582i | −1.4516+0.2578i | +0.7092−0.8073i |
| w51 | 110011 | −0.2516+0.3998i | −0.1689+1.0567i | −0.7092−0.8073i |
| w52 | 110100 | −1.2278−0.8230i | −0.6995−0.1411i | +0.1388−0.7057i |
| w53 | 110101 | −0.8133−1.2150i | −0.4035−0.1354i | −0.1388−0.7057i |
| w54 | 110110 | −0.3325−0.1582i | −0.6750+1.2072i | +0.4197−0.7206i |
| w55 | 110111 | −0.2516−0.3998i | −0.2558+1.4247i | −0.4197−0.7206i |
| w56 | 111000 | −0.8971+0.5677i | −1.0161+0.4912i | +1.0693+0.9408i |
| w57 | 111001 | −0.6145+0.8494i | −0.1287+0.4061i | −1.0693+0.9408i |
| w58 | 111010 | −0.6200+0.3227i | −1.1306+0.8649i | +0.7092+0.8073i |
| w59 | 111011 | −0.4328+0.5954i | −0.1385+0.7199i | −0.7092+0.8073i |
| w60 | 111100 | −0.8971−0.5677i | −0.6966+0.4427i | +0.1388+0.7057i |

-continued

| w/ MCS index | bit label | MCS = 5 (or 6 or 7) | MCS = 6 (or 5 or 7) | MCS = 7 (or 5 or 6) |
|---|---|---|---|---|
| w61 | 111101 | −0.6145−0.8494i | −0.4025+0.4142i | −0.1388+0.7057i |
| w62 | 111110 | −0.6200−0.3227i | −0.6874+0.8123i | +0.4197+0.7206i |
| w63 | 111111 | −0.4328−0.5954i | −0.4017+0.7107i | −0.4197+0.7206i |

B3) 256-QAM NUC for MCS=8 (or 9):

| w index | bit label | Constellation point |
|---|---|---|
| w0 | 0000000 | −0.5039+1.2055i |
| w1 | 0000000 | −0.4884+1.0092i |
| w2 | 0000001 | −1.1657+1.0793i |
| w3 | 0000001 | −1.2385+0.8387i |
| w4 | 0000010 | −0.5781+1.4095i |
| w5 | 0000010 | −0.6891+1.0532i |
| w6 | 0000011 | −0.7876+1.2931i |
| w7 | 0000011 | −0.8990+1.0937i |
| w8 | 0000100 | −0.5039−1.2055i |
| w9 | 0000100 | −0.4884+1.0092i |
| w10 | 0000101 | −1.1657−1.0793i |
| w11 | 0000101 | −1.2385−0.8387i |
| w12 | 0000110 | −0.5781−1.4095i |
| w13 | 0000110 | −0.6891−1.0532i |
| w14 | 0000111 | −0.7876−1.2931i |
| w15 | 0000111 | −0.8990−1.0937i |
| w16 | 0001000 | −0.6346+0.6721i |
| w17 | 0001000 | −0.5902+0.8432i |
| w18 | 0001001 | −1.2060+0.5685i |
| w19 | 0001001 | −1.4112+0.6488i |
| w20 | 0001010 | −0.8075+0.6969i |
| w21 | 0001010 | −0.7660+0.8734i |
| w22 | 0001011 | −1.0100+0.6965i |
| w23 | 0001011 | −0.9651+0.8870i |
| w24 | 0001100 | −0.6346−0.6721i |
| w25 | 0001100 | −0.5902−0.8432i |
| w26 | 0001101 | −1.2060−0.5685i |
| w27 | 0001101 | −1.4112−0.6488i |
| w28 | 0001110 | −0.8075−0.6969i |
| w29 | 0001110 | −0.7660−0.8734i |
| w30 | 0001111 | −1.0100−0.6965i |
| w31 | 0001111 | −0.9651−0.8870i |
| w32 | 0010000 | −0.6629+0.0713i |
| w33 | 0010000 | −0.6641+0.2135i |
| w34 | 0010001 | −1.4228+0.1199i |
| w35 | 0010001 | −1.2036+0.1064i |
| w36 | 0010010 | −0.8160+0.0736i |
| w37 | 0010010 | −0.8280+0.2196i |
| w38 | 0010011 | −0.9811+0.0673i |
| w39 | 0010011 | −1.0114+0.2066i |
| w40 | 0010100 | −0.6629−0.0713i |
| w41 | 0010100 | −0.6641−0.2135i |
| w42 | 0010101 | −1.4228−0.1199i |
| w43 | 0010101 | −1.2036−0.1064i |
| w44 | 0010110 | −0.8160−0.0736i |
| w45 | 0010110 | −0.8280−0.2196i |
| w46 | 0010111 | −0.9811−0.0673i |
| w47 | 0010111 | −1.0114−0.2066i |
| w48 | 0011000 | −0.6511+0.5096i |
| w49 | 0011000 | −0.6617+0.3573i |
| w50 | 0011001 | −1.4186+0.3682i |
| w51 | 0011001 | −1.2116+0.3184i |
| w52 | 0011010 | −0.8111+0.5264i |
| w53 | 0011010 | −0.8276+0.3658i |
| w54 | 0011011 | −0.9802+0.5258i |
| w55 | 0011011 | −1.0181+0.3668i |
| w56 | 0011100 | −0.6511−0.5096i |
| w57 | 0011100 | −0.6517−0.3573i |
| w58 | 0011101 | −1.4186−0.3682i |
| w59 | 0011101 | −1.2116−0.3184i |
| w60 | 0011110 | −0.8111−0.5264i |
| w61 | 0011110 | −0.8276−0.3658i |
| w62 | 0011111 | −0.9802−0.5258i |
| w63 | 0011111 | −1.0181−0.3668i |
| w64 | 01000000 | +0.5039+1.2055i |
| w65 | 01000001 | +0.4884+1.0092i |
| w66 | 01000010 | +1.1657+1.0793i |
| w67 | 01000011 | +1.2385+0.8387i |
| w68 | 01000100 | +0.5781+1.4095i |
| w69 | 01000101 | +0.6891+1.0532i |
| w70 | 01000110 | +0.7876+1.2931i |
| w71 | 01000111 | +0.8990+1.0937i |
| w72 | 01001000 | +0.5039−1.2055i |
| w73 | 01001001 | +0.4884−1.0092i |
| w74 | 01001010 | +1.1657−1.0793i |
| w75 | 01001011 | +1.2385−0.8387i |
| w76 | 01001100 | +0.5781−1.4095i |
| w77 | 01001101 | +0.6891−1.0532i |
| w78 | 01001110 | +0.7876−1.2931i |
| w79 | 01001111 | +0.8990−1.0937i |
| w80 | 01010000 | +0.6346+0.6721i |
| w81 | 01010001 | +0.5902+0.8432i |
| w82 | 01010010 | +1.2060+0.5685i |
| w83 | 01010011 | +1.4112+0.6488i |
| w84 | 01010100 | +0.8075+0.6969i |
| w85 | 01010101 | +0.7660+0.8734i |
| w86 | 01010110 | +1.0100+0.6965i |
| w87 | 01010111 | +0.9651+0.8870i |
| w88 | 01011000 | +0.6346−0.6721i |
| w89 | 01011001 | +0.5902−0.8432i |
| w90 | 01011010 | +1.2060−0.5685i |
| w91 | 01011011 | +1.4112−0.6488i |
| w92 | 01011100 | +0.8075−0.6969i |
| w93 | 01011101 | +0.7660−0.8734i |
| w94 | 01011110 | +1.0100−0.6965i |
| w95 | 01011111 | +0.9651−0.8870i |
| w96 | 01100000 | +0.6629+0.0713i |
| w97 | 01100001 | +0.6641+0.2135i |
| w98 | 01100010 | +1.4228+0.1199i |
| w99 | 01100011 | +1.2036+0.1064i |
| w100 | 01100100 | +0.8160+0.0736i |
| w101 | 01100101 | +0.8280+0.2196i |
| w102 | 01100110 | +0.9811+0.0673i |
| w103 | 01100111 | +1.0114+0.2066i |
| w104 | 01101000 | +0.6629−0.0713i |
| w105 | 01101001 | +0.6641−0.2135i |
| w106 | 01101010 | +1.4228−0.1199i |
| w107 | 01101011 | +1.2036−0.1064i |
| w108 | 01101100 | +0.8160−0.0736i |
| w109 | 01101101 | +0.8280−0.2196i |
| w110 | 01101110 | +0.9811−0.0673i |
| w111 | 01101111 | +1.0114−0.2066i |
| w112 | 01110000 | +0.6511+0.5096i |
| w113 | 01110001 | +0.6617+0.3573i |
| w114 | 01110010 | +1.4186+0.3682i |
| w115 | 01110011 | +1.2116+0.3184i |
| w116 | 01110100 | +0.8111+0.5264i |
| w117 | 01110101 | +0.8276+0.3658i |
| w118 | 01110110 | +0.9802+0.5258i |
| w119 | 01110111 | +1.0181+0.3668i |
| w120 | 01111000 | +0.6511−0.5096i |
| w121 | 01111001 | +0.6617−0.3573i |
| w122 | 01111010 | +1.4186−0.3682i |
| w123 | 01111011 | +1.2116−0.3184i |
| w124 | 01111100 | +0.8111−0.5264i |
| w125 | 01111101 | +0.8276−0.3658i |
| w126 | 01111110 | +0.9802−0.5258i |
| w127 | 01111111 | +1.0181−0.3668i |
| w128 | 10000000 | −0.3004+1.2452i |
| w129 | 10000001 | −0.2967+1.0627i |
| w130 | 10000010 | −0.0994+1.2493i |
| w131 | 10000011 | −0.0947+1.0662i |
| w132 | 10000100 | −0.3452+1.4585i |
| w133 | 10000101 | −0.2650+0.9148i |
| w134 | 10000110 | −0.1137+1.4651i |
| w135 | 10000111 | −0.0895+0.8991i |
| w136 | 10001000 | −0.3004−1.2452i |
| w137 | 10001001 | −0.2967−1.0627i |
| w138 | 10001010 | −0.0994−1.2493i |
| w139 | 10001011 | −0.0947−1.0662i |
| w140 | 10001100 | −0.3452−1.4585i |

-continued

| w index | bit label | Constellation point |
| --- | --- | --- |
| w141 | 10001101 | −0.2650−0.9148i |
| w142 | 10001110 | −0.1137−1.4651i |
| w143 | 10001111 | −0.0895−0.8991i |
| w144 | 10010000 | −0.4787+0.6378i |
| w145 | 10010001 | −0.4439+0.7942i |
| w146 | 10010010 | −0.0688+0.5579i |
| w147 | 10010011 | −0.0550+0.6984i |
| w148 | 10010100 | −0.3328+0.6100i |
| w149 | 10010101 | −0.3014+0.7660i |
| w150 | 10010110 | −0.2008+0.5810i |
| w151 | 10010111 | −0.1623+0.7417i |
| w152 | 10011000 | −0.4787−0.6378i |
| w153 | 10011001 | −0.4439−0.7942i |
| w154 | 10011010 | −0.0688−0.5579i |
| w155 | 10011011 | −0.0550−0.6984i |
| w156 | 10011100 | −0.3328−0.6100i |
| w157 | 10011101 | −0.3014−0.7660i |
| w158 | 10011110 | −0.2008−0.5810i |
| w159 | 10011111 | −0.1623−0.7417i |
| w160 | 10100000 | −0.5146−0.0676i |
| w161 | 10100001 | −0.5128+0.2035i |
| w162 | 10100010 | −0.0738+0.0604i |
| w163 | 10100011 | −0.0736+0.1802i |
| w164 | 10100100 | −0.3680−0.0641i |
| w165 | 10100101 | −0.3662+0.1927i |
| w166 | 10100110 | −0.2211+0.0614i |
| w167 | 10100111 | −0.2203+0.1844i |
| w168 | 10101000 | −0.5146−0.0676i |
| w169 | 10101001 | −0.5128−0.2035i |
| w170 | 10101010 | −0.0738−0.0604i |
| w171 | 10101011 | −0.0736−0.1802i |
| w172 | 10101100 | −0.3680−0.0641i |
| w173 | 10101101 | −0.3662−0.1927i |
| w174 | 10101110 | −0.2211−0.0614i |
| w175 | 10101111 | −0.2203−0.1844i |
| w176 | 10110000 | −0.4984+0.4870i |
| w177 | 10110001 | −0.5089+0.3418i |
| w178 | 10110010 | −0.0716+0.4278i |
| w179 | 10110011 | −0.0731+0.3023i |
| w180 | 10110100 | −0.3534+0.4630i |
| w181 | 10110101 | −0.3625+0.3247i |
| w182 | 10110110 | −0.2134+0.4408i |
| w183 | 10110111 | −0.2183+0.3103i |
| w184 | 10111000 | −0.4984−0.4870i |
| w185 | 10111001 | −0.5089−0.3418i |
| w186 | 10111010 | −0.0716−0.4278i |
| w187 | 10111011 | −0.0731−0.3023i |
| w188 | 10111100 | −0.3534−0.4630i |
| w189 | 10111101 | −0.3625−0.3247i |
| w190 | 10111110 | −0.2134−0.4408i |
| w191 | 10111111 | −0.2183−0.3103i |
| w192 | 11000000 | +0.3004+1.2452i |
| w193 | 11000001 | +0.2967+1.0627i |
| w194 | 11000010 | +0.0994+1.2493i |
| w195 | 11000011 | +0.0947+1.0662i |
| w196 | 11000100 | +0.3452+1.4585i |
| w197 | 11000101 | +0.2650+0.9148i |
| w198 | 11000110 | +0.1137+1.4651i |
| w199 | 11000111 | +0.0895+0.8991i |
| w200 | 11001000 | +0.3004−1.2452i |
| w201 | 11001001 | +0.2967−1.0627i |
| w202 | 11001010 | +0.0994−1.2493i |
| w203 | 11001011 | +0.0947−1.0662i |
| w204 | 11001100 | +0.3452−1.4585i |
| w205 | 11001101 | +0.2650−0.9148i |
| w206 | 11001110 | +0.1137−1.4651i |
| w207 | 11001111 | +0.0895−0.8991i |
| w208 | 11010000 | +0.4787+0.6378i |
| w209 | 11010001 | +0.4439+0.7942i |
| w210 | 11010010 | +0.0688+0.5579i |
| w211 | 11010011 | +0.0550+0.6984i |
| w212 | 11010100 | +0.3328+0.6100i |
| w213 | 11010101 | +0.3014+0.7660i |
| w214 | 11010110 | +0.2008+0.5810i |
| w215 | 11010111 | +0.1623+0.7417i |
| w216 | 11011000 | +0.4787−0.6378i |
| w217 | 11011001 | +0.4439−0.7942i |
| w218 | 11011010 | +0.0688−0.5579i |
| w219 | 11011011 | +0.0550−0.6984i |
| w220 | 11011100 | +0.3328−0.6100i |
| w221 | 11011101 | +0.3014−0.7660i |
| w222 | 11011110 | +0.2008−0.5810i |
| w223 | 11011111 | +0.1623−0.7417i |
| w224 | 11100000 | +0.5146−0.0676i |
| w225 | 11100001 | +0.5128+0.2035i |
| w226 | 11100010 | +0.0738+0.0604i |
| w227 | 11100011 | +0.0736+0.1802i |
| w228 | 11100100 | +0.3680−0.0641i |
| w229 | 11100101 | +0.3662+0.1927i |
| w230 | 11100110 | +0.2211+0.0614i |
| w231 | 11100111 | +0.2203+0.1844i |
| w232 | 11101000 | +0.5146−0.0676i |
| w233 | 11101001 | +0.5128−0.2035i |
| w234 | 11101010 | +0.0738−0.0604i |
| w235 | 11101011 | +0.0736−0.1802i |
| w236 | 11101100 | +0.3680−0.0641i |
| w237 | 11101101 | +0.3662−0.1927i |
| w238 | 11101110 | +0.2211−0.0614i |
| w239 | 11101111 | +0.2203−0.1844i |
| w240 | 11110000 | +0.4984+0.4870i |
| w241 | 11110001 | +0.5089+0.3418i |
| w242 | 11110010 | +0.0716+0.4278i |
| w243 | 11110011 | +0.0731+0.3023i |
| w244 | 11110100 | +0.3534+0.4630i |
| w245 | 11110101 | +0.3625+0.3247i |
| w246 | 11110110 | +0.2134+0.4408i |
| w247 | 11110111 | +0.2183+0.3103i |
| w248 | 11111000 | +0.4984−0.4870i |
| w249 | 11111001 | +0.5089−0.3418i |
| w250 | 11111010 | +0.0716−0.4278i |
| w251 | 11111011 | +0.0731−0.3023i |
| w252 | 11111100 | +0.3534−0.4630i |
| w253 | 11111101 | +0.3625−0.3247i |
| w254 | 11111110 | +0.2134−0.4408i |
| w255 | 11111111 | +0.2183−0.3103i | or
for MCS=9 (or 8):

| w index | bit label | Constellation point |
| --- | --- | --- |
| w0 | 0000000 | −0.5039+1.2055i |
| w1 | 0000000 | +0.5039+1.2055i |
| w2 | 0000001 | −0.6629+0.0713i |
| w3 | 0000001 | +0.6629+0.0713i |
| w4 | 0000010 | −0.5781+1.4095i |
| w5 | 0000010 | +0.5781+1.4095i |
| w6 | 0000011 | −0.8160+0.0736i |
| w7 | 0000011 | +0.8160+0.0736i |
| w8 | 0000100 | −0.3004+1.2452i |
| w9 | 0000100 | +0.3004+1.2452i |
| w10 | 0000101 | −0.5146−0.0676i |
| w11 | 0000101 | +0.5146−0.0676i |
| w12 | 0000110 | −0.3452+1.4585i |
| w13 | 0000110 | +0.3452+1.4585i |
| w14 | 0000111 | −0.3680+0.0641i |
| w15 | 0000111 | +0.3680+0.0641i |
| w16 | 0001000 | −1.1657+1.0793i |
| w17 | 0001000 | +1.1657+1.0793i |
| w18 | 0001001 | −1.4228+0.1199i |
| w19 | 0001001 | +1.4228+0.1199i |
| w20 | 0001010 | −0.7876+1.2931i |
| w21 | 0001010 | +0.7876+1.2931i |
| w22 | 0001011 | −0.9811+0.0673i |
| w23 | 0001011 | +0.9811+0.0673i |
| w24 | 0001100 | −0.0994+1.2493i |
| w25 | 0001100 | +0.0994+1.2493i |
| w26 | 0001101 | −0.0738+0.0604i |
| w27 | 0001101 | +0.0738+0.0604i |
| w28 | 0001110 | −0.1137+1.4651i |
| w29 | 0001110 | +0.1137+1.4651i |
| w30 | 0001111 | −0.2211+0.0614i |

| w index | bit label | Constellation point | | w index | bit label | Constellation point |
|---|---|---|---|---|---|---|
| w31 | 0001111 | +0.2211+0.0614i | | w108 | 01101100 | −0.3328−0.6100i |
| w32 | 0010000 | −0.5039−1.2055i | | w109 | 01101101 | +0.3328−0.6100i |
| w33 | 0010000 | +0.5039−1.2055i | | w110 | 01101110 | −0.3534−0.4630i |
| w34 | 0010001 | −0.6629−0.0713i | | w111 | 01101111 | +0.3534−0.4630i |
| w35 | 0010001 | +0.6629−0.0713i | | w112 | 01110000 | −1.2060−0.5685i |
| w36 | 0010010 | −0.5781−1.4095i | | w113 | 01110001 | +1.2060−0.5685i |
| w37 | 0010010 | +0.5781−1.4095i | | w114 | 01110010 | −1.4186−0.3682i |
| w38 | 0010011 | −0.8160−0.0736i | | w115 | 01110011 | +1.4186−0.3682i |
| w39 | 0010011 | +0.8160−0.0736i | | w116 | 01110100 | −1.0100−0.6965i |
| w40 | 0010100 | −0.3004−1.2452i | | w117 | 01110101 | +1.0100−0.6965i |
| w41 | 0010100 | +0.3004−1.2452i | | w118 | 01110110 | −0.9802−0.5258i |
| w42 | 0010101 | −0.5146−0.0676i | | w119 | 01110111 | +0.9802−0.5258i |
| w43 | 0010101 | +0.5146−0.0676i | | w120 | 01111000 | −0.0688−0.5579i |
| w44 | 0010110 | −0.3452−1.4585i | | w121 | 01111001 | +0.0688−0.5579i |
| w45 | 0010110 | +0.3452−1.4585i | | w122 | 01111010 | −0.0716−0.4278i |
| w46 | 0010111 | −0.3680−0.0641i | | w123 | 01111011 | +0.0716−0.4278i |
| w47 | 0010111 | +0.3680−0.0641i | | w124 | 01111100 | −0.2008−0.5810i |
| w48 | 0011000 | −1.1657−1.0793i | | w125 | 01111101 | +0.2008−0.5810i |
| w49 | 0011000 | +1.1657−1.0793i | | w126 | 01111110 | −0.2134−0.4408i |
| w50 | 0011001 | −1.4228−0.1199i | | w127 | 01111111 | +0.2134−0.4408i |
| w51 | 0011001 | +1.4228−0.1199i | | w128 | 10000000 | −0.4884+1.0092i |
| w52 | 0011010 | −0.7876−1.2931i | | w129 | 10000001 | +0.4884+1.0092i |
| w53 | 0011010 | +0.7876−1.2931i | | w130 | 10000010 | −0.6641+0.2135i |
| w54 | 0011011 | −0.9811−0.0673i | | w131 | 10000011 | +0.6641+0.2135i |
| w55 | 0011011 | +0.9811−0.0673i | | w132 | 10000100 | −0.6891+1.0532i |
| w56 | 0011100 | −0.0994−1.2493i | | w133 | 10000101 | +0.6891+1.0532i |
| w57 | 0011100 | +0.0994−1.2493i | | w134 | 10000110 | −0.8280+0.2196i |
| w58 | 0011101 | −0.0738−0.0604i | | w135 | 10000111 | +0.8280+0.2196i |
| w59 | 0011101 | +0.0738−0.0604i | | w136 | 10001000 | −0.2967+1.0627i |
| w60 | 0011110 | −0.1137−1.4651i | | w137 | 10001001 | +0.2967+1.0627i |
| w61 | 0011110 | +0.1137−1.4651i | | w138 | 10001010 | −0.5128+0.2035i |
| w62 | 0011111 | −0.2211−0.0614i | | w139 | 10001011 | +0.5128+0.2035i |
| w63 | 0011111 | +0.2211−0.0614i | | w140 | 10001100 | −0.2650+0.9148i |
| w64 | 01000000 | −0.6346+0.6721i | | w141 | 10001101 | +0.2650+0.9148i |
| w65 | 01000001 | +0.6346+0.6721i | | w142 | 10001110 | −0.3662+0.1927i |
| w66 | 01000010 | −0.6511+0.5096i | | w143 | 10001111 | +0.3662+0.1927i |
| w67 | 01000011 | +0.6511+0.5096i | | w144 | 10010000 | −1.2385+0.8387i |
| w68 | 01000100 | −0.8075+0.6969i | | w145 | 10010001 | +1.2385+0.8387i |
| w69 | 01000101 | +0.8075+0.6969i | | w146 | 10010010 | −1.2036+0.1064i |
| w70 | 01000110 | −0.8111+0.5264i | | w147 | 10010011 | +1.2036+0.1064i |
| w71 | 01000111 | +0.8111+0.5264i | | w148 | 10010100 | −0.8990+1.0937i |
| w72 | 01001000 | −0.4787+0.6378i | | w149 | 10010101 | +0.8990+1.0937i |
| w73 | 01001001 | +0.4787+0.6378i | | w150 | 10010110 | −1.0114+0.2066i |
| w74 | 01001010 | −0.4984+0.4870i | | w151 | 10010111 | +1.0114+0.2066i |
| w75 | 01001011 | +0.4984+0.4870i | | w152 | 10011000 | −0.0947+1.0662i |
| w76 | 01001100 | −0.3328+0.6100i | | w153 | 10011001 | +0.0947+1.0662i |
| w77 | 01001101 | +0.3328+0.6100i | | w154 | 10011010 | −0.0736+0.1802i |
| w78 | 01001110 | −0.3534+0.4630i | | w155 | 10011011 | +0.0736+0.1802i |
| w79 | 01001111 | +0.3534+0.4630i | | w156 | 10011100 | −0.0895+0.8991i |
| w80 | 01010000 | −1.2060+0.5685i | | w157 | 10011101 | +0.0895+0.8991i |
| w81 | 01010001 | +1.2060+0.5685i | | w158 | 10011110 | −0.2203+0.1844i |
| w82 | 01010010 | −1.4186+0.3682i | | w159 | 10011111 | +0.2203+0.1844i |
| w83 | 01010011 | +1.4186+0.3682i | | w160 | 10100000 | −0.4884−1.0092i |
| w84 | 01010100 | −1.0100+0.6965i | | w161 | 10100001 | +0.4884−1.0092i |
| w85 | 01010101 | +1.0100+0.6965i | | w162 | 10100010 | −0.6641−0.2135i |
| w86 | 01010110 | −0.9802+0.5258i | | w163 | 10100011 | +0.6641−0.2135i |
| w87 | 01010111 | +0.9802+0.5258i | | w164 | 10100100 | −0.6891−1.0532i |
| w88 | 01011000 | −0.0688+0.5579i | | w165 | 10100101 | +0.6891−1.0532i |
| w89 | 01011001 | +0.0688+0.5579i | | w166 | 10100110 | −0.8280−0.2196i |
| w90 | 01011010 | −0.0716+0.4278i | | w167 | 10100111 | +0.8280−0.2196i |
| w91 | 01011011 | +0.0716+0.4278i | | w168 | 10101000 | −0.2967−1.0627i |
| w92 | 01011100 | −0.2008+0.5810i | | w169 | 10101001 | +0.2967−1.0627i |
| w93 | 01011101 | +0.2008+0.5810i | | w170 | 10101010 | −0.5128−0.2035i |
| w94 | 01011110 | −0.2134+0.4408i | | w171 | 10101011 | +0.5128−0.2035i |
| w95 | 01011111 | +0.2134+0.4408i | | w172 | 10101100 | −0.2650−0.9148i |
| w96 | 01100000 | −0.6346−0.6721i | | w173 | 10101101 | +0.2650−0.9148i |
| w97 | 01100001 | +0.6346−0.6721i | | w174 | 10101110 | −0.3662−0.1927i |
| w98 | 01100010 | −0.6511−0.5096i | | w175 | 10101111 | +0.3662−0.1927i |
| w99 | 01100011 | +0.6511−0.5096i | | w176 | 10110000 | −1.2385−0.8387i |
| w100 | 01100100 | −0.8075−0.6969i | | w177 | 10110001 | +1.2385−0.8387i |
| w101 | 01100101 | +0.8075−0.6969i | | w178 | 10110010 | −1.2036−0.1064i |
| w102 | 01100110 | −0.8111−0.5264i | | w179 | 10110011 | +1.2036−0.1064i |
| w103 | 01100111 | +0.8111−0.5264i | | w180 | 10110100 | −0.8990−1.0937i |
| w104 | 01101000 | −0.4787−0.6378i | | w181 | 10110101 | +0.8990−1.0937i |
| w105 | 01101001 | +0.4787−0.6378i | | w182 | 10110110 | −1.0114−0.2066i |
| w106 | 01101010 | −0.4984−0.4870i | | w183 | 10110111 | +1.0114−0.2066i |
| w107 | 01101011 | +0.4984−0.4870i | | w184 | 10111000 | −0.0947−1.0662i |

-continued

| w index | bit label | Constellation point |
|---|---|---|
| w185 | 10111001 | +0.0947−1.0662i |
| w186 | 10111010 | −0.0736−0.1802i |
| w187 | 10111011 | +0.0736−0.1802i |
| w188 | 10111100 | −0.0895−0.8991i |
| w189 | 10111101 | +0.0895−0.8991i |
| w190 | 10111110 | −0.2203−0.1844i |
| w191 | 10111111 | +0.2203−0.1844i |
| w192 | 11000000 | −0.5902+0.8432i |
| w193 | 11000001 | +0.5902+0.8432i |
| w194 | 11000010 | −0.6617+0.3573i |
| w195 | 11000011 | +0.6617+0.3573i |
| w196 | 11000100 | −0.7660+0.8734i |
| w197 | 11000101 | +0.7660+0.8734i |
| w198 | 11000110 | −0.8276+0.3658i |
| w199 | 11000111 | +0.8276+0.3658i |
| w200 | 11001000 | −0.4439+0.7942i |
| w201 | 11001001 | +0.4439+0.7942i |
| w202 | 11001010 | −0.5089+0.3418i |
| w203 | 11001011 | +0.5089+0.3418i |
| w204 | 11001100 | −0.3014+0.7660i |
| w205 | 11001101 | +0.3014+0.7660i |
| w206 | 11001110 | −0.3625+0.3247i |
| w207 | 11001111 | +0.3625+0.3247i |
| w208 | 11010000 | −1.4112+0.6488i |
| w209 | 11010001 | +1.4112+0.6488i |
| w210 | 11010010 | −1.2116+0.3184i |
| w211 | 11010011 | +1.2116+0.3184i |
| w212 | 11010100 | −0.9651+0.8870i |
| w213 | 11010101 | +0.9651+0.8870i |
| w214 | 11010110 | −1.0181+0.3668i |
| w215 | 11010111 | +1.0181+0.3668i |
| w216 | 11011000 | −0.0550+0.6984i |
| w217 | 11011001 | +0.0550+0.6984i |
| w218 | 11011010 | −0.0731+0.3023i |
| w219 | 11011011 | +0.0731+0.3023i |
| w220 | 11011100 | −0.1623+0.7417i |
| w221 | 11011101 | +0.1623+0.7417i |
| w222 | 11011110 | −0.2183+0.3103i |
| w223 | 11011111 | +0.2183+0.3103i |

-continued

| w index | bit label | Constellation point |
|---|---|---|
| w224 | 11100000 | −0.5902−0.8432i |
| w225 | 11100001 | +0.5902−0.8432i |
| w226 | 11100010 | −0.6617−0.3573i |
| w227 | 11100011 | +0.6617−0.3573i |
| w228 | 11100100 | −0.7660−0.8734i |
| w229 | 11100101 | +0.7660−0.8734i |
| w230 | 11100110 | −0.8276−0.3658i |
| w231 | 11100111 | +0.8276−0.3658i |
| w232 | 11101000 | −0.4439−0.7942i |
| w233 | 11101001 | +0.4439−0.7942i |
| w234 | 11101010 | −0.5089−0.3418i |
| w235 | 11101011 | +0.5089−0.3418i |
| w236 | 11101100 | −0.3014−0.7660i |
| w237 | 11101101 | +0.3014−0.7660i |
| w238 | 11101110 | −0.3625−0.3247i |
| w239 | 11101111 | +0.3625−0.3247i |
| w240 | 11110000 | −1.4112−0.6488i |
| w241 | 11110001 | +1.4112−0.6488i |
| w242 | 11110010 | −1.2116−0.3184i |
| w243 | 11110011 | +1.2116−0.3184i |
| w244 | 11110100 | −0.9651−0.8870i |
| w245 | 11110101 | +0.9651−0.8870i |
| w246 | 11110110 | −1.0181−0.3668i |
| w247 | 11110111 | +1.0181−0.3668i |
| w248 | 11111000 | −0.0550−0.6984i |
| w249 | 11111001 | +0.0550−0.6984i |
| w250 | 11111010 | −0.0731−0.3023i |
| w251 | 11111011 | +0.0731−0.3023i |
| w252 | 11111100 | −0.1623−0.7417i |
| w253 | 11111101 | +0.1623−0.7417i |
| w254 | 11111110 | −0.2183−0.3103i |
| w255 | 11111111 | +0.2183−0.3103i |

C) 1024-QAM non-uniform constellations of group C for BCC encoding:

C1) for code rate 2/3 (or 3/4 or 7/8)), where $z_q$ is a complex constellation point having a real part and an imaginary part

| real part | | | | | | | | | | | | | | | | | |
|---|---|---|---|---|---|---|---|---|---|---|---|---|---|---|---|---|---|
| $b_2$ | 0 | 0 | 0 | 0 | 0 | 0 | 0 | 0 | 0 | 0 | 0 | 0 | 0 | 0 | 0 | 0 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 0 | 0 | 0 | 0 | 0 | 0 | 1 | 1 | 1 | 1 | 1 | 1 | 1 | 1 | 1 | |
| $\mathrm{Re}(z_q)$ | −31 | −29 | −27 | −25 | −23 | −21 | −19 | −17 | −15 | −13 | −11 | −9 | −7 | −5 | −3 | −1 | Uniform |
|  | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_2$ | 1 | 1 | 1 | 1 | 1 | 1 | 1 | 1 | 1 | 1 | 1 | 1 | 1 | 1 | 1 | 1 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 1 | 1 | 1 | 1 | 1 | 1 | 1 | 1 | 0 | 0 | 0 | 0 | 0 | 0 | 0 | 0 | |
| $\mathrm{Re}(z_q)$ | 1 | 3 | 5 | 7 | 9 | 11 | 13 | 15 | 17 | 19 | 21 | 23 | 25 | 27 | 29 | 31 | Uniform |
|  | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |

| imaginary part | | | | | | | | | | | | | | | | | |
|---|---|---|---|---|---|---|---|---|---|---|---|---|---|---|---|---|---|
| $b_0$ | 0 | 0 | 0 | 0 | 0 | 0 | 0 | 0 | 1 | 1 | 1 | 1 | 1 | 1 | 1 | 1 | |
| $b_1$ | 0 | 0 | 1 | 1 | 1 | 1 | 0 | 0 | 0 | 0 | 1 | 1 | 1 | 1 | 0 | 0 | |
| $b_5$ | 0 | 0 | 0 | 0 | 0 | 0 | 0 | 0 | 0 | 0 | 0 | 0 | 0 | 0 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $\mathrm{Im}(z_q)$ | −31 | −29 | −27 | −25 | −23 | −21 | −19 | −17 | −15 | −13 | −11 | −9 | −7 | −5 | −3 | −1 | Uniform |
|  | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 1 | 1 | 1 | 1 | 1 | 1 | 1 | 1 | 0 | 0 | 0 | 0 | 0 | 0 | 0 | 0 | |
| $b_1$ | 0 | 0 | 1 | 1 | 1 | 1 | 0 | 0 | 0 | 0 | 1 | 1 | 1 | 1 | 0 | 0 | |
| $b_5$ | 1 | 1 | 1 | 1 | 1 | 1 | 1 | 1 | 1 | 1 | 1 | 1 | 1 | 1 | 1 | 1 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $\mathrm{Im}(z_q)$ | 1 | 3 | 5 | 7 | 9 | 11 | 13 | 15 | 17 | 19 | 21 | 23 | 25 | 27 | 29 | 31 | Uniform |
|  | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041;

C2) for code rate 3/4 (or 2/3 or 7/8)), where $z_q$ is a complex constellation point having a real part and an imaginary part real part

| | | | | | | | | | | | | | | | | | |
|---|---|---|---|---|---|---|---|---|---|---|---|---|---|---|---|---|---|
| $b_0$ | 0 | 0 | 1 | 1 | 1 | 1 | 0 | 0 | 0 | 0 | 1 | 1 | 1 | 1 | 0 | 0 | |
| $b_1$ | 0 | 0 | 0 | 0 | 0 | 0 | 0 | 0 | 0 | 0 | 0 | 0 | 0 | 0 | 0 | 0 | |
| $b_3$ | 0 | 0 | 0 | 0 | 0 | 0 | 0 | 0 | 1 | 1 | 1 | 1 | 1 | 1 | 1 | 1 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 0 | 0 | 1 | 1 | 1 | 1 | 1 | 1 | 1 | 1 | 0 | 0 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 0 | 1 | 1 | 1 | 1 | 0 | 0 | 0 | 0 | 1 | 1 | 1 | 1 | 0 | 0 | |
| $b_1$ | 1 | 1 | 1 | 1 | 1 | 1 | 1 | 1 | 1 | 1 | 1 | 1 | 1 | 1 | 1 | 1 | |
| $b_3$ | 1 | 1 | 1 | 1 | 1 | 1 | 1 | 1 | 0 | 0 | 0 | 0 | 0 | 0 | 0 | 0 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | | |
|---|---|---|---|---|---|---|---|---|---|---|---|---|---|---|---|---|---|
| $b_2$ | 0 | 0 | 0 | 0 | 0 | 0 | 0 | 0 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_2$ | 1 | 1 | 1 | 1 | 1 | 1 | 1 | 1 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0001, 5.0203, 7.0622, 9.1446, 11.2738, 13.4672, 15.7360, 18.0975, 20.5669, 23.1643, 25.9119, 28.8399, 31.9932, 35.4479, 39.3783;

C3) for code rate 7/8 (or 2/3 or 3/4)), where $z_q$ is a complex constellation point having a real part and an imaginary part real part

| | | | | | | | | | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 0 | 0 | 0 | 0 | 1 | 1 | 1 | 1 | 1 | 1 | 1 | 1 | |
| $b_3$ | 0 | 0 | 0 | 0 | 0 | 0 | 0 | 0 | 0 | 0 | 0 | 0 | 0 | 0 | 0 | 0 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_1$ | 1 | 1 | 1 | 1 | 1 | 1 | 1 | 1 | 0 | 0 | 0 | 0 | 0 | 0 | 0 | 0 | |
| $b_3$ | 1 | 1 | 1 | 1 | 1 | 1 | 1 | 1 | 1 | 1 | 1 | 1 | 1 | 1 | 1 | 1 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | |
|---|---|---|---|---|---|---|---|---|---|---|---|---|---|---|---|---|
| $b_2$ | 0 | 1 | 1 | 0 | 0 | 1 | 1 | 0 | 0 | 1 | 1 | 0 | 0 | 1 | 1 | 0 |
| $b_5$ | 0 | 0 | 0 | 0 | 0 | 0 | 0 | 0 | 0 | 0 | 0 | 0 | 0 | 0 | 0 | 0 |
| $b_6$ | 0 | 0 | 0 | 0 | 1 | 1 | 1 | 1 | 1 | 1 | 1 | 1 | 0 | 0 | 0 | 0 |
| $b_8$ | 0 | 0 | 1 | 1 | 1 | 1 | 0 | 0 | 0 | 0 | 1 | 1 | 1 | 1 | 0 | 0 |
| $b_9$ | 0 | 0 | 0 | 0 | 0 | 0 | 0 | 0 | 1 | 1 | 1 | 1 | 1 | 1 | 1 | 1 |

-continued

| | | | | | | | | | | | | | | | | |
|---|---|---|---|---|---|---|---|---|---|---|---|---|---|---|---|---|
| $Im(z_q)$ | -31 | -29 | -27 | -25 | -23 | -21 | -19 | -17 | -15 | -13 | -11 | -9 | -7 | -5 | -3 | -1 Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | -1 NUC |
| $b_2$ | 0 | 1 | 1 | 0 | 0 | 1 | 1 | 0 | 0 | 1 | 1 | 0 | 0 | 1 | 1 | 0 |
| $b_5$ | 1 | 1 | 1 | 1 | 1 | 1 | 1 | 1 | 1 | 1 | 1 | 1 | 1 | 1 | 1 | 1 |
| $b_6$ | 0 | 0 | 0 | 0 | 1 | 1 | 1 | 1 | 1 | 1 | 1 | 1 | 0 | 0 | 0 | 0 |
| $b_8$ | 0 | 0 | 1 | 1 | 1 | 1 | 0 | 0 | 0 | 0 | 1 | 1 | 1 | 1 | 0 | 0 |
| $b_9$ | 1 | 1 | 1 | 1 | 1 | 1 | 1 | 1 | 0 | 0 | 0 | 0 | 0 | 0 | 0 | 0 |
| $Im(z_q)$ | 1 | 3 | 5 | 7 | 9 | 11 | 13 | 15 | 17 | 19 | 21 | 23 | 25 | 27 | 29 | 31 Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041;

D) 1024-QAM non-uniform constellations of group D for LDPC encoding:

D1) for code rate 2/3 (or 2/3 or 5/6)), where $z_q$ is a complex constellation point having a real part and an imaginary part real part

| | | | | | | | | | | | | | | | | |
|---|---|---|---|---|---|---|---|---|---|---|---|---|---|---|---|---|
| $b_1$ | 0 | 1 | 1 | 0 | 0 | 1 | 1 | 0 | 0 | 1 | 1 | 0 | 0 | 1 | 1 | 0 |
| $b_2$ | 0 | 0 | 0 | 0 | 0 | 0 | 0 | 0 | 1 | 1 | 1 | 1 | 1 | 1 | 1 | 1 |
| $b_3$ | 0 | 0 | 1 | 1 | 1 | 1 | 0 | 0 | 0 | 0 | 1 | 1 | 1 | 1 | 0 | 0 |
| $b_6$ | 0 | 0 | 0 | 0 | 0 | 0 | 0 | 0 | 0 | 0 | 0 | 0 | 0 | 0 | 0 | 0 |
| $b_7$ | 0 | 0 | 0 | 0 | 1 | 1 | 1 | 1 | 1 | 1 | 1 | 1 | 0 | 0 | 0 | 0 |
| $Re(z_q)$ | -31 | -29 | -27 | -25 | -23 | -21 | -19 | -17 | -15 | -13 | -11 | -9 | -7 | -5 | -3 | -1 Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | -1 NUC |
| $b_1$ | 0 | 1 | 1 | 0 | 0 | 1 | 1 | 0 | 0 | 1 | 1 | 0 | 0 | 1 | 1 | 0 |
| $b_2$ | 1 | 1 | 1 | 1 | 1 | 1 | 1 | 1 | 0 | 0 | 0 | 0 | 0 | 0 | 0 | 0 |
| $b_3$ | 0 | 0 | 1 | 1 | 1 | 1 | 0 | 0 | 0 | 0 | 1 | 1 | 1 | 1 | 0 | 0 |
| $b_6$ | 1 | 1 | 1 | 1 | 1 | 1 | 1 | 1 | 1 | 1 | 1 | 1 | 1 | 1 | 1 | 1 |
| $b_7$ | 0 | 0 | 0 | 0 | 1 | 1 | 1 | 1 | 1 | 1 | 1 | 1 | 0 | 0 | 0 | 0 |
| $Re(z_q)$ | 1 | 3 | 5 | 7 | 9 | 11 | 13 | 15 | 17 | 19 | 21 | 23 | 25 | 27 | 29 | 31 Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ NUC | imaginary part

| | | | | | | | | | | | | | | | | |
|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 |
| $b_4$ | 0 | 0 | 1 | 1 | 1 | 1 | 0 | 0 | 0 | 0 | 1 | 1 | 1 | 1 | 0 | 0 |
| $b_5$ | 0 | 0 | 0 | 0 | 0 | 0 | 0 | 0 | 0 | 0 | 0 | 0 | 0 | 0 | 0 | 0 |
| $b_8$ | 0 | 0 | 0 | 0 | 1 | 1 | 1 | 1 | 1 | 1 | 1 | 1 | 0 | 0 | 0 | 0 |
| $b_9$ | 0 | 0 | 0 | 0 | 0 | 0 | 0 | 0 | 1 | 1 | 1 | 1 | 1 | 1 | 1 | 1 |
| $Im(z_q)$ | -31 | -29 | -27 | -25 | -23 | -21 | -19 | -17 | -15 | -13 | -11 | -9 | -7 | -5 | -3 | -1 Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | -1 NUC |
| $b_0$ | 0 | 1 | 1 | 0 | 0 | 1 | 1 | 0 | 0 | 1 | 1 | 0 | 0 | 1 | 1 | 0 |
| $b_4$ | 0 | 0 | 1 | 1 | 1 | 1 | 0 | 0 | 0 | 0 | 1 | 1 | 1 | 1 | 0 | 0 |
| $b_5$ | 1 | 1 | 1 | 1 | 1 | 1 | 1 | 1 | 1 | 1 | 1 | 1 | 1 | 1 | 1 | 1 |
| $b_8$ | 0 | 0 | 0 | 0 | 1 | 1 | 1 | 1 | 1 | 1 | 1 | 1 | 0 | 0 | 0 | 0 |
| $b_9$ | 1 | 1 | 1 | 1 | 1 | 1 | 1 | 1 | 0 | 0 | 0 | 0 | 0 | 0 | 0 | 0 |
| $Im(z_q)$ | 1 | 3 | 5 | 7 | 9 | 11 | 13 | 15 | 17 | 19 | 21 | 23 | 25 | 27 | 29 | 31 Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ NUC | wherein the values for $u_1, \ldots, u_{15}$ are:
2.0047, 3.9822, 5.1633, 7.0998, 8.5600, 10.4887, 12.2428, 14.2618, 16.3225, 18.5947, 21.0696, 23.8248, 26.9139, 30.4303, 34.5872;

D2) for code rate 3/4 (or 2/3 or 5/6)), where $z_q$ is a complex constellation point having a real part and an imaginary part real part

| | | | | | | | | | | | | | | | | |
|---|---|---|---|---|---|---|---|---|---|---|---|---|---|---|---|---|
| $b_3$ | 0 | 1 | 1 | 0 | 0 | 1 | 1 | 0 | 0 | 1 | 1 | 0 | 0 | 1 | 1 | 0 |
| $b_4$ | 0 | 0 | 0 | 0 | 1 | 1 | 1 | 1 | 1 | 1 | 1 | 1 | 0 | 0 | 0 | 0 |
| $b_5$ | 0 | 0 | 1 | 1 | 1 | 1 | 0 | 0 | 0 | 0 | 1 | 1 | 1 | 1 | 0 | 0 |
| $b_8$ | 0 | 0 | 0 | 0 | 0 | 0 | 0 | 0 | 0 | 0 | 0 | 0 | 0 | 0 | 0 | 0 |
| $b_9$ | 0 | 0 | 0 | 0 | 0 | 0 | 0 | 0 | 1 | 1 | 1 | 1 | 1 | 1 | 1 | 1 |
| $Re(z_q)$ | -31 | -29 | -27 | -25 | -23 | -21 | -19 | -17 | -15 | -13 | -11 | -9 | -7 | -5 | -3 | -1 Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | -1 NUC |

-continued

| | | | | | | | | | | | | | | | | | |
|---|---|---|---|---|---|---|---|---|---|---|---|---|---|---|---|---|---|
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_8$ | 1 | 1 | 1 | 1 | 1 | 1 | 1 | 1 | 1 | 1 | 1 | 1 | 1 | 1 | 1 | 1 | |
| $b_9$ | 1 | 1 | 1 | 1 | 1 | 1 | 1 | 1 | 0 | 0 | 0 | 0 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |

| imaginary part | | | | | | | | | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 0 | 0 | 0 | 0 | 0 | 0 | 0 | 0 | 1 | 1 | 1 | 1 | 1 | 1 | 1 | 1 | |
| $b_7$ | 0 | 0 | 0 | 0 | 0 | 0 | 0 | 0 | 0 | 0 | 0 | 0 | 0 | 0 | 0 | 0 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 1 | 1 | 1 | 1 | 1 | 1 | 1 | 1 | 0 | 0 | 0 | 0 | 0 | 0 | 0 | 0 | |
| $b_7$ | 1 | 1 | 1 | 1 | 1 | 1 | 1 | 1 | 1 | 1 | 1 | 1 | 1 | 1 | 1 | 1 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9667, 4.9871, 7.0015, 9.0819, 11.1960, 13.3951, 15.6735, 18.0691, 20.5980, 23.2914, 26.1728, 29.2806, 32.6657, 36.4161, 40.7366;
D3) code rate 5/6 (or 2/3 or 3/4)), where $z_q$ is a complex constellation point having a real part and an imaginary part

| real part | | | | | | | | | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_3$ | 0 | 0 | 0 | 0 | 0 | 0 | 0 | 0 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 0 | 0 | 0 | 0 | 0 | 0 | 0 | 0 | 0 | 0 | 0 | 0 | |
| $b_8$ | 0 | 0 | 0 | 0 | 1 | 1 | 1 | 1 | 1 | 1 | 1 | 1 | 0 | 0 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_3$ | 1 | 1 | 1 | 1 | 1 | 1 | 1 | 1 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 1 | 1 | 1 | 1 | 1 | 1 | 1 | 1 | 1 | 1 | 1 | 1 | 1 | 1 | 1 | 1 | |
| $b_8$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |

| imaginary part | | | | | | | | | | | | | | | | | |
|---|---|---|---|---|---|---|---|---|---|---|---|---|---|---|---|---|---|
| $b_1$ | 0 | 0 | 0 | 0 | 0 | 0 | 0 | 0 | 1 | 1 | 1 | 1 | 1 | 1 | 1 | 1 | |
| $b_2$ | 0 | 0 | 0 | 0 | 1 | 1 | 1 | 1 | 1 | 1 | 1 | 1 | 0 | 0 | 0 | 0 | |
| $b_4$ | 0 | 0 | 0 | 0 | 0 | 0 | 0 | 0 | 0 | 0 | 0 | 0 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_1$ | 1 | 1 | 1 | 1 | 1 | 1 | 1 | 1 | 0 | 0 | 0 | 0 | 0 | 0 | 0 | 0 | |
| $b_2$ | 0 | 0 | 0 | 0 | 1 | 1 | 1 | 1 | 1 | 1 | 1 | 1 | 0 | 0 | 0 | 0 | |
| $b_4$ | 1 | 1 | 1 | 1 | 1 | 1 | 1 | 1 | 1 | 1 | 1 | 1 | 1 | 1 | 1 | 1 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9902, 5.0100, 7.0446, 9.1283, 11.2570, 13.4588, 15.7417, 18.1292, 20.6379, 23.2916, 26.1151, 29.1412, 32.4176, 36.0267, 40.1583;
wherein the bit labeling indicated in groups A to D may alternatively be inverted for one or more bit labels.

6. A transmission apparatus comprising:
a coding and modulation apparatus as claimed in claim 1 configured to encode and modulate input data into constellation values,
a converter configured to convert said constellation values into one or more trans-mission streams to be transmitted, and
a transmitter configured to transmit said one or more transmission streams.

7. A transmission apparatus as claimed in claim 6, further comprising signaling circuitry configured to embed signalling information into the one or more transmission streams, said signalling information including information about the code used by the encoder, the total number M of constellation points of the constellation, the location of the constellation points and the code rate.

8. A transmission apparatus as claimed in claim 7, wherein said signaling circuitry is configured to embed signalling information into the one or more transmission streams, said signalling information including a modulation and coding, MCS, index information including information about the total number M of constellation points of the constellation and the code rate.

9. A transmission apparatus as claimed in claim 7, further comprising: modulation circuitry configured to select using a uniform constellation instead of one of said non-uniform constellations for modulating said cell words into constellation values,
wherein said signaling circuitry is configured to embed signalling information into the one or more transmission streams, said signalling information including constellation information indicating if a non-uniform constellation or a uniform constellation has been used for modulation.

10. A transmission apparatus as claimed in claim 7, wherein said signaling circuitry is configured to embed said signalling information at the beginning of frames, in particular of each frame, of a plurality of frames used for transmission of the one or more transmission streams.

11. A transmission apparatus as claimed in claim 7, wherein said signaling circuitry is configured to embed said signalling information into a SIG, L-SIG, HT-SIG, VHT-SIG or HE-SIG field.

12. A transmission method comprising:
a coding and modulation method as claimed in claim 5 that encodes and modulates input data into constellation values,
converting said constellation values into one or more transmission streams to be transmitted, and
transmitting said one or more transmission streams.

13. A demodulation and decoding apparatus comprising:
a demodulator configured to demodulate constellation values of a NUC (non-uniform constellation) into cell words and to assign bit combinations to constellation values of the used non-uniform constellation, and
a decoder configured to decode cell words into output data according to a BCC (binary convolutional code), or a LDPC (low density parity check code),
wherein said demodulator is configured to use, based on signalling information indicating the code used by an encoder, the total number M of constellation points of the constellation and the code rate,
i) a non-uniform constellation and bit labeling from a group A, if the encoder is configured to use a BCC code and if M=16, 64 or 256, the group A comprising constellations as defined in
sub-group A1 for 16-QAM with M=16 and code rates of 1/2 or 3/4,
sub-group A2 for 64-QAM with M=64 and code rates of 2/3, 3/4 or 5/6, and
sub-group A3 for 256-QAM with M=256 and code rates of 3/4 or 5/6,
wherein the constellation points are defined by a constellation position vector w0 . . . wM-1,
or
ii) a non-uniform constellation and bit labeling from a group B, if the encoder is configured to use a LDPC code and if M=16, 64 or 256, the group B comprising constellations as defined in
sub-group B1 for 16-QAM with M=16 and code rates of 1/2 or 3/4,
sub-group B2 for 64-QAM with M=64 and code rates of 2/3, 3/4 or 5/6, and
sub-group B3 for 256-QAM with M=256 and code rates of 3/4 or 5/6,
wherein the constellation points are defined by a constellation position vector w0 . . . wM-1,
or
iii) a non-uniform constellation and bit labeling from a group C, if the encoder is configured to use a BCC code and if M=1024 and a code rate of 2/3, 3/4 or 7/8, the group C comprising constellations C1, C2 and C3,
wherein the constellation points are defined by the constellation position vector u of length v=sqrt(M)/2−1,
or
iv) a non-uniform constellation and bit labeling from a group D, if the encoder is configured to use a LDPC code and if M=1024 and a code rate of 2/3, 3/4 or 5/6, the group D comprising constellations D1, D2, D3,
wherein the constellation points are defined by the constellation position vector u of length v=sqrt(M)/2−1,
wherein when said demodulator is configured to use a selected non-uniform constellation obtained from a constellation from anyone of groups A, B, C or D the demodulator may use the selected non-uniform constellation which has been modified through rotation by an angle around the origin, through inversion of bit labels for all constellation points, through interchanging of bit positions, through mirroring on any line in the complex plane and/or through predistortion for the con-stellation points,
wherein the constellation position vectors of the different constellations of the groups A, B, C, D of constellations are defined as follows:
A) M-QAM non-uniform constellations of group A for BCC encoding:
A1) 16-QAM NUC, where MCS is a modulation and coding scheme

| w | bit label | MCS = 3 (or 4) | MCS = 4 (or 3) |
|---|---|---|---|
| w0 | 0000 | +0.2918+0.2918i | +0.3063−0.3063i |
| w1 | 0001 | +0.9565+0.2918i | +0.3063+0.3063i |
| w2 | 0010 | −0.2918+0.2918i | +0.9519−0.3063i |
| w3 | 0011 | −0.9565+0.2918i | +0.9519+0.3063i |
| w4 | 0100 | +0.2918+0.9565i | −0.3063−0.3063i |
| w5 | 0101 | +0.9565+0.9565i | −0.3063+0.3063i |
| w6 | 0110 | −0.2918+0.9565i | −0.9519−0.3063i |
| w7 | 0111 | −0.9565+0.9565i | −0.9519+0.3063i |
| w8 | 1000 | +0.2918−0.2918i | +0.3063−0.9519i |
| w9 | 1001 | +0.9565−0.2918i | +0.3063+0.9519i |
| w10 | 1010 | −0.2918−0.2918i | +0.9519−0.9519i |
| w11 | 1011 | −0.9565−0.2918i | +0.9519+0.9519i |
| w12 | 1100 | +0.2918−0.9565i | −0.3063−0.9519i |
| w13 | 1101 | +0.9565−0.9565i | −0.3063+0.9519i |
| w14 | 1110 | −0.2918−0.9565i | −0.9519−0.9519i |
| w15 | 1111 | −0.9565−0.9565i | −0.9519+0.9519i |

A2) 64-QAM NUC

| w/ MCS index | bit label | MCS = 5 (or 6 or 7) | MCS = 6 (or 5 or 7) | MCS = 7 (or 5 or 6) |
|---|---|---|---|---|
| w0 | 000000 | +1.0474−0.1695i | +1.0432−0.1724i | +1.0297−0.1665i |
| w1 | 000001 | +0.7243−0.1504i | +0.7272−0.1538i | +0.1417−0.1412i |
| w2 | 000010 | −1.0474−0.1695i | +0.1428−0.1397i | −1.0297−0.1665i |

-continued

| w/MCS index | bit label | MCS = 5 (or 6 or 7) | MCS = 6 (or 5 or 7) | MCS = 7 (or 5 or 6) |
|---|---|---|---|---|
| w3 | 000011 | −0.7243−0.1504i | +0.4304−0.1474i | −0.1417−0.1412i |
| w4 | 000100 | +0.1407−0.1336i | −1.0432−0.1724i | +1.1116−0.5027i |
| w5 | 000101 | +0.4265−0.1388i | −0.7272−0.1538i | +0.1521−0.4258i |
| w6 | 000110 | −0.1407−0.1336i | −0.1428−0.1397i | −1.1116−0.5027i |
| w7 | 000111 | −0.4265−0.1388i | −0.4304−0.1474i | −0.1521−0.4258i |
| w8 | 001000 | +1.0474+0.1695i | +1.0432+0.1724i | +1.0297+0.1665i |
| w9 | 001001 | +0.7243+0.1504i | +0.7272+0.1538i | +0.1417+0.1412i |
| w10 | 001010 | −1.0474+0.1695i | +0.1428+0.1397i | −1.0297+0.1665i |
| w11 | 001011 | −0.7243+0.1504i | +0.4304+0.1474i | −0.1417+0.1412i |
| w12 | 001100 | +0.1407+0.1336i | −1.0432+0.1724i | +1.1116+0.5027i |
| w13 | 001101 | +0.4265+0.1388i | −0.7272+0.1538i | +0.1521+0.4258i |
| w14 | 001110 | −0.1407+0.1336i | −0.142S+0.1397i | −1.1116+0.5027i |
| w15 | 001111 | −0.4265+0.1388i | −0.4304+0.1474i | −0.1521+0.4258i |
| w16 | 010000 | +1.4261−0.2216i | +1.1145−0.5358i | +0.7218−0.1633i |
| w17 | 010001 | +0.6106−1.1783i | +0.7705−0.4700i | +0.4281−0.1504i |
| w18 | 010010 | −1.4261−0.2216i | +0.1500−0.4221i | −0.7218−0.1633i |
| w19 | 010011 | −0.6106−1.1783i | +0.4537−0.4461i | −0.4281−0.1504i |
| w20 | 010100 | +0.1682−1.0316i | −1.1145−0.5358i | +0.7726−0.4955i |
| w21 | 010101 | +0.2287−1.3914i | −0.7705−0.4700i | +0.4581−0.4553i |
| w22 | 010110 | −0.1682−1.0316i | −0.1500−0.4221i | −0.7726−0.4955i |
| w23 | 010111 | −0.2287−1.3914i | −0.4537−0.4461i | −0.4581−0.4553i |
| w24 | 011000 | +1.4261+0.2216i | +1.1145+0.5358i | +0.7218+0.1633i |
| w25 | 011001 | +0.6106+1.1783i | +0.7705+0.4700i | +0.4281+0.1504i |
| w26 | 011010 | −1.4261+0.2216i | +0.1500+0.4221i | −0.7218+0.1633i |
| w27 | 011011 | −0.6106+1.1783i | +0.4537+0.4461i | −0.4281+0.1504i |
| w28 | 011100 | +0.1682+1.0316i | −1.1145+0.5358i | +0.7726+0.4955i |
| w29 | 011101 | +0.2287+1.3914i | −0.7705+0.4700i | +0.4581+0.4553i |
| w30 | 011110 | −0.1682+1.0316i | −0.1500+0.4221i | −0.7726+0.4955i |
| w31 | 011111 | −0.2287+1.3914i | −0.4537+0.4461i | −0.4581+0.4553i |
| w32 | 100000 | +1.0854−0.5394i | +1.3903−0.2023i | +1.3715−0.1909i |
| w33 | 100001 | +0.7353−0.4523i | +0.5830−1.1356i | +0.1700−1.0281i |
| w34 | 100010 | −1.0854−0.5394i | +0.1708−1.0248i | −1.3715−0.1909i |
| w35 | 100011 | −0.7353−0.4523i | +0.2191−1.3618i | −0.1700−1.0281i |
| w36 | 100100 | +0.1392−0.4078i | −1.3903−0.2023i | +1.1152−0.8599i |
| w37 | 100101 | +0.4262−0.4205i | −0.5830−1.1356i | +0.1524−0.7179i |
| w38 | 100110 | −0.1392−0.4078i | −0.1708−1.0248i | −1.1152−0.8599i |
| w39 | 100111 | −0.4262−0.4205i | −0.2191−1.3618i | −0.1524−0.7179i |
| w40 | 101000 | +1.0854+0.5394i | +1.3903+0.2023i | +1.3715+0.1909i |
| w41 | 101001 | +0.7353+0.4523i | +0.5830+1.1356i | +0.1700+1.0281i |
| w42 | 101010 | −1.0854+0.5394i | +0.1708+1.0248i | −1.3715+0.1909i |
| w43 | 101011 | −0.7353+0.4523i | +0.2191+1.3618i | −0.1700+1.0281i |
| w44 | 101100 | +0.1392+0.4078i | −1.3903+0.2023i | +1.1152+0.8599i |
| w45 | 101101 | +0.4262+0.4205i | −0.5830+1.1356i | +0.1524+0.7179i |
| w46 | 101110 | −0.1392+0.4078i | −0.1708+1.0248i | −1.1152+0.8599i |
| w47 | 101111 | −0.4262+0.4205i | −0.2191+1.3618i | −0.1524+0.7179i |
| w48 | 110000 | +1.0693−0.9408i | +1.0788−0.9275i | +0.5530−1.1489i |
| w49 | 110001 | +0.7092−0.8073i | +0.7608−0.8009i | +0.2033−1.3620i |
| w50 | 110010 | −1.0693−0.9408i | +0.1480−0.7122i | −0.5530−1.1489i |
| w51 | 110011 | −0.7092−0.8073i | +0.4498−0.7565i | −0.2033−1.3620i |
| w52 | 110100 | +0.1388−0.7057i | −1.0788−0.9275i | +0.7724−0.8458i |
| w53 | 110101 | +0.4197−0.7206i | −0.7608−0.8009i | +0.4596−0.7717i |
| w54 | 110110 | −0.1388−0.7057i | −0.1480−0.7122i | −0.7724−0.8458i |
| w55 | 110111 | −0.4197−0.7206i | −0.4498−0.7565i | −0.4596−0.7717i |
| w56 | 111000 | +1.0693+0.9408i | +1.0788+0.9275i | +0.5530+1.1489i |
| w57 | 111001 | +0.7092+08073i | +0.7608+0.8009i | +0.2033+1.3620i |
| w58 | 111010 | −1.0693+0.9408i | +0.1480+0.7122i | −0.5530+1.1489i |
| w59 | 111011 | −0.7092+0.8073i | +0.4498+0.7565i | −0.2033+1.3620i |
| w60 | 111100 | +0.1388+0.7057i | −1.0788+0.9275i | +0.7724+0.8458i |
| w61 | 111101 | +0.4197+0.7206i | −0.7608+0.8009i | +0.4596+0.7717i |
| w62 | 111110 | −0.1388+0.7057i | −0.1480+0.7122i | −0.7724+0.8458i |
| w63 | 111111 | −0.4197+0.7206i | −0.4498+0.7565i | −0.4596+0.7717i |

A3) 256-QAM NUC for MCS=8 (or 9):

| w index | bit label | Constellation point |
|---|---|---|
| w0 | 0000000 | −0.4905 + 1.1842i |
| w1 | 0000000 | −0.6911 + 0.6930i |
| w2 | 0000001 | −0.5982 + 1.0262i |
| w3 | 0000001 | −0.6740 + 0.8584i |
| w4 | 0000010 | +0.4905 + 1.1842i |
| w5 | 0000010 | +0.6911 + 0.6930i |
| w6 | 0000011 | +0.5982 + 1.0262i |
| w7 | 0000011 | +0.6740 + 0.8584i |
| w8 | 0000100 | −0.6622 + 0.0739i |
| w9 | 0000100 | −0.6739 + 0.5331i |
| w10 | 0000101 | −0.6337 + 0.2246i |
| w11 | 0000101 | −0.6474 + 0.3777i |
| w12 | 0000110 | +0.6622 + 0.0739i |
| w13 | 0000110 | +0.6739 + 0.5331i |
| w14 | 0000111 | +0.6337 + 0.2246i |
| w15 | 0000111 | +0.6474 + 0.3777i |
| w16 | 0001000 | −0.4905 − 1.1842i |
| w17 | 0001000 | −0.6911 − 0.6930i |
| w18 | 0001001 | −0.5982 − 1.0262i |
| w19 | 0001001 | −0.6740 − 0.8584i |
| w20 | 0001010 | +0.4905 − 1.1842i |
| w21 | 0001010 | +0.6911 − 0.6930i |
| w22 | 0001011 | +0.5982 − 1.0262i |
| w23 | 0001011 | +0.6740 − 0.8584i |
| w24 | 0001100 | −0.6622 − 0.0739i |
| w25 | 0001100 | −0.6739 − 0.5331i |
| w26 | 0001101 | −0.6337 − 0.2246i |
| w27 | 0001101 | −0.6474 − 0.3777i |
| w28 | 0001110 | +0.6622 − 0.0739i |
| w29 | 0001110 | +0.6739 − 0.5331i |
| w30 | 0001111 | +0.6337 − 0.2246i |
| w31 | 0001111 | +0.6474 − 0.3777i |
| w32 | 0010000 | −0.6854 + 1.2221i |
| w33 | 0010000 | −0.8561 + 0.6778i |
| w34 | 0010001 | −0.7829 + 1.0274i |
| w35 | 0010001 | −0.8451 + 0.8492i |
| w36 | 0010010 | +0.6854 + 1.2221i |
| w37 | 0010010 | +0.8561 + 0.6778i |
| w38 | 0010011 | +0.7829 + 1.0274i |
| w39 | 0010011 | +0.8451 + 0.8492i |
| w40 | 0010100 | −0.8231 + 0.0739i |
| w41 | 0010100 | −0.8353 + 0.5198i |
| w42 | 0010101 | −0.7818 + 0.2196i |
| w43 | 0010101 | −0.7994 + 0.3695i |
| w44 | 0010110 | +0.8231 + 0.0739i |
| w45 | 0010110 | +0.8353 + 0.5198i |
| w46 | 0010111 | +0.7818 + 0.2196i |
| w47 | 0010111 | +0.7994 + 0.3695i |
| w48 | 0011000 | −0.6854 − 1.2221i |
| w49 | 0011000 | −0.8561 − 0.6778i |
| w50 | 0011001 | −0.7829 − 1.0274i |
| w51 | 0011001 | −0.8451 − 0.8492i |
| w52 | 0011010 | +0.6854 − 1.2221i |
| w53 | 0011010 | +0.8561 − 0.6778i |
| w54 | 0011011 | +0.7829 − 1.0274i |
| w55 | 0011011 | +0.8451 − 0.8492i |
| w56 | 0011100 | −0.8231 − 0.0739i |
| w57 | 0011100 | −0.8353 − 0.5198i |
| w58 | 0011101 | −0.7818 − 0.2196i |
| w59 | 0011101 | −0.7994 − 0.3695i |
| w60 | 0011110 | +0.8231 − 0.0739i |
| w61 | 0011110 | +0.8353 − 0.5198i |
| w62 | 0011111 | +0.7818 − 0.2196i |
| w63 | 0011111 | +0.7994 − 0.3695i |
| w64 | 01000000 | −0.4711 + 1.3764i |
| w65 | 01000001 | −0.5308 + 0.6813i |
| w66 | 01000010 | −0.4242 + 0.9942i |
| w67 | 01000011 | −0.5155 + 0.8438i |
| w68 | 01000100 | +0.4711 + 1.3764i |
| w69 | 01000101 | +0.5308 + 0.6813i |
| w70 | 01000110 | +0.4242 + 0.9942i |
| w71 | 01000111 | +0.5155 + 0.8438i |
| w72 | 01001000 | −0.5101 + 0.0730i |
| w73 | 01001001 | −0.5175 + 0.5233i |
| w74 | 01001010 | −0.4897 + 0.2198i |
| w75 | 01001011 | −0.4992 + 0.3698i |
| w76 | 01001100 | +0.5101 + 0.0730i |
| w77 | 01001101 | +0.5175 + 0.5233i |
| w78 | 01001110 | +0.4897 + 0.2198i |
| w79 | 01001111 | +0.4992 + 0.3698i |
| w80 | 01010000 | −0.4711 − 1.3764i |
| w81 | 01010001 | −0.5308 − 0.6813i |
| w82 | 01010010 | −0.4242 − 0.9942i |

-continued

| w index | bit label | Constellation point |
|---|---|---|
| w83 | 01010011 | −0.5155 − 0.8438i |
| w84 | 01010100 | +0.4711 − 1.3764i |
| w85 | 01010101 | +0.5308 − 0.6813i |
| w86 | 01010110 | +0.4242 − 0.9942i |
| w87 | 01010111 | +0.5155 − 0.8438i |
| w88 | 01011000 | −0.5101 − 0.0730i |
| w89 | 01011001 | −0.5175 − 0.5233i |
| w90 | 01011010 | −0.4897 − 0.2198i |
| w91 | 01011011 | −0.4992 − 0.3698i |
| w92 | 01011100 | +0.5101 − 0.0730i |
| w93 | 01011101 | +0.5175 − 0.5233i |
| w94 | 01011110 | +0.4897 − 0.2198i |
| w95 | 01011111 | +0.4992 − 0.3698i |
| w96 | 01100000 | −0.2836 + 1.2952i |
| w97 | 01100001 | −0.3755 + 0.6565i |
| w98 | 01100010 | −0.2860 + 1.1119i |
| w99 | 01100011 | −0.3664 + 0.8105i |
| w100 | 01100100 | +0.2836 + 1.2952i |
| w101 | 01100101 | +0.3755 + 0.6565i |
| w102 | 01100110 | +0.2860 + 1.1119i |
| w103 | 01100111 | +0.3664 + 0.8105i |
| w104 | 01101000 | −0.3616 + 0.0709i |
| w105 | 01101001 | −0.3655 + 0.5062i |
| w106 | 01101010 | −0.3479 + 0.2135i |
| w107 | 01101011 | −0.3537 + 0.3587i |
| w108 | 01101100 | +0.3616 + 0.0709i |
| w109 | 01101101 | +0.3655 + 0.5062i |
| w110 | 01101110 | +0.3479 + 0.2135i |
| w111 | 01101111 | +0.3537 + 0.3587i |
| w112 | 01110000 | −0.2836 − 1.2952i |
| w113 | 01110001 | −0.3755 − 0.6565i |
| w114 | 01110010 | −0.2860 − 1.1119i |
| w115 | 01110011 | −0.3664 − 0.8105i |
| w116 | 01110100 | +0.2836 − 1.2952i |
| w117 | 01110101 | +0.3755 − 0.6565i |
| w118 | 01110110 | +0.2860 − 1.1119i |
| w119 | 01110111 | +0.3664 − 0.8105i |
| w120 | 01111000 | −0.3616 − 0.0709i |
| w121 | 01111001 | −0.3655 − 0.5062i |
| w122 | 01111010 | −0.3479 − 0.2135i |
| w123 | 01111011 | −0.3537 − 0.3587i |
| w124 | 01111100 | +0.3616 − 0.0709i |
| w125 | 01111101 | +0.3655 − 0.5062i |
| w126 | 01111110 | +0.3479 − 0.2135i |
| w127 | 01111111 | +0.3537 − 0.3587i |
| w128 | 10000000 | −1.2103 + 0.9014i |
| w129 | 10000001 | −1.1677 + 0.4847i |
| w130 | 10000010 | −1.2323 + 0.6874i |
| w131 | 10000011 | −1.3547 + 0.4862i |
| w132 | 10000100 | +1.2103 + 0.9014i |
| w133 | 10000101 | +1.1677 + 0.4847i |
| w134 | 10000110 | +1.2323 + 0.6874i |
| w135 | 10000111 | +1.3547 + 0.4862i |
| w136 | 10001000 | −1.1595 + 0.0882i |
| W137 | 10001001 | −1.4613 + 0.2782i |
| w138 | 10001010 | −1.3430 + 0.0950i |
| w139 | 10001011 | −1.2637 + 0.2839i |
| w140 | 10001100 | +1.1595 + 0.0882i |
| w141 | 10001101 | +1.4613 + 0.2782i |
| w142 | 10001110 | +1.3430 + 0.0950i |
| w143 | 10001111 | +1.2637 + 0.2839i |
| w144 | 10010000 | −1.2103 − 0.9014i |
| w145 | 10010001 | −1.1677 − 0.4847i |
| w146 | 10010010 | −1.2323 − 0.6874i |
| w147 | 10010011 | −1.3547 − 0.4862i |
| w148 | 10010100 | +1.2103 − 0.9014i |
| w149 | 10010101 | +1.1677 − 0.4847i |
| w150 | 10010110 | +1.2323 − 0.6874i |
| w151 | 10010111 | +1.3547 − 0.4862i |
| w152 | 10011000 | −1.1595 − 0.0882i |
| w153 | 10011001 | −1.4613 − 0.2782i |
| w154 | 10011010 | −1.3430 − 0.0950i |
| w155 | 10011011 | −1.2637 − 0.2839i |
| w156 | 10011100 | +1.1595 − 0.0882i |
| w157 | 10011101 | +1.4613 − 0.2782i |
| w158 | 10011110 | +1.3430 − 0.0950i |
| w159 | 10011111 | +1.2637 − 0.2839i |
| w160 | 10100000 | −0.9022 + 1.1987i |
| w161 | 10100001 | −1.0215 + 0.6013i |
| w162 | 10100010 | −0.9925 + 0.9967i |
| w163 | 10100011 | −1.0233 + 0.7878i |
| w164 | 10100100 | +0.9022 + 1.1987i |
| w165 | 10100101 | +1.0215 + 0.6013i |
| w166 | 10100110 | +0.9925 + 0.9967i |
| w167 | 10100111 | +1.0233 + 0.7878i |
| w168 | 10101000 | −0.9894 + 0.0820i |
| w169 | 10101001 | −0.9800 + 0.4265i |
| w170 | 10101010 | −0.9367 + 0.2358i |
| w171 | 10101011 | −1.0889 + 0.2858i |
| w172 | 10101100 | +0.9894 + 0.0820i |
| w173 | 10101101 | +0.9800 + 0.4265i |
| w174 | 10101110 | +0.9367 + 0.2358i |
| w175 | 10101111 | +1.0889 + 0.2858i |
| w176 | 10110000 | −0.9022 − 1.1987i |
| w177 | 10110001 | −1.0215 − 0.6013i |
| w178 | 10110010 | −0.9925 − 0.9967i |
| w179 | 10110011 | −1.0233 − 0.7878i |
| w180 | 10110100 | +0.9022 − 1.1987i |
| w181 | 10110101 | +1.0215 − 0.6013i |
| w182 | 10110110 | +0.9925 − 0.9967i |
| w183 | 10110111 | +1.0233 − 0.7878i |
| w184 | 10111000 | −0.9894 − 0.0820i |
| w185 | 10111001 | −0.9800 − 0.4265i |
| w186 | 10111010 | −0.9367 − 0.2358i |
| w187 | 10111011 | −1.0889 − 0.2858i |
| w188 | 10111100 | +0.9894 − 0.0820i |
| w189 | 10111101 | +0.9800 − 0.4265i |
| w190 | 10111110 | +0.9367 − 0.2358i |
| w191 | 10111111 | −1.2103 + 0.9014i |
| w192 | 11000000 | −0.0888 + 1.1903i |
| w193 | 11000001 | −0.0732 + 0.6770i |
| w194 | 11000010 | −0.0829 + 1.0145i |
| w195 | 11000011 | −0.0737 + 0.8430i |
| w196 | 11000100 | +0.0888 + 1.1903i |
| w197 | 11000101 | +0.0732 + 0.6770i |
| w198 | 11000110 | +0.0829 + 1.0145i |
| w199 | 11000111 | +0.0737 + 0.8430i |
| w200 | 11001000 | −0.0711 + 0.0728i |
| w201 | 11001001 | −0.0722 + 0.5215i |
| w202 | 11001010 | −0.0687 + 0.2202i |
| w203 | 11001011 | −0.0699 + 0.3698i |
| w204 | 11001100 | +0.0711 + 0.0728i |
| w205 | 11001101 | +0.0722 + 0.5215i |
| w206 | 11001110 | +0.0687 + 0.2202i |
| w207 | 11001111 | +0.0699 + 0.3698i |
| w208 | 11010000 | −0.0888 − 1.1903i |
| w209 | 11010001 | −0.0732 − 0.6770i |
| w210 | 11010010 | −0.0829 − 1.0145i |
| w211 | 11010011 | −0.0737 − 0.8430i |
| w212 | 11010100 | +0.0888 − 1.1903i |
| w213 | 11010101 | +0.0732 − 0.6770i |
| w214 | 11010110 | +0.0829 − 1.0145i |
| w215 | 11010111 | +0.0737 − 0.8430i |
| w216 | 11011000 | −0.0711 − 0.0728i |
| w217 | 11011001 | −0.0722 − 0.5215i |
| w218 | 11011010 | −0.0687 − 0.2202i |
| w219 | 11011011 | −0.0699 − 0.3698i |
| w220 | 11011100 | +0.0711 − 0.0728i |
| w221 | 11011101 | +0.0722 − 0.5215i |
| w222 | 11011110 | +0.0687 − 0.2202i |
| w223 | 11011111 | +0.0699 − 0.3698i |
| w224 | 11100000 | −0.1023 + 1.3833i |
| w225 | 11100001 | −0.2228 + 0.6437i |
| w226 | 11100010 | −0.2357 + 0.9536i |
| w227 | 11100011 | −0.2175 + 0.7949i |
| w228 | 11100100 | +0.1023 + 1.3833i |
| w229 | 11100101 | +0.2228 + 0.6437i |
| w230 | 11100110 | +0.2357 + 0.9536i |
| w231 | 11100111 | +0.2175 + 0.7949i |
| w232 | 11101000 | −0.2153 + 0.0697i |
| w233 | 11101001 | −0.2171 + 0.4970i |
| w234 | 11101010 | −0.2074 + 0.2103i |
| w235 | 11101011 | −0.2104 + 0.3528i |
| w236 | 11101100 | +0.2153 + 0.0697i |

-continued

| w index | bit label | Constellation point |
|---|---|---|
| w237 | 11101101 | +0.2171 + 0.4970i |
| w238 | 11101110 | +0.2074 + 0.2103i |
| w239 | 11101111 | +0.2104 + 0.3528i |
| w240 | 11110000 | −0.1023 − 1.3833i |
| w241 | 11110001 | −0.2228 − 0.6437i |
| w242 | 11110010 | −0.2357 − 0.9536i |
| w243 | 11110011 | −0.2175 − 0.7949i |
| w244 | 11110100 | +0.1023 − 1.3833i |
| w245 | 11110101 | +0.2228 − 0.6437i |
| w246 | 11110110 | +0.2357 − 0.9536i |
| w247 | 11110111 | +0.2175 − 0.7949i |
| w248 | 11111000 | −0.2153 − 0.0697i |
| w249 | 11111001 | −0.2171 − 0.4970i |
| w250 | 11111010 | −0.2074 − 0.2103i |
| w251 | 11111011 | −0.2104 − 0.3528i |
| w252 | 11111100 | +0.2153 − 0.0697i |
| w253 | 11111101 | +0.2171 − 0.4970i |
| w254 | 11111110 | +0.2074 − 0.2103i |
| w255 | 11111111 | +0.2104 − 0.3528i | or
for MCS=9 (or 8):

| w index | bit label | Constellation point |
|---|---|---|
| w0 | 0000000 | −0.4801 + 1.1746i |
| w1 | 0000000 | −0.6762 + 1.2058i |
| w2 | 0000001 | +0.4801 + 1.1746i |
| w3 | 0000001 | +0.6762 + 1.2058i |
| w4 | 0000010 | −0.4614 + 1.3554i |
| w5 | 0000010 | −0.2766 + 1.2869i |
| w6 | 0000011 | +0.4614 + 1.3554i |
| w7 | 0000011 | +0.2766 + 1.2869i |
| w8 | 0000100 | −1.1920 + 0.8876i |
| w9 | 0000100 | −0.8919 + 1.1799i |
| w10 | 0000101 | +1.1920 + 0.8876i |
| w11 | 0000101 | +0.8919 + 1.1799i |
| w12 | 0000110 | −0.0897 + 1.1870i |
| w13 | 0000110 | −0.0980 + 1.3675i |
| w14 | 0000111 | +0.0897 + 1.1870i |
| w15 | 0000111 | +0.0980 + 1.3675i |
| w16 | 0001000 | −0.7042 + 0.7037i |
| w17 | 0001000 | −0.8656 + 0.6806i |
| w18 | 0001001 | +0.7042 + 0.7037i |
| w19 | 0001001 | +0.8656 + 0.6806i |
| w20 | 0001010 | −0.5441 + 0.6946i |
| w21 | 0001010 | −0.3865 + 0.6677i |
| w22 | 0001011 | +0.5441 + 0.6946i |
| w23 | 0001011 | +0.3865 + 0.6677i |
| w24 | 0001100 | −1.1619 + 0.4714i |
| w25 | 0001100 | −1.0233 + 0.5938i |
| w26 | 0001101 | +1.1619 + 0.4714i |
| w27 | 0001101 | +1.0233 + 0.5938i |
| w28 | 0001110 | −0.0761 + 0.6911i |
| w29 | 0001110 | −0.2301 + 0.6395i |
| w30 | 0001111 | +0.0761 + 0.6911i |
| w31 | 0001111 | +0.2301 + 0.6395i |
| w32 | 0010000 | −0.4801 − 1.1746i |
| w33 | 0010000 | −0.6762 − 1.2058i |
| w34 | 0010001 | +0.4801 − 1.1746i |
| w35 | 0010001 | +0.6762 − 1.2058i |
| w36 | 0010010 | −0.4614 − 1.3554i |
| w37 | 0010010 | −0.2766 − 1.2869i |
| w38 | 0010011 | +0.4614 − 1.3554i |
| w39 | 0010011 | +0.2766 − 1.2869i |
| w40 | 0010100 | −1.1920 − 0.8876i |
| w41 | 0010100 | −0.8919 − 1.1799i |
| w42 | 0010101 | +1.1920 − 0.8876i |
| w43 | 0010101 | +0.8919 − 1.1799i |
| w44 | 0010110 | −0.0897 − 1.1870i |
| w45 | 0010110 | −0.0980 − 1.3675i |
| w46 | 0010111 | +0.0897 − 1.1870i |
| w47 | 0010111 | +0.0980 − 1.3675i |
| w48 | 0011000 | −0.7042 − 0.7037i |
| w49 | 0011000 | −0.8656 − 0.6806i |
| w50 | 0011001 | +0.7042 − 0.7037i |
| w51 | 0011001 | +0.8656 − 0.6806i |
| w52 | 0011010 | −0.5441 − 0.6946i |
| w53 | 0011010 | −0.3865 − 0.6677i |
| w54 | 0011011 | +0.5441 − 0.6946i |
| w55 | 0011011 | +0.3865 − 0.6677i |
| w56 | 0011100 | −1.1619 − 0.4714i |
| w57 | 0011100 | −1.0233 − 0.5938i |
| w58 | 0011101 | +1.1619 − 0.4714i |
| w59 | 0011101 | +1.0233 − 0.5938i |
| w60 | 0011110 | −0.0761 − 0.6911i |
| w61 | 0011110 | −0.2301 − 0.6395i |
| w62 | 0011111 | +0.0761 − 0.6911i |
| w63 | 0011111 | +0.2301 − 0.6395i |
| w64 | 01000000 | −0.6844 + 0.0760i |
| w65 | 01000001 | −0.8440 + 0.0765i |
| w66 | 01000010 | +0.6844 + 0.0760i |
| w67 | 01000011 | +0.8440 + 0.0765i |
| w68 | 01000100 | −0.5319 + 0.0762i |
| w69 | 01000101 | −0.3811 + 0.0732i |
| w70 | 01000110 | +0.5319 + 0.0762i |
| w71 | 01000111 | +0.3811 + 0.0732i |
| w72 | 01001000 | −1.1751 + 0.0886i |
| w73 | 01001001 | −1.0070 + 0.0833i |
| w74 | 01001010 | +1.1751 + 0.0886i |
| w75 | 01001011 | +1.0070 + 0.0833i |
| w76 | 01001100 | −0.0749 + 0.0766i |
| w77 | 01001101 | −0.2291 + 0.0689i |
| w78 | 01001110 | +0.0749 + 0.0766i |
| w79 | 01001111 | +0.2291 + 0.0689i |
| w80 | 01010000 | −0.6891 + 0.5440i |
| w81 | 01010001 | −0.8493 + 0.5224i |
| w82 | 01010010 | +0.6891 + 0.5440i |
| w83 | 01010011 | +0.8493 + 0.5224i |
| w84 | 01010100 | −0.5302 + 0.5350i |
| w85 | 01010101 | −0.3753 + 0.5150i |
| w86 | 01010110 | +0.5302 + 0.5350i |
| w87 | 01010111 | +0.3753 + 0.5150i |
| w88 | 01011000 | −1.4427 + 0.2847i |
| w89 | 01011001 | −0.9868 + 0.4178i |
| w90 | 01011010 | +1.4427 + 0.2847i |
| w91 | 01011011 | +0.9868 + 0.4178i |
| w92 | 01011100 | −0.0759 + 0.5374i |
| w93 | 01011101 | −0.2229 + 0.4904i |
| w94 | 01011110 | +0.0759 + 0.5374i |
| w95 | 01011111 | +0.2229 + 0.4904i |
| w96 | 01100000 | −0.6844 − 0.0760i |
| w97 | 01100001 | −0.8440 − 0.0765i |
| w98 | 01100010 | +0.6844 − 0.0760i |
| w99 | 01100011 | +0.8440 − 0.0765i |
| w100 | 01100100 | −0.5319 − 0.0762i |
| w101 | 01100101 | −0.3811 − 0.0732i |
| w102 | 01100110 | +0.5319 − 0.0762i |
| w103 | 01100111 | +0.3811 − 0.0732i |
| w104 | 01101000 | −1.1751 − 0.0886i |
| w105 | 01101001 | −1.0070 − 0.0833i |
| w106 | 01101010 | +1.1751 − 0.0886i |
| w107 | 01101011 | +1.0070 − 0.0833i |
| w108 | 01101100 | −0.0749 − 0.0766i |
| w109 | 01101101 | −0.2291 − 0.0689i |
| w110 | 01101110 | +0.0749 − 0.0766i |
| w111 | 01101111 | +0.2291 − 0.0689i |
| w112 | 01110000 | −0.6891 − 0.5440i |
| w113 | 01110001 | −0.8493 − 0.5224i |
| w114 | 01110010 | +0.6891 − 0.5440i |
| w115 | 01110011 | +0.8493 − 0.5224i |
| w116 | 01110100 | −0.5302 − 0.5350i |
| w117 | 01110101 | −0.3753 − 0.5150i |
| w118 | 01110110 | +0.5302 − 0.5350i |
| w119 | 01110111 | +0.3753 − 0.5150i |
| w120 | 01111000 | −1.4427 − 0.2847i |
| w121 | 01111001 | −0.9868 − 0.4178i |
| w122 | 01111010 | +1.4427 − 0.2847i |
| w123 | 01111011 | +0.9868 − 0.4178i |
| w124 | 01111100 | −0.0759 − 0.5374i |
| w125 | 01111101 | −0.2229 − 0.4904i |
| w126 | 01111110 | +0.0759 − 0.5374i |

| w index | bit label | Constellation point |
|---|---|---|
| w127 | 01111111 | +0.2229 − 0.4904i |
| w128 | 10000000 | −0.5937 + 1.0262i |
| w129 | 10000001 | −0.7777 + 1.0233i |
| w130 | 10000010 | +0.5937 + 1.0262i |
| w131 | 10000011 | +0.7777 + 1.0233i |
| w132 | 10000100 | −0.4184 + 0.9977i |
| w133 | 10000101 | −0.2792 + 1.1096i |
| w134 | 10000110 | +0.4184 + 0.9977i |
| w135 | 10000111 | +0.2792 + 1.1096i |
| w136 | 10001000 | −1.2121 + 0.6733i |
| W137 | 10001001 | −0.9865 + 0.9873i |
| w138 | 10001010 | +1.2121 + 0.6733i |
| w139 | 10001011 | +0.9865 + 0.9873i |
| w140 | 10001100 | −0.0824 + 1.0164i |
| w141 | 10001101 | −0.2359 + 0.9515i |
| w142 | 10001110 | +0.0824 + 1.0164i |
| w143 | 10001111 | +0.2359 + 0.9515i |
| w144 | 10010000 | −0.6785 + 0.8656i |
| w145 | 10010001 | −0.8479 + 0.8504i |
| w146 | 10010010 | +0.6785 + 0.8656i |
| w147 | 10010011 | +0.8479 + 0.8504i |
| w148 | 10010100 | −0.5200 + 0.8555i |
| w149 | 10010101 | −0.3697 + 0.8223i |
| w150 | 10010110 | +0.5200 + 0.8555i |
| w151 | 10010111 | +0.3697 + 0.8223i |
| w152 | 10011000 | −1.3397 + 0.4820i |
| w153 | 10011001 | −1.0229 + 0.7822i |
| w154 | 10011010 | +1.3397 + 0.4820i |
| w155 | 10011011 | +1.0229 + 0.7822i |
| w156 | 10011100 | −0.0752 + 0.8524i |
| w157 | 10011101 | −0.2205 + 0.7921i |
| w158 | 10011110 | +0.0752 + 0.8524i |
| w159 | 10011111 | +0.2205 + 0.7921i |
| w160 | 10100000 | −0.5937 − 1.0262i |
| w161 | 10100001 | −0.7777 − 1.0233i |
| w162 | 10100010 | +0.5937 − 1.0262i |
| w163 | 10100011 | +0.7777 − 1.0233i |
| w164 | 10100100 | −0.4184 − 0.9977i |
| w165 | 10100101 | −0.2792 − 1.1096i |
| w166 | 10100110 | +0.4184 − 0.9977i |
| w167 | 10100111 | +0.2792 − 1.1096i |
| w168 | 10101000 | −1.2121 − 0.6733i |
| w169 | 10101001 | −0.9865 − 0.9873i |
| w170 | 10101010 | +1.2121 − 0.6733i |
| w171 | 10101011 | +0.9865 − 0.9873i |
| w172 | 10101100 | −0.0824 − 1.0164i |
| w173 | 10101101 | −0.2359 − 0.9515i |
| w174 | 10101110 | +0.0824 − 1.0164i |
| w175 | 10101111 | +0.2359 − 0.9515i |
| w176 | 10110000 | −0.6785 − 0.8656i |
| w177 | 10110001 | −0.8479 − 0.8504i |
| w178 | 10110010 | +0.6785 − 0.8656i |
| w179 | 10110011 | +0.8479 − 0.8504i |
| w180 | 10110100 | −0.5200 − 0.8555i |
| w181 | 10110101 | −0.3697 − 0.8223i |
| w182 | 10110110 | +0.5200 − 0.8555i |
| w183 | 10110111 | +0.3697 − 0.8223i |
| w184 | 10111000 | −1.3397 − 0.4820i |
| w185 | 10111001 | −1.0229 − 0.7822i |
| w186 | 10111010 | +1.3397 − 0.4820i |
| w187 | 10111011 | +1.0229 − 0.7822i |
| w188 | 10111100 | −0.0752 − 0.8524i |
| w189 | 10111101 | −0.2205 − 0.7921i |
| w190 | 10111110 | +0.0752 − 0.8524i |
| w191 | 10111111 | +0.2205 − 0.7921i |
| w192 | 11000000 | −0.6336 + 0.2306i |
| w193 | 11000001 | −0.7836 + 0.2217i |
| w194 | 11000010 | +0.6336 + 0.2306i |
| w195 | 11000011 | +0.7836 + 0.2217i |
| w196 | 11000100 | −0.4864 + 0.2253i |
| w197 | 11000101 | −0.3429 + 0.2164i |
| w198 | 11000110 | +0.4864 + 0.2253i |
| w199 | 11000111 | +0.3429 + 0.2164i |
| w200 | 11001000 | −1.3520 + 0.0957i |
| w201 | 11001001 | −0.9402 + 0.2370i |
| w202 | 11001010 | +1.3520 + 0.0957i |
| w203 | 11001011 | +0.9402 + 0.2370i |
| w204 | 11001100 | −0.0684 + 0.2330i |
| w205 | 11001101 | −0.2017 + 0.2031i |
| w206 | 11001110 | +0.0684 + 0.2330i |
| w207 | 11001111 | +0.2017 + 0.2031i |
| w208 | 11010000 | −0.6601 + 0.3878i |
| w209 | 11010001 | −0.8131 + 0.3716i |
| w210 | 11010010 | +0.6601 + 0.3878i |
| w211 | 11010011 | +0.8131 + 0.3716i |
| w212 | 11010100 | −0.5092 + 0.3789i |
| w213 | 11010101 | −0.3608 + 0.3649i |
| w214 | 11010110 | +0.5092 + 0.3789i |
| w215 | 11010111 | +0.3608 + 0.3649i |
| w216 | 11011000 | −1.2604 + 0.2816i |
| w217 | 11011001 | −1.0927 + 0.2741i |
| w218 | 11011010 | +1.2604 + 0.2816i |
| w219 | 11011011 | +1.0927 + 0.2741i |
| w220 | 11011100 | −0.0724 + 0.3856i |
| w221 | 11011101 | −0.2134 + 0.3455i |
| w222 | 11011110 | +0.0724 + 0.3856i |
| w223 | 11011111 | +0.2134 + 0.3455i |
| w224 | 11100000 | −0.6336 − 0.2306i |
| w225 | 11100001 | −0.7836 − 0.2217i |
| w226 | 11100010 | +0.6336 − 0.2306i |
| w227 | 11100011 | +0.7836 − 0.2217i |
| w228 | 11100100 | −0.4864 − 0.2253i |
| w229 | 11100101 | −0.3429 − 0.2164i |
| w230 | 11100110 | +0.4864 − 0.2253i |
| w231 | 11100111 | +0.3429 − 0.2164i |
| w232 | 11101000 | −1.3520 − 0.0957i |
| w233 | 11101001 | −0.9402 − 0.2370i |
| w234 | 11101010 | +1.3520 − 0.0957i |
| w235 | 11101011 | +0.9402 − 0.2370i |
| w236 | 11101100 | −0.0684 − 0.2330i |
| w237 | 11101101 | −0.2017 − 0.2031i |
| w238 | 11101110 | +0.0684 − 0.2330i |
| w239 | 11101111 | +0.2017 − 0.2031i |
| w240 | 11110000 | −0.6601 − 0.3878i |
| w241 | 11110001 | −0.8131 − 0.3716i |
| w242 | 11110010 | +0.6601 − 0.3878i |
| w243 | 11110011 | +0.8131 − 0.3716i |
| w244 | 11110100 | −0.5092 − 0.3789i |
| w245 | 11110101 | −0.3608 − 0.3649i |
| w246 | 11110110 | +0.5092 − 0.3789i |
| w247 | 11110111 | +0.3608 − 0.3649i |
| w248 | 11111000 | −1.2604 − 0.2816i |
| w249 | 11111001 | −1.0927 − 0.2741i |
| w250 | 11111010 | +1.2604 − 0.2816i |
| w251 | 11111011 | +1.0927 − 0.2741i |
| w252 | 11111100 | −0.0724 − 0.3856i |
| w253 | 11111101 | −0.2134 − 0.3455i |
| w254 | 11111110 | +0.0724 − 0.3856i |
| w255 | 11111111 | +0.2134 − 0.3455i |

B) M-QAM non-uniform constellations of group B for LDPC encoding:

B1) 16-QAM NUC, where MCS 3 corresponds to a 16-QAM with code rate 1/2, and MCS 4 corresponds to 16-QAM with code rate 3/4

| w | bit label | MCS = 3 (or 4) | MCS = 4 (or 3) |
|---|---|---|---|
| w0 | 0000 | +0.4925+1.2040i | +0.3018−0.3018i |
| w1 | 0001 | +0.4925−1.2040i | +0.9534−0.3018i |
| w2 | 0010 | +0.2530+0.4936i | +0.3018+0.3018i |
| w3 | 0011 | +0.2530−0.4936i | +0.9534+0.3018i |
| w4 | 0100 | −0.4925+1.2040i | −0.3018−0.3018i |
| w5 | 0101 | −0.4925−1.2040i | −0.9534−0.3018i |
| w6 | 0110 | −0.2530+0.4936i | −0.3018+0.3018i |
| w7 | 0111 | −0.2530−0.4936i | −0.9534+0.3018i |
| w8 | 1000 | +1.2040+0.4925i | +0.3018−0.9534i |
| w9 | 1001 | +1.2040−0.4925i | +0.9534−0.9534i |
| w10 | 1010 | +0.4936+0.2530i | +0.3018+0.9534i |
| w11 | 1011 | +0.4936−0.2530i | +0.9534+0.9534i |
| w12 | 1100 | −1.2040+0.4925i | −0.3018−0.9534i |

-continued

| w | bit label | MCS = 3 (or 4) | MCS = 4 (or 3) |
|---|---|---|---|
| w13 | 1101 | −1.2040−0.4925i | −0.9534−0.9534i |
| w14 | 1110 | −0.4936+0.2530i | −0.3018+0.9534i |
| w15 | 1111 | −0.4936−0.2530i | −0.9534+0.9534i |

B2) 64-QAM NUC

| w/MCS index | bit label | MCS = 5 (or 6 or 7) | MCS = 6 (or 5 or 7) | MCS = 7 (or 5 or 6) |
|---|---|---|---|---|
| w0 | 000000 | +1.4656+0.2931i | +1.0441−0.1581i | +1.0474−0.1695i |
| w1 | 000001 | +0.2878+1.4388i | +0.1321−0.1317i | −1.0474−0.1695i |
| w2 | 000010 | +0.1678+0.1166i | +1.4516−0.2578i | +0.7243−0.1504i |
| w3 | 000011 | +0.1177+0.4119i | +0.1689−1.0567i | −0.7243−0.1504i |
| w4 | 000100 | +1.4656−0.2931i | +0.6995−0.1411i | +0.1407−0.1336i |
| w5 | 000101 | +0.2878−1.4388i | +0.4035−0.1354i | −0.1407−0.1336i |
| w6 | 000110 | +0.1678−0.1166i | +0.6750−1.2072i | +0.4265−0.1388i |
| w7 | 000111 | +0.1177−0.4119i | +0.2558−1.4247i | −0.4265−0.1388i |
| w8 | 001000 | +1.0649+0.2069i | +1.0161−0.4912i | +1.0474+0.1695i |
| w9 | 001001 | +0.2219+1.0386i | +0.1287−0.4061i | −1.0474+0.1695i |
| w10 | 001010 | +0.7408+0.1355i | +1.1306−0.8649i | +0.7243+0.1504i |
| w11 | 001011 | +0.1559+0.7442i | +0.1385−0.7199i | −0.7243+0.1504i |
| w12 | 001100 | +1.0649−0.2069i | +0.6966−0.4427i | +0.1407+0.1336i |
| w13 | 001101 | +0.2219−1.0386i | +0.4025−0.4142i | −0.1407+0.1336i |
| w14 | 001110 | +0.7408−0.1355i | +0.6874−0.8123i | +0.4265+0.1388i |
| w15 | 001111 | +0.1559−0.7442i | +0.4017−0.7107i | −0.4265+0.1388i |
| w16 | 010000 | +1.2278+0.8230i | +1.0441+0.1581i | +1.0854−0.5394i |
| w17 | 010001 | +0.8133+1.2150i | +0.1321+0.1317i | −1.0854−0.5394i |
| w18 | 010010 | +0.3325+0.1582i | +1.4516+0.2578i | +0.7353−0.4623i |
| w19 | 010011 | +0.2516+0.3998i | +0.1689+1.0567i | −0.7353−0.4623i |
| w20 | 010100 | +1.2278−0.8230i | +0.6995+0.1411i | +0.1392−0.4078i |
| w21 | 010101 | +0.8133−1.2150i | +0.4035+0.1354i | −0.1392−0.4078i |
| w22 | 010110 | +0.3325−0.1582i | +0.6750+1.2072i | +0.4262−0.4205i |
| w23 | 010111 | +0.2516−0.3998i | +0.2558+1.4247i | −0.4262−0.4205i |
| w24 | 011000 | +0.8971+0.5677i | +1.0161+0.4912i | +1.0854+0.5394i |
| w25 | 011001 | +0.6145+0.8494i | +0.1287+0.4061i | −1.0854+0.5394i |
| w26 | 011010 | +0.6200+0.3227i | +1.1306+0.8649i | +0.7353+0.4623i |
| w27 | 011011 | +0.4328+0.5954i | +0.1385+0.7199i | −0.7353+0.4623i |
| w28 | 011100 | +0.8971−0.5677i | +0.6966+0.4427i | +0.1392+0.4078i |
| w29 | 011101 | +0.6145−0.8494i | +0.4025+0.4142i | −0.1392+0.4078i |
| w30 | 011110 | +0.6200−0.3227i | +0.6874+0.8123i | +0.4262+0.4205i |
| w31 | 011111 | +0.4328−0.5954i | +0.4017+0.7107i | −0.4262+0.4205i |
| w32 | 100000 | −1.4656+0.2931i | −1.0441−0.1581i | +1.4261−0.2216i |
| w33 | 100001 | −0.2878+1.4388i | −0.1321−0.1317i | −1.4261−0.2216i |
| w34 | 100010 | −0.1678+0.1166i | −1.4516−0.2578i | +0.6106−1.1783i |
| w35 | 100011 | −0.1177+0.4119i | −0.1689−1.0567i | −0.6106−1.1783i |
| w36 | 100100 | −1.4656−0.2931i | −0.6995−0.1411i | +0.1682−1.0316i |
| w37 | 100101 | −0.2878−1.4388i | −0.4035−0.1354i | −0.1682−1.0316i |
| w38 | 100110 | −0.1678−0.1166i | −0.6750−1.2072i | +0.2287−1.3914i |
| w39 | 100111 | −0.1177−0.4119i | −0.2558−1.4247i | −0.2287−1.3914i |
| w40 | 101000 | −1.0649+0.2069i | −1.0161−0.4912i | +1.4261+0.2216i |
| w41 | 101001 | −0.2219+1.0386i | −0.1287−0.4061i | −1.4261+0.2216i |
| w42 | 101010 | −0.7408+0.1355i | −1.1306−0.8649i | +0.6106+1.1783i |
| w43 | 101011 | −0.1559+0.7442i | −0.1385−0.7199i | −0.6106+1.1783i |
| w44 | 101100 | −1.0649−0.2069i | −0.6966−0.4427i | +0.1682+1.0316i |
| w45 | 101101 | −0.2219−1.0386i | −0.4025−0.4142i | −0.1682+1.0316i |
| w46 | 101110 | −0.7408−0.1355i | −0.6874−0.8123i | +0.2287+1.3914i |
| w47 | 101111 | −0.1559−0.7442i | −0.4017−0.7107i | −0.2287+1.3914i |
| w48 | 110000 | −1.2278+0.8230i | −1.0441+0.1581i | +1.0693−0.9408i |
| w49 | 110001 | −0.8133+1.2150i | −0.1321+0.1317i | −1.0693−0.9408i |
| w50 | 110010 | −0.3325+0.1582i | −1.4516+0.2578i | +0.7092−0.8073i |
| w51 | 110011 | −0.2516+0.3998i | −0.1689+1.0567i | −0.7092−0.8073i |
| w52 | 110100 | −1.2278−0.8230i | −0.6995+0.1411i | +0.1388−0.7057i |
| w53 | 110101 | −0.8133−1.2150i | −0.4035+0.1354i | −0.1388−0.7057i |
| w54 | 110110 | −0.3325−0.1582i | −0.6750+1.2072i | +0.4197−0.7206i |
| w55 | 110111 | −0.2516−0.3998i | −0.2558+1.4247i | −0.4197−0.7206i |
| w56 | 111000 | −0.8971+0.5677i | −1.0161+0.4912i | +1.0693+0.9408i |
| w57 | 111001 | −0.6145+0.8494i | −0.1287+0.4061i | −1.0693+0.9408i |
| w58 | 111010 | −0.6200+0.3227i | −1.1306+0.8649i | +0.7092+0.8073i |
| w59 | 111011 | −0.4328+0.5954i | −0.1385+0.7199i | −0.7092+0.8073i |
| w60 | 111100 | −0.8971−0.5677i | −0.6966+0.4427i | +0.1388+0.7057i |
| w61 | 111101 | −0.6145−0.8494i | −0.4025+0.4142i | −0.1388+0.7057i |
| w62 | 111110 | −0.6200−0.3227i | −0.6874+0.8123i | +0.4197+0.7206i |
| w63 | 111111 | −0.4328−0.5954i | −0.4017+0.7107i | −0.4197+0.7206i |

B3) 256-QAM NUC for MCS=8 (or 9):

| w index | bit label | Constellation point |
|---|---|---|
| w0 | 0000000 | −0.5039 + 1.2055i |
| w1 | 0000000 | −0.4884 + 1.0092i |
| w2 | 0000001 | −1.1657 + 1.0793i |
| w3 | 0000001 | −1.2385 + 0.8387i |
| w4 | 0000010 | −0.5781 + 1.4095i |
| w5 | 0000010 | −0.6891 + 1.0532i |
| w6 | 0000011 | −0.7876 + 1.2931i |
| w7 | 0000011 | −0.8990 + 1.0937i |
| w8 | 0000100 | −0.5039 − 1.2055i |
| w9 | 0000100 | −0.4884 − 1.0092i |
| w10 | 0000101 | −1.1657 − 1.0793i |
| w11 | 0000101 | −1.2385 − 0.8387i |
| w12 | 0000110 | −0.5781 − 1.4095i |
| w13 | 0000110 | −0.6891 − 1.0532i |
| w14 | 0000111 | −0.7876 − 1.2931i |
| w15 | 0000111 | −0.8990 − 1.0937i |
| w16 | 0001000 | −0.6346 + 0.6721i |
| w17 | 0001000 | −0.5902 + 0.8432i |
| w18 | 0001001 | −1.2060 + 0.5685i |
| w19 | 0001001 | −1.4112 + 0.6488i |
| w20 | 0001010 | −0.8075 + 0.6969i |
| w21 | 0001010 | −0.7660 + 0.8734i |
| w22 | 0001011 | −1.0100 + 0.6965i |
| w23 | 0001011 | −0.9651 + 0.8870i |
| w24 | 0001100 | −0.6346 − 0.6721i |
| w25 | 0001100 | −0.5902 − 0.8432i |
| w26 | 0001101 | −1.2060 − 0.5685i |
| w27 | 0001101 | −1.4112 − 0.6488i |
| w28 | 0001110 | −0.8075 − 0.6969i |
| w29 | 0001110 | −0.7660 − 0.8734i |
| w30 | 0001111 | −1.0100 − 0.6965i |
| w31 | 0001111 | −0.9651 − 0.8870i |
| w32 | 0010000 | −0.6629 + 0.0713i |
| w33 | 0010000 | −0.6641 + 0.2135i |
| w34 | 0010001 | −1.4228 + 0.1199i |
| w35 | 0010001 | −1.2036 + 0.1064i |
| w36 | 0010010 | −0.8160 + 0.0736i |
| w37 | 0010010 | −0.8280 + 0.2196i |
| w38 | 0010011 | −0.9811 + 0.0673i |
| w39 | 0010011 | −1.0114 + 0.2066i |
| w40 | 0010100 | −0.6629 − 0.0713i |
| w41 | 0010100 | −0.6641 − 0.2135i |
| w42 | 0010101 | −1.4228 − 0.1199i |
| w43 | 0010101 | −1.2036 − 0.1064i |
| w44 | 0010110 | −0.8160 − 0.0736i |
| w45 | 0010110 | −0.8280 − 0.2196i |
| w46 | 0010111 | −0.9811 − 0.0673i |
| w47 | 0010111 | −1.0114 − 0.2066i |
| w48 | 0011000 | −0.6511 + 0.5096i |
| w49 | 0011000 | −0.6617 + 0.3573i |
| w50 | 0011001 | −1.4186 + 0.3682i |
| w51 | 0011001 | −1.2116 + 0.3184i |
| w52 | 0011010 | −0.8111 + 0.5264i |
| w53 | 0011010 | −0.8276 + 0.3658i |
| w54 | 0011011 | −0.9802 + 0.5258i |
| w55 | 0011011 | −1.0181 + 0.3668i |
| w56 | 0011100 | −0.6511 − 0.5096i |
| w57 | 0011100 | −0.6617 − 0.3573i |
| w58 | 0011101 | −1.4186 − 0.3682i |
| w59 | 0011101 | −1.2116 − 0.3184i |
| w60 | 0011110 | −0.8111 − 0.5264i |
| w61 | 0011110 | −0.8276 − 0.3658i |
| w62 | 0011111 | −0.9802 − 0.5258i |
| w63 | 0011111 | −1.0181 − 0.3668i |
| w64 | 01000000 | +0.5039 + 1.2055i |
| w65 | 01000001 | +0.4884 + 1.0092i |
| w66 | 01000010 | +1.1657 + 1.0793i |
| w67 | 01000011 | +1.2385 + 0.8387i |
| w68 | 01000100 | +0.5781 + 1.4095i |
| w69 | 01000101 | +0.6891 + 1.0532i |
| w70 | 01000110 | +0.7876 + 1.2931i |
| w71 | 01000111 | +0.8990 + 1.0937i |
| w72 | 01001000 | +0.5039 − 1.2055i |
| w73 | 01001001 | +0.4884 − 1.0092i |
| w74 | 01001010 | +1.1657 − 1.0793i |

-continued

| w index | bit label | Constellation point |
|---|---|---|
| w75 | 01001011 | +1.2385 − 0.8387i |
| w76 | 01001100 | +0.5781 − 1.4095i |
| w77 | 01001101 | +0.6891 − 1.0532i |
| w78 | 01001110 | +0.7876 − 1.2931i |
| w79 | 01001111 | +0.8990 − 1.0937i |
| w80 | 01010000 | +0.6346 + 0.6721i |
| w81 | 01010001 | +0.5902 + 0.8432i |
| w82 | 01010010 | +1.2060 + 0.5685i |
| w83 | 01010011 | +1.4112 + 0.6488i |
| w84 | 01010100 | +0.8075 + 0.6969i |
| w85 | 01010101 | +0.7660 + 0.8734i |
| w86 | 01010110 | +1.0100 + 0.6965i |
| w87 | 01010111 | +0.9651 + 0.8870i |
| w88 | 01011000 | +0.6346 − 0.6721i |
| w89 | 01011001 | +0.5902 − 0.8432i |
| w90 | 01011010 | +1.2060 − 0.5685i |
| w91 | 01011011 | +1.4112 − 0.6488i |
| w92 | 01011100 | +0.8075 − 0.6969i |
| w93 | 01011101 | +0.7660 − 0.8734i |
| w94 | 01011110 | +1.0100 − 0.6965i |
| w95 | 01011111 | +0.9651 − 0.8870i |
| w96 | 01100000 | +0.6629 + 0.0713i |
| w97 | 01100001 | +0.6641 + 0.2135i |
| w98 | 01100010 | +1.4228 + 0.1199i |
| w99 | 01100011 | +1.2036 + 0.1064i |
| w100 | 01100100 | +0.8160 + 0.0736i |
| w101 | 01100101 | +0.8280 + 0.2196i |
| w102 | 01100110 | +0.9811 + 0.0673i |
| w103 | 01100111 | +1.0114 + 0.2066i |
| w104 | 01101000 | +0.6629 − 0.0713i |
| w105 | 01101001 | +0.6641 − 0.2135i |
| w106 | 01101010 | +1.4228 − 0.1199i |
| w107 | 01101011 | +1.2036 − 0.1064i |
| w108 | 01101100 | +0.8160 − 0.0736i |
| w109 | 01101101 | +0.8280 − 0.2196i |
| w110 | 01101110 | +0.9811 − 0.0673i |
| w111 | 01101111 | +1.0114 − 0.2066i |
| w112 | 01110000 | +0.6511 + 0.5096i |
| w113 | 01110001 | +0.6617 + 0.3573i |
| w114 | 01110010 | +1.4186 + 0.3682i |
| w115 | 01110011 | +1.2116 + 0.3184i |
| w116 | 01110100 | +0.8111 + 0.5264i |
| w117 | 01110101 | +0.8276 + 0.3658i |
| w118 | 01110110 | +0.9802 + 0.5258i |
| w119 | 01110111 | +1.0181 + 0.3668i |
| w120 | 01111000 | +0.6511 − 0.5096i |
| w121 | 01111001 | +0.6617 − 0.3573i |
| w122 | 01111010 | +1.4186 − 0.3682i |
| w123 | 01111011 | +1.2116 − 0.3184i |
| w124 | 01111100 | +0.8111 − 0.5264i |
| w125 | 01111101 | +0.8276 − 0.3658i |
| w126 | 01111110 | +0.9802 − 0.5258i |
| w127 | 01111111 | +1.0181 − 0.3668i |
| w128 | 10000000 | −0.3004 + 1.2452i |
| w129 | 10000001 | −0.2967 + 1.0627i |
| w130 | 10000010 | −0.0994 + 1.2493i |
| w131 | 10000011 | −0.0947 + 1.0662i |
| w132 | 10000100 | −0.3452 + 1.4585i |
| w133 | 10000101 | −0.2650 + 0.9148i |
| w134 | 10000110 | −0.1137 + 1.4651i |
| w135 | 10000111 | −0.0895 + 0.8991i |
| w136 | 10001000 | −0.3004 − 1.2452i |
| W137 | 10001001 | −0.2967 − 1.0627i |
| w138 | 10001010 | −0.0994 − 1.2493i |
| w139 | 10001011 | −0.0947 − 1.0662i |
| w140 | 10001100 | −0.3452 − 1.4585i |
| w141 | 10001101 | −0.2650 − 0.9148i |
| w142 | 10001110 | −0.1137 − 1.4651i |
| w143 | 10001111 | −0.0895 − 0.8991i |
| w144 | 10010000 | −0.4787 + 0.6378i |
| w145 | 10010001 | −0.4439 + 0.7942i |
| w146 | 10010010 | −0.0688 + 0.5579i |
| w147 | 10010011 | −0.0550 + 0.6984i |
| w148 | 10010100 | −0.3328 + 0.6100i |
| w149 | 10010101 | −0.3014 + 0.7660i |
| w150 | 10010110 | −0.2008 + 0.5810i |
| w151 | 10010111 | −0.1623 + 0.7417i |

-continued

| w index | bit label | Constellation point |
|---|---|---|
| w152 | 10011000 | −0.4787 − 0.6378i |
| w153 | 10011001 | −0.4439 − 0.7942i |
| w154 | 10011010 | −0.0688 − 0.5579i |
| w155 | 10011011 | −0.0550 − 0.6984i |
| w156 | 10011100 | −0.3328 − 0.6100i |
| w157 | 10011101 | −0.3014 − 0.7660i |
| w158 | 10011110 | −0.2008 − 0.5810i |
| w159 | 10011111 | −0.1623 − 0.7417i |
| w160 | 10100000 | −0.5146 + 0.0676i |
| w161 | 10100001 | −0.5128 + 0.2035i |
| w162 | 10100010 | −0.0738 + 0.0604i |
| w163 | 10100011 | −0.0736 + 0.1802i |
| w164 | 10100100 | −0.3680 + 0.0641i |
| w165 | 10100101 | −0.3662 + 0.1927i |
| w166 | 10100110 | −0.2211 + 0.0614i |
| w167 | 10100111 | −0.2203 + 0.1844i |
| w168 | 10101000 | −0.5146 − 0.0676i |
| w169 | 10101001 | −0.5128 − 0.2035i |
| w170 | 10101010 | −0.0738 − 0.0604i |
| w171 | 10101011 | −0.0736 − 0.1802i |
| w172 | 10101100 | −0.3680 − 0.0641i |
| w173 | 10101101 | −0.3662 − 0.1927i |
| w174 | 10101110 | −0.2211 − 0.0614i |
| w175 | 10101111 | −0.2203 − 0.1844i |
| w176 | 10110000 | −0.4984 + 0.4870i |
| w177 | 10110001 | −0.5089 + 0.3418i |
| w178 | 10110010 | −0.0716 + 0.4278i |
| w179 | 10110011 | −0.0731 + 0.3023i |
| w180 | 10110100 | −0.3534 + 0.4630i |
| w181 | 10110101 | −0.3625 + 0.3247i |
| w182 | 10110110 | −0.2134 + 0.4408i |
| w183 | 10110111 | −0.2183 + 0.3103i |
| w184 | 10111000 | −0.4984 − 0.4870i |
| w185 | 10111001 | −0.5089 − 0.3418i |
| w186 | 10111010 | −0.0716 − 0.4278i |
| w187 | 10111011 | −0.0731 − 0.3023i |
| w188 | 10111100 | −0.3534 − 0.4630i |
| w189 | 10111101 | −0.3625 − 0.3247i |
| w190 | 10111110 | −0.2134 − 0.4408i |
| w191 | 10111111 | −0.2183 − 0.3108i |
| w192 | 11000000 | +0.3004 + 1.2452i |
| w193 | 11000001 | +0.2967 + 1.0627i |
| w194 | 11000010 | +0.0994 + 1.2493i |
| w195 | 11000011 | +0.0947 + 1.0662i |
| w196 | 11000100 | +0.3452 + 1.4585i |
| w197 | 11000101 | +0.2650 + 0.9148i |
| w198 | 11000110 | +0.1137 + 1.4651i |
| w199 | 11000111 | +0.0895 + 0.8991i |
| w200 | 11001000 | +0.3004 − 1.2452i |
| w201 | 11001001 | +0.2967 − 1.0627i |
| w202 | 11001010 | +0.0994 − 1.2493i |
| w203 | 11001011 | +0.0947 − 1.0662i |
| w204 | 11001100 | +0.3452 − 1.4585i |
| w205 | 11001101 | +0.2650 − 0.9148i |
| w206 | 11001110 | +0.1137 − 1.4651i |
| w207 | 11001111 | +0.0895 − 0.8991i |
| w208 | 11010000 | +0.4787 + 0.6378i |
| w209 | 11010001 | +0.4439 + 0.7942i |
| w210 | 11010010 | +0.0688 + 0.5579i |
| w211 | 11010011 | +0.0550 + 0.6984i |
| w212 | 11010100 | +0.3328 + 0.6100i |
| w213 | 11010101 | +0.3014 + 0.7660i |
| w214 | 11010110 | +0.2008 + 0.5810i |
| w215 | 11010111 | +0.1623 + 0.7417i |
| w216 | 11011000 | +0.4787 − 0.6378i |
| w217 | 11011001 | +0.4439 − 0.7942i |
| w218 | 11011010 | +0.0688 − 0.5579i |
| w219 | 11011011 | +0.0550 − 0.6984i |
| w220 | 11011100 | +0.3328 − 0.6100i |
| w221 | 11011101 | +0.3014 − 0.7660i |
| w222 | 11011110 | +0.2008 − 0.5810i |
| w223 | 11011111 | +0.1623 − 0.7417i |
| w224 | 11100000 | +0.5146 + 0.0676i |
| w225 | 11100001 | +0.5128 + 0.2035i |
| w226 | 11100010 | +0.0738 + 0.0604i |
| w227 | 11100011 | +0.0736 + 0.1802i |
| w228 | 11100100 | +0.3680 + 0.0641i |

-continued

| w index | bit label | Constellation point |
|---|---|---|
| w229 | 11100101 | +0.3662 + 0.1927i |
| w230 | 11100110 | +0.2211 + 0.0614i |
| w231 | 11100111 | +0.2203 + 0.1844i |
| w232 | 11101000 | +0.5146 − 0.0676i |
| w233 | 11101001 | +0.5128 − 0.2035i |
| w234 | 11101010 | +0.0738 − 0.0604i |
| w235 | 11101011 | +0.0736 − 0.1802i |
| w236 | 11101100 | +0.3680 − 0.0641i |
| w237 | 11101101 | +0.3662 − 0.1927i |
| w238 | 11101110 | +0.2211 − 0.0614i |
| w239 | 11101111 | +0.2203 − 0.1844i |
| w240 | 11110000 | +0.4984 + 0.4870i |
| w241 | 11110001 | +0.5089 + 0.3418i |
| w242 | 11110010 | +0.0716 + 0.4278i |
| w243 | 11110011 | +0.0731 + 0.3023i |
| w244 | 11110100 | +0.3534 + 0.4630i |
| w245 | 11110101 | +0.3625 + 0.3247i |
| w246 | 11110110 | +0.2134 + 0.4408i |
| w247 | 11110111 | +0.2183 + 0.3103i |
| w248 | 11111000 | +0.4984 − 0.4870i |
| w249 | 11111001 | +0.5089 − 0.3418i |
| w250 | 11111010 | +0.0716 − 0.4278i |
| w251 | 11111011 | +0.0731 − 0.3023i |
| w252 | 11111100 | +0.3534 − 0.4630i |
| w253 | 11111101 | +0.3625 − 0.3247i |
| w254 | 11111110 | +0.2134 − 0.4408i |
| w255 | 11111111 | +0.2183 − 0.3108i | or
for MCS=9 (or 8):

| w index | bit label | Constellation point |
|---|---|---|
| w0 | 0000000 | −0.5039 + 1.2055i |
| w1 | 0000000 | +0.5039 + 1.2055i |
| w2 | 0000001 | −0.6629 + 0.0713i |
| w3 | 0000001 | +0.6629 + 0.0713i |
| w4 | 0000010 | −0.5781 + 1.4095i |
| w5 | 0000010 | +0.5781 + 1.4095i |
| w6 | 0000011 | −0.8160 + 0.0736i |
| w7 | 0000011 | +0.8160 + 0.0736i |
| w8 | 0000100 | −0.3004 + 1.2452i |
| w9 | 0000100 | +0.3004 + 1.2452i |
| w10 | 0000101 | −0.5146 + 0.0676i |
| w11 | 0000101 | +0.5146 + 0.0676i |
| w12 | 0000110 | −0.3452 + 1.4585i |
| w13 | 0000110 | +0.3452 + 1.4585i |
| w14 | 0000111 | −0.3680 + 0.0641i |
| w15 | 0000111 | +0.3680 + 0.0641i |
| w16 | 0001000 | −1.1657 + 1.0793i |
| w17 | 0001000 | +1.1657 + 1.0793i |
| w18 | 0001001 | −1.4228 + 0.1199i |
| w19 | 0001001 | +1.4228 + 0.1199i |
| w20 | 0001010 | −0.7876 + 1.2931i |
| w21 | 0001010 | +0.7876 + 1.2931i |
| w22 | 0001011 | −0.9811 + 0.0673i |
| w23 | 0001011 | +0.9811 + 0.0673i |
| w24 | 0001100 | −0.0994 + 1.2493i |
| w25 | 0001100 | +0.0994 + 1.2493i |
| w26 | 0001101 | −0.0738 + 0.0604i |
| w27 | 0001101 | +0.0738 + 0.0604i |
| w28 | 0001110 | −0.1137 + 1.4651i |
| w29 | 0001110 | +0.1137 + 1.4651i |
| w30 | 0001111 | −0.2211 + 0.0614i |
| w31 | 0001111 | +0.2211 + 0.0614i |
| w32 | 0010000 | −0.5039 − 1.2055i |
| w33 | 0010000 | +0.5039 − 1.2055i |
| w34 | 0010001 | −0.6629 − 0.0713i |
| w35 | 0010001 | +0.6629 − 0.0713i |
| w36 | 0010010 | −0.5781 − 1.4095i |
| w37 | 0010010 | +0.5781 − 1.4095i |
| w38 | 0010011 | −0.8160 − 0.0736i |
| w39 | 0010011 | +0.8160 − 0.0736i |
| w40 | 0010100 | −0.3004 − 1.2452i |
| w41 | 0010100 | +0.3004 − 1.2452i |
| w42 | 0010101 | −0.5146 − 0.0676i |
| w43 | 0010101 | +0.5146 − 0.0676i |
| w44 | 0010110 | −0.3452 − 1.4585i |
| w45 | 0010110 | +0.3452 − 1.4585i |
| w46 | 0010111 | −0.3680 − 0.0641i |
| w47 | 0010111 | +0.3680 − 0.0641i |
| w48 | 0011000 | −1.1657 − 1.0793i |
| w49 | 0011000 | +1.1657 − 1.0793i |
| w50 | 0011001 | −1.4228 + 0.1199i |
| w51 | 0011001 | +1.4228 + 0.1199i |
| w52 | 0011010 | −0.7876 − 1.2931i |
| w53 | 0011010 | +0.7876 − 1.2931i |
| w54 | 0011011 | −0.9811 − 0.0673i |
| w55 | 0011011 | +0.9811 − 0.0673i |
| w56 | 0011100 | −0.0994 − 1.2493i |
| w57 | 0011100 | +0.0994 − 1.2493i |
| w58 | 0011101 | −0.0738 − 0.0604i |
| w59 | 0011101 | +0.0738 − 0.0604i |
| w60 | 0011110 | −0.1137 − 1.4651i |
| w61 | 0011110 | +0.1137 − 1.4651i |
| w62 | 0011111 | −0.2211 − 0.0614i |
| w63 | 0011111 | +0.2211 − 0.0614i |
| w64 | 01000000 | −0.6346 + 0.6721i |
| w65 | 01000001 | +0.6346 + 0.6721i |
| w66 | 01000010 | −0.6511 + 0.5096i |
| w67 | 01000011 | +0.6511 + 0.5096i |
| w68 | 01000100 | −0.8075 + 0.6969i |
| w69 | 01000101 | +0.8075 + 0.6969i |
| w70 | 01000110 | −0.8111 + 0.5264i |
| w71 | 01000111 | +0.8111 + 0.5264i |
| w72 | 01001000 | −0.4787 + 0.6378i |
| w73 | 01001001 | +0.4787 + 0.6378i |
| w74 | 01001010 | −0.4984 + 0.4870i |
| w75 | 01001011 | +0.4984 + 0.4870i |
| w76 | 01001100 | −0.3328 + 0.6100i |
| w77 | 01001101 | +0.3328 + 0.6100i |
| w78 | 01001110 | −0.3534 + 0.4630i |
| w79 | 01001111 | +0.3534 + 0.4630i |
| w80 | 01010000 | −1.2060 + 0.5685i |
| w81 | 01010001 | +1.2060 + 0.5685i |
| w82 | 01010010 | −1.4186 + 0.3682i |
| w83 | 01010011 | +1.4186 + 0.3682i |
| w84 | 01010100 | −1.0100 + 0.6965i |
| w85 | 01010101 | +1.0100 + 0.6965i |
| w86 | 01010110 | −0.9802 + 0.5258i |
| w87 | 01010111 | +0.9802 + 0.5258i |
| w88 | 01011000 | −0.0688 + 0.5579i |
| w89 | 01011001 | +0.0688 + 0.5579i |
| w90 | 01011010 | −0.0716 + 0.4278i |
| w91 | 01011011 | +0.0716 + 0.4278i |
| w92 | 01011100 | −0.2008 + 0.5810i |
| w93 | 01011101 | +0.2008 + 0.5810i |
| w94 | 01011110 | −0.2134 + 0.4408i |
| w95 | 01011111 | +0.2134 + 0.4408i |
| w96 | 01100000 | −0.6346 − 0.6721i |
| w97 | 01100001 | +0.6346 − 0.6721i |
| w98 | 01100010 | −0.6511 − 0.5096i |
| w99 | 01100011 | +0.6511 − 0.5096i |
| w100 | 01100100 | −0.8075 − 0.6969i |
| w101 | 01100101 | +0.8075 − 0.6969i |
| w102 | 01100110 | −0.8111 − 0.5264i |
| w103 | 01100111 | +0.8111 − 0.5264i |
| w104 | 01101000 | −0.4787 − 0.6378i |
| w105 | 01101001 | +0.4787 − 0.6378i |
| w106 | 01101010 | −0.4984 − 0.4870i |
| w107 | 01101011 | +0.4984 − 0.4870i |
| w108 | 01101100 | −0.3328 − 0.6100i |
| w109 | 01101101 | +0.3328 − 0.6100i |
| w110 | 01101110 | −0.3534 − 0.4630i |
| w111 | 01101111 | +0.3534 − 0.4630i |
| w112 | 01110000 | −1.2060 − 0.5685i |
| w113 | 01110001 | +1.2060 − 0.5685i |
| w114 | 01110010 | −1.4186 − 0.3682i |
| w115 | 01110011 | +1.4186 − 0.3682i |
| w116 | 01110100 | −1.0100 − 0.6965i |
| w117 | 01110101 | +1.0100 − 0.6965i |
| w118 | 01110110 | −0.9802 − 0.5258i |

| w index | bit label | Constellation point |
|---|---|---|
| w119 | 01110111 | +0.9802 − 0.5258i |
| w120 | 01111000 | −0.0688 − 0.5579i |
| w121 | 01111001 | +0.0688 − 0.5579i |
| w122 | 01111010 | −0.0716 − 0.4278i |
| w123 | 01111011 | +0.0716 − 0.4278i |
| w124 | 01111100 | −0.2008 − 0.5810i |
| w125 | 01111101 | +0.2008 − 0.5810i |
| w126 | 01111110 | −0.2134 − 0.4408i |
| w127 | 01111111 | +0.2134 − 0.4408i |
| w128 | 10000000 | −0.4884 + 1.0092i |
| w129 | 10000001 | +0.4884 + 1.0092i |
| w130 | 10000010 | −0.6641 + 0.2135i |
| w131 | 10000011 | +0.6641 + 0.2135i |
| w132 | 10000100 | −0.6891 + 1.0532i |
| w133 | 10000101 | +0.6891 + 1.0532i |
| w134 | 10000110 | −0.8280 + 0.2196i |
| w135 | 10000111 | +0.8280 + 0.2196i |
| w136 | 10001000 | −0.2967 + 1.0627i |
| W137 | 10001001 | +0.2967 + 1.0627i |
| w138 | 10001010 | −0.5128 + 0.2035i |
| w139 | 10001011 | +0.5128 + 0.2035i |
| w140 | 10001100 | −0.2650 + 0.9148i |
| w141 | 10001101 | +0.2650 + 0.9148i |
| w142 | 10001110 | −0.3662 + 0.1927i |
| w143 | 10001111 | +0.3662 + 0.1927i |
| w144 | 10010000 | −1.2385 + 0.8387i |
| w145 | 10010001 | +1.2385 + 0.8387i |
| w146 | 10010010 | −1.2036 + 0.1064i |
| w147 | 10010011 | +1.2036 + 0.1064i |
| w148 | 10010100 | −0.8990 + 1.0937i |
| w149 | 10010101 | +0.8990 + 1.0937i |
| w150 | 10010110 | −1.0114 + 0.2066i |
| w151 | 10010111 | +1.0114 + 0.2066i |
| w152 | 10011000 | −0.0947 + 1.0662i |
| w153 | 10011001 | +0.0947 + 1.0662i |
| w154 | 10011010 | −0.0736 + 0.1802i |
| w155 | 10011011 | +0.0736 + 0.1802i |
| w156 | 10011100 | −0.0895 + 0.8991i |
| w157 | 10011101 | +0.0895 + 0.8991i |
| w158 | 10011110 | −0.2203 + 0.1844i |
| w159 | 10011111 | +0.2203 + 0.1844i |
| w160 | 10100000 | −0.4884 − 1.0092i |
| w161 | 10100001 | +0.4884 − 1.0092i |
| w162 | 10100010 | −0.6641 − 0.2135i |
| w163 | 10100011 | +0.6641 − 0.2135i |
| w164 | 10100100 | −0.6891 − 1.0532i |
| w165 | 10100101 | +0.6891 − 1.0532i |
| w166 | 10100110 | −0.8280 − 0.2196i |
| w167 | 10100111 | +0.8280 − 0.2196i |
| w168 | 10101000 | −0.2967 − 1.0627i |
| w169 | 10101001 | +0.2967 − 1.0627i |
| w170 | 10101010 | −0.5128 − 0.2035i |
| w171 | 10101011 | +0.5128 − 0.2035i |
| w172 | 10101100 | −0.2650 − 0.9148i |
| w173 | 10101101 | +0.2650 − 0.9148i |
| w174 | 10101110 | −0.3662 − 0.1927i |
| w175 | 10101111 | +0.3662 − 0.1927i |
| w176 | 10110000 | −1.2385 − 0.8387i |
| w177 | 10110001 | +1.2385 − 0.8387i |
| w178 | 10110010 | −1.2036 − 0.1064i |
| w179 | 10110011 | +1.2036 − 0.1064i |
| w180 | 10110100 | −0.8990 − 1.0937i |
| w181 | 10110101 | +0.8990 − 1.0937i |
| w182 | 10110110 | −1.0114 − 0.2066i |
| w183 | 10110111 | +1.0114 − 0.2066i |
| w184 | 10111000 | −0.0947 − 1.0662i |
| w185 | 10111001 | +0.0947 − 1.0662i |
| w186 | 10111010 | −0.0736 − 0.1802i |
| w187 | 10111011 | +0.0736 − 0.1802i |
| w188 | 10111100 | −0.0895 − 0.8991i |
| w189 | 10111101 | +0.0895 − 0.8991i |
| w190 | 10111110 | −0.2203 − 0.1844i |
| w191 | 10111111 | +0.2203 − 0.1844i |
| w192 | 11000000 | −0.5902 + 0.8432i |
| w193 | 11000001 | +0.5902 + 0.8432i |
| w194 | 11000010 | −0.6617 + 0.3573i |
| w195 | 11000011 | +0.6617 + 0.3573i |
| w196 | 11000100 | −0.7660 + 0.8734i |
| w197 | 11000101 | +0.7660 + 0.8734i |
| w198 | 11000110 | −0.8276 + 0.3658i |
| w199 | 11000111 | +0.8276 + 0.3658i |
| w200 | 11001000 | −0.4439 + 0.7942i |
| w201 | 11001001 | +0.4439 + 0.7942i |
| w202 | 11001010 | −0.5089 + 0.3418i |
| w203 | 11001011 | +0.5089 + 0.3418i |
| w204 | 11001100 | −0.3014 + 0.7660i |
| w205 | 11001101 | +0.3014 + 0.7660i |
| w206 | 11001110 | −0.3625 + 0.3247i |
| w207 | 11001111 | +0.3625 + 0.3247i |
| w208 | 11010000 | −1.4112 + 0.6488i |
| w209 | 11010001 | +1.4112 + 0.6488i |
| w210 | 11010010 | −1.2116 + 0.3184i |
| w211 | 11010011 | +1.2116 + 0.3184i |
| w212 | 11010100 | −0.9651 + 0.8870i |
| w213 | 11010101 | +0.9651 + 0.8870i |
| w214 | 11010110 | −1.0181 + 0.3668i |
| w215 | 11010111 | +1.0181 + 0.3668i |
| w216 | 11011000 | −0.0550 + 0.6984i |
| w217 | 11011001 | +0.0550 + 0.6984i |
| w218 | 11011010 | −0.0731 + 0.3023i |
| w219 | 11011011 | +0.0731 + 0.3023i |
| w220 | 11011100 | −0.1623 + 0.7417i |
| w221 | 11011101 | +0.1623 + 0.7417i |
| w222 | 11011110 | −0.2183 + 0.3103i |
| w223 | 11011111 | +0.2183 + 0.3103i |
| w224 | 11100000 | −0.5902 − 0.8432i |
| w225 | 11100001 | +0.5902 − 0.8432i |
| w226 | 11100010 | −0.6617 − 0.3573i |
| w227 | 11100011 | +0.6617 − 0.3573i |
| w228 | 11100100 | −0.7660 − 0.8734i |
| w229 | 11100101 | +0.7660 − 0.8734i |
| w230 | 11100110 | −0.8276 − 0.3658i |
| w231 | 11100111 | +0.8276 − 0.3658i |
| w232 | 11101000 | −0.4439 − 0.7942i |
| w233 | 11101001 | +0.4439 − 0.7942i |
| w234 | 11101010 | −0.5089 − 0.3418i |
| w235 | 11101011 | +0.5089 − 0.3418i |
| w236 | 11101100 | −0.3014 − 0.7660i |
| w237 | 11101101 | +0.3014 − 0.7660i |
| w238 | 11101110 | −0.3625 − 0.3247i |
| w239 | 11101111 | +0.3625 − 0.3247i |
| w240 | 11110000 | −1.4112 − 0.6488i |
| w241 | 11110001 | +1.4112 − 0.6488i |
| w242 | 11110010 | −1.2116 − 0.3184i |
| w243 | 11110011 | +1.2116 − 0.3184i |
| w244 | 11110100 | −0.9651 − 0.8870i |
| w245 | 11110101 | +0.9651 − 0.8870i |
| w246 | 11110110 | −1.0181 − 0.3668i |
| w247 | 11110111 | +1.0181 − 0.3668i |
| w248 | 11111000 | −0.0550 − 0.6984i |
| w249 | 11111001 | +0.0550 − 0.6984i |
| w250 | 11111010 | −0.0731 − 0.3023i |
| w251 | 11111011 | +0.0731 − 0.3023i |
| w252 | 11111100 | −0.1623 − 0.7417i |
| w253 | 11111101 | +0.1623 − 0.7417i |
| w254 | 11111110 | −0.2183 − 0.3103i |
| w255 | 11111111 | +0.2183 − 0.3103i |

C) 1024-QAM non-uniform constellations of group C for BCC encoding:

C1) for code rate 2/3 (or 3/4 or 7/8)), where $z_q$ is a complex constellation point having a real part and an imaginary part real part

| | | | | | | | | | | | | | | | | | |
|---|---|---|---|---|---|---|---|---|---|---|---|---|---|---|---|---|---|
| $b_2$ | 0 | 0 | 0 | 0 | 0 | 0 | 0 | 0 | 0 | 0 | 0 | 0 | 0 | 0 | 0 | 0 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 0 | 0 | 0 | 0 | 0 | 0 | 0 | 1 | 1 | 1 | 1 | 1 | 1 | 1 | 1 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_2$ | 1 | 1 | 1 | 1 | 1 | 1 | 1 | 1 | 1 | 1 | 1 | 1 | 1 | 1 | 1 | 1 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 1 | 1 | 1 | 1 | 1 | 1 | 1 | 1 | 0 | 0 | 0 | 0 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | | |
|---|---|---|---|---|---|---|---|---|---|---|---|---|---|---|---|---|---|
| $b_0$ | 0 | 0 | 0 | 0 | 0 | 0 | 0 | 0 | 1 | 1 | 1 | 1 | 1 | 1 | 1 | 1 | |
| $b_1$ | 0 | 0 | 1 | 1 | 1 | 1 | 0 | 0 | 0 | 0 | 1 | 1 | 1 | 1 | 0 | 0 | |
| $b_5$ | 0 | 0 | 0 | 0 | 0 | 0 | 0 | 0 | 0 | 0 | 0 | 0 | 0 | 0 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 1 | 1 | 1 | 1 | 1 | 1 | 1 | 1 | 0 | 0 | 0 | 0 | 0 | 0 | 0 | 0 | |
| $b_1$ | 0 | 0 | 1 | 1 | 1 | 1 | 0 | 0 | 0 | 0 | 1 | 1 | 1 | 1 | 0 | 0 | |
| $b_5$ | 1 | 1 | 1 | 1 | 1 | 1 | 1 | 1 | 1 | 1 | 1 | 1 | 1 | 1 | 1 | 1 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041;

C2) for code rate 3/4 (or 2/3 or 7/8)), where $z_q$ is a complex constellation point having a real part and an imaginary part wherein the values for $u_1, \ldots, u_{15}$ are:
3.0001, 5.0203, 7.0622, 9.1446, 11.2738, 13.4672, 15.7360, 18.0975, 20.5669, 23.1643, 25.9119, 28.8399, 31.9932, 35.4479, 39.3783;

C3) for code rate 7/8 (or 2/3 or 3/4)), where $z_q$ is a complex constellation point having a real part and an imaginary part real part

| | | | | | | | | | | | | | | | | | |
|---|---|---|---|---|---|---|---|---|---|---|---|---|---|---|---|---|---|
| $b_0$ | 0 | 0 | 1 | 1 | 1 | 1 | 0 | 0 | 0 | 0 | 1 | 1 | 1 | 1 | 0 | 0 | |
| $b_1$ | 0 | 0 | 0 | 0 | 0 | 0 | 0 | 0 | 0 | 0 | 0 | 0 | 0 | 0 | 0 | 0 | |
| $b_3$ | 0 | 0 | 0 | 0 | 0 | 0 | 0 | 0 | 1 | 1 | 1 | 1 | 1 | 1 | 1 | 1 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 1 | 1 | 1 | 1 | 1 | 1 | 1 | 1 | 1 | 1 | 1 | 1 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 0 | 1 | 1 | 1 | 1 | 0 | 0 | 0 | 0 | 1 | 1 | 1 | 1 | 0 | 0 | |
| $b_1$ | 1 | 1 | 1 | 1 | 1 | 1 | 1 | 1 | 1 | 1 | 1 | 1 | 1 | 1 | 1 | 1 | |
| $b_3$ | 1 | 1 | 1 | 1 | 1 | 1 | 1 | 1 | 0 | 0 | 0 | 0 | 0 | 0 | 0 | 0 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | | |
|---|---|---|---|---|---|---|---|---|---|---|---|---|---|---|---|---|---|
| $b_2$ | 0 | 0 | 0 | 0 | 0 | 0 | 0 | 0 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_2$ | 1 | 1 | 1 | 1 | 1 | 1 | 1 | 1 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |

| | | | | | | | | real part | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 0 | 0 | 0 | 0 | 1 | 1 | 1 | 1 | 1 | 1 | 1 | 1 | |
| $b_3$ | 0 | 0 | 0 | 0 | 0 | 0 | 0 | 0 | 0 | 0 | 0 | 0 | 0 | 0 | 0 | 0 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_0$ | 0 | 1 | 1 | 0 | 0 | 1 | 1 | 0 | 0 | 1 | 1 | 0 | 0 | 1 | 1 | 0 | |
| $b_1$ | 1 | 1 | 1 | 1 | 1 | 1 | 1 | 1 | 0 | 0 | 0 | 0 | 0 | 0 | 0 | 0 | |
| $b_3$ | 1 | 1 | 1 | 1 | 1 | 1 | 1 | 1 | 1 | 1 | 1 | 1 | 1 | 1 | 1 | 1 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |

| | | | | | | | | imaginary part | | | | | | | | | |
|---|---|---|---|---|---|---|---|---|---|---|---|---|---|---|---|---|---|
| $b_2$ | 0 | 1 | 1 | 0 | 0 | 1 | 1 | 0 | 0 | 1 | 1 | 0 | 0 | 1 | 1 | 0 | |
| $b_5$ | 0 | 0 | 0 | 0 | 0 | 0 | 0 | 0 | 0 | 0 | 0 | 0 | 0 | 0 | 0 | 0 | |
| $b_6$ | 0 | 0 | 0 | 0 | 1 | 1 | 1 | 1 | 1 | 1 | 1 | 1 | 0 | 0 | 0 | 0 | |
| $b_8$ | 0 | 0 | 1 | 1 | 1 | 1 | 0 | 0 | 0 | 0 | 1 | 1 | 1 | 1 | 0 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_2$ | 0 | 1 | 1 | 0 | 0 | 1 | 1 | 0 | 0 | 1 | 1 | 0 | 0 | 1 | 1 | 0 | |
| $b_5$ | 1 | 1 | 1 | 1 | 1 | 1 | 1 | 1 | 1 | 1 | 1 | 1 | 1 | 1 | 1 | 1 | |
| $b_6$ | 0 | 0 | 0 | 0 | 1 | 1 | 1 | 1 | 1 | 1 | 1 | 1 | 0 | 0 | 0 | 0 | |
| $b_8$ | 0 | 0 | 1 | 1 | 1 | 1 | 0 | 0 | 0 | 0 | 1 | 1 | 1 | 1 | 0 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041;

D) 1024-QAM non-uniform constellations of group D for LDPC encoding:
D1) for code rate 2/3 (or 2/3 or 5/6)), where $z_q$ is a complex constellation point having a real part and an imaginary part

| | | | | | | | | real part | | | | | | | | | |
|---|---|---|---|---|---|---|---|---|---|---|---|---|---|---|---|---|---|
| $b_1$ | 0 | 1 | 1 | 0 | 0 | 1 | 1 | 0 | 0 | 1 | 1 | 0 | 0 | 1 | 1 | 0 | |
| $b_2$ | 0 | 0 | 0 | 0 | 0 | 0 | 0 | 0 | 1 | 1 | 1 | 1 | 1 | 1 | 1 | 1 | |
| $b_3$ | 0 | 0 | 1 | 1 | 1 | 1 | 0 | 0 | 0 | 0 | 1 | 1 | 1 | 1 | 0 | 0 | |
| $b_6$ | 0 | 0 | 0 | 0 | 0 | 0 | 0 | 0 | 0 | 0 | 0 | 0 | 0 | 0 | 0 | 0 | |
| $b_7$ | 0 | 0 | 0 | 0 | 1 | 1 | 1 | 1 | 1 | 1 | 1 | 1 | 0 | 0 | 0 | 0 | |
| $Re(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_1$ | 0 | 1 | 1 | 0 | 0 | 1 | 1 | 0 | 0 | 1 | 1 | 0 | 0 | 1 | 1 | 0 | |
| $b_2$ | 1 | 1 | 1 | 1 | 1 | 1 | 1 | 1 | 0 | 0 | 0 | 0 | 0 | 0 | 0 | 0 | |
| $b_3$ | 0 | 0 | 1 | 1 | 1 | 1 | 0 | 0 | 0 | 0 | 1 | 1 | 1 | 1 | 0 | 0 | |
| $b_6$ | 1 | 1 | 1 | 1 | 1 | 1 | 1 | 1 | 1 | 1 | 1 | 1 | 1 | 1 | 1 | 1 | |
| $b_7$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |

| | | | | | | | | imaginary part | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_4$ | 0 | 0 | 1 | 1 | 1 | 1 | 0 | 0 | 0 | 0 | 1 | 1 | 1 | 1 | 0 | 0 | |
| $b_5$ | 0 | 0 | 0 | 0 | 0 | 0 | 0 | 0 | 0 | 0 | 0 | 0 | 0 | 0 | 0 | 0 | |
| $b_8$ | 0 | 0 | 0 | 0 | 1 | 1 | 1 | 1 | 1 | 1 | 1 | 1 | 0 | 0 | 0 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_0$ | 0 | 1 | 1 | 0 | 0 | 1 | 1 | 0 | 0 | 1 | 1 | 0 | 0 | 1 | 1 | 0 | |
| $b_4$ | 0 | 0 | 1 | 1 | 1 | 1 | 0 | 0 | 0 | 0 | 1 | 1 | 1 | 1 | 0 | 0 | |
| $b_5$ | 1 | 1 | 1 | 1 | 1 | 1 | 1 | 1 | 1 | 1 | 1 | 1 | 1 | 1 | 1 | 1 | |
| $b_8$ | 0 | 0 | 0 | 0 | 1 | 1 | 1 | 1 | 1 | 1 | 1 | 1 | 0 | 0 | 0 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.0047, 3.9822, 5.1633, 7.0998, 8.5600, 10.4887, 12.2428, 14.2618, 16.3225, 18.5947, 21.0696, 23.8248, 26.9139, 30.4303, 34.5872;

D2) for code rate 3/4 (or 2/3 or 5/6)), where $z_q$ is a complex constellation point having a real part and an imaginary part

| | | | | | | | | real part | | | | | | | | | |
|---|---|---|---|---|---|---|---|---|---|---|---|---|---|---|---|---|---|
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_8$ | 0 | 0 | 0 | 0 | 0 | 0 | 0 | 0 | 0 | 0 | 0 | 0 | 0 | 0 | 0 | 0 | |
| $b_9$ | 0 | 0 | 0 | 0 | 0 | 0 | 0 | 0 | 1 | 1 | 1 | 1 | 1 | 1 | 1 | 1 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_8$ | 1 | 1 | 1 | 1 | 1 | 1 | 1 | 1 | 1 | 1 | 1 | 1 | 1 | 1 | 1 | 1 | |
| $b_9$ | 1 | 1 | 1 | 1 | 1 | 1 | 1 | 1 | 0 | 0 | 0 | 0 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| | | | | | | | | imaginary part | | | | | | | | | |
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 0 | 0 | 0 | 0 | 0 | 0 | 0 | 0 | 1 | 1 | 1 | 1 | 1 | 1 | 1 | 1 | |
| $b_7$ | 0 | 0 | 0 | 0 | 0 | 0 | 0 | 0 | 0 | 0 | 0 | 0 | 0 | 0 | 0 | 0 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 1 | 1 | 1 | 1 | 1 | 1 | 1 | 1 | 0 | 0 | 0 | 0 | 0 | 0 | 0 | 0 | |
| $b_7$ | 1 | 1 | 1 | 1 | 1 | 1 | 1 | 1 | 1 | 1 | 1 | 1 | 1 | 1 | 1 | 1 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9667, 4.9871, 7.0015, 9.0819, 11.1960, 13.3951, 15.6735, 18.0691, 20.5980, 23.2914, 26.1728, 29.2806, 32.6657, 36.4161, 40.7366;

D3) code rate 5/6 (or 2/3 or 3/4)), where $z_q$ s a complex constellation point having a real part and an imaginary part

| | | | | | | | | real part | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_3$ | 0 | 0 | 0 | 0 | 0 | 0 | 0 | 0 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 0 | 0 | 0 | 0 | 0 | 0 | 0 | 0 | 0 | 0 | 0 | 0 | |
| $b_8$ | 0 | 0 | 0 | 0 | 1 | 1 | 1 | 1 | 1 | 1 | 1 | 1 | 0 | 0 | 0 | 0 | |
| $Re(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_0$ | 0 | 1 | 1 | 0 | 0 | 1 | 1 | 0 | 0 | 1 | 1 | 0 | 0 | 1 | 1 | 0 | |
| $b_3$ | 1 | 1 | 1 | 1 | 1 | 1 | 1 | 1 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 1 | 1 | 1 | 1 | 1 | 1 | 1 | 1 | 1 | 1 | 1 | 1 | 1 | 1 | 1 | 1 | |
| $b_8$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| | | | | | | | | imaginary part | | | | | | | | | |
| $b_1$ | 0 | 0 | 0 | 0 | 0 | 0 | 0 | 0 | 1 | 1 | 1 | 1 | 1 | 1 | 1 | 1 | |
| $b_2$ | 0 | 0 | 0 | 0 | 1 | 1 | 1 | 1 | 1 | 1 | 1 | 1 | 0 | 0 | 0 | 0 | |
| $b_4$ | 0 | 0 | 0 | 0 | 0 | 0 | 0 | 0 | 0 | 0 | 0 | 0 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $Im(z_q)$ | −31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_1$ | 1 | 1 | 1 | 1 | 1 | 1 | 1 | 1 | 0 | 0 | 0 | 0 | 0 | 0 | 0 | 0 | |

-continued

| | | | | | | | | | | | | | | | | | |
|---|---|---|---|---|---|---|---|---|---|---|---|---|---|---|---|---|---|
| $b_2$ | 0 | 0 | 0 | 0 | 1 | 1 | 1 | 1 | 1 | 1 | 1 | 1 | 0 | 0 | 0 | 0 | |
| $b_4$ | 1 | 1 | 1 | 1 | 1 | 1 | 1 | 1 | 1 | 1 | 1 | 1 | 1 | 1 | 1 | 1 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9902, 5.0100, 7.0446, 9.1283, 11.2570, 13.4588, 15.7417, 18.1292, 20.6379, 23.2916, 26.1151, 29.1412, 32.4176, 36.0267, 40.1583;
wherein the bit labeling indicated in groups A to D may alternatively be inverted for one or more bit labels.

14. A demodulation and decoding method comprising:
demodulating constellation values of a NUC (non-uniform constellation) into cell words and assigning bit combinations to constellation values of the used non-uniform constellation, and
decoding cell words into output data according to a BCC (binary convolutional code), or a LDPC (low density parity check code), and
wherein said demodulating is configured to use, based on signalling information indicating the code used by an encoder, the total number M of constellation points of the constellation and the code rate,
i) a NUC (non-uniform constellation) and bit labeling from a group A, if the encoder is configured to use a BCC code and if M=16, 64 or 256, the group A comprising constellations as defined in
sub-group A1 for 16-QAM with M=16 and code rates of 1/2 or 3/4,
sub-group A2 for 64-QAM with M=64 and code rates of 2/3, 3/4 or 5/6, and
sub-group A3 for 256-QAM with M=256 and code rates of 3/4 or 5/6,
wherein the constellation points are defined by a constellation position vector $w_0 \ldots w_{M-1}$,
or
ii) a non-uniform constellation and bit labeling from a group B, if the encoder is configured to use a LDPC code and if M=16, 64 or 256, the group B comprising constellations as defined in
sub-group B1 for 16-QAM with M=16 and code rates of 1/2 or 3/4,
sub-group B2 for 64-QAM with M=64 and code rates of 2/3, 3/4 or 5/6, and
sub-group B3 for 256-QAM with M=256 and code rates of 3/4 or 5/6,
wherein the constellation points are defined by a constellation position vector $w_0 \ldots w_{M-1}$,
or
iii) a non-uniform constellation and bit labeling from a group C, if the encoder is configured to use a BCC code and if M=1024 and a code rate of 2/3, 3/4 or 7/8, the group C comprising constellations C1, C2 and C3,
wherein the constellation points are defined by the constellation position vector u of length v=sqrt(M)/2−1,
or
iv) a non-uniform constellation and bit labeling from a group D, if the encoder is configured to use a LDPC code and if M=1024 and a code rate of 2/3, 3/4 or 5/6, the group D comprising constellations D1, D2, D3, wherein the constellation points are defined by the constellation position vector u of length v=sqrt(M)/2−1,
wherein when said demodulator is configured to use a selected non-uniform constellation obtained from a constellation from anyone of groups A, B, C or D the demodulator may use the selected non-uniform constellation which has been modified through rotation by an angle around the origin, through inversion of bit labels for all constellation points, through interchanging of bit positions, through mirroring on any line in the complex plane and/or through predistortion for the constellation points,
wherein the constellation position vectors of the different constellations of the groups A, B, C, D of constellations are defined as follows:
A) M-QAM non-uniform constellations of group A for BCC encoding:
A1) 16-QAM NUC, where MCS is a modulation and coding scheme, where MCS 3 corresponds to a 16-QAM with code rate 1/2, and MCS 4 corresponds to 16-QAM with code rate 3/4

| w | bit label | MCS = 3 (or 4) | MCS = 4 (or 3) |
|---|---|---|---|
| w0 | 0000 | +0.2918+0.2918i | +0.3063−0.3063i |
| w1 | 0001 | +0.9565+0.2918i | +0.3063+0.3063i |
| w2 | 0010 | −0.2918+0.2918i | +0.9519−0.3063i |
| w3 | 0011 | −0.9565+0.2918i | +0.9519+0.3063i |
| w4 | 0100 | +0.2918+0.9565i | −0.3063−0.3063i |
| w5 | 0101 | +0.9565+0.9565i | −0.3063+0.3063i |
| w6 | 0110 | −0.2918+0.9565i | −0.9519−0.3063i |
| w7 | 0111 | −0.9565+0.9565i | −0.9519+0.3063i |
| w8 | 1000 | +0.2918−0.2918i | +0.3063−0.9519i |
| w9 | 1001 | +0.9555−0.2918i | +0.3063+0.9519i |
| w10 | 1010 | −0.2918−0.2918i | +0.9519−0.9519i |
| w11 | 1011 | −0.9565−0.2918i | +0.9519+0.9519i |
| w12 | 1100 | +0.2918−0.9565i | −0.3063−0.9519i |
| w13 | 1101 | +0.9565−0.9565i | −0.3063+0.9519i |
| w14 | 1110 | −0.2918−0.9565i | −0.9519−0.9519i |
| w15 | 1111 | −0.9565−0.9565i | −0.9519+0.9519i |

A2) 64-QAM NUC

| w/MCS index | bit label | MCS = 5 (or 6 or 7) | MCS = 6 (or 5 or 7) | MCS = 7 (or 5 or 6) |
|---|---|---|---|---|
| w0 | 000000 | +1.0474−0.1695i | +1.0432−0.1724i | +1.0297−0.1665i |
| w1 | 000001 | +0.7243−0.1504i | +0.7272−0.1538i | +0.1417−0.1412i |
| w2 | 000010 | −1.0474−0.1695i | +0.1428−0.1397i | −1.0297−0.1665i |
| w3 | 000011 | −0.7243−0.1504i | +0.4304−0.1474i | −0.1417−0.1412i |
| w4 | 000100 | +0.1407−0.1336i | −1.0432−0.1724i | +1.1116−0.5027i |
| w5 | 000101 | +0.4265−0.1388i | −0.7272−0.1538i | +0.1521−0.4258i |
| w6 | 000110 | −0.1407−0.1336i | −0.1428−0.1397i | −1.1116−0.5027i |
| w7 | 000111 | −0.4265−0.1388i | −0.4304−0.1474i | −0.1521−0.4258i |
| w8 | 001000 | +1.0474+0.1695i | +1.0432+0.1724i | +1.0297+0.1665i |
| w9 | 001001 | +0.7243+0.1504i | +0.7272+0.1538i | +0.1417+0.1412i |
| w10 | 001010 | −1.0474+0.1695i | +0.1428+0.1397i | −1.0297+0.1665i |
| w11 | 001011 | −0.7243+0.1504i | +0.4304+0.1474i | −0.1417+0.1412i |
| w12 | 001100 | +0.1407+0.1336i | −1.0432+0.1724i | +1.1116+0.5027i |

-continued

| w/ MCS index | bit label | MCS = 5 (or 6 or 7) | MCS = 6 (or 5 or 7) | MCS = 7 (or 5 or 6) |
|---|---|---|---|---|
| w13 | 001101 | +0.4265+0.1388i | −0.7272+0.1538i | +0.1521+0.4258i |
| w14 | 001110 | −0.1407+0.0336i | −0.1428+0.1397i | −1.1116+0.5027i |
| w15 | 001111 | −0.4255+0.1388i | −0.4304+0.1474i | −0.1521+0.4258i |
| w16 | 010000 | +1.4261−0.2216i | +1.1145−0.5358i | +0.7218−0.1633i |
| w17 | 010001 | +0.6106−1.1783i | +0.7705−0.4700i | +0.4281−0.1504i |
| w18 | 010010 | −1.4261−0.2216i | +0.1500−0.4221i | −0.7218−0.1633i |
| w19 | 010011 | −0.6106−1.1783i | +0.4537−0.4461i | −0.4281−0.1504i |
| w20 | 010100 | +0.1682−1.0316i | −1.1145−0.5358i | +0.7726−0.4955i |
| w21 | 010101 | +0.2287−1.3914i | −0.7705−0.4700i | +0.4581−0.4553i |
| w22 | 010110 | −0.1682−1.0316i | −0.1500−0.4221i | −0.7726−0.4955i |
| w23 | 010111 | −0.2287−1.3914i | −0.4537−0.4461i | −0.4581−0.4553i |
| w24 | 011000 | +1.4261+0.2216i | +1.1145+0.5358i | +0.7218+0.1633i |
| w25 | 011001 | +0.6106+1.1783i | +0.7705+0.4700i | +0.4281+0.1504i |
| w26 | 011010 | −1.4261+0.2216i | +0.1500+0.4221i | −0.7218+0.1633i |
| w27 | 011011 | −0.6106+1.1783i | +0.4537+0.4461i | −0.4281+0.1504i |
| w28 | 011100 | +0.1682+1.0316i | −1.1145+0.5358i | +0.7726+0.4955i |
| w29 | 011101 | +0.2287+1.3914i | −0.7705+0.4700i | +0.4581+0.4553i |
| w30 | 011110 | −0.1682+1.0316i | −0.1500+0.4221i | −0.7726+0.4955i |
| w31 | 011111 | −0.2287+1.3914i | −0.4537+0.4461i | −0.4581+0.4553i |
| w32 | 100000 | +1.0854−0.5394i | +1.3903−0.2023i | +1.3715−0.1909i |
| w33 | 100001 | +0.7353−0.4623i | +0.5830−1.1356i | +0.1700−1.0281i |
| w34 | 100010 | −1.0854−0.5394i | +0.1708−1.0248i | −1.3715−0.1909i |
| w35 | 100011 | −0.7353−0.4523i | +0.2191−1.3618i | −0.1700−1.0281i |
| w36 | 100100 | +0.1392−0.4078i | −1.3903−0.2023i | +1.1152−0.8599i |
| w37 | 100101 | +0.4262−0.4205i | −0.5830−1.1356i | +0.1524−0.7179i |
| w38 | 100110 | −0.1392−0.4078i | −0.1708−1.0248i | −1.1152−0.8599i |
| w39 | 100111 | −0.4262−0.4205i | −0.2191−1.3618i | −0.1524−0.7179i |
| w40 | 101000 | +1.0854+0.5394i | +1.3903+0.2023i | +1.3715+0.1909i |
| w41 | 101001 | +0.7353+0.4623i | +0.5830+1.1356i | +0.1700+1.0281i |
| w42 | 101010 | −1.0854+0.5394i | +0.1708+1.0248i | −1.3715+0.1909i |
| w43 | 101011 | −0.7353+0.4623i | +0.2191+1.3618i | −0.1700+1.0281i |
| w44 | 101100 | +0.1392+0.4078i | −1.3903+0.2023i | +1.1152+0.8599i |
| w45 | 101101 | +0.4262+0.4205i | −0.5830+1.1356i | +0.1524+0.7179i |
| w46 | 101110 | −0.1392+0.4078i | −0.1708+1.0248i | −1.1152+0.8599i |
| w47 | 101111 | −0.4262+0.4205i | −0.2191+1.3618i | −0.1524+0.7179i |
| w48 | 110000 | +1.0693−0.9408i | +1.0788−0.9275i | +0.5530−1.1489i |
| w49 | 110001 | +0.7092−0.8073i | +0.7608−0.8009i | +0.2033−1.3620i |
| w50 | 110010 | −1.0693−0.9408i | +0.1480−0.7122i | −0.5530−1.1489i |
| w51 | 110011 | −0.7092−0.8073i | +0.4498−0.7565i | −0.2033−1.3620i |
| w52 | 110100 | +0.1388−0.7057i | −1.0788−0.9275i | +0.7724−0.8458i |
| w53 | 110101 | +0.4197−0.7206i | −0.7608−0.8009i | +0.4596−0.7717i |
| w54 | 110110 | −0.1388−0.7057i | −0.1480−0.7122i | −0.7724−0.8458i |
| w55 | 110111 | −0.4197−0.7206i | −0.4498−0.7565i | −0.4596−0.7717i |
| w56 | 111000 | +1.0693+0.9408i | +1.0788+0.9275i | +0.5530+1.1489i |
| w57 | 111001 | +0.7092+0.8073i | +0.7608+0.8009i | +0.2033+1.3620i |
| w58 | 111010 | −1.0693+0.9408i | +0.1480+0.7122i | −0.5530+1.1489i |
| w59 | 111011 | −0.7092+0.8073i | +0.4498+0.7565i | −0.2033+1.3620i |
| w60 | 111100 | +0.1388+0.7057i | −1.0788+0.9275i | +0.7724+0.8458i |
| w61 | 111101 | +0.4197+0.7206i | −0.7608+0.8009i | +0.4596+0.7717i |
| w62 | 111110 | −0.1388+0.7057i | −0.1480+0.7122i | −0.7724+0.5458i |
| w63 | 111111 | −0.4197+0.7206i | −0.4498+0.7565i | −0.4596+0.7717i |

A3) 256-QAM NUC for MCS=8 (or 9):

| w index | bit label | Constellation point |
|---|---|---|
| w0 | 0000000 | −0.4905+1.1842i |
| w1 | 0000000 | −0.6911+0.6930i |
| w2 | 0000001 | −0.5982+1.0262i |
| w3 | 0000001 | −0.6740+0.8584i |
| w4 | 0000010 | +0.4905+1.1842i |
| w5 | 0000010 | +0.6911+0.6930i |
| w6 | 0000011 | +0.5982+1.0262i |
| w7 | 0000011 | +0.6740+0.8584i |
| w8 | 0000100 | −0.6622+0.0739i |
| w9 | 0000100 | −0.6739+0.5331i |
| w10 | 0000101 | −0.6337+0.2246i |
| w11 | 0000101 | −0.6474+0.3777i |
| w12 | 0000110 | +0.6622+0.0739i |
| w13 | 0000110 | +0.6739+0.5331i |
| w14 | 0000111 | +0.6337+0.2246i |
| w15 | 0000111 | +0.6474+0.3777i |
| w16 | 0001000 | −0.4905−1.1842i |
| w17 | 0001000 | −0.6911−0.6930i |
| w18 | 0001001 | −0.5982−1.0262i |
| w19 | 0001001 | −0.6740−0.8584i |
| w20 | 0001010 | +0.4905−1.1842i |
| w21 | 0001010 | +0.6911−0.6930i |
| w22 | 0001011 | +0.5982−1.0262i |
| w23 | 0001011 | +0.6740−0.8584i |
| w24 | 0001100 | −0.6622−0.0739i |
| w25 | 0001100 | −0.6739−0.5331i |
| w26 | 0001101 | −0.6337−0.2246i |
| w27 | 0001101 | −0.6474−0.3777i |
| w28 | 0001110 | +0.6622−0.0739i |
| w29 | 0001110 | +0.6739−0.5331i |
| w30 | 0001111 | +0.6337−0.2246i |
| w31 | 0001111 | +0.6474−0.3777i |
| w32 | 0010000 | −0.6854+1.2221i |
| w33 | 0010000 | −0.8561+0.6778i |
| w34 | 0010001 | −0.7829+1.0274i |
| w35 | 0010001 | −0.8451+0.8492i |
| w36 | 0010010 | +0.6854+1.2221i |
| w37 | 0010010 | +0.8561+0.6778i |
| w38 | 0010011 | +0.7829+1.0274i |
| w39 | 0010011 | +0.8451+0.8492i |
| w40 | 0010100 | −0.8231+0.0739i |
| w41 | 0010100 | −0.8353+0.5198i |
| w42 | 0010101 | −0.7818+0.2196i |
| w43 | 0010101 | −0.7994+0.3695i |
| w44 | 0010110 | +0.8231+0.0739i |
| w45 | 0010110 | +0.8353+0.5198i |
| w46 | 0010111 | +0.7818+0.2196i |
| w47 | 0010111 | +0.7994+0.3695i |
| w48 | 0011000 | −0.6854−1.2221i |
| w49 | 0011000 | −0.8561−0.6778i |
| w50 | 0011001 | −0.7829−1.0274i |
| w51 | 0011001 | −0.8451−0.8492i |
| w52 | 0011010 | +0.6854−1.2221i |
| w53 | 0011010 | +0.8561−0.6778i |
| w54 | 0011011 | +0.7829−1.0274i |
| w55 | 0011011 | +0.8451−0.8492i |
| w56 | 0011100 | −0.8231−0.0739i |
| w57 | 0011100 | −0.8353−0.5198i |
| w58 | 0011101 | −0.7818−0.2196i |
| w59 | 0011101 | −0.7994−0.3695i |
| w60 | 0011110 | +0.8231−0.0739i |
| w61 | 0011110 | +0.8353−0.5198i |
| w62 | 0011111 | +0.7818−0.2196i |
| w63 | 0011111 | +0.7994−0.3695i |
| w64 | 01000000 | −0.4711+1.3764i |
| w65 | 01000001 | −0.5308+0.6813i |
| w66 | 01000010 | −0.4242+0.9942i |
| w67 | 01000011 | −0.5155+0.8438i |
| w68 | 01000100 | +0.4711+1.3764i |
| w69 | 01000101 | +0.5308+0.6813i |
| w70 | 01000110 | +0.4242+0.9942i |
| w71 | 01000111 | +0.5155+0.8438i |
| w72 | 01001000 | −0.5101+0.0730i |
| w73 | 01001001 | −0.5175+0.5233i |
| w74 | 01001010 | −0.4897+0.2198i |
| w75 | 01001011 | −0.4992+0.3698i |
| w76 | 01001100 | +0.5101+0.0730i |
| w77 | 01001101 | +0.5175+0.5233i |
| w78 | 01001110 | +0.4897+0.2198i |
| w79 | 01001111 | +0.4992+0.3698i |
| w80 | 01010000 | −0.4711−1.3764i |
| w81 | 01010001 | −0.5308−0.6813i |
| w82 | 01010010 | −0.4242−0.9942i |
| w83 | 01010011 | −0.5155−0.8438i |
| w84 | 01010100 | +0.4711−1.3764i |
| w85 | 01010101 | +0.5308−0.6813i |
| w86 | 01010110 | +0.4242−0.9942i |
| w87 | 01010111 | +0.5155−0.8438i |
| w88 | 01011000 | −0.5101−0.0730i |
| w89 | 01011001 | −0.5175−0.5233i |
| w90 | 01011010 | −0.4897−0.2198i |
| w91 | 01011011 | −0.4992−0.3698i |
| w92 | 01011100 | +0.5101−0.0730i |

-continued

| w index | bit label | Constellation point |
|---|---|---|
| w93 | 01011101 | +0.5175−0.5233i |
| w94 | 01011110 | +0.4897−0.2198i |
| w95 | 01011111 | +0.4992−0.3698i |
| w96 | 01100000 | −0.2836+1.2952i |
| w97 | 01100001 | −0.3755+0.6565i |
| w98 | 01100010 | −0.2860+1.1119i |
| w99 | 01100011 | −0.3664+0.8105i |
| w100 | 01100100 | +0.2836+1.2952i |
| w101 | 01100101 | +0.3755+0.6565i |
| w102 | 01100110 | +0.2860+1.1119i |
| w103 | 01100111 | +0.3664+0.8105i |
| w104 | 01101000 | −0.3616+0.0709i |
| w105 | 01101001 | −0.3655+0.5062i |
| w106 | 01101010 | −0.3479+0.2135i |
| w107 | 01101011 | −0.3537+0.3587i |
| w108 | 01101100 | +0.3616+0.0709i |
| w109 | 01101101 | +0.3655+0.5062i |
| w110 | 01101110 | +0.3479+0.2135i |
| w111 | 01101111 | +0.3537+0.3587i |
| w112 | 01110000 | −0.2836−1.2952i |
| w113 | 01110001 | −0.3755−0.6565i |
| w114 | 01110010 | −0.2860−1.1119i |
| w115 | 01110011 | −0.3664−0.8105i |
| w116 | 01110100 | +0.2836−1.2952i |
| w117 | 01110101 | +0.3755−0.6565i |
| w118 | 01110110 | +0.2860−1.1119i |
| w119 | 01110111 | +0.3664−0.8105i |
| w120 | 01111000 | −0.3616−0.0709i |
| w121 | 01111001 | −0.3655−0.5062i |
| w122 | 01111010 | −0.3479−0.2135i |
| w123 | 01111011 | −0.3537−0.3587i |
| w124 | 01111100 | +0.3616−0.0709i |
| w125 | 01111101 | +0.3655−0.5062i |
| w126 | 01111110 | +0.3479−0.2135i |
| w127 | 01111111 | +0.3537−0.3587i |
| w128 | 10000000 | −1.2103+0.9014i |
| w129 | 10000001 | −1.1677+0.4847i |
| w130 | 10000010 | −1.2323+0.6874i |
| w131 | 10000011 | −1.3547+0.4862i |
| w132 | 10000100 | +1.2103+0.9014i |
| w133 | 10000101 | +1.1677+0.4847i |
| w134 | 10000110 | +1.2323+0.6874i |
| w135 | 10000111 | +1.3547+0.4862i |
| w136 | 10001000 | −1.1595+0.0882i |
| w137 | 10001001 | −1.4613+0.2782i |
| w138 | 10001010 | −1.3430+0.0950i |
| w139 | 10001011 | −1.2637+0.2839i |
| w140 | 10001100 | +1.1595+0.0882i |
| w141 | 10001101 | +1.4613+0.2782i |
| w142 | 10001110 | +1.3430+0.0950i |
| w143 | 10001111 | +1.2637+0.2839i |
| w144 | 10010000 | −1.2103−0.9014i |
| w145 | 10010001 | −1.1677−0.4847i |
| w146 | 10010010 | −1.2323−0.6874i |
| w147 | 10010011 | −1.3547−0.4862i |
| w148 | 10010100 | +1.2103−0.9014i |
| w149 | 10010101 | +1.1677−0.4847i |
| w150 | 10010110 | +1.2323−0.6874i |
| w151 | 10010111 | +1.3547−0.4862i |
| w152 | 10011000 | −1.1595−0.0882i |
| w153 | 10011001 | −1.4613−0.2782i |
| w154 | 10011010 | −1.3430−0.0950i |
| w155 | 10011011 | −1.2637−0.2839i |
| w156 | 10011100 | +1.1595−0.0882i |
| w157 | 10011101 | +1.4613−0.2782i |
| w158 | 10011110 | +1.3430−0.0950i |
| w159 | 10011111 | +1.2637−0.2839i |
| w160 | 10100000 | −0.9022+1.1987i |
| w161 | 10100001 | −1.0215+0.6013i |
| w162 | 10100010 | −0.9925+0.9967i |
| w163 | 10100011 | −1.0233+0.7878i |
| w164 | 10100100 | +0.9022+1.1987i |
| w165 | 10100101 | +1.0215+0.6013i |
| w166 | 10100110 | +0.9925+0.9967i |
| w167 | 10100111 | +1.0233+0.7878i |
| w168 | 10101000 | −0.9894+0.0820i |
| w169 | 10101001 | −0.9800+0.4265i |
| w170 | 10101010 | −0.9367+0.2358i |
| w171 | 10101011 | −1.0889+0.2858i |
| w172 | 10101100 | +0.9894+0.0820i |
| w173 | 10101101 | +0.9800+0.4265i |
| w174 | 10101110 | +0.9367+0.2358i |
| w175 | 10101111 | +1.0889+0.2858i |
| w176 | 10110000 | −0.9022−1.1987i |
| w177 | 10110001 | −1.0215−0.6013i |
| w178 | 10110010 | −0.9925−0.9967i |
| w179 | 10110011 | −1.0233−0.7878i |
| w180 | 10110100 | +0.9022−1.1987i |
| w181 | 10110101 | +1.0215−0.6013i |
| w182 | 10110110 | +0.9925−0.9967i |
| w183 | 10110111 | +1.0233−0.7878i |
| w184 | 10111000 | −0.9894−0.0820i |
| w185 | 10111001 | −0.9800−0.4265i |
| w186 | 10111010 | −0.9367−0.2358i |
| w187 | 10111011 | −1.0889−0.2858i |
| w188 | 10111100 | +0.9894−0.0820i |
| w189 | 10111101 | +0.9800−0.4265i |
| w190 | 10111110 | +0.9367−0.2358i |
| w191 | 10111111 | −1.2103+0.9014i |
| w192 | 11000000 | −0.0888+1.1903i |
| w193 | 11000001 | −0.0732+0.6770i |
| w194 | 11000010 | −0.0829+1.0145i |
| w195 | 11000011 | −0.0737+0.8430i |
| w196 | 11000100 | +0.0888+1.1903i |
| w197 | 11000101 | +0.0732+0.6770i |
| w198 | 11000110 | +0.0829+1.0145i |
| w199 | 11000111 | +0.0737+0.8430i |
| w200 | 11001000 | −0.0711+0.0728i |
| w201 | 11001001 | −0.0722+0.5215i |
| w202 | 11001010 | −0.0687+0.2202i |
| w203 | 11001011 | −0.0699+0.3698i |
| w204 | 11001100 | +0.0711+0.0728i |
| w205 | 11001101 | +0.0722+0.5215i |
| w206 | 11001110 | +0.0687+0.2202i |
| w207 | 11001111 | +0.0699+0.3698i |
| w208 | 11010000 | −0.0888−1.1903i |
| w209 | 11010001 | −0.0732−0.6770i |
| w210 | 11010010 | −0.0829−1.0145i |
| w211 | 11010011 | −0.0737−0.8430i |
| w212 | 11010100 | +0.0888−1.1903i |
| w213 | 11010101 | +0.0732−0.6770i |
| w214 | 11010110 | +0.0829−1.0145i |
| w215 | 11010111 | +0.0737−0.8430i |
| w216 | 11011000 | −0.0711−0.0728i |
| w217 | 11011001 | −0.0722−0.5215i |
| w218 | 11011010 | −0.0687−0.2202i |
| w219 | 11011011 | −0.0699−0.3698i |
| w220 | 11011100 | +0.0711−0.0728i |
| w221 | 11011101 | +0.0722−0.5215i |
| w222 | 11011110 | +0.0687−0.2202i |
| w223 | 11011111 | +0.0699−0.3698i |
| w224 | 11100000 | −0.1023+1.3833i |
| w225 | 11100001 | −0.2228+0.6437i |
| w226 | 11100010 | −0.2357+0.9536i |
| w227 | 11100011 | −0.2175+0.7949i |
| w228 | 11100100 | +0.1023+1.3833i |
| w229 | 11100101 | +0.2228+0.6437i |
| w230 | 11100110 | +0.2357+0.9536i |
| w231 | 11100111 | +0.2175+0.7949i |
| w232 | 11101000 | −0.2153+0.0697i |
| w233 | 11101001 | −0.2171+0.4970i |
| w234 | 11101010 | −0.2074+0.2103i |
| w235 | 11101011 | −0.2104+0.3528i |
| w236 | 11101100 | +0.2153+0.0697i |
| w237 | 11101101 | +0.2171+0.4970i |
| w238 | 11101110 | +0.2074+0.2103i |
| w239 | 11101111 | +0.2104+0.3528i |
| w240 | 11110000 | −0.1023−1.3833i |
| w241 | 11110001 | −0.2228−0.6437i |
| w242 | 11110010 | −0.2357−0.9536i |
| w243 | 11110011 | −0.2175−0.7949i |
| w244 | 11110100 | +0.1023−1.3833i |
| w245 | 11110101 | +0.2228−0.6437i |
| w246 | 11110110 | +0.2357−0.9536i |

-continued

| w index | bit label | Constellation point |
|---|---|---|
| w247 | 11110111 | +0.2175−0.7949i |
| w248 | 11111000 | −0.2153−0.0697i |
| w249 | 11111001 | −0.2171−0.4970i |
| w250 | 11111010 | −0.2074−0.2103i |
| w251 | 11111011 | −0.2104−0.3528i |
| w252 | 11111100 | +0.2153−0.0697i |
| w253 | 11111101 | +0.2171−0.4970i |
| w254 | 11111110 | +0.2074−0.2103i |
| w255 | 11111111 | +0.2104−0.3528i | or
for MCS=9 (or 8):

| w index | bit label | Constellation point |
|---|---|---|
| w0 | 0000000 | −0.4801+1.1746i |
| w1 | 0000000 | −0.6762+1.2058i |
| w2 | 0000001 | +0.4801+1.1746i |
| w3 | 0000001 | +0.6762+1.2058i |
| w4 | 0000010 | −0.4614+1.3554i |
| w5 | 0000010 | −0.2766+1.2869i |
| w6 | 0000011 | +0.4514+1.3554i |
| w7 | 0000011 | +0.2766+1.2869i |
| w8 | 0000100 | −1.1920+0.8876i |
| w9 | 0000100 | −0.8919+1.1799i |
| w10 | 0000101 | +1.1920+0.8876i |
| w11 | 0000101 | +0.8919+1.1799i |
| w12 | 0000110 | −0.0897+1.1870i |
| w13 | 0000110 | −0.0980+1.3675i |
| w14 | 0000111 | +0.0897+1.1870i |
| w15 | 0000111 | +0.0980+1.3675i |
| w16 | 0001000 | −0.7042+0.7037i |
| w17 | 0001000 | −0.8656+0.6806i |
| w18 | 0001001 | +0.7042+0.7037i |
| w19 | 0001001 | +0.8656+0.6806i |
| w20 | 0001010 | −0.5441+0.6946i |
| w21 | 0001010 | −0.3865+0.6677i |
| w22 | 0001011 | +0.5441+0.6946i |
| w23 | 0001011 | +0.3865+0.6677i |
| w24 | 0001100 | −1.1619+0.4714i |
| w25 | 0001100 | −1.0233+0.5938i |
| w26 | 0001101 | +1.1619+0.4714i |
| w27 | 0001101 | +1.0233+0.5938i |
| w28 | 0001110 | −0.0761+0.6911i |
| w29 | 0001110 | −0.2301+0.6395i |
| w30 | 0001111 | +0.0761+0.6911i |
| w31 | 0001111 | +0.2301+0.6395i |
| w32 | 0010000 | −0.4801−1.1746i |
| w33 | 0010000 | −0.6762−1.2058i |
| w34 | 0010001 | +0.4801−1.1746i |
| w35 | 0010001 | +0.6762−1.2058i |
| w36 | 0010010 | −0.4614−1.3554i |
| w37 | 0010010 | −0.2766−1.2869i |
| w38 | 0010011 | +0.4614−1.3554i |
| w39 | 0010011 | +0.2766−1.2869i |
| w40 | 0010100 | −1.1920−0.8876i |
| w41 | 0010100 | −0.8919−1.1799i |
| w42 | 0010101 | +1.1920−0.8876i |
| w43 | 0010101 | +0.8919−1.1799i |
| w44 | 0010110 | −0.0897−1.1870i |
| w45 | 0010110 | −0.0980−1.3675i |
| w46 | 0010111 | +0.0897−1.1870i |
| w47 | 0010111 | +0.0980−1.3675i |
| w48 | 0011000 | −0.7042−0.7037i |
| w49 | 0011000 | −0.8656−0.6806i |
| w50 | 0011001 | +0.7042−0.7037i |
| w51 | 0011001 | +0.8656−0.6806i |
| w52 | 0011010 | −0.5441−0.6946i |
| w53 | 0011010 | −0.3865−0.6677i |
| w54 | 0011011 | +0.5441−0.6946i |
| w55 | 0011011 | +0.3865−0.6677i |
| w56 | 0011100 | −1.1619−0.4714i |
| w57 | 0011100 | −1.0233−0.5938i |
| w58 | 0011101 | +1.1619−0.4714i |
| w59 | 0011101 | +1.0233−0.5938i |
| w60 | 0011110 | −0.0761−0.6911i |
| w61 | 0011110 | −0.2301−0.6395i |
| w62 | 0011111 | +0.0761−0.6911i |
| w63 | 0011111 | +0.2301−0.6395i |
| w64 | 01000000 | −0.6844+0.0760i |
| w65 | 01000001 | −0.8440+0.0765i |
| w66 | 01000010 | +0.6844+0.0760i |
| w67 | 01000011 | +0.8440+0.0765i |
| w68 | 01000100 | −0.5319+0.0762i |
| w69 | 01000101 | −0.3811+0.0732i |
| w70 | 01000110 | +0.5319+0.0762i |
| w71 | 01000111 | +0.3811+0.0732i |
| w72 | 01001000 | −1.1751+0.0886i |
| w73 | 01001001 | −0.0070+0.0833i |
| w74 | 01001010 | +1.1751+0.0886i |
| w75 | 01001011 | +1.0070+0.0833i |
| w76 | 01001100 | −0.0749+0.0766i |
| w77 | 01001101 | −0.2291+0.0689i |
| w78 | 01001110 | +0.0749+0.0766i |
| w79 | 01001111 | +0.2291+0.0689i |
| w80 | 01010000 | −0.6891+0.5440i |
| w81 | 01010001 | −0.8493+0.5224i |
| w82 | 01010010 | +0.6891+0.5440i |
| w83 | 01010011 | +0.8493+0.5224i |
| w84 | 01010100 | −0.5302+0.5350i |
| w85 | 01010101 | −0.3753+0.5150i |
| w86 | 01010110 | +0.5302+0.5350i |
| w87 | 01010111 | +0.3753+0.5150i |
| w88 | 01011000 | −1.4427+0.2847i |
| w89 | 01011001 | −0.9868+0.4178i |
| w90 | 01011010 | +1.4427+0.2847i |
| w91 | 01011011 | +0.9868+0.4178i |
| w92 | 01011100 | −0.0759+0.5374i |
| w93 | 01011101 | −0.2229+0.4904i |
| w94 | 01011110 | +0.0759+0.5374i |
| w95 | 01011111 | +0.2229+0.4904i |
| w96 | 01100000 | −0.6844−0.0760i |
| w97 | 01100001 | −0.8440−0.0765i |
| w98 | 01100010 | +0.6844−0.0760i |
| w99 | 01100011 | +0.8440−0.0765i |
| w100 | 01100100 | −0.5319−0.0762i |
| w101 | 01100101 | −0.3811−0.0732i |
| w102 | 01100110 | +0.5319−0.0762i |
| w103 | 01100111 | +0.3811−0.0732i |
| w104 | 01101000 | −1.1751−0.0886i |
| w105 | 01101001 | −1.0070−0.0833i |
| w106 | 01101010 | +1.1751−0.0886i |
| w107 | 01101011 | +1.0070−0.0833i |
| w108 | 01101100 | −0.0749−0.0766i |
| w109 | 01101101 | −0.2291−0.0689i |
| w110 | 01101110 | +0.0749−0.0766i |
| w111 | 01101111 | +0.2291−0.0689i |
| w112 | 01110000 | −0.6891−0.5440i |
| w113 | 01110001 | −0.8493−0.5224i |
| w114 | 01110010 | +0.6891−0.5440i |
| w115 | 01110011 | +0.8493−0.5224i |
| w116 | 01110100 | −0.5302−0.5350i |
| w117 | 01110101 | −0.3753−0.5150i |
| w118 | 01110110 | +0.5302−0.5350i |
| w119 | 01110111 | +0.3753−0.5150i |
| w120 | 01111000 | −1.4427−0.2847i |
| w121 | 01111001 | −0.9868−0.4178i |
| w122 | 01111010 | +1.4427−0.2847i |
| w123 | 01111011 | +0.9868−0.4178i |
| w124 | 01111100 | −0.0759−0.5374i |
| w125 | 01111101 | −0.2229−0.4904i |
| w126 | 01111110 | +0.0759−0.5374i |
| w127 | 01111111 | +0.2229−0.4904i |
| w128 | 10000000 | −0.5937+1.0262i |
| w129 | 10000001 | −0.7777+1.0233i |
| w130 | 10000010 | +0.5937+1.0262i |
| w131 | 10000011 | +0.7777+1.0233i |
| w132 | 10000100 | −0.4154+0.9977i |
| w133 | 10000101 | −0.2792+1.1096i |
| w134 | 10000110 | +0.4184+0.9977i |
| w135 | 10000111 | +0.2792+1.1096i |
| w136 | 10001000 | −1.2121+0.6733i |

-continued

| w index | bit label | Constellation point |
|---|---|---|
| w137 | 10001001 | −0.9865+0.9873i |
| w138 | 10001010 | +1.2121+0.6733i |
| w139 | 10001011 | +0.9865+0.9873i |
| w140 | 10001100 | −0.0824+1.0164i |
| w141 | 10001101 | −0.2359+0.9515i |
| w142 | 10001110 | +0.0824+1.0164i |
| w143 | 10001111 | +0.2359+0.9515i |
| w144 | 10010000 | −0.6785+0.8656i |
| w145 | 10010001 | −0.8479+0.8504i |
| w146 | 10010010 | +0.6785+0.8656i |
| w147 | 10010011 | +0.8479+0.8504i |
| w148 | 10010100 | −0.5200+0.8555i |
| w149 | 10010101 | −0.3697+0.8223i |
| w150 | 10010110 | +0.5200+0.8555i |
| w151 | 10010111 | +0.3697+0.8223i |
| w152 | 10011000 | −1.3397+0.4820i |
| w153 | 10011001 | −1.0229+0.7822i |
| w154 | 10011010 | +1.3397+0.4820i |
| w155 | 10011011 | +1.0229+0.7822i |
| w156 | 10011100 | −0.0752+0.8524i |
| w157 | 10011101 | −0.2205+0.7921i |
| w158 | 10011110 | +0.0752+0.8524i |
| w159 | 10011111 | +0.2205+0.7921i |
| w160 | 10100000 | −0.5937−1.0262i |
| w161 | 10100001 | −0.7777−1.0233i |
| w162 | 10100010 | +0.5937−1.0262i |
| w163 | 10100011 | +0.7777−1.0233i |
| w164 | 10100100 | −0.4184−0.9977i |
| w165 | 10100101 | −0.2792−1.1096i |
| w166 | 10100110 | +0.4184−0.9977i |
| w167 | 10100111 | +0.2792−1.1096i |
| w168 | 10101000 | −1.2121−0.6733i |
| w169 | 10101001 | −0.9865−0.9873i |
| w170 | 10101010 | +1.2121−0.6733i |
| w171 | 10101011 | +0.9865−0.9873i |
| w172 | 10101100 | −0.0824−1.0164i |
| w173 | 10101101 | −0.2359−0.9515i |
| w174 | 10101110 | +0.0824−1.0164i |
| w175 | 10101111 | +0.2359−0.9515i |
| w176 | 10110000 | −0.6785−0.8656i |
| w177 | 10110001 | −0.8479−0.8504i |
| w178 | 10110010 | +0.6785−0.8656i |
| w179 | 10110011 | +0.8479−0.8504i |
| w180 | 10110100 | −0.5200−0.8555i |
| w181 | 10110101 | −0.3697−0.8223i |
| w182 | 10110110 | +0.5200−0.8555i |
| w183 | 10110111 | +0.3697−0.8223i |
| w184 | 10111000 | −1.3397−0.4820i |
| w185 | 10111001 | −1.0229−0.7822i |
| w186 | 10111010 | +1.3397−0.4820i |
| w187 | 10111011 | +1.0229−0.7822i |
| w188 | 10111100 | −0.0752−0.8524i |
| w189 | 10111101 | −0.2205−0.7921i |
| w190 | 10111110 | +0.0752−0.8524i |
| w191 | 10111111 | +0.2205−0.7921i |
| w192 | 11000000 | −0.6336+0.2306i |
| w193 | 11000001 | −0.7836+0.2217i |
| w194 | 11000010 | +0.6336+0.2306i |
| w195 | 11000011 | +0.7836+0.2217i |
| w196 | 11000100 | −0.4864+0.2253i |
| w197 | 11000101 | −0.3429+0.2164i |
| w198 | 11000110 | +0.4864+0.2253i |
| w199 | 11000111 | +0.3429+0.2164i |
| w200 | 11001000 | −1.3520+0.0957i |
| w201 | 11001001 | −0.9402+0.2370i |
| w202 | 11001010 | +1.3520+0.0957i |
| w203 | 11001011 | +0.9402+0.2370i |
| w204 | 11001100 | −0.0684+0.2330i |
| w205 | 11001101 | −0.2017+0.2031i |
| w206 | 11001110 | +0.0684+0.2330i |
| w207 | 11001111 | +0.2017+0.2031i |
| w208 | 11010000 | −0.6601+0.3878i |
| w209 | 11010001 | −0.8131+0.3716i |
| w210 | 11010010 | +0.6601+0.3878i |
| w211 | 11010011 | +0.8131+0.3716i |
| w212 | 11010100 | −0.5092+0.3789i |
| w213 | 11010101 | −0.3608+0.3649i |
| w214 | 11010110 | +0.5092+0.3789i |
| w215 | 11010111 | +0.3608+0.3649i |
| w216 | 11011000 | −1.2604+0.2816i |
| w217 | 11011001 | −1.0927+0.2741i |
| w218 | 11011010 | +1.2604+0.2816i |
| w219 | 11011011 | +1.0927+0.2741i |
| w220 | 11011100 | −0.0724+0.3856i |
| w221 | 11011101 | −0.2134+0.3455i |
| w222 | 11011110 | +0.0724+0.3856i |
| w223 | 11011111 | +0.2134+0.3455i |
| w224 | 11100000 | −0.6336−0.2306i |
| w225 | 11100001 | −0.7836−0.2217i |
| w226 | 11100010 | +0.6336−0.2305i |
| w227 | 11100011 | +0.7836−0.2217i |
| w228 | 11100100 | −0.4864−0.2253i |
| w229 | 11100101 | −0.3429−0.2164i |
| w230 | 11100110 | +0.4864−0.2253i |
| w231 | 11100111 | +0.3429−0.2164i |
| w232 | 11101000 | −1.3520−0.0957i |
| w233 | 11101001 | −0.9402−0.2370i |
| w234 | 11101010 | +1.3520−0.0957i |
| w235 | 11101011 | +0.9402−0.2370i |
| w236 | 11101100 | −0.0684−0.2330i |
| w237 | 11101101 | −0.2017−0.2031i |
| w238 | 11101110 | +0.0684−0.2330i |
| w239 | 11101111 | +0.2017−0.2031i |
| w240 | 11110000 | −0.6601−0.3878i |
| w241 | 11110001 | −0.8131−0.3716i |
| w242 | 11110010 | +0.6601−0.3878i |
| w243 | 11110011 | +0.8131−0.3716i |
| w244 | 11110100 | −0.5092−0.3789i |
| w245 | 11110101 | −0.3608−0.3649i |
| w246 | 11110110 | +0.5092−0.3789i |
| w247 | 11110111 | +0.3608−0.3649i |
| w248 | 11111000 | −1.2604−0.2816i |
| w249 | 11111001 | −1.0927−0.2741i |
| w250 | 11111010 | +1.2604−0.2816i |
| w251 | 11111011 | +1.0927−0.2741i |
| w252 | 11111100 | −0.0724−0.3856i |
| w253 | 11111101 | −0.2134−0.3455i |
| w254 | 11111110 | +0.0724−0.3856i |
| w255 | 11111111 | +0.2134−0.3455i |

B) M-QAM non-uniform constellations of group B for LDPC encoding:

B1) 16-QAM NUC, where MCS 3 corresponds to a 16-QAM with code rate 1/2, and MCS 4 corresponds to 16-QAM with code rate 3/4

| w | bit label | MCS = 3 (or 4) | MCS = 4 (or 3) |
|---|---|---|---|
| w0 | 0000 | +0.4925+1.2040i | +0.3018−0.3018i |
| w1 | 0001 | +0.4925−1.2040i | +0.9534−0.3018i |
| w2 | 0010 | +0.2530+0.4936i | +0.3018+0.3018i |
| w3 | 0011 | +0.2530−0.4936i | +0.9534+0.3018i |
| w4 | 0100 | −0.4925+1.2040i | −0.3018−0.3018i |
| w5 | 0101 | −0.4925−1.2040i | −0.9534−0.3018i |
| w6 | 0110 | −0.2530+0.4936i | −0.3018+0.3018i |
| w7 | 0111 | −0.2530−0.4936i | −0.9534+0.3018i |
| w8 | 1000 | +1.2040+0.4925i | +0.3018−0.9534i |
| w9 | 1001 | +1.2040−0.4925i | +0.9534−0.9534i |
| w10 | 1010 | +0.4936+0.2530i | +0.3018+0.9534i |
| w11 | 1011 | +0.4936−0.2530i | +0.9534+0.9534i |
| w12 | 1100 | −1.2040+0.4925i | −0.3018−0.9534i |
| w13 | 1101 | −1.2040−0.4925i | −0.9534−0.9534i |
| w14 | 1110 | −0.4936+0.2530i | −0.3018+0.9534i |
| w15 | 1111 | −0.4936−0.2530i | −0.9534+0.9534i |

B2) 64-QAM NUC

| w/ MCS index | bit label | MCS = 5 (or 6 or 7) | MCS = 6 (or 5 or 7) | MCS = 7 (or 5 or 6) |
|---|---|---|---|---|
| w0 | 000000 | +1.4656+0.2931i | +1.0441−0.1581i | +1.0474+0.1695i |
| w1 | 000001 | +0.2878+1.4388i | +0.1321−0.1317i | −1.0474−0.1695i |
| w2 | 000010 | +0.1678+0.1166i | +1.4516−0.2578i | +0.7243−0.1504i |
| w3 | 000011 | +0.1177+0.4119i | +0.1689−1.0567i | −0.7243−0.1504i |
| w4 | 000100 | +1.4656−0.2931i | +0.6995−0.1411i | +0.1407−0.1336i |
| w5 | 000101 | +0.2878−1.4388i | +0.4035−0.1354i | −0.1407−0.1336i |
| w6 | 000110 | +0.1678−0.1166i | +0.6750−1.2072i | +0.4265−0.1388i |
| w7 | 000111 | +0.1177−0.4119i | +0.2558−1.4247i | −0.4265−0.1388i |
| w8 | 001000 | +1.0649+0.2069i | +1.0161−0.4912i | +1.0474+0.1695i |
| w9 | 001001 | +0.2219+1.0386i | +0.1287−0.4061i | −1.0474−0.1695i |
| w10 | 001010 | +0.7408+0.1355i | +1.1306−0.8649i | +0.7243−0.1504i |
| w11 | 001011 | +0.1559+0.7442i | +0.1385−0.7199i | −0.7243−0.1504i |
| w12 | 001100 | +1.0649−0.2069i | +0.6966−0.4427i | +0.1407−0.1336i |
| w13 | 001101 | +0.2219−1.0386i | +0.4025−0.4142i | −0.1407−0.1336i |
| w14 | 001110 | +0.7408−0.1355i | +0.6874−0.8123i | +0.4265−0.1388i |
| w15 | 001111 | +0.1559−0.7442i | +0.4017−0.7107i | −0.4265−0.1388i |
| w16 | 010000 | +1.2278+0.8230i | +1.0441+0.1581i | +1.0854−0.5394i |
| w17 | 010001 | +0.8133+1.2150i | +0.1321+0.1317i | −1.0854−0.5394i |
| w18 | 010010 | +0.3325+0.1582i | +1.4516+0.2578i | +0.7353−0.4623i |
| w19 | 010011 | +0.2516+0.3998i | +0.1689+1.0567i | −0.7353−0.4623i |
| w20 | 010100 | +1.2278−0.8230i | +0.6995+0.1411i | +0.1392−0.4078i |
| w21 | 010101 | +0.8133−1.2150i | +0.4035+0.1354i | −0.1392−0.4078i |
| w22 | 010110 | +0.3325−0.1582i | +0.6750+1.2072i | +0.4262−0.4205i |
| w23 | 010111 | +0.2516−0.3998i | +0.2558+1.4247i | −0.4262−0.4205i |
| w24 | 011000 | +0.8971+0.5677i | +1.0161+0.4912i | +1.0854−0.5394i |
| w25 | 011001 | +0.6145+0.8494i | +0.1287+0.4061i | −1.0854−0.5394i |
| w26 | 011010 | +0.6200+0.3227i | +1.1306+0.8649i | +0.7353−0.4623i |
| w27 | 011011 | +0.4328+0.5954i | +0.1385+0.7199i | −0.7353−0.4623i |
| w28 | 011100 | +0.8971−0.5677i | +0.6966+0.4427i | +0.1392−0.4078i |
| w29 | 011101 | +0.6145−0.8494i | +0.4025+0.4142i | −0.1392−0.4078i |
| w30 | 011110 | +0.6200−0.3227i | +0.6874+0.8123i | +0.4262−0.4205i |
| w31 | 011111 | +0.4328−0.5954i | +0.4017+0.7107i | −0.4262−0.4205i |
| w32 | 100000 | −1.4656+0.2931i | −1.0441−0.1581i | +1.4261−0.2216i |
| w33 | 100001 | −0.2878+1.4388i | −0.1321−0.1317i | −1.4261−0.2216i |
| w34 | 100010 | −0.1678+0.1166i | −1.4516−0.2578i | +0.6106−1.1783i |
| w35 | 100011 | −0.1177+0.4119i | −0.1689−1.0567i | −0.6106−1.1783i |
| w36 | 100100 | −1.4656−0.2931i | −0.6995−0.1411i | +0.1682−1.0316i |
| w37 | 100101 | −0.2878−1.4388i | −0.4035−0.1354i | −0.1682−1.0316i |
| w38 | 100110 | −0.1678−0.1166i | −0.6750−1.2072i | +0.2287−1.3914i |
| w39 | 100111 | −0.1177−0.4119i | −0.2558−1.4247i | −0.2287−1.3914i |
| w40 | 101000 | −1.0649+0.2069i | −1.0161−0.4912i | +1.4261+0.2216i |
| w41 | 101001 | −0.2219+1.0386i | −0.1287−0.4061i | −1.4261+0.2216i |
| w42 | 101010 | −0.7408+0.1355i | −1.1306−0.8649i | +0.6106+1.1783i |
| w43 | 101011 | −0.1559+0.7442i | −0.1385−0.7199i | −0.6106+1.1783i |
| w44 | 101100 | −1.0649−0.2069i | −0.6966−0.4427i | +0.1682+1.0316i |
| w45 | 101101 | −0.2219−1.0386i | −0.4025−0.4142i | −0.1682+1.0316i |
| w46 | 101110 | −0.7408−0.1355i | −0.6874−0.8123i | +0.2287+1.3914i |
| w47 | 101111 | −0.1559−0.7442i | −0.4017−0.7107i | −0.2287+1.3914i |
| w48 | 110000 | −1.2278+0.8230i | −1.0441+0.1581i | +1.0693−0.9408i |
| w49 | 110001 | −0.8133+1.2150i | −0.1321+0.1317i | −1.0693−0.9408i |
| w50 | 110010 | −0.3325+0.1582i | −1.4516+0.2578i | +0.7092−0.8073i |
| w51 | 110011 | −0.2516+0.3998i | −0.1689+1.0567i | −0.7092−0.8073i |
| w52 | 110100 | −1.2278−0.8230i | −0.6995+0.1411i | +0.1388−0.7057i |
| w53 | 110101 | −0.8133−1.2150i | −0.4035+0.1354i | −0.1388−0.7057i |
| w54 | 110110 | −0.3325−0.1582i | −0.6750+1.2072i | +0.4197−0.7206i |
| w55 | 110111 | −0.2516−0.3998i | −0.2558+1.4247i | −0.4197−0.7206i |
| w56 | 111000 | −0.8971+0.5677i | −1.0161+0.4912i | +1.0693+0.9408i |
| w57 | 111001 | −0.6145+0.8494i | −0.1287+0.4061i | −1.0693+0.9408i |
| w58 | 111010 | −0.6200+0.3227i | −1.1306+0.8649i | +0.7092+0.8073i |
| w59 | 111011 | −0.4328+0.5954i | −0.1385+0.7199i | −0.7092+0.8073i |
| w60 | 111100 | −0.8971−0.5677i | −0.6966+0.4427i | +0.1388+0.7057i |
| w61 | 111101 | −0.6145−0.8494i | −0.4025+0.4142i | −0.1388+0.7057i |
| w62 | 111110 | −0.6200−0.3227i | −0.6874+0.8123i | +0.4197+0.7206i |
| w63 | 111111 | −0.4328−0.5954i | −0.4017+0.7107i | −0.4197+0.7206i |

B3) 256-QAM NUC for MCS=8 (or 9):

| w index | bit label | Constellation point |
|---|---|---|
| w0 | 00000000 | −0.5039+1.2055i |
| w1 | 00000000 | −0.4884+1.0092i |
| w2 | 00000001 | −1.1657+1.0793i |
| w3 | 00000001 | −1.2385+0.8387i |
| w4 | 00000010 | −0.5781+1.4095i |
| w5 | 00000010 | −0.6891+1.0532i |
| w6 | 00000011 | −0.7876+1.2931i |
| w7 | 00000011 | −0.8990+1.0937i |
| w8 | 00000100 | −0.5039−1.2055i |
| w9 | 00000100 | −0.4884−1.0092i |
| w10 | 00000101 | −1.1657−1.0793i |
| w11 | 00000101 | −1.2385−0.8387i |
| w12 | 00000110 | −0.5781−1.4095i |
| w13 | 00000110 | −0.6891−1.0532i |
| w14 | 00000111 | −0.7876−1.2931i |
| w15 | 00000111 | −0.8990−1.0937i |
| w16 | 00001000 | −0.6346+0.6721i |
| w17 | 00001000 | −0.5902+0.8432i |
| w18 | 00001001 | −1.2060+0.5685i |
| w19 | 00001001 | −1.4112+0.6488i |
| w20 | 00001010 | −0.8075+0.6969i |
| w21 | 00001010 | −0.7660+0.8734i |
| w22 | 00001011 | −1.0100+0.6965i |
| w23 | 00001011 | −0.9651+0.8870i |
| w24 | 00001100 | −0.6346−0.6721i |
| w25 | 00001100 | −0.5902−0.8432i |
| w26 | 00001101 | −1.2060−0.5685i |
| w27 | 00001101 | −1.4112−0.6488i |
| w28 | 00001110 | −0.8075−0.6969i |
| w29 | 00001110 | −0.7660−0.8734i |
| w30 | 00001111 | −1.0100−0.6965i |
| w31 | 00001111 | −0.9651−0.8870i |
| w32 | 00010000 | −0.6629+0.0713i |
| w33 | 00010000 | −0.6641+0.2135i |
| w34 | 00010001 | −1.4228+0.1199i |
| w35 | 00010001 | −1.2036+0.1064i |
| w36 | 00010010 | −0.8160+0.0736i |
| w37 | 00010010 | −0.8280+0.2196i |
| w38 | 00010011 | −0.9811+0.0673i |
| w39 | 00010011 | −1.0114+0.2066i |
| w40 | 00010100 | −0.6629−0.0713i |
| w41 | 00010100 | −0.6641−0.2135i |
| w42 | 00010101 | −1.4228−0.1199i |
| w43 | 00010101 | −1.2036−0.1064i |
| w44 | 00010110 | −0.8160−0.0736i |
| w45 | 00010110 | −0.8280−0.2196i |
| w46 | 00010111 | −0.9811−0.0673i |
| w47 | 00010111 | −1.0114−0.2066i |
| w48 | 00011000 | −0.6511+0.5096i |
| w49 | 00011000 | −0.6617+0.3573i |
| w50 | 00011001 | −1.4186+0.3682i |
| w51 | 00011001 | −1.2116+0.3184i |
| w52 | 00011010 | −0.8111+0.5264i |
| w53 | 00011010 | −0.8276+0.3658i |
| w54 | 00011011 | −0.9802+0.5258i |
| w55 | 00011011 | −1.0181+0.3668i |
| w56 | 00011100 | −0.6511−0.5096i |
| w57 | 00011100 | −0.6617−0.3573i |
| w58 | 00011101 | −1.4186−0.3682i |
| w59 | 00011101 | −1.2116−0.3184i |
| w60 | 00011110 | −0.8111−0.5264i |
| w61 | 00011110 | −0.8276−0.3658i |
| w62 | 00011111 | −0.9802−0.5258i |
| w63 | 00011111 | −1.0181−0.3668i |
| w64 | 01000000 | +0.5039+1.2055i |
| w65 | 01000001 | +0.4884+1.0092i |
| w66 | 01000010 | +1.1657+1.0793i |
| w67 | 01000011 | +1.2385+0.8387i |
| w68 | 01000100 | +0.5781+1.4095i |
| w69 | 01000101 | +0.6891+1.0532i |
| w70 | 01000110 | +0.7876+1.2931i |
| w71 | 01000111 | +0.8990+1.0937i |
| w72 | 01001000 | +0.5039−1.2055i |
| w73 | 01001001 | +0.4884−1.0092i |
| w74 | 01001010 | +1.1657−1.0793i |
| w75 | 01001011 | +1.2385−0.8387i |
| w76 | 01001100 | +0.5781−1.4095i |
| w77 | 01001101 | +0.6891−1.0532i |
| w78 | 01001110 | +0.7876−1.2931i |

| w index | bit label | Constellation point |
|---|---|---|
| w79 | 01001111 | +0.8990−1.0937i |
| w80 | 01010000 | +0.6346+0.6721i |
| w81 | 01010001 | +0.5902+0.8432i |
| w82 | 01010010 | +1.2060+0.5685i |
| w83 | 01010011 | +1.4112+0.6488i |
| w84 | 01010100 | +0.8075+0.6969i |
| w85 | 01010101 | +0.7660+0.8734i |
| w86 | 01010110 | +1.0100+0.6965i |
| w87 | 01010111 | +0.9651+0.8870i |
| w88 | 01011000 | +0.6346−0.6721i |
| w89 | 01011001 | +0.5902−0.8432i |
| w90 | 01011010 | +1.2060−0.5685i |
| w91 | 01011011 | +1.4112−0.6488i |
| w92 | 01011100 | +0.8075−0.6969i |
| w93 | 01011101 | +0.7660−0.8734i |
| w94 | 01011110 | +1.0100−0.6965i |
| w95 | 01011111 | +0.9651−0.8870i |
| w96 | 01100000 | +0.6629+0.0713i |
| w97 | 01100001 | +0.6641+0.2135i |
| w98 | 01100010 | +1.4228+0.1199i |
| w99 | 01100011 | +1.2036+0.1064i |
| w100 | 01100100 | +0.8160+0.0736i |
| w101 | 01100101 | +0.8280+0.2196i |
| w102 | 01100110 | +0.9811+0.0673i |
| w103 | 01100111 | +1.0114+0.2066i |
| w104 | 01101000 | +0.6529−0.0713i |
| w105 | 01101001 | +0.6641−0.2135i |
| w106 | 01101010 | +1.4228−0.1199i |
| w107 | 01101011 | +1.2036−0.1064i |
| w108 | 01101100 | +0.8160−0.0736i |
| w109 | 01101101 | +0.8280−0.2196i |
| w110 | 01101110 | +0.9811−0.0673i |
| w111 | 01101111 | +1.0114−0.2066i |
| w112 | 01110000 | +0.6511+0.5096i |
| w113 | 01110001 | +0.6617+0.3573i |
| w114 | 01110010 | +1.4186+0.3682i |
| w115 | 01110011 | +1.2116+0.3184i |
| w116 | 01110100 | +0.8111+0.5264i |
| w117 | 01110101 | +0.8276+0.3658i |
| w118 | 01110110 | +0.9802+0.5258i |
| w119 | 01110111 | +1.0181+0.3668i |
| w120 | 01111000 | +0.6511−0.5096i |
| w121 | 01111001 | +0.6617−0.3573i |
| w122 | 01111010 | +1.4186−0.3682i |
| w123 | 01111011 | +1.2116−0.3184i |
| w124 | 01111100 | +0.8111−0.5264i |
| w125 | 01111101 | +0.8276−0.3658i |
| w126 | 01111110 | +0.9802−0.5258i |
| w127 | 01111111 | +1.0181−0.3668i |
| w128 | 10000000 | −0.3004+1.2452i |
| w129 | 10000001 | −0.2967+1.0627i |
| w130 | 10000010 | −0.0994+1.2493i |
| w131 | 10000011 | −0.0947+1.0662i |
| w132 | 10000100 | −0.3452+1.4585i |
| w133 | 10000101 | −0.2650+0.9148i |
| w134 | 10000110 | −0.1137+1.4651i |
| w135 | 10000111 | −0.0895+0.8991i |
| w136 | 10001000 | −0.3004−1.2452i |
| w137 | 10001001 | −0.2967−1.0627i |
| w138 | 10001010 | −0.0994−1.2493i |
| w139 | 10001011 | −0.0947−1.0662i |
| w140 | 10001100 | −0.3452−1.4585i |
| w141 | 10001101 | −0.2650−0.9148i |
| w142 | 10001110 | −0.1137−1.4651i |
| w143 | 10001111 | −0.0895−0.8991i |
| w144 | 10010000 | −0.4787+0.6378i |
| w145 | 10010001 | −0.4439+0.7942i |
| w146 | 10010010 | −0.0688+0.5579i |
| w147 | 10010011 | −0.0550+0.6984i |
| w148 | 10010100 | −0.3328+0.6100i |
| w149 | 10010101 | −0.3014+0.7660i |
| w150 | 10010110 | −0.2008+0.5810i |
| w151 | 10010111 | −0.1623+0.7417i |
| w152 | 10011000 | −0.4787−0.6378i |
| w153 | 10011001 | −0.4439−0.7942i |
| w154 | 10011010 | −0.0688−0.5579i |
| w155 | 10011011 | −0.0550−0.6984i |
| w156 | 10011100 | −0.3328−0.6100i |
| w157 | 10011101 | −0.3014−0.7660i |
| w158 | 10011110 | −0.2008−0.5810i |
| w159 | 10011111 | −0.1623−0.7417i |
| w160 | 10100000 | −0.5145+0.0676i |
| w161 | 10100001 | −0.5128+0.2035i |
| w162 | 10100010 | −0.0738+0.0604i |
| w163 | 10100011 | −0.0736+0.1802i |
| w164 | 10100100 | −0.3680+0.0641i |
| w165 | 10100101 | −0.3662+0.1927i |
| w166 | 10100110 | −0.2211+0.0614i |
| w167 | 10100111 | −0.2203+0.1844i |
| w168 | 10101000 | −0.5146−0.0676i |
| w169 | 10101001 | −0.5128−0.2035i |
| w170 | 10101010 | −0.0738−0.0604i |
| w171 | 10101011 | −0.0736−0.1802i |
| w172 | 10101100 | −0.3680−0.0641i |
| w173 | 10101101 | −0.3662−0.1927i |
| w174 | 10101110 | −0.2211−0.0614i |
| w175 | 10101111 | −0.2203−0.1844i |
| w176 | 10110000 | −0.4984+0.4870i |
| w177 | 10110001 | −0.5089+0.3418i |
| w178 | 10110010 | −0.0716+0.4278i |
| w179 | 10110011 | −0.0731+0.3023i |
| w180 | 10110100 | −0.3534+0.4630i |
| w181 | 10110101 | −0.3625+0.3247i |
| w182 | 10110110 | −0.2134+0.4408i |
| w183 | 10110111 | −0.2183+0.3103i |
| w184 | 10111000 | −0.4984−0.4870i |
| w185 | 10111001 | −0.5089−0.3418i |
| w186 | 10111010 | −0.0716−0.4278i |
| w187 | 10111011 | −0.0731−0.3023i |
| w188 | 10111100 | −0.3534−0.4630i |
| w189 | 10111101 | −0.3625−0.3247i |
| w190 | 10111110 | −0.2134−0.4408i |
| w191 | 10111111 | −0.2183−0.3103i |
| w192 | 11000000 | +0.3004+1.2452i |
| w193 | 11000001 | +0.2967+1.0627i |
| w194 | 11000010 | +0.0994+1.2493i |
| w195 | 11000011 | +0.0947+1.0662i |
| w196 | 11000100 | +0.3452+1.4585i |
| w197 | 11000101 | +0.2650+0.9148i |
| w198 | 11000110 | +0.1137+1.4651i |
| w199 | 11000111 | +0.0895+0.8991i |
| w200 | 11001000 | +0.3004−1.2452i |
| w201 | 11001001 | +0.2967−1.0627i |
| w202 | 11001010 | +0.0994−1.2493i |
| w203 | 11001011 | +0.0947−1.0662i |
| w204 | 11001100 | +0.3452−1.4585i |
| w205 | 11001101 | +0.2650−0.9148i |
| w206 | 11001110 | +0.1137−1.4651i |
| w207 | 11001111 | +0.0895−0.8991i |
| w208 | 11010000 | +0.4787+0.6378i |
| w209 | 11010001 | +0.4439+0.7942i |
| w210 | 11010010 | +0.0688+0.5579i |
| w211 | 11010011 | +0.0550+0.6984i |
| w212 | 11010100 | +0.3328+0.6100i |
| w213 | 11010101 | +0.3014+0.7660i |
| w214 | 11010110 | +0.2008+0.5810i |
| w215 | 11010111 | +0.1623+0.7417i |
| w216 | 11011000 | +0.4787−0.6378i |
| w217 | 11011001 | +0.4439−0.7942i |
| w218 | 11011010 | +0.0688−0.5579i |
| w219 | 11011011 | +0.0550−0.6984i |
| w220 | 11011100 | +0.3328−0.6100i |
| w221 | 11011101 | +0.3014−0.7660i |
| w222 | 11011110 | +0.2008−0.5810i |
| w223 | 11011111 | +0.1623−0.7417i |
| w224 | 11100000 | +0.5146+0.0676i |
| w225 | 11100001 | +0.5128+0.2035i |
| w226 | 11100010 | +0.0738+0.0604i |
| w227 | 11100011 | +0.0736+0.1802i |
| w228 | 11100100 | +0.3680+0.0641i |
| w229 | 11100101 | +0.3662+0.1927i |
| w230 | 11100110 | +0.2211+0.0614i |
| w231 | 11100111 | +0.2203+0.1844i |
| w232 | 11101000 | +0.5146−0.0676i |

-continued

| w index | bit label | Constellation point |
| --- | --- | --- |
| w233 | 11101001 | +0.5128−0.2035i |
| w234 | 11101010 | +0.0738−0.0604i |
| w235 | 11101011 | +0.0736−0.1802i |
| w236 | 11101100 | +0.3680−0.0641i |
| w237 | 11101101 | +0.3662−0.1927i |
| w238 | 11101110 | +0.2211−0.0614i |
| w239 | 11101111 | +0.2203−0.1844i |
| w240 | 11110000 | +0.4984+0.4870i |
| w241 | 11110001 | +0.5089+0.3418i |
| w242 | 11110010 | +0.0716+0.4278i |
| w243 | 11110011 | +0.0731+0.3023i |
| w244 | 11110100 | +0.3534+0.4630i |
| w245 | 11110101 | +0.3625+0.3247i |
| w246 | 11110110 | +0.2134+0.4408i |
| w247 | 11110111 | +0.2183+0.3103i |
| w248 | 11111000 | +0.4984−0.4870i |
| w249 | 11111001 | +0.5089−0.3418i |
| w250 | 11111010 | +0.0716−0.4278i |
| w251 | 11111011 | +0.0731−0.3023i |
| w252 | 11111100 | +0.3534−0.4630i |
| w253 | 11111101 | +0.3625−0.3247i |
| w254 | 11111110 | +0.2134−0.4408i |
| w255 | 11111111 | +0.2183−0.3103i | or
for MCS=9 (or 8):

| w index | bit label | Constellation point |
| --- | --- | --- |
| w0 | 0000000 | −0.5039+1.2055i |
| w1 | 0000000 | +0.5039+1.2055i |
| w2 | 0000001 | −0.6629+0.0713i |
| w3 | 0000001 | +0.6629+0.0713i |
| w4 | 0000010 | −0.5781+1.4095i |
| w5 | 0000010 | +0.5781+1.4095i |
| w6 | 0000011 | −0.8160+0.0736i |
| w7 | 0000011 | +0.8160+0.0736i |
| w8 | 0000100 | −0.3004+1.2452i |
| w9 | 0000100 | +0.3004+1.2452i |
| w10 | 0000101 | −0.5146+0.0676i |
| w11 | 0000101 | +0.5146+0.0676i |
| w12 | 0000110 | −0.3452+1.4585i |
| w13 | 0000110 | +0.3452+1.4585i |
| w14 | 0000111 | −0.3680+0.0641i |
| w15 | 0000111 | +0.3680+0.0641i |
| w16 | 0001000 | −1.1657+1.0793i |
| w17 | 0001000 | +1.1657+1.0793i |
| w18 | 0001001 | −1.4228+0.1199i |
| w19 | 0001001 | +1.4228+0.1199i |
| w20 | 0001010 | −0.7876+1.2931i |
| w21 | 0001010 | +0.7876+1.2931i |
| w22 | 0001011 | −0.9811+0.0673i |
| w23 | 0001011 | +0.9811+0.0673i |
| w24 | 0001100 | −0.0994+1.2493i |
| w25 | 0001100 | +0.0994+1.2493i |
| w26 | 0001101 | −0.0738+0.0604i |
| w27 | 0001101 | +0.0738+0.0604i |
| w28 | 0001110 | −0.1137+1.4651i |
| w29 | 0001110 | +0.1137+1.4651i |
| w30 | 0001111 | −0.2211+0.0614i |
| w31 | 0001111 | +0.2211+0.0614i |
| w32 | 0010000 | −0.5039−1.2055i |
| w33 | 0010000 | +0.5039−1.2055i |
| w34 | 0010001 | −0.6629−0.0713i |
| w35 | 0010001 | +0.6529−0.0713i |
| w36 | 0010010 | −0.5781−1.4095i |
| w37 | 0010010 | +0.5781−1.4095i |
| w38 | 0010011 | −0.8160−0.0736i |
| w39 | 0010011 | +0.8160−0.0736i |
| w40 | 0010100 | −0.3004−1.2452i |
| w41 | 0010100 | +0.3004−1.2452i |
| w42 | 0010101 | −0.5146−0.0676i |
| w43 | 0010101 | +0.5146−0.0676i |
| w44 | 0010110 | −0.3452−1.4585i |
| w45 | 0010110 | +0.3452−1.4585i |
| w46 | 0010111 | −0.3680−0.0641i |
| w47 | 0010111 | +0.3680−0.0641i |
| w48 | 0011000 | −1.1657−1.0793i |
| w49 | 0011000 | +1.1657−1.0793i |
| w50 | 0011001 | −1.4228−0.1199i |
| w51 | 0011001 | +1.4288−0.1199i |
| w52 | 0011010 | −0.7876−1.2931i |
| w53 | 0011010 | +0.7876−1.2931i |
| w54 | 0011011 | −0.9811−0.0673i |
| w55 | 0011011 | +0.9811−0.0673i |
| w56 | 0011100 | −0.0994−1.2493i |
| w57 | 0011100 | +0.0994−1.2493i |
| w58 | 0011101 | −0.0738−0.0604i |
| w59 | 0011101 | +0.0738−0.0604i |
| w60 | 0011110 | −0.1137−1.4651i |
| w61 | 0011110 | +0.1137−1.4651i |
| w62 | 0011111 | −0.2211−0.0614i |
| w63 | 0011111 | +0.2211−0.0614i |
| w64 | 01000000 | −0.6346+0.6721i |
| w65 | 01000001 | +0.6346+0.6721i |
| w66 | 01000010 | −0.6511+0.5096i |
| w67 | 01000011 | +0.6511+0.5096i |
| w68 | 01000100 | −0.8075+0.6969i |
| w69 | 01000101 | +0.8075+0.6969i |
| w70 | 01000110 | −0.8111+0.5264i |
| w71 | 01000111 | +0.8111+0.5264i |
| w72 | 01001000 | −0.4787+0.6378i |
| w73 | 01001001 | +0.4787+0.6378i |
| w74 | 01001010 | −0.4984+0.4870i |
| w75 | 01001011 | +0.4984+0.4870i |
| w76 | 01001100 | −0.3328+0.6100i |
| w77 | 01001101 | +0.3328+0.6100i |
| w78 | 01001110 | −0.3534+0.4630i |
| w79 | 01001111 | +0.3534+0.4630i |
| w80 | 01010000 | −1.2060+0.5685i |
| w81 | 01010001 | +1.2060+0.5685i |
| w82 | 01010010 | −1.4186+0.3682i |
| w83 | 01010011 | +1.4186+0.3682i |
| w84 | 01010100 | −1.0100+0.6965i |
| w85 | 01010101 | +1.0100+0.6965i |
| w86 | 01010110 | −0.9802+0.5258i |
| w87 | 01010111 | +0.9802+0.5258i |
| w88 | 01011000 | −0.0688+0.5579i |
| w89 | 01011001 | +0.0688+0.5579i |
| w90 | 01011010 | −0.0716+0.4278i |
| w91 | 01011011 | +0.0716+0.4278i |
| w92 | 01011100 | −0.2008+0.5810i |
| w93 | 01011101 | +0.2008+0.5810i |
| w94 | 01011110 | −0.2134+0.4408i |
| w95 | 01011111 | +0.2134+0.4408i |
| w96 | 01100000 | −0.6346−0.6721i |
| w97 | 01100001 | +0.6346−0.6721i |
| w98 | 01100010 | −0.6511−0.5096i |
| w99 | 01100011 | +0.6511−0.5096i |
| w100 | 01100100 | −0.8075−0.6969i |
| w101 | 01100101 | +0.8075−0.6969i |
| w102 | 01100110 | −0.8111−0.5264i |
| w103 | 01100111 | +0.8111−0.5264i |
| w104 | 01101000 | −0.4787−0.6378i |
| w105 | 01101001 | +0.4787−0.6378i |
| w106 | 01101010 | −0.4984−0.4870i |
| w107 | 01101011 | +0.4984−0.4870i |
| w108 | 01101100 | −0.3328−0.6100i |
| w109 | 01101101 | +0.3328−0.6100i |
| w110 | 01101110 | −0.3534−0.4630i |
| w111 | 01101111 | +0.3534−0.4630i |
| w112 | 01110000 | −1.2060−0.5685i |
| w113 | 01110001 | +1.2060−0.5685i |
| w114 | 01110010 | −1.4186−0.3682i |
| w115 | 01110011 | +1.4186−0.3682i |
| w116 | 01110100 | −1.0100−0.6965i |
| w117 | 01110101 | +1.0100−0.6965i |
| w118 | 01110110 | −0.9802−0.5258i |
| w119 | 01110111 | +0.9802−0.5258i |
| w120 | 01111000 | −0.0688−0.5579i |
| w121 | 01111001 | +0.0688−0.5579i |
| w122 | 01111010 | −0.0716−0.4278i |

| w index | bit label | Constellation point |
|---|---|---|
| w123 | 01111011 | +0.0716−0.4278i |
| w124 | 01111100 | −0.2008−0.5810i |
| w125 | 01111101 | +0.2008−0.5810i |
| w126 | 01111110 | −0.2134−0.4408i |
| w127 | 01111111 | +0.2134−0.4408i |
| w128 | 10000000 | −0.4884+1.0092i |
| w129 | 10000001 | +0.4884+1.00921 |
| w130 | 10000010 | −0.6641+0.2135i |
| w131 | 10000011 | +0.6641+0.2135i |
| w132 | 10000100 | −0.6891+1.0532i |
| w133 | 10000101 | +0.6891+1.0532i |
| w134 | 10000110 | −0.8280+0.2196i |
| w135 | 10000111 | +0.8280+0.2196i |
| w136 | 10001000 | −0.2967+1.0627i |
| w137 | 10001001 | +0.2967+1.0627i |
| w138 | 10001010 | −0.5128+0.2035i |
| w139 | 10001011 | +0.5128+0.2035i |
| w140 | 10001100 | −0.2650+0.9148i |
| w141 | 10001101 | +0.2650+0.9148i |
| w142 | 10001110 | −0.3662+0.1927i |
| w143 | 10001111 | +0.3662+0.1927i |
| w144 | 10010000 | −1.2385+0.8387i |
| w145 | 10010001 | +1.2385+0.8387i |
| w146 | 10010010 | −1.2036+0.1064i |
| w147 | 10010011 | +1.2036+0.1064i |
| w148 | 10010100 | −0.8990+1.0937i |
| w149 | 10010101 | +0.8990+1.0937i |
| w150 | 10010110 | −1.0114+0.2066i |
| w151 | 10010111 | +1.0114+0.2066i |
| w152 | 10011000 | −0.0947+1.0662i |
| w153 | 10011001 | +0.0947+1.0662i |
| w154 | 10011010 | −0.0736+0.1802i |
| w155 | 10011011 | +0.0736+0.1802i |
| w156 | 10011100 | −0.0895+0.8991i |
| w157 | 10011101 | +0.0895+0.8991i |
| w158 | 10011110 | −0.2203+0.1844i |
| w159 | 10011111 | +0.2203+0.1844i |
| w160 | 10100000 | −0.4884−1.0092i |
| w161 | 10100001 | +0.4884−1.0092i |
| w162 | 10100010 | −0.6641−0.2135i |
| w163 | 10100011 | +0.6641−0.2135i |
| w164 | 10100100 | −0.6891−1.0532i |
| w165 | 10100101 | +0.6891−1.0532i |
| w166 | 10100110 | −0.8280−0.2196i |
| w167 | 10100111 | +0.8280−0.2196i |
| w168 | 10101000 | −0.2967−1.0627i |
| w169 | 10101001 | +0.2967−1.0627i |
| w170 | 10101010 | −0.5128−0.2035i |
| w171 | 10101011 | +0.5128−0.2035i |
| w172 | 10101100 | −0.2650−0.9148i |
| w173 | 10101101 | +0.2650−0.9148i |
| w174 | 10101110 | −0.3662−0.1927i |
| w175 | 10101111 | +0.3662−0.1927i |
| w176 | 10110000 | −1.2385−0.8387i |
| w177 | 10110001 | +1.2385−0.8387i |
| w178 | 10110010 | −1.2036−0.1064i |
| w179 | 10110011 | +1.2036−0.1064i |
| w180 | 10110100 | −0.8990−1.0937i |
| w181 | 10110101 | +0.8990−1.0937i |
| w182 | 10110110 | −1.0114−0.2066i |
| w183 | 10110111 | +1.0114−0.2066i |
| w184 | 10111000 | −0.0947−1.0662i |
| w185 | 10111001 | +0.0947−1.0662i |
| w186 | 10111010 | −0.0736−0.1802i |
| w187 | 10111011 | +0.0736−0.1802i |
| w188 | 10111100 | −0.0895−0.8991i |
| w189 | 10111101 | +0.0895−0.8991i |
| w190 | 10111110 | −0.2203−0.1844i |
| w191 | 10111111 | +0.2203−0.1844i |
| w192 | 11000000 | −0.5902+0.8432i |
| w193 | 11000001 | +0.5902+0.8432i |
| w194 | 11000010 | −0.6617+0.3573i |
| w195 | 11000011 | +0.6617+0.3573i |
| w196 | 11000100 | −0.7660+0.8734i |
| w197 | 11000101 | +0.7660+0.8734i |
| w198 | 11000110 | −0.8276+0.3658i |
| w199 | 11000111 | +0.8276+0.3658i |
| w200 | 11001000 | −0.4439+0.7942i |
| w201 | 11001001 | +0.4439+0.7942i |
| w202 | 11001010 | −0.5089+0.3418i |
| w203 | 11001011 | +0.5089+0.3418i |
| w204 | 11001100 | −0.3014+0.7660i |
| w205 | 11001101 | +0.3014+0.7660i |
| w206 | 11001110 | −0.3625+0.3247i |
| w207 | 11001111 | +0.3625+0.3247i |
| w208 | 11010000 | −1.4112+0.6488i |
| w209 | 11010001 | +1.4112+0.6488i |
| w210 | 11010010 | −1.2116+0.3184i |
| w211 | 11010011 | +1.2116+0.3184i |
| w212 | 11010100 | −0.9651+0.8870i |
| w213 | 11010101 | +0.9651+0.5870i |
| w214 | 11010110 | −1.0181+0.3668i |
| w215 | 11010111 | +1.0181+0.3668i |
| w216 | 11011000 | −0.0550+0.6984i |
| w217 | 11011001 | +0.0550+0.6984i |
| w218 | 11011010 | −0.0731+0.3023i |
| w219 | 11011011 | +0.0731+0.3023i |
| w220 | 11011100 | −0.1623+0.7417i |
| w221 | 11011101 | +0.1623+0.7417i |
| w222 | 11011110 | −0.2183+0.3103i |
| w223 | 11011111 | +0.2183+0.3103i |
| w224 | 11100000 | −0.5902−0.8432i |
| w225 | 11100001 | +0.5902−0.8432i |
| w226 | 11100010 | −0.6617−0.3573i |
| w227 | 11100011 | +0.6617−0.3573i |
| w228 | 11100100 | −0.7660−0.8734i |
| w229 | 11100101 | +0.7660−0.8734i |
| w230 | 11100110 | −0.8276−0.3658i |
| w231 | 11100111 | +0.8276−0.3658i |
| w232 | 11101000 | −0.4439−0.7942i |
| w233 | 11101001 | +0.4439−0.7942i |
| w234 | 11101010 | −0.5089−0.3418i |
| w235 | 11101011 | +0.5089−0.3418i |
| w236 | 11101100 | −0.3014−0.7660i |
| w237 | 11101101 | +0.3014−0.7660i |
| w238 | 11101110 | −0.3625−0.3247i |
| w239 | 11101111 | +0.3625−0.3247i |
| w240 | 11110000 | −1.4112−0.6488i |
| w241 | 11110001 | +1.4112−0.6488i |
| w242 | 11110010 | −1.2116−0.3184i |
| w243 | 11110011 | +1.2116−0.3184i |
| w244 | 11110100 | −0.9651−0.8870i |
| w245 | 11110101 | +0.9651−0.8870i |
| w246 | 11110110 | −1.0181−0.3668i |
| w247 | 11110111 | +1.0181−0.3668i |
| w248 | 11111000 | −0.0550−0.6984i |
| w249 | 11111001 | +0.0550−0.6984i |
| w250 | 11111010 | −0.0731−0.3023i |
| w251 | 11111011 | +0.0731−0.3023i |
| w252 | 11111100 | −0.1623−0.7417i |
| w253 | 11111101 | +0.1623−0.7417i |
| w254 | 11111110 | −0.2183−0.3103i |
| w255 | 11111111 | +0.2183−0.3103i |

C) 1024-QAM non-uniform constellations of group C for BCC encoding:

C1) for code rate 2/3 (or 3/4 or 7/8)), where $z_q$ is a complex constellation point having a real part and an imaginary part

| | | | | | | | | real part | | | | | | | | | |
|---|---|---|---|---|---|---|---|---|---|---|---|---|---|---|---|---|---|
| $b_2$ | 0 | 0 | 0 | 0 | 0 | 0 | 0 | 0 | 0 | 0 | 0 | 0 | 0 | 0 | 0 | 0 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 0 | 0 | 0 | 0 | 0 | 0 | 0 | 1 | 1 | 1 | 1 | 1 | 1 | 1 | 1 | |
| $Re(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_2$ | 1 | 1 | 1 | 1 | 1 | 1 | 1 | 1 | 1 | 1 | 1 | 1 | 1 | 1 | 1 | 1 | |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 1 | 1 | 1 | 1 | 1 | 1 | 1 | 1 | 0 | 0 | 0 | 0 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| | | | | | | | | imaginary part | | | | | | | | | |
| $b_0$ | 0 | 0 | 0 | 0 | 0 | 0 | 0 | 0 | 1 | 1 | 1 | 1 | 1 | 1 | 1 | 1 | |
| $b_1$ | 0 | 0 | 1 | 1 | 1 | 1 | 0 | 0 | 0 | 0 | 1 | 1 | 1 | 1 | 0 | 0 | |
| $b_5$ | 0 | 0 | 0 | 0 | 0 | 0 | 0 | 0 | 0 | 0 | 0 | 0 | 0 | 0 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $Im(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_0$ | 1 | 1 | 1 | 1 | 1 | 1 | 1 | 1 | 0 | 0 | 0 | 0 | 0 | 0 | 0 | 0 | |
| $b_1$ | 0 | 0 | 1 | 1 | 1 | 1 | 0 | 0 | 0 | 0 | 1 | 1 | 1 | 1 | 0 | 0 | |
| $b_5$ | 1 | 1 | 1 | 1 | 1 | 1 | 1 | 1 | 1 | 1 | 1 | 1 | 1 | 1 | 1 | 1 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041;

C2) for code rate 3/4 (or 2/3 or 7/8)), where $z_q$ is a complex constellation point having a real part and an imaginary part

| | | | | | | | | real part | | | | | | | | | |
|---|---|---|---|---|---|---|---|---|---|---|---|---|---|---|---|---|---|
| $b_0$ | 0 | 0 | 1 | 1 | 1 | 1 | 0 | 0 | 0 | 0 | 1 | 1 | 1 | 1 | 0 | 0 | |
| $b_1$ | 0 | 0 | 0 | 0 | 0 | 0 | 0 | 0 | 0 | 0 | 0 | 0 | 0 | 0 | 0 | 0 | |
| $b_3$ | 0 | 0 | 0 | 0 | 0 | 0 | 0 | 0 | 1 | 1 | 1 | 1 | 1 | 1 | 1 | 1 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 0 | 0 | 1 | 1 | 1 | 1 | 1 | 1 | 1 | 1 | 0 | 0 | 0 | 0 | |
| $Re(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_0$ | 0 | 0 | 1 | 1 | 1 | 1 | 0 | 0 | 0 | 0 | 1 | 1 | 1 | 1 | 0 | 0 | |
| $b_1$ | 1 | 1 | 1 | 1 | 1 | 1 | 1 | 1 | 1 | 1 | 1 | 1 | 1 | 1 | 1 | 1 | |
| $b_3$ | 1 | 1 | 1 | 1 | 1 | 1 | 1 | 1 | 0 | 0 | 0 | 0 | 0 | 0 | 0 | 0 | |
| $b_4$ | 0 | 1 | 1 | 0 | 0 | 1 | 1 | 0 | 0 | 1 | 1 | 0 | 0 | 1 | 1 | 0 | |
| $b_6$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| | | | | | | | | imaginary part | | | | | | | | | |
| $b_2$ | 0 | 0 | 0 | 0 | 0 | 0 | 0 | 0 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_2$ | 1 | 1 | 1 | 1 | 1 | 1 | 1 | 1 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 1 | 1 | 1 | 1 | 1 | 1 | 1 | 1 | 0 | 0 | 0 | 0 | |
| $b_8$ | 0 | 1 | 1 | 0 | 0 | 1 | 1 | 0 | 0 | 1 | 1 | 0 | 0 | 1 | 1 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0001, 5.0203, 7.0622, 9.1446, 11.2738, 13.4672, 15.7360, 18.0975, 20.5669, 23.1643, 25.9119, 28.8399, 31.9932, 35.4479, 39.3783;

C3) for code rate 7/8 (or 2/3 or 3/4)), where $z_q$ is a complex constellation point having a real part and an imaginary part

| | real part | | | | | | | | | | | | | | | | |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 0 | 0 | 0 | 0 | 1 | 1 | 1 | 1 | 1 | 1 | 1 | 1 | |
| $b_3$ | 0 | 0 | 0 | 0 | 0 | 0 | 0 | 0 | 0 | 0 | 0 | 0 | 0 | 0 | 0 | 0 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_0$ | 0 | 1 | 1 | 0 | 0 | 1 | 1 | 0 | 0 | 1 | 1 | 0 | 0 | 1 | 1 | 0 | |
| $b_1$ | 1 | 1 | 1 | 1 | 1 | 1 | 1 | 1 | 0 | 0 | 0 | 0 | 0 | 0 | 0 | 0 | |
| $b_3$ | 1 | 1 | 1 | 1 | 1 | 1 | 1 | 1 | 1 | 1 | 1 | 1 | 1 | 1 | 1 | 1 | |
| $b_4$ | 0 | 0 | 0 | 0 | 1 | 1 | 1 | 1 | 1 | 1 | 1 | 1 | 0 | 0 | 0 | 0 | |
| $b_7$ | 0 | 0 | 1 | 1 | 1 | 1 | 0 | 0 | 0 | 0 | 1 | 1 | 1 | 1 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| | imaginary part | | | | | | | | | | | | | | | | |
| $b_2$ | 0 | 1 | 1 | 0 | 0 | 1 | 1 | 0 | 0 | 1 | 1 | 0 | 0 | 1 | 1 | 0 | |
| $b_5$ | 0 | 0 | 0 | 0 | 0 | 0 | 0 | 0 | 0 | 0 | 0 | 0 | 0 | 0 | 0 | 0 | |
| $b_6$ | 0 | 0 | 0 | 0 | 1 | 1 | 1 | 1 | 1 | 1 | 1 | 1 | 0 | 0 | 0 | 0 | |
| $b_8$ | 0 | 0 | 1 | 1 | 1 | 1 | 0 | 0 | 0 | 0 | 1 | 1 | 1 | 1 | 0 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_2$ | 0 | 1 | 1 | 0 | 0 | 1 | 1 | 0 | 0 | 1 | 1 | 0 | 0 | 1 | 1 | 0 | |
| $b_5$ | 1 | 1 | 1 | 1 | 1 | 1 | 1 | 1 | 1 | 1 | 1 | 1 | 1 | 1 | 1 | 1 | |
| $b_6$ | 0 | 0 | 0 | 0 | 1 | 1 | 1 | 1 | 1 | 1 | 1 | 1 | 0 | 0 | 0 | 0 | |
| $b_8$ | 0 | 0 | 1 | 1 | 1 | 1 | 0 | 0 | 0 | 0 | 1 | 1 | 1 | 1 | 0 | 0 | |
| $b_9$ | 1 | 1 | 1 | 1 | 1 | 1 | 1 | 1 | 0 | 0 | 0 | 0 | 0 | 0 | 0 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
3.0036, 5.0180, 7.0505, 9.1089, 11.2008, 13.3343, 15.5187, 17.7638, 20.0812, 22.4846, 24.9913, 27.6247, 30.4193, 33.4347, 36.8041;

D) 1024-QAM non-uniform constellations of group D for LDPC encoding:

D1) for code rate 2/3 (or 2/3 or 5/6)), where $z_q$ is a complex constellation point having a real part and an imaginary part

| | real part | | | | | | | | | | | | | | | | |
|---|---|---|---|---|---|---|---|---|---|---|---|---|---|---|---|---|---|
| $b_1$ | 0 | 1 | 1 | 0 | 0 | 1 | 1 | 0 | 0 | 1 | 1 | 0 | 0 | 1 | 1 | 0 | |
| $b_2$ | 0 | 0 | 0 | 0 | 0 | 0 | 0 | 0 | 1 | 1 | 1 | 1 | 1 | 1 | 1 | 1 | |
| $b_3$ | 0 | 0 | 1 | 1 | 1 | 1 | 0 | 0 | 0 | 0 | 1 | 1 | 1 | 1 | 0 | 0 | |
| $b_6$ | 0 | 0 | 0 | 0 | 0 | 0 | 0 | 0 | 0 | 0 | 0 | 0 | 0 | 0 | 0 | 0 | |
| $b_7$ | 0 | 0 | 0 | 0 | 1 | 1 | 1 | 1 | 1 | 1 | 1 | 1 | 0 | 0 | 0 | 0 | |
| $Re(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_1$ | 0 | 1 | 1 | 0 | 0 | 1 | 1 | 0 | 0 | 1 | 1 | 0 | 0 | 1 | 1 | 0 | |
| $b_2$ | 1 | 1 | 1 | 1 | 1 | 1 | 1 | 1 | 0 | 0 | 0 | 0 | 0 | 0 | 0 | 0 | |
| $b_3$ | 0 | 0 | 1 | 1 | 1 | 1 | 0 | 0 | 0 | 0 | 1 | 1 | 1 | 1 | 0 | 0 | |
| $b_6$ | 1 | 1 | 1 | 1 | 1 | 1 | 1 | 1 | 1 | 1 | 1 | 1 | 1 | 1 | 1 | 1 | |
| $b_7$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC |
| | imaginary part | | | | | | | | | | | | | | | | |
| $b_0$ | 0 | 1 | 1 | 0 | 0 | 1 | 1 | 0 | 0 | 1 | 1 | 0 | 0 | 1 | 1 | 0 | |
| $b_4$ | 0 | 0 | 1 | 1 | 1 | 1 | 0 | 0 | 0 | 0 | 1 | 1 | 1 | 1 | 0 | 0 | |
| $b_5$ | 0 | 0 | 0 | 0 | 0 | 0 | 0 | 0 | 0 | 0 | 0 | 0 | 0 | 0 | 0 | 0 | |
| $b_8$ | 0 | 0 | 0 | 0 | 1 | 1 | 1 | 1 | 1 | 1 | 1 | 1 | 0 | 0 | 0 | 0 | |
| $b_9$ | 0 | 0 | 0 | 0 | 0 | 0 | 0 | 0 | 1 | 1 | 1 | 1 | 1 | 1 | 1 | 1 | |
| $Im(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |

-continued

|       | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_4$ | 0 | 0 | 1 | 1 | 1 | 1 | 0 | 0 | 0 | 0 | 1 | 1 | 1 | 1 | 0 | 0 | |
| $b_5$ | 1 | 1 | 1 | 1 | 1 | 1 | 1 | 1 | 1 | 1 | 1 | 1 | 1 | 1 | 1 | 1 | |
| $b_8$ | 0 | 0 | 0 | 0 | 1 | 1 | 1 | 1 | 1 | 1 | 1 | 1 | 0 | 0 | 0 | 0 | |
| $b_9$ | 1 | 1 | 1 | 1 | 1 | 1 | 1 | 1 | 0 | 0 | 0 | 0 | 0 | 0 | 0 | 0 | |
| $\operatorname{Im}(z_q)$ | 1 | 3 | 5 | 7 | 9 | 11 | 13 | 15 | 17 | 19 | 21 | 23 | 25 | 27 | 29 | 31 | Uniform |
|       | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.0047, 3.9822, 5.1633, 7.0998, 8.5600, 10.4887, 12.2428, 14.2618, 16.3225, 18.5947, 21.0696, 23.8248, 26.9139, 30.4303, 34.5872;

D2) for code rate 3/4 (or 2/3 or 5/6)), where $z_q$ is a complex constellation point having a real part and an imaginary part real part

|       |     |     |     |     |     |     |     |     |     |     |     |     |     |     |     |     |     |
|---|---|---|---|---|---|---|---|---|---|---|---|---|---|---|---|---|---|
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_8$ | 0 | 0 | 0 | 0 | 0 | 0 | 0 | 0 | 0 | 0 | 0 | 0 | 0 | 0 | 0 | 0 | |
| $b_9$ | 0 | 0 | 0 | 0 | 0 | 0 | 0 | 0 | 1 | 1 | 1 | 1 | 1 | 1 | 1 | 1 | |
| $\operatorname{Re}(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
|       | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_3$ | 0 | 1 | 1 | 0 | 0 | 1 | 1 | 0 | 0 | 1 | 1 | 0 | 0 | 1 | 1 | 0 | |
| $b_4$ | 0 | 0 | 0 | 0 | 1 | 1 | 1 | 1 | 1 | 1 | 1 | 1 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_8$ | 1 | 1 | 1 | 1 | 1 | 1 | 1 | 1 | 1 | 1 | 1 | 1 | 1 | 1 | 1 | 1 | |
| $b_9$ | 1 | 1 | 1 | 1 | 1 | 1 | 1 | 1 | 0 | 0 | 0 | 0 | 0 | 0 | 0 | 0 | |
| $\operatorname{Re}(z_q)$ | 1 | 3 | 5 | 7 | 9 | 11 | 13 | 15 | 17 | 19 | 21 | 23 | 25 | 27 | 29 | 31 | Uniform |
|       | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

|       |     |     |     |     |     |     |     |     |     |     |     |     |     |     |     |     |     |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 0 | 0 | 0 | 0 | 0 | 0 | 0 | 0 | 1 | 1 | 1 | 1 | 1 | 1 | 1 | 1 | |
| $b_7$ | 0 | 0 | 0 | 0 | 0 | 0 | 0 | 0 | 0 | 0 | 0 | 0 | 0 | 0 | 0 | 0 | |
| $\operatorname{Im}(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
|       | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_0$ | 0 | 1 | 1 | 0 | 0 | 1 | 1 | 0 | 0 | 1 | 1 | 0 | 0 | 1 | 1 | 0 | |
| $b_1$ | 0 | 0 | 0 | 0 | 1 | 1 | 1 | 1 | 1 | 1 | 1 | 1 | 0 | 0 | 0 | 0 | |
| $b_2$ | 0 | 0 | 1 | 1 | 1 | 1 | 0 | 0 | 0 | 0 | 1 | 1 | 1 | 1 | 0 | 0 | |
| $b_6$ | 1 | 1 | 1 | 1 | 1 | 1 | 1 | 1 | 0 | 0 | 0 | 0 | 0 | 0 | 0 | 0 | |
| $b_7$ | 1 | 1 | 1 | 1 | 1 | 1 | 1 | 1 | 1 | 1 | 1 | 1 | 1 | 1 | 1 | 1 | |
| $\operatorname{Im}(z_q)$ | 1 | 3 | 5 | 7 | 9 | 11 | 13 | 15 | 17 | 19 | 21 | 23 | 25 | 27 | 29 | 31 | Uniform |
|       | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9667, 4.9871, 7.0015, 9.0819, 11.1960, 13.3951, 15.6735, 18.0691, 20.5980, 23.2914, 26.1728, 29.2806, 32.6657, 36.4161, 40.7366;

D3) code rate 5/6 (or 2/3 or 3/4)), where $z_q$ is a complex constellation point having a real part and an imaginary part real part

|       |     |     |     |     |     |     |     |     |     |     |     |     |     |     |     |     |     |
|---|---|---|---|---|---|---|---|---|---|---|---|---|---|---|---|---|---|
| $b_0$ | 0 | 1 | 1 | 0 | 0 | 1 | 1 | 0 | 0 | 1 | 1 | 0 | 0 | 1 | 1 | 0 | |
| $b_3$ | 0 | 0 | 0 | 0 | 0 | 0 | 0 | 0 | 1 | 1 | 1 | 1 | 1 | 1 | 1 | 1 | |
| $b_5$ | 0 | 0 | 1 | 1 | 1 | 1 | 0 | 0 | 0 | 0 | 1 | 1 | 1 | 1 | 0 | 0 | |
| $b_7$ | 0 | 0 | 0 | 0 | 0 | 0 | 0 | 0 | 0 | 0 | 0 | 0 | 0 | 0 | 0 | 0 | |
| $b_8$ | 0 | 0 | 0 | 0 | 1 | 1 | 1 | 1 | 1 | 1 | 1 | 1 | 0 | 0 | 0 | 0 | |
| $\operatorname{Re}(z_q)$ | $-31$ | $-29$ | $-27$ | $-25$ | $-23$ | $-21$ | $-19$ | $-17$ | $-15$ | $-13$ | $-11$ | $-9$ | $-7$ | $-5$ | $-3$ | $-1$ | Uniform |
|       | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | $-1$ | NUC |
| $b_0$ | 0 | 1 | 1 | 0 | 0 | 1 | 1 | 0 | 0 | 1 | 1 | 0 | 0 | 1 | 1 | 0 | |
| $b_3$ | 1 | 1 | 1 | 1 | 1 | 1 | 1 | 1 | 0 | 0 | 0 | 0 | 0 | 0 | 0 | 0 | |
| $b_5$ | 0 | 0 | 1 | 1 | 1 | 1 | 0 | 0 | 0 | 0 | 1 | 1 | 1 | 1 | 0 | 0 | |
| $b_7$ | 1 | 1 | 1 | 1 | 1 | 1 | 1 | 1 | 1 | 1 | 1 | 1 | 1 | 1 | 1 | 1 | |

-continued

| | | | | | | | | | | | | | | | | | |
|---|---|---|---|---|---|---|---|---|---|---|---|---|---|---|---|---|---|
| $b_8$ | 0 | 0 | 0 | 0 | 1 | 1 | 1 | 1 | 1 | 1 | 1 | 1 | 0 | 0 | 0 | 0 | |
| $Re(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | imaginary part

| | | | | | | | | | | | | | | | | | |
|---|---|---|---|---|---|---|---|---|---|---|---|---|---|---|---|---|---|
| $b_1$ | 0 | 0 | 0 | 0 | 0 | 0 | 0 | 0 | 1 | 1 | 1 | 1 | 1 | 1 | 1 | 1 | |
| $b_2$ | 0 | 0 | 0 | 0 | 1 | 1 | 1 | 1 | 1 | 1 | 1 | 1 | 0 | 0 | 0 | 0 | |
| $b_4$ | 0 | 0 | 0 | 0 | 0 | 0 | 0 | 0 | 0 | 0 | 0 | 0 | 0 | 0 | 0 | 0 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $Im(z_q)$ | 31 | −29 | −27 | −25 | −23 | −21 | −19 | −17 | −15 | −13 | −11 | −9 | −7 | −5 | −3 | −1 | Uniform |
| | $-u_{15}$ | $-u_{14}$ | $-u_{13}$ | $-u_{12}$ | $-u_{11}$ | $-u_{10}$ | $-u_9$ | $-u_8$ | $-u_7$ | $-u_6$ | $-u_5$ | $-u_4$ | $-u_3$ | $-u_2$ | $-u_1$ | −1 | NUC |
| $b_1$ | 1 | 1 | 1 | 1 | 1 | 1 | 1 | 1 | 0 | 0 | 0 | 0 | 0 | 0 | 0 | 0 | |
| $b_2$ | 0 | 0 | 0 | 0 | 1 | 1 | 1 | 1 | 1 | 1 | 1 | 1 | 0 | 0 | 0 | 0 | |
| $b_4$ | 1 | 1 | 1 | 1 | 1 | 1 | 1 | 1 | 1 | 1 | 1 | 1 | 1 | 1 | 1 | 1 | |
| $b_6$ | 0 | 0 | 1 | 1 | 1 | 1 | 0 | 0 | 0 | 0 | 1 | 1 | 1 | 1 | 0 | 0 | |
| $b_9$ | 0 | 1 | 1 | 0 | 0 | 1 | 1 | 0 | 0 | 1 | 1 | 0 | 0 | 1 | 1 | 0 | |
| $Im(z_q)$ | 1 | 3 | 5 | 7 | 9 | 11 | 13 | 15 | 17 | 19 | 21 | 23 | 25 | 27 | 29 | 31 | Uniform |
| | 1 | $u_1$ | $u_2$ | $u_3$ | $u_4$ | $u_5$ | $u_6$ | $u_7$ | $u_8$ | $u_9$ | $u_{10}$ | $u_{11}$ | $u_{12}$ | $u_{13}$ | $u_{14}$ | $u_{15}$ | NUC | wherein the values for $u_1, \ldots, u_{15}$ are:
2.9902, 5.0100, 7.0446, 9.1283, 11.2570, 13.4588, 15.7417, 18.1292, 20.6379, 23.2916, 26.1151, 29.1412, 32.4176, 36.0267, 40.1583;
wherein the bit labeling indicated in groups A to D may alternatively be inverted for one or more bit labels.

15. Receiving apparatus comprising:
a receiver configured to receive one or more transmission streams,
a deconverter configured to deconvert one or more transmission streams into said constellation values, and
a demodulation and decoding apparatus as claimed in claim 13 configured to demodulate and decode said constellation values into output data.

16. Receiving method comprising:
receiving one or more transmission streams,
deconverting one or more transmission streams into said constellation values, and
demodulating and decoding said constellation values into output data according to a method as claimed in claim 14.

17. A non-transitory computer-readable recording medium that stores therein a computer program product, which, when executed by a processor, causes the method according to claim 5 to be performed.

* * * * *